US007594609B2

(12) United States Patent
Kotlarsky et al.

(10) Patent No.: US 7,594,609 B2
(45) Date of Patent: Sep. 29, 2009

(54) AUTOMATIC DIGITAL VIDEO IMAGE CAPTURE AND PROCESSING SYSTEM SUPPORTING IMAGE-PROCESSING BASED CODE SYMBOL READING DURING A PASS-THROUGH MODE OF SYSTEM OPERATION AT A RETAIL POINT OF SALE (POS) STATION

(75) Inventors: Anatoly Kotlarsky, Holland, PA (US); Ka Man Au, Philadelphia, PA (US); Mikhail Veksland, Marlton, NJ (US); Xiaoxun Zhu, Marlton, NJ (US)

(73) Assignee: Metrologic Instruments, Inc., Blackwood, NJ (US)

(*) Notice: Subject to any disclaimer, the term of this patent is extended or adjusted under 35 U.S.C. 154(b) by 0 days.

(21) Appl. No.: 11/788,769

(22) Filed: Apr. 20, 2007

(65) Prior Publication Data

US 2008/0006698 A1      Jan. 10, 2008

Related U.S. Application Data

(63) Continuation-in-part of application No. 11/818,156, filed on Mar. 30, 2007, and a continuation-in-part of application No. 11/700,544, filed on Jan. 31, 2007, and a continuation-in-part of application No. 11/700,543, filed on Jan. 31, 2007, and a continuation-in-part of application No. 11/700,737, filed on Jan. 31, 2007, and a continuation-in-part of application No. 11/700,400, filed on Jan. 31, 2007, and a continuation-in-part of application No. 11/699,761, filed on Jan. 30, 2007, now Pat. No. 7,487,917, and a continuation-in-part of application No. 11/699,760, filed on Jan. 30, 2007, now Pat. No. 7,484,666, and a continuation-in-part of application No. 11/699,746, filed on Jan. 30, 2007, and a continuation-in-part of application No. 11/648,758, filed on Dec. 29, 2006, now Pat. No. 7,494,063, and a continuation-in-part of application No. 11/648,759, filed on Dec. 29, 2006, and a continuation-in-part of application No. 11/489,259, filed on Jul. 19, 2006, and a continuation-in-part of application No. 11/408,268, filed on Apr. 20, 2006, now Pat. No. 7,464,877, and a continuation-in-part of application No. 11/305,895, filed on Dec. 16, 2005, and a continuation-in-part of application No. 10/989,220, filed on Nov. 15, 2004, now Pat. No. 7,490,774, and a continuation-in-part of application No. 10/712,787, filed on Nov. 13, 2003, now Pat. No. 7,128,266.

(51) Int. Cl.
*G06K 7/10* (2006.01)

(52) U.S. Cl. .......................... 235/462.42; 235/462.01; 235/462.09; 235/462.43

(58) Field of Classification Search ............ 235/462.42, 235/462.43, 462.01, 462.09, 383, 462.24
See application file for complete search history.

(56) References Cited

U.S. PATENT DOCUMENTS 4,045,813 A     8/1977 Jones
(Continued)

OTHER PUBLICATIONS

Technical Publication by Simon D. Haynes et al. entitled "Sonic-A Plug-In Architecture for Video Processing", pp. 1-10.
(Continued)

*Primary Examiner*—Ahshik Kim
(74) *Attorney, Agent, or Firm*—Thomas J. Perkowski, Esq., P.C.

(57) ABSTRACT

An automatic digital video image capture and processing system supporting image-processing based code symbol reading during a pass-through mode of system operation at a retail point of sale (POS) station. The system comprises an automatic object direction detection subsystem, disposed in its housing, as well as an illumination subsystem, an image formation and detection subsystem, an automatic illumination control subsystem, a digital image capturing and buffering subsystem, a digital image processing subsystem, and a system control subsystem. During system operation, the automatic object direction detection subsystem automatically detects the presence and direction of movement of the object in the field of view (FOV), and in response thereto, generates a first signal indicating a triggering event and a second signal indicating the direction of movement of the object with respect to the FOV. The system control subsystem is responsive to the first and second control signals, and controls and/or coordinates the operation of the subsystems above system so as to support image-processing based code symbol reading during the pass-through mode of system operation at the retail POS station.

23 Claims, 86 Drawing Sheets

U.S. PATENT DOCUMENTS

| | | |
|---|---|---|
| 4,053,233 A | 10/1977 | Biene et al. |
| 4,291,338 A | 9/1981 | Thomas |
| 4,317,622 A | 3/1982 | Metzger |
| 4,338,514 A | 7/1982 | Bixby |
| 4,427,286 A | 1/1984 | Bosse |
| 4,471,228 A | 9/1984 | Nishizawa et al. |
| 4,528,444 A | 7/1985 | Hara et al. |
| 4,535,758 A | 8/1985 | Longacre, Jr. |
| 4,538,060 A | 8/1985 | Sakai et al. |
| 4,613,402 A | 9/1986 | Losee et al. |
| 4,632,542 A | 12/1986 | Whiteside |
| 4,703,344 A | 10/1987 | Hisano et al. |
| D297,432 S | 8/1988 | Stant et al. |
| 4,766,300 A | 8/1988 | Chadima, Jr. et al. |
| 4,805,026 A | 2/1989 | Oda |
| 4,816,916 A | 3/1989 | Akiyama |
| 4,818,847 A | 4/1989 | Hara et al. |
| 4,819,070 A | 4/1989 | Hynecek |
| 4,835,615 A | 5/1989 | Taniguchi et al. |
| D304,026 S | 10/1989 | Goodner et al. |
| 4,894,523 A | 1/1990 | Chadima, Jr. et al. |
| D308,865 S | 6/1990 | Weaver et al. |
| 4,952,966 A | 8/1990 | Ishida et al. |
| 4,972,224 A | 11/1990 | Thompson |
| 4,978,981 A | 12/1990 | Satoh et al. |
| 4,996,413 A | 2/1991 | McDaniel et al. |
| 5,019,714 A | 5/1991 | Knowles |
| 5,025,319 A | 6/1991 | Mutoh et al. |
| 5,034,619 A | 7/1991 | Hammond, Jr. |
| 5,063,460 A | 11/1991 | Mutze et al. |
| 5,063,462 A | 11/1991 | Nakagawa et al. |
| 5,111,263 A | 5/1992 | Stevens |
| 5,124,537 A | 6/1992 | Chandler et al. |
| 5,142,684 A | 8/1992 | Perry et al. |
| 5,144,119 A | 9/1992 | Chadima, Jr. et al. |
| 5,155,345 A | 10/1992 | Ito |
| 5,170,205 A | 12/1992 | Satoh et al. |
| 5,202,907 A | 4/1993 | Yonemoto |
| 5,231,293 A | 7/1993 | Longacre, Jr. |
| 5,233,169 A | 8/1993 | Longacre, Jr. |
| 5,235,198 A | 8/1993 | Stevens et al. |
| 5,235,416 A | 8/1993 | Stanhope |
| 5,262,871 A | 11/1993 | Wilder et al. |
| 5,270,802 A | 12/1993 | Takagi et al. |
| 5,272,538 A | 12/1993 | Homma et al. |
| 5,281,800 A | 1/1994 | Pelton et al. |
| 5,286,960 A | 2/1994 | Longacre, Jr. et al. |
| 5,288,985 A | 2/1994 | Chadima, Jr. et al. |
| 5,291,008 A | 3/1994 | Havens et al. |
| 5,291,009 A | 3/1994 | Roustaei |
| 5,294,783 A | 3/1994 | Hammond, Jr. et al. |
| 5,296,689 A | 3/1994 | Reddersen et al. |
| D346,162 S | 4/1994 | Bennett et al. |
| 5,304,786 A | 4/1994 | Pavlidis et al. |
| 5,304,787 A | 4/1994 | Wang |
| 5,308,962 A | 5/1994 | Havens et al. |
| 5,309,243 A | 5/1994 | Tsai |
| 5,319,181 A | 6/1994 | Shellhammer et al. |
| 5,319,182 A | 6/1994 | Havens et al. |
| 5,331,118 A | 7/1994 | Jensen |
| 5,340,973 A | 8/1994 | Knowles et al. |
| 5,345,266 A | 9/1994 | Denyer |
| 5,349,172 A | 9/1994 | Roustaei |
| 5,352,884 A | 10/1994 | Petrick et al. |
| 5,354,977 A | 10/1994 | Roustaei |
| 5,378,883 A | 1/1995 | Batterman et al. |
| 5,396,054 A | 3/1995 | Krichever et al. |
| 5,399,846 A | 3/1995 | Pavlidis et al. |
| 5,410,141 A | 4/1995 | Kkoenck et al. |
| 5,410,348 A | 4/1995 | Hamasaki |
| 5,418,357 A | 5/1995 | Inoue et al. |
| 5,420,409 A | 5/1995 | Longacre, Jr. et al. |
| 5,430,285 A | 7/1995 | Karpen et al. |
| 5,430,286 A | 7/1995 | Hammond, Jr. et al. |
| 5,450,291 A | 9/1995 | Kumagai |
| 5,457,309 A | 10/1995 | Pelton |
| 5,463,214 A | 10/1995 | Longacre, Jr. et al. |
| 5,468,951 A | 11/1995 | Knowles et al. |
| 5,479,515 A | 12/1995 | Longacre, Jr. |
| 5,484,994 A | 1/1996 | Roustaei |
| 5,489,769 A | 2/1996 | Kubo |
| 5,489,771 A | 2/1996 | Beach et al. |
| 5,491,330 A | 2/1996 | Sato et al. |
| 5,495,097 A | 2/1996 | Katz et al. |
| 5,519,496 A | 5/1996 | Borgert et al. |
| 5,521,366 A | 5/1996 | Wang et al. |
| 5,532,467 A | 7/1996 | Rousatei |
| 5,541,419 A | 7/1996 | Arakellian |
| 5,545,886 A | 8/1996 | Metlitsky et al. |
| 5,550,366 A | 8/1996 | Roustaei |
| 5,572,006 A | 11/1996 | Wang et al. |
| 5,572,007 A | 11/1996 | Aragon et al. |
| 5,591,952 A | 1/1997 | Krichever et al. |
| 5,610,654 A | 3/1997 | Parulski et al. |
| 5,621,203 A | 4/1997 | Swartz et al. |
| 5,623,137 A | 4/1997 | Powers et al. |
| 5,635,697 A | 6/1997 | Shellhammer et al. |
| 5,637,851 A | 6/1997 | Swartz et al. |
| 5,646,390 A | 7/1997 | Wang et al. |
| 5,659,167 A | 8/1997 | Wang et al. |
| 5,659,761 A | 8/1997 | DeArras et al. |
| 5,661,291 A | 8/1997 | Ahearn et al. |
| 5,677,522 A | 10/1997 | Rice et al. |
| 5,679,941 A * | 10/1997 | Iizaka et al. ................ 235/383 |
| 5,702,059 A | 12/1997 | Chu et al. |
| 5,710,417 A | 1/1998 | Joseph et al. |
| 5,717,195 A | 2/1998 | Feng et al. |
| 5,717,221 A | 2/1998 | Li et al. |
| 5,719,384 A | 2/1998 | Ju et al. |
| 5,723,853 A | 3/1998 | Longacre, Jr. et al. |
| 5,723,868 A | 3/1998 | Hammond, Jr. et al. |
| 5,736,724 A | 4/1998 | Ju et al. |
| 5,739,518 A | 4/1998 | Wang |
| 5,747,796 A | 5/1998 | Heard et al. |
| 5,754,670 A | 5/1998 | Shin et al. |
| 5,756,981 A | 5/1998 | Roustaei et al. |
| 5,773,806 A | 6/1998 | Longacre, Jr. et al. |
| 5,773,810 A | 6/1998 | Hussey et al. |
| D396,033 S | 7/1998 | Ahearn et al. |
| 5,777,314 A | 7/1998 | Roustaei |
| 5,780,834 A | 7/1998 | Havens et al. |
| 5,783,811 A | 7/1998 | Feng et al. |
| 5,784,102 A | 7/1998 | Hussey et al. |
| 5,786,582 A | 7/1998 | Roustaei et al. |
| 5,786,583 A | 7/1998 | Maltsev |
| 5,786,586 A | 7/1998 | Pidhirny et al. |
| 5,793,033 A | 8/1998 | Feng et al. |
| 5,793,967 A | 8/1998 | Simciak et al. |
| 5,808,286 A | 9/1998 | Nukui et al. |
| 5,811,774 A | 9/1998 | Ju et al. |
| 5,811,784 A | 9/1998 | Tausch et al. |
| 5,815,200 A | 9/1998 | Ju et al. |
| 5,821,518 A | 10/1998 | Sussmeier et al. |
| 5,825,006 A | 10/1998 | Longacre, Jr. et al. |
| 5,831,254 A | 11/1998 | Karpen et al. |
| 5,831,674 A | 11/1998 | Ju et al. |
| 5,834,754 A | 11/1998 | Feng et al. |
| 5,837,985 A | 11/1998 | Karpen |
| 5,838,495 A | 11/1998 | Hennick |
| 5,841,121 A | 11/1998 | Koenck |
| 5,867,594 A | 2/1999 | Cymbalski |
| 5,883,375 A | 3/1999 | Knowles et al. |
| 5,900,613 A | 5/1999 | Koziol et al. |
| 5,912,700 A | 6/1999 | Honey et al. |

| | | | | | | |
|---|---|---|---|---|---|---|
| 5,914,476 | A | 6/1999 | Gerst, III et al. | 6,398,112 | B1 | 6/2002 | Li et al. |
| 5,914,477 | A | 6/1999 | Wang | D459,728 | S | 7/2002 | Roberts et al. |
| 5,920,061 | A | 7/1999 | Feng | 6,419,157 | B1 | 7/2002 | Ehrhart et al. |
| 5,929,418 | A | 7/1999 | Ehrhart et al. | 6,431,452 | B2 | 8/2002 | Feng |
| 5,932,862 | A | 8/1999 | Hussey et al. | 6,435,411 | B1 | 8/2002 | Massieu et al. |
| 5,942,741 | A | 8/1999 | Longacre, Jr. et al. | 6,469,289 | B1 | 10/2002 | Scott-Thomas et al. |
| 5,949,052 | A | 9/1999 | Longacre, Jr. et al. | 6,473,126 | B1 | 10/2002 | Higashihara et al. |
| 5,949,054 | A | 9/1999 | Karpen et al. | 6,473,519 | B1 | 10/2002 | Pidhirny et al. |
| 5,949,057 | A | 9/1999 | Feng | 6,478,223 | B1 | 11/2002 | Ackley |
| 5,965,863 | A | 10/1999 | Parker et al. | D467,918 | S | 12/2002 | Fitch et al. |
| 5,978,610 | A | 11/1999 | Aoki | 6,489,798 | B1 | 12/2002 | Scott-Thomas et al. |
| 5,979,763 | A | 11/1999 | Wang et al. | 6,491,223 | B1 | 12/2002 | Longacre, Jr. et al. |
| 5,986,705 | A | 11/1999 | Shiboya et al. | 6,497,368 | B1 | 12/2002 | Friend et al. |
| 5,992,744 | A | 11/1999 | Smith et al. | 6,499,664 | B2 | 12/2002 | Knowles et al. |
| 5,992,750 | A | 11/1999 | Chadima, Jr. et al. | 6,527,182 | B1 | 3/2003 | Chiba et al. |
| 6,000,612 | A | 12/1999 | Xu | 6,547,139 | B1 | 4/2003 | Havens et al. |
| 6,006,995 | A | 12/1999 | Amundsen et al. | 6,550,679 | B2 | 4/2003 | Hennick et al. |
| RE36,528 | E | 1/2000 | Roustaei | 6,561,428 | B2 | 5/2003 | Meier et al. |
| 6,015,088 | A | 1/2000 | Parker et al. | 6,565,003 | B1 | 5/2003 | Ma et al. |
| 6,016,135 | A | 1/2000 | Biss et al. | 6,575,367 | B1 | 6/2003 | Longacre et al. |
| 6,019,286 | A | 2/2000 | Li et al. | 6,575,369 | B1 | 6/2003 | Knowles et al. |
| 6,044,231 | A | 3/2000 | Soshi et al. | 6,578,766 | B1 | 6/2003 | Parker et al. |
| 6,045,047 | A | 4/2000 | Pidhirny et al. | 6,585,159 | B1 | 7/2003 | Meier et al. |
| 6,060,722 | A | 5/2000 | Havens et al. | 6,601,768 | B2 | 8/2003 | McCall et al. |
| 6,062,475 | A | 5/2000 | Feng | 6,603,508 | B1 | 8/2003 | Hata |
| 6,064,763 | A | 5/2000 | Maltsev | 6,607,128 | B1 | 8/2003 | Schwartz et al. |
| 6,095,422 | A | 8/2000 | Ogami | 6,616,046 | B1 | 9/2003 | Barkan et al. |
| 6,097,839 | A | 8/2000 | Liu | 6,619,547 | B2 | 9/2003 | Crowther et al. |
| 6,097,856 | A | 8/2000 | Hammon, Jr. | 6,628,445 | B2 | 9/2003 | Chaleff et al. |
| 6,098,887 | A | 8/2000 | Figarella et al. | 6,637,655 | B1 | 10/2003 | Hudrick et al. |
| 6,109,528 | A | 8/2000 | Ohanian et al. | 6,637,658 | B2 | 10/2003 | Barber et al. |
| 6,119,941 | A | 9/2000 | Katsandres et al. | 6,655,595 | B1 | 12/2003 | Longacre, Jr. et al. |
| 6,123,261 | A | 9/2000 | Roustaei | 6,659,350 | B2 | 12/2003 | Schwartz et al. |
| 6,123,263 | A | 9/2000 | Feng | 6,669,093 | B1 | 12/2003 | Meyerson et al. |
| 6,128,414 | A | 10/2000 | Liu | 6,681,994 | B1 | 1/2004 | Koenck |
| 6,141,046 | A | 10/2000 | Roth et al. | 6,685,092 | B2 | 2/2004 | Patel et al. |
| 6,149,063 | A | 11/2000 | Reynolds et al. | 6,685,095 | B2 | 2/2004 | Roustaei et al. |
| 6,152,371 | A | 11/2000 | Schwartz et al. | 6,689,998 | B1 | 2/2004 | Bremer |
| 6,158,661 | A | 12/2000 | Chadima, Jr. et al. | 6,695,209 | B1 | 2/2004 | La |
| 6,161,760 | A | 12/2000 | Marrs et al. | 6,698,656 | B2 | 3/2004 | Parker et al. |
| 6,164,544 | A | 12/2000 | Schwartz et al. | 6,708,883 | B2 | 3/2004 | Krichever |
| 6,173,893 | B1 | 1/2001 | Maltsev et al. | 6,708,885 | B2 | 3/2004 | Reiffel |
| 6,177,926 | B1 | 1/2001 | Kunert | 6,722,569 | B2 | 4/2004 | Ehrhart et al. |
| 6,179,208 | B1 | 1/2001 | Feng | 6,729,546 | B2 | 5/2004 | Roustaei |
| 6,209,789 | B1 | 4/2001 | Amundsen et al. | 6,736,320 | B1 | 5/2004 | Crowther et al. |
| D442,152 | S | 5/2001 | Roustaei | 6,752,319 | B2 | 6/2004 | Ehrhart et al. |
| 6,223,988 | B1 | 5/2001 | Batterman et al. | 6,758,402 | B1 | 7/2004 | Check et al. |
| 6,233,986 | B1 | 5/2001 | Suzuki et al. | 6,758,403 | B1 | 7/2004 | Keys et al. |
| 6,234,395 | B1 | 5/2001 | Chadima et al. | 6,766,954 | B2 | 7/2004 | Barkan et al. |
| 6,244,512 | B1 | 6/2001 | Koenck et al. | 6,778,210 | B1 | 8/2004 | Sugahara et al. |
| 6,246,642 | B1 | 6/2001 | Gardner, Jr. et al. | 6,809,766 | B1 | 10/2004 | Krymski et al. |
| 6,250,551 | B1 | 6/2001 | He et al. | 6,814,290 | B2 | 11/2004 | Longacre |
| 6,254,003 | B1 | 7/2001 | Pettinelli et al. | 6,814,292 | B2 | 11/2004 | Good |
| 6,264,105 | B1 | 7/2001 | Longacre, Jr. et al. | 6,831,690 | B1 | 12/2004 | John et al. |
| 6,266,685 | B1 | 7/2001 | Danielson et al. | 6,832,725 | B2 | 12/2004 | Gardiner et al. |
| 6,275,388 | B1 | 8/2001 | Hennick et al. | 6,834,807 | B2 | 12/2004 | Ehrhart et al. |
| 6,298,175 | B1 | 10/2001 | Longacre, Jr. et al. | 6,837,431 | B2 | 1/2005 | Carlson et al. |
| 6,298,176 | B2 | 10/2001 | Longacre, Jr. et al. | 6,856,440 | B2 | 2/2005 | Chaleff et al. |
| 6,330,974 | B1 | 12/2001 | Ackley | 6,863,217 | B2 | 3/2005 | Hudrick et al. |
| 6,336,587 | B1 | 1/2002 | He et al. | 6,871,993 | B2 | 3/2005 | Hecht |
| 6,340,114 | B1 | 1/2002 | Correa et al. | D505,423 | S | 5/2005 | Ahearn et al. |
| 6,343,739 | B1 * | 2/2002 | Lippert ................... 235/383 | 6,899,272 | B2 | 5/2005 | Krichever et al. |
| 6,345,765 | B1 | 2/2002 | Wiklof | 6,899,273 | B2 | 5/2005 | Hussey et al. |
| 6,347,163 | B2 | 2/2002 | Roustaei | 6,912,076 | B2 | 6/2005 | Chaleff et al. |
| 6,357,659 | B1 | 3/2002 | Kelly et al. | 6,918,540 | B2 | 7/2005 | Good |
| 6,360,947 | B1 | 3/2002 | Knowles et al. | 6,942,151 | B2 | 9/2005 | Ehrhart |
| 6,367,699 | B2 | 4/2002 | Ackley | 6,947,612 | B2 | 9/2005 | Helms et al. |
| 6,370,003 | B1 | 4/2002 | Hennick | 6,951,304 | B2 | 10/2005 | Good |
| 6,371,374 | B1 | 4/2002 | Schwartz et al. | 6,959,865 | B2 | 11/2005 | Walczyk et al. |
| 6,373,579 | B1 | 4/2002 | Ober et al. | 6,969,003 | B2 | 11/2005 | Havens et al. |
| 6,385,352 | B1 | 5/2002 | Roustaei | 6,991,167 | B2 * | 1/2006 | Check et al. ............ 235/462.14 |
| 6,390,625 | B1 | 5/2002 | Slawson et al. | 6,991,169 | B2 | 1/2006 | Bobba et al. |
| D458,265 | S | 6/2002 | Fitch | 7,021,542 | B2 | 4/2006 | Patel et al. |

| | | |
|---|---|---|
| 7,044,377 B2 | 5/2006 | Patel et al. |
| 7,055,747 B2 | 6/2006 | Havens et al. |
| 7,059,525 B2 | 6/2006 | Longacre, Jr. et al. |
| 7,070,099 B2 | 7/2006 | Patel |
| 7,077,317 B2 | 7/2006 | Longacre, Jr. et al. |
| 7,077,321 B2 | 7/2006 | Longacre, Jr. et al. |
| 7,077,327 B1 | 7/2006 | Knowles et al. |
| 7,080,786 B2 | 7/2006 | Longacre, Jr. et al. |
| 7,083,098 B2 | 8/2006 | Joseph et al. |
| 7,086,596 B2 | 8/2006 | Meier et al. |
| 7,086,597 B2 | 8/2006 | Good |
| 7,090,135 B2 | 8/2006 | Patel |
| 7,097,101 B2 | 8/2006 | Kogan et al. |
| 7,097,102 B2 | 8/2006 | Patel et al. |
| 7,100,832 B2 | 9/2006 | Good |
| 7,110,028 B1 | 9/2006 | Merrill |
| 7,137,555 B2 | 11/2006 | Bremer et al. |
| 7,148,923 B2 | 12/2006 | Harper et al. |
| 7,191,947 B2 | 3/2007 | Kahn et al. |
| 7,195,164 B2 | 3/2007 | Patel |
| 7,198,195 B2 | 4/2007 | Bobba et al. |
| 7,219,843 B2 | 5/2007 | Havens et al. |
| 7,221,394 B2 | 5/2007 | Enomoto |
| 7,222,793 B2 | 5/2007 | Patel |
| 7,261,238 B1 | 8/2007 | Carlson et al. |
| 7,273,298 B2 | 9/2007 | Laschke et al. |
| 7,296,748 B2 | 11/2007 | Good |
| 7,296,751 B2 | 11/2007 | Barber et al. |
| 7,303,126 B2 | 12/2007 | Patel et al. |
| 7,303,131 B2 | 12/2007 | Carlson et al. |
| 7,317,447 B2 | 1/2008 | Tan et al. |
| 7,331,523 B2 | 2/2008 | Meier et al. |
| 7,403,707 B2 | 7/2008 | Raskar et al. |
| 2002/0008968 A1 | 1/2002 | Hennick et al. |
| 2002/0096566 A1 | 7/2002 | Schwartz et al. |
| 2002/0150309 A1 | 10/2002 | Hepworth et al. |
| 2002/0170970 A1 | 11/2002 | Ehrhart |
| 2002/0171745 A1 | 11/2002 | Ehrhart |
| 2002/0179713 A1 | 12/2002 | Pettinelli et al. |
| 2002/0191830 A1 | 12/2002 | Pidhirny |
| 2003/0062418 A1 | 4/2003 | Barber et al. |
| 2003/0062419 A1 | 4/2003 | Ehrhart et al. |
| 2003/0085282 A1 | 5/2003 | Parker et al. |
| 2003/0197063 A1 | 10/2003 | Longacre, Jr. |
| 2003/0209603 A1 | 11/2003 | Schwartz et al. |
| 2003/0213847 A1 | 11/2003 | McCall et al. |
| 2003/0218069 A1 | 11/2003 | Meier et al. |
| 2004/0000592 A1 | 1/2004 | Schwartz et al. |
| 2004/0004125 A1 | 1/2004 | Havens et al. |
| 2004/0021783 A1 | 2/2004 | Mihara |
| 2004/0094627 A1 | 5/2004 | Parker et al. |
| 2004/0195328 A1 | 10/2004 | Barber et al. |
| 2006/0180670 A1 | 8/2006 | Acosta et al. |

OTHER PUBLICATIONS

Web-based article from Dr. Dobb's Portal entitled "The Spark Real-Time Kernel" by Anatoly Kotlarsky, www.ddj.com, May 1, 1999, pp. 1-6.

The Customer's Guide to SwiftDecoder™ for Fixed Station Scanners by Omniplanar, Inc., Princeton, New Jersey, Jul. 1, 2008, 136 pages.

Product brochure for the ¼-Inch SOC VGA CMOS Digital Image Sensor by Micron Technology, Inc., 2006, pp. 1-14.

Thesis entitled 'Low-Power Architectures For Single-Chip Digital Image Sensors' by Steve Tanner, Nov. 2000, pp. 1-171.

Product presentation entitled '2D Barcodes and Imaging Scanner Technology' by Bradley S. Carlson for Symbol Technology, Inc. pp. 1-46.

Thesis entitled 'Applications and Implementations Of Centroiding Using CMOS Image Sensors' by Joey Shah of the University of Waterloo, 2002, pp. 1-98.

Product manual for the CBOSII Programmer's Model Rev 1.0, Omniplanar, Inc., Feb. 25, 1994, 52 pages.

Product brochure for the LMC555 CMOS Timer by National Semiconductor Corporation, Mar. 2002, pp. 1-10.

Powerpoint demonstration of the Code Reader 2.0 (CR2)—All Applications Reader, Code Corporation, www.codecorp.com, Apr. 6, 2004, pp. 1-10.

Press Release entitled "Code Corporation's New Imager Offers Revolutionary Performance and Bluetooth Radio", by Benjamin M. Miller, Codex Corporation, 11814 South Election Road, Suite 200, Draper UT 84020, Feb. 19, 2003, pp. 1-2.

Product brochure for the 4600r Retail 2D Imager by Handheld Products, www.handheld.com, Apr. 2007, pp. 1-2.

Search Report for PCT/US07/09763 completed Jul. 27, 2008.

* cited by examiner

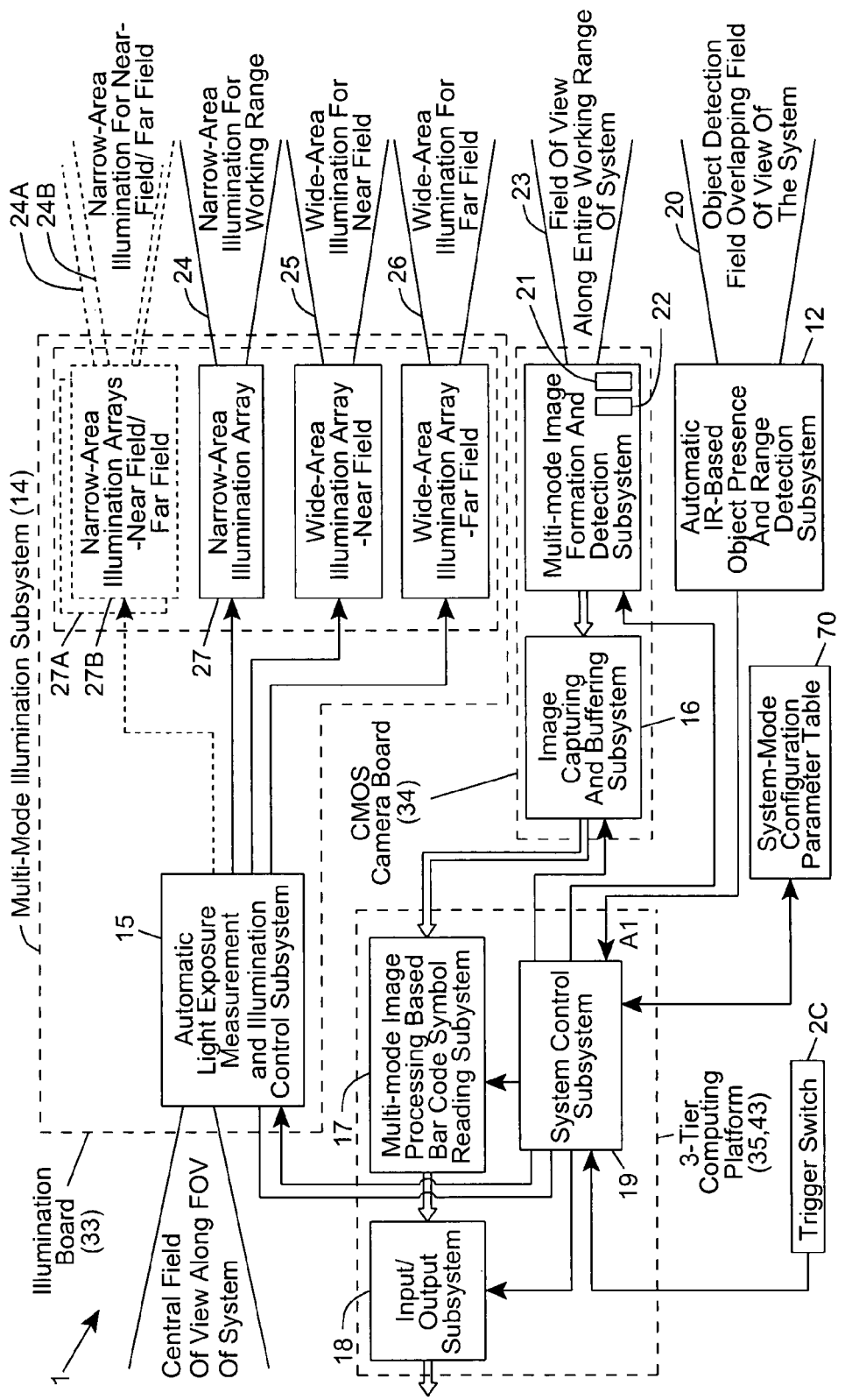
FIG. 2A1

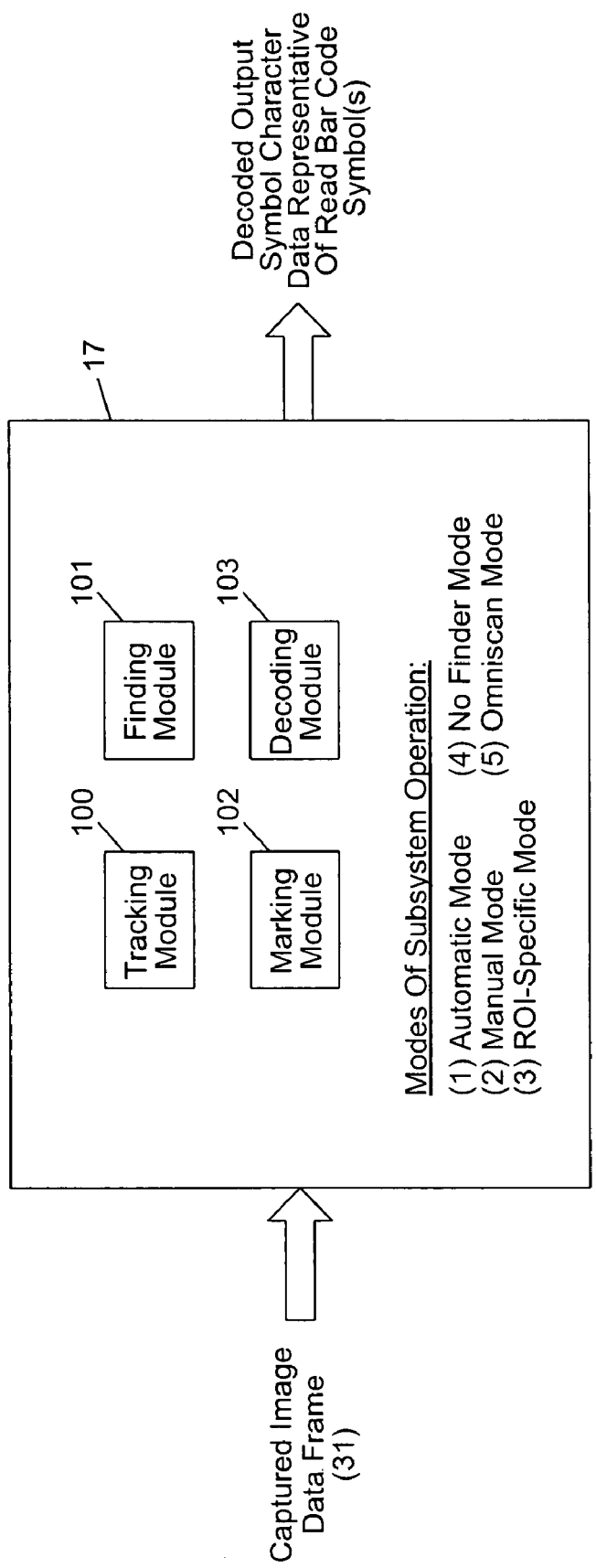
FIG. 2A2

- Barrel Hold Lens Elements
- Base Hold Sensors
- Barrel Slides In Base To Focus

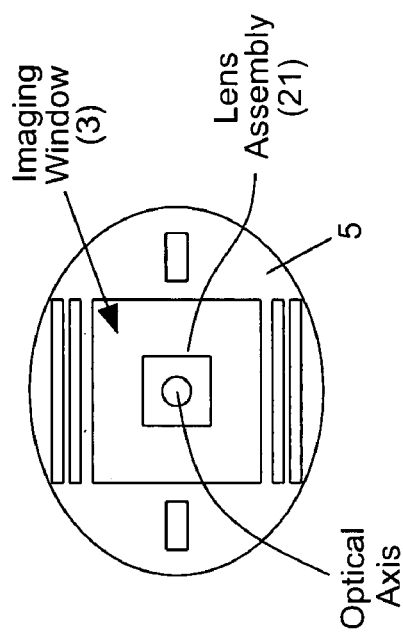
FIG. 3F2
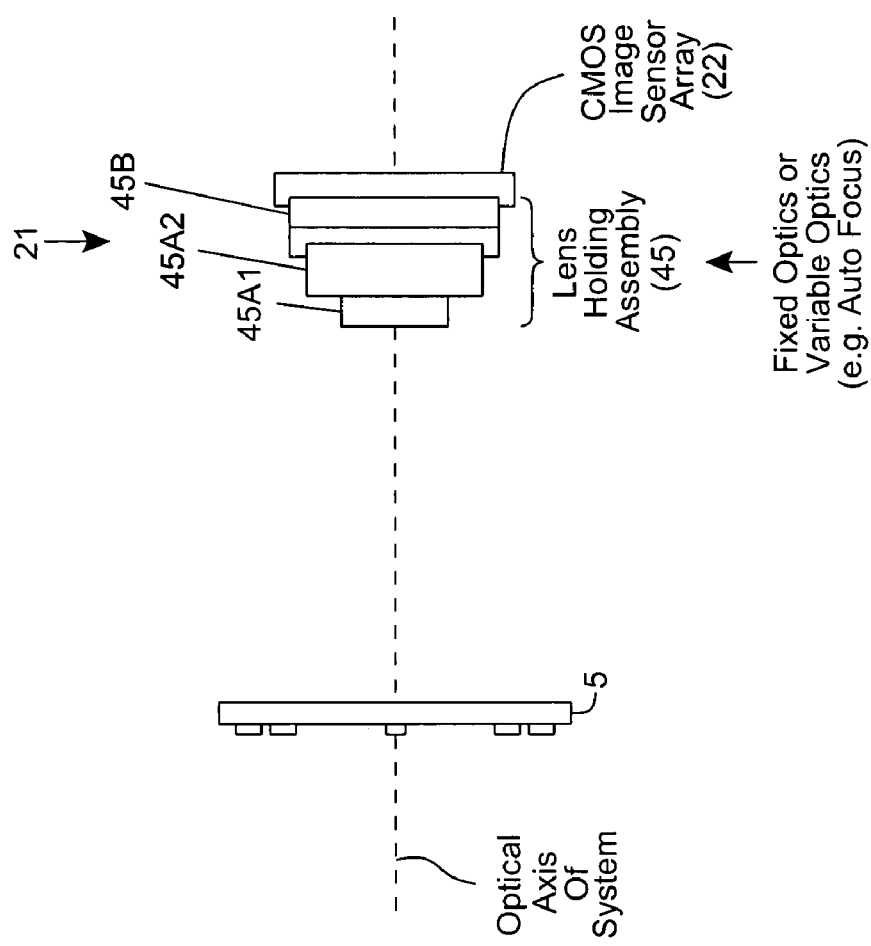
FIG. 3F1

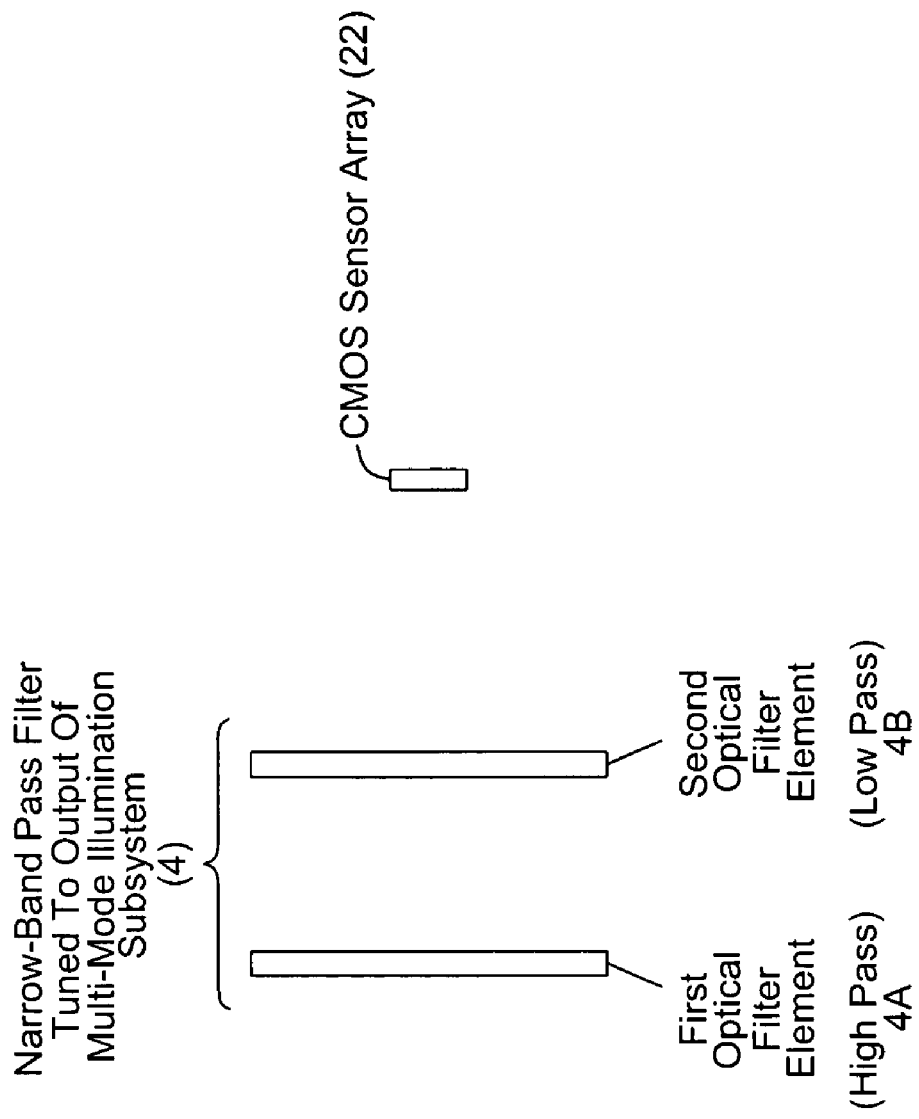

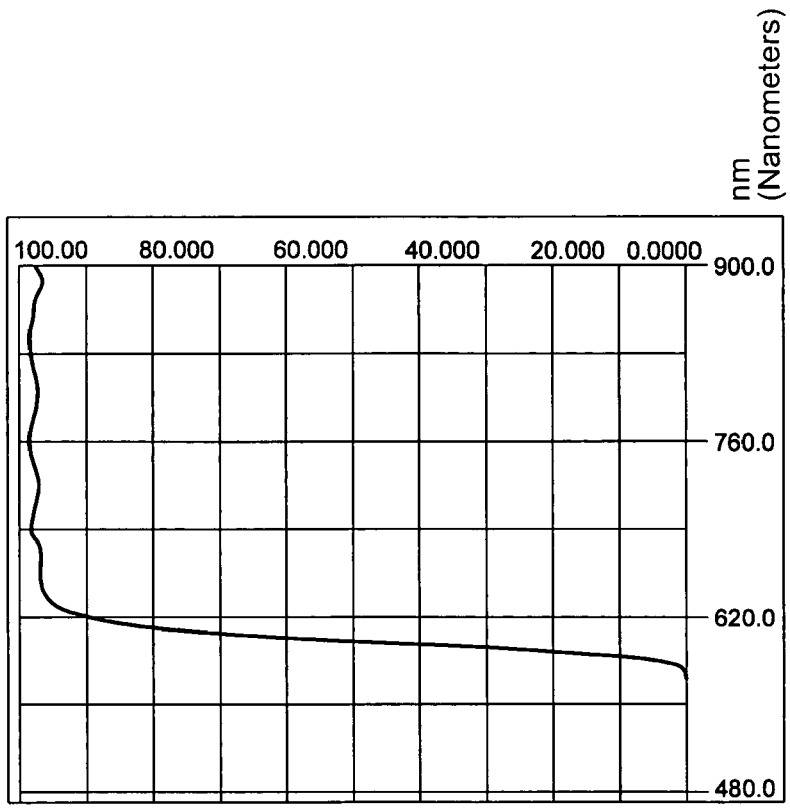
FIG. 5A3
Red Window And Low-Pass Filter Characteristics
• Must Bandpass Return Light Against Ambient
  - Red Window + Low Pass Filter
  - Restricts Range To 620nm – 700nm
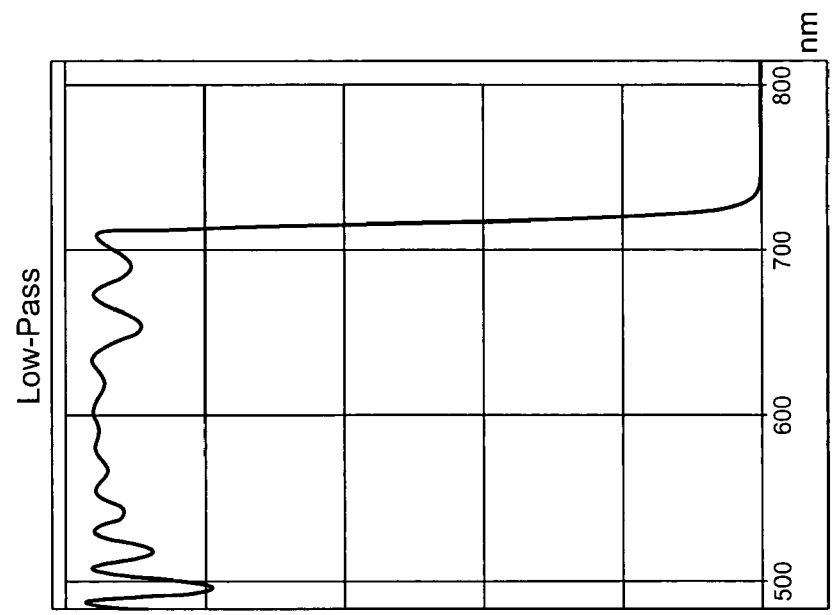
FIG. 5A2

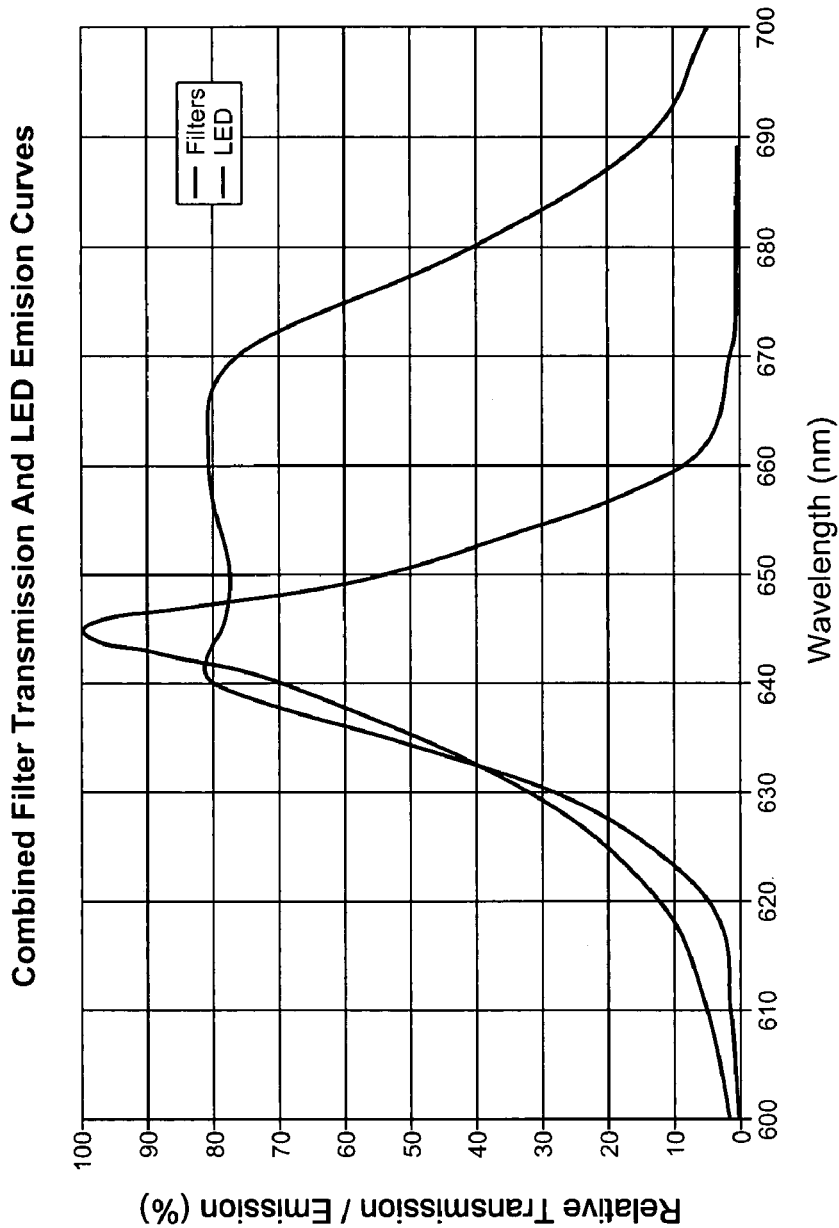
FIG. 5A4

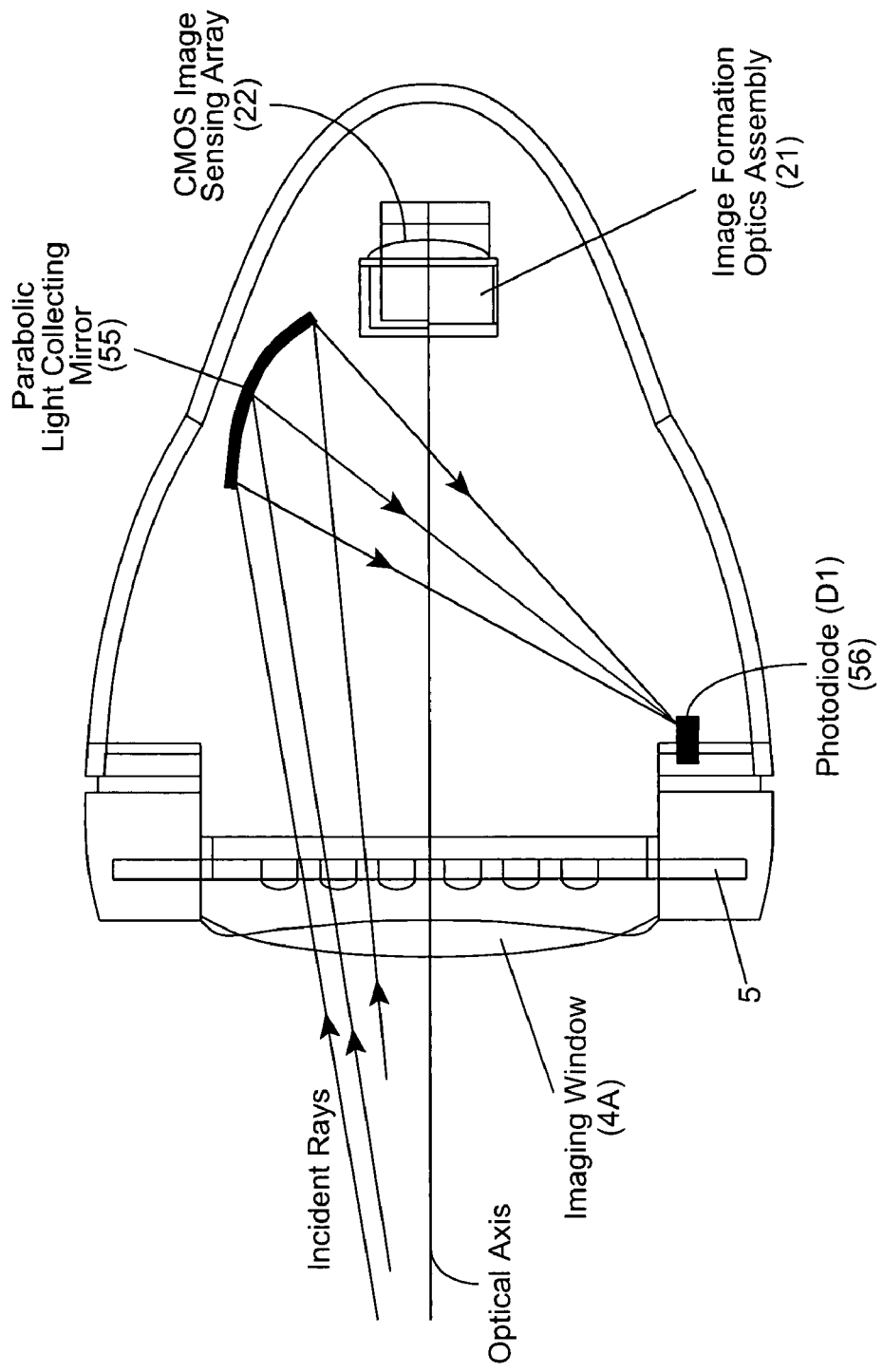

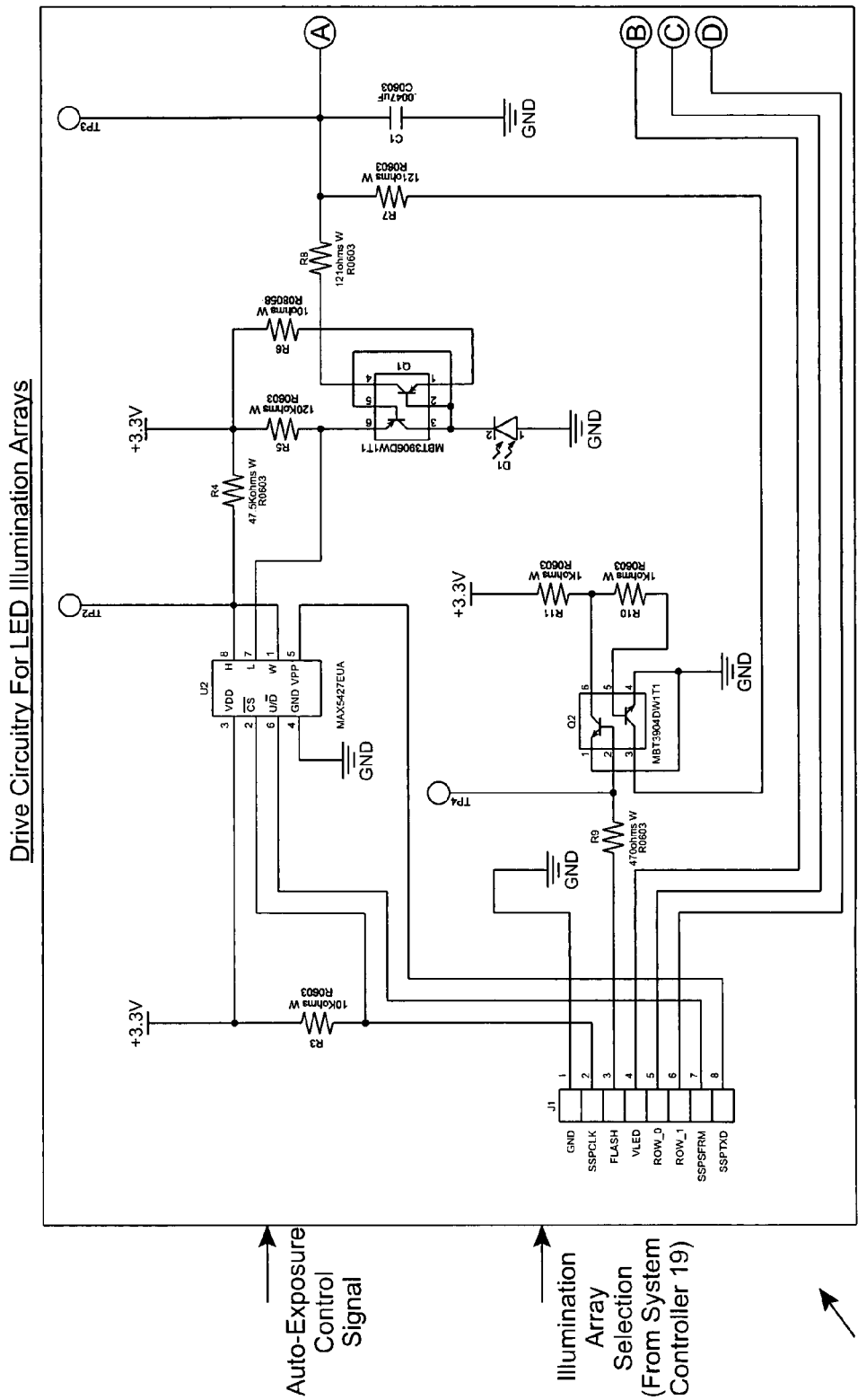
FIG. 6C1

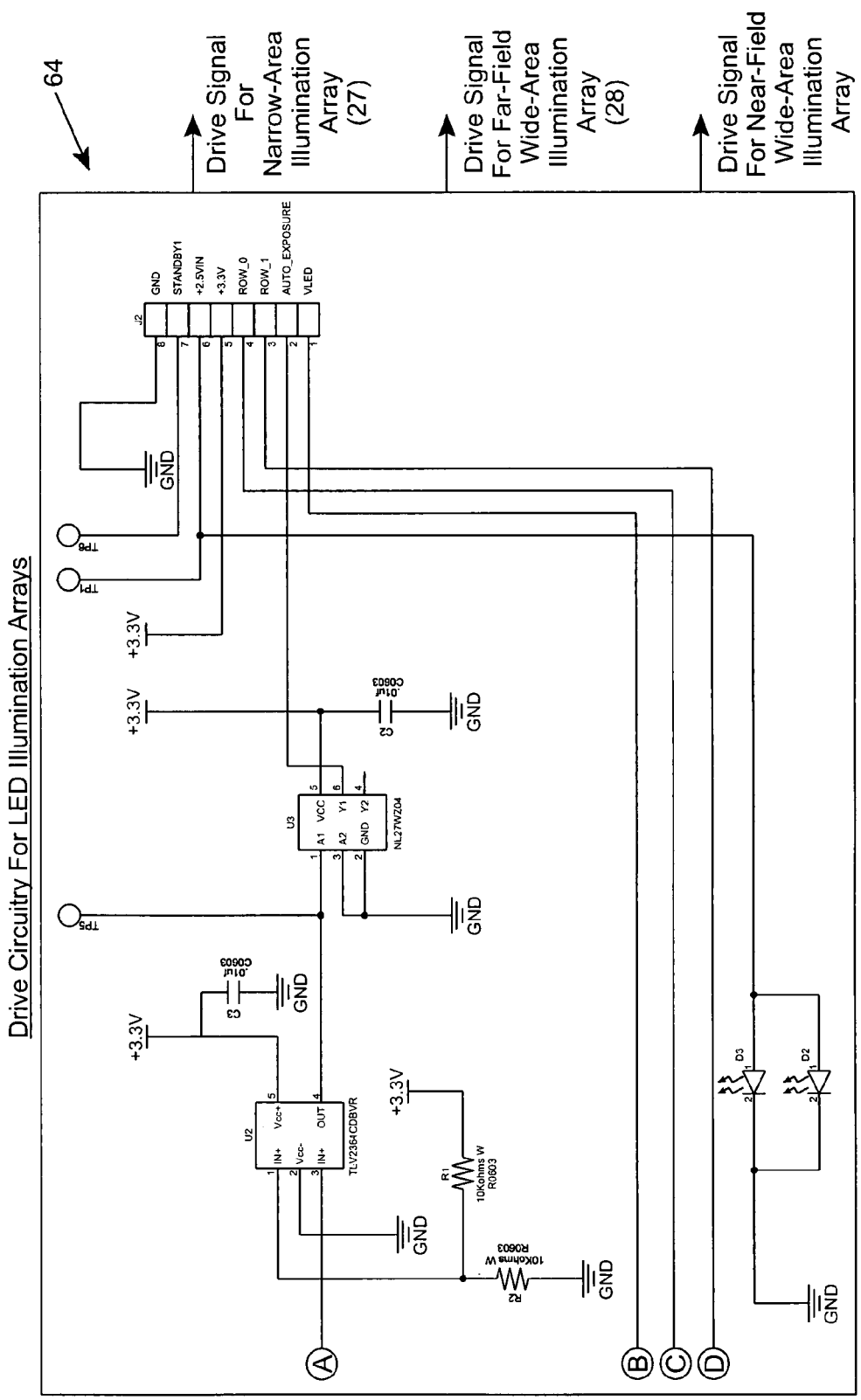
FIG. 6C2

METHOD OF GLOBAL EXPOSURE CONTROL WITHIN A IMAGING-BASED BAR CODE SYMBOL READING SYSTEM

A — STEP A: SELECT THE SINGLE FRAME SHUTTER MODE OF OPERATION FOR THE CMOS IMAGING SENSING ARRAY PROVIDED WITHIN AN IMAGING-BASED BAR CODE SYMBOL READING SYSTEM EMPLOYING AN AUTOMATIC LIGHT EXPOSURE MEASUREMENT AND ILLUMINATION CONTROL SUBSYSTEM, A MULTI-MODE ILLUMINATION SUBSYSTEM, AND A SYSTEM CONTROL SUBSYSTEM INTEGRATED THEREWITH, AND IMAGE FORMATION OPTICS PROVIDING THE CMOS IMAGE SENSING ARRAY WITH A FIELD OF VIEW INTO A REGION OF SPACE WHERE OBJECTS TO BE IMAGED ARE PRESENTED.

B — STEP B: USE THE AUTOMATIC LIGHT EXPOSURE MEASUREMENT AND ILLUMINATION CONTROL SUBSYSTEM TO CONTINUOUSLY COLLECT ILLUMINATION FROM A PORTION OF THE FIELD OF VIEW, DETECT THE INTENSITY OF THE COLLECTED ILLUMINATION, AND GENERATE AN ELECTRICAL ANALOG SIGNAL CORRESPONDING TO THE DETECTED INTENSITY, FOR PROCESSING.

C — STEP C: ACTIVATE (E.G. BY WAY OF THE SYSTEM CONTROL SUBSYSTEM 19 OR DIRECTLY BY WAY OF TRIGGER SWITCH 2C) THE CMOS IMAGE SENSING ARRAY SO THAT ITS ROWS OF PIXELS BEGIN TO INTEGRATE PHOTONICALLY GENERATED ELECTRICAL CHARGE IN RESPONSE TO THE FORMATION OF AN IMAGE ONTO THE CMOS IMAGE SENSING ARRAY BY THE IMAGE FORMATION OPTICS OF THE SYSTEM.

D — STEP D: WHEN ALL ROWS OF PIXELS IN THE IMAGE SENSING ARRAY ARE OPERATED IN A STATE OF INTEGRATION, AUTOMATICALLY GENERATE AN ELECTRONIC ROLLING SHUTTER (ERS) DIGITAL PULSE SIGNAL FROM THE CMOS IMAGE SENSING ARRAY AND PROVIDE THIS ERS PULSE SIGNAL TO THE AUTOMATIC LIGHT EXPOSURE MEASUREMENT AND ILLUMINATION CONTROL SUBSYSTEM SO AS TO ACTIVATE LIGHT EXPOSURE MEASUREMENT AND ILLUMINATION CONTROL OPERATIONS THEREWITHIN (A)

FIG. 6E1

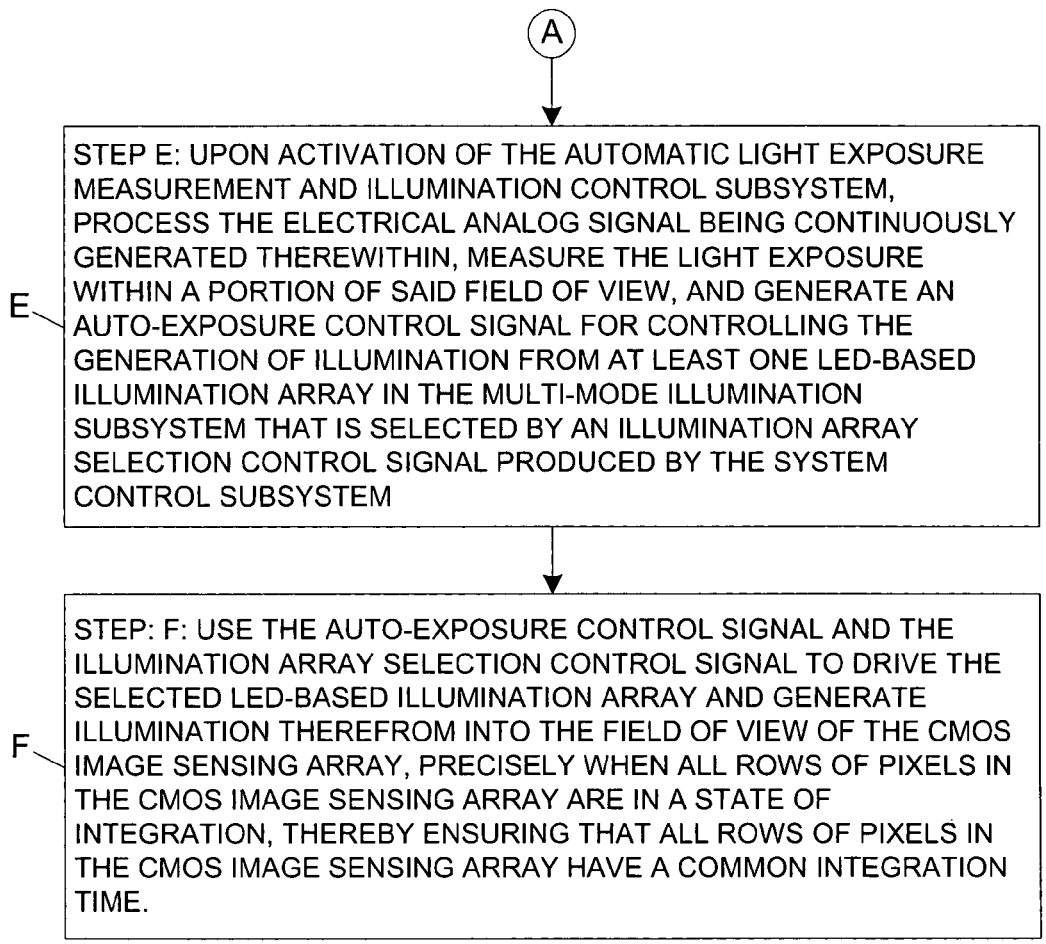
FIG. 6E2

N=1280 x 1024 + 1

PROGRAMMABLE MODES OF BAR CODE SYMBOL READING OPERATION WITHIN THE HAND-SUPPORTABLE DIGITAL IMAGING-BASED BAR CODE SYMBOL READER OF THE PRESENT INVENTION

Programmed Mode of System Operation No.1: Manually-Triggered Single-Attempt 1D Single-Read Mode Employing the No-Finder Mode of Operation Programmed Mode of System Operation No.2: Manually-Triggered Multiple-Attempt 1D Single-Read Mode Employing the No-Finder Mode of Operation Programmed Mode of System Operation No.3: Manually-Triggered Single-Attempt 1D/2D Single-Read Mode Employing the No-Finder And The Automatic Or Manual Modes of Operation Programmed Mode of System Operation No.4: Manually-Triggered Multiple-Attempt 1D/2D Single-Read Mode Employing the No-Finder And The Automatic Or Manual Modes of Operation Programmed Mode of System Operation No.5: Manually-Triggered Multiple-Attempt 1D/2D Multiple-Read Mode Employing the No-Finder And The Automatic Or Manual Modes of Operation Programmed Mode of System Operation No.6: Automatically- Triggered Single-Attempt 1D Single-Read Mode Employing The No-Finder Mode Of Operation Programmed Mode of System Operation No.7: Automatically-Triggered Multi-Attempt 1D Single-Read Mode Employing The No-Finder Mode Of Operation Programmed Mode of System Operation No.8: Automatically-Triggered Multi-Attempt 1D/2D Single-Read Mode Employing The No-Finder and Manual and/or Automatic Modes Of Operation Programmed Mode of System Operation No.9: Automatically-Triggered Multi-Attempt 1D/2D Multiple-Read Mode Employing The No-Finder and Manual and/or Automatic Modes Of Operation Programmable Mode of System Operation No. 10: Automatically-Triggered Multiple-Attempt 1D/2D Single-Read Mode Employing The Manual, Automatic or Omniscan Modes Of Operation Programmed Mode of System Operation No. 11: Semi-Automatic-Triggered Single-Attempt 1D/2D Single-Read Mode Employing The No-Finder And The Automatic Or Manual Modes Of Operation

FIG. 11A

Programmable Mode of System Operation No. 12: Semi-Automatic-Triggered Multiple-Attempt 1D/2D Single-Read Mode Employing The No-Finder And The Automatic Or Manual Modes Of Operation Semi-Automatic-Triggered Multiple-Attempt 1D/2D Multiple-Read Mode Employing The No-Finder And The Automatic Or Manual Modes Of Decoder Operation; Programmable Mode of Operation No. 13

Programmable Mode of Operation No. 14: Semi-Automatic-Triggered Multiple-Attempt 1D/2D Multiple-Read Mode Employing The No-Finder And The Omniscan Modes Of Operation Programmable Mode of Operation No. 15: Continuously-Automatically-Triggered Multiple-Attempt 1D/2D Multiple-Read Mode Employing The Automatic, Manual Or Omniscan Modes Of Operation Programmable Mode of System Operation No. 16: Diagnostic Mode Of Imaging-Based Bar Code Reader Operation Programmable Mode of System Operation No. 17: Live Video Mode Of Imaging-Based Bar Code Reader Operation

FIG. 11B

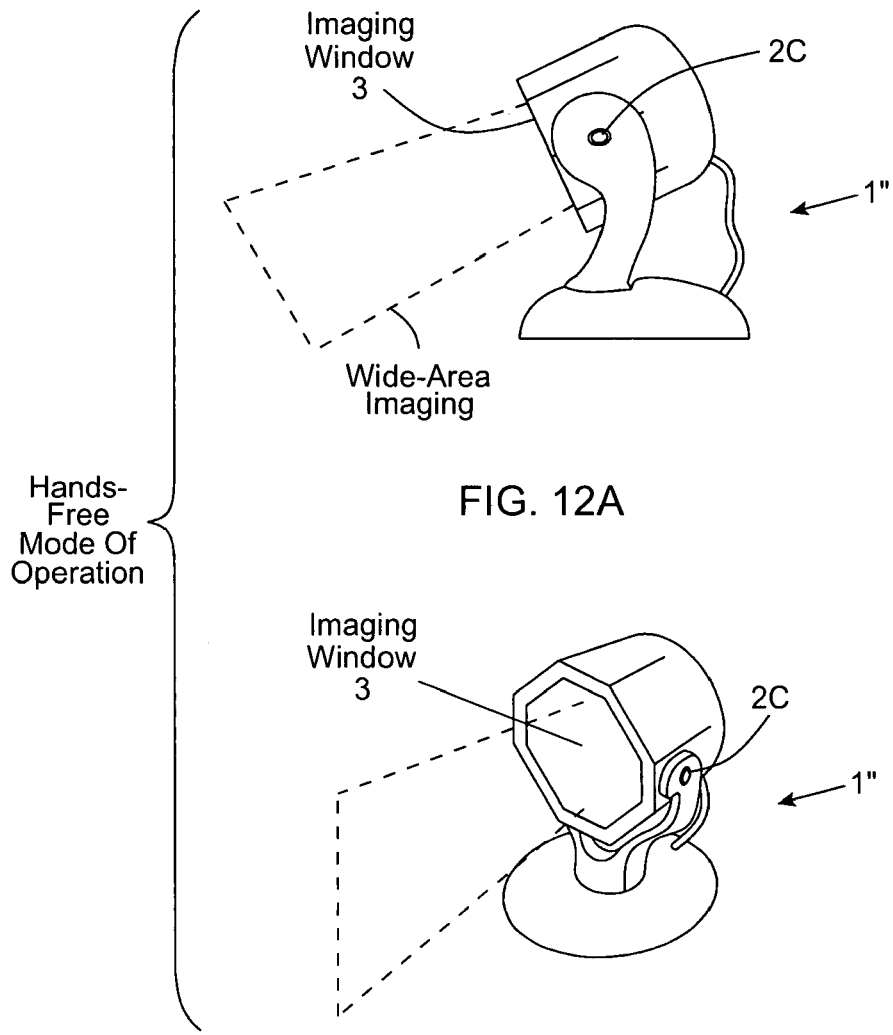
FIG. 12A
FIG. 12B
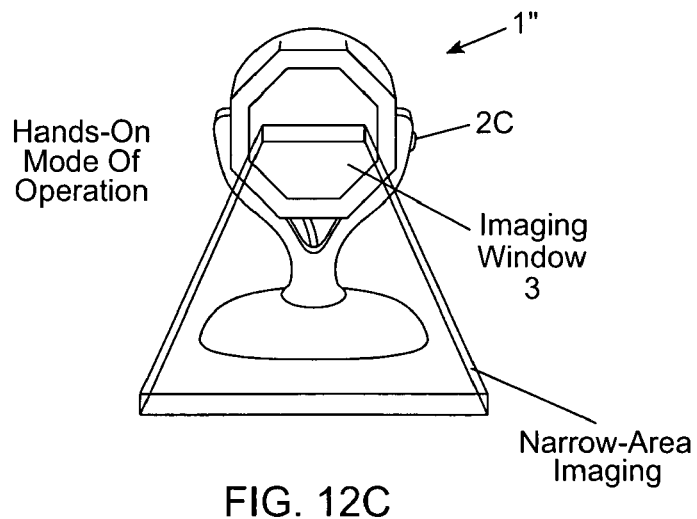
FIG. 12C

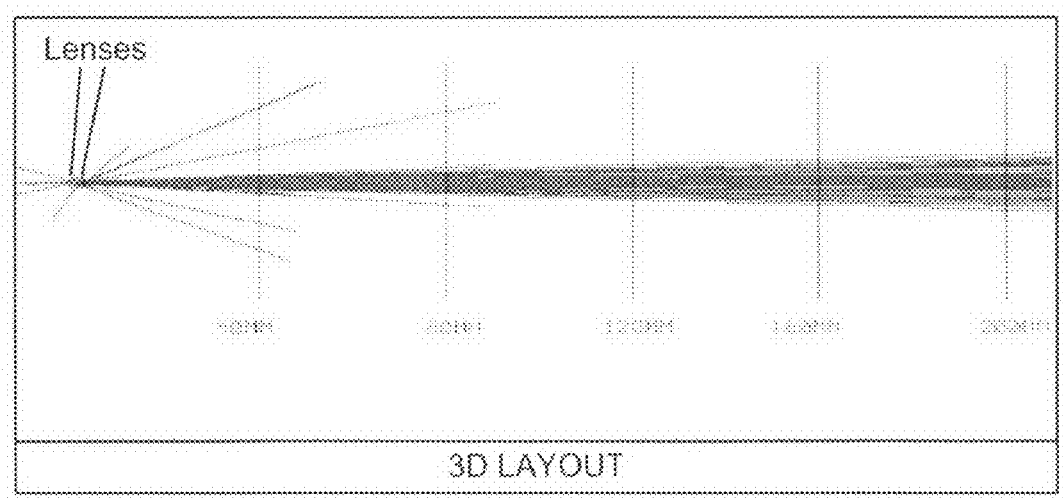
FIG. 25C
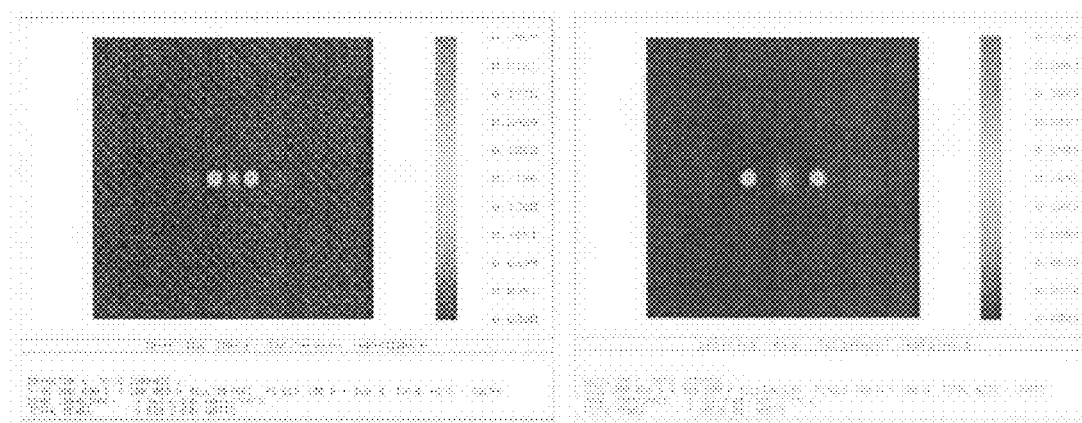
Distance: 40mm              Distance: 80mm
FIG. 25D1                   FIG. 25D2

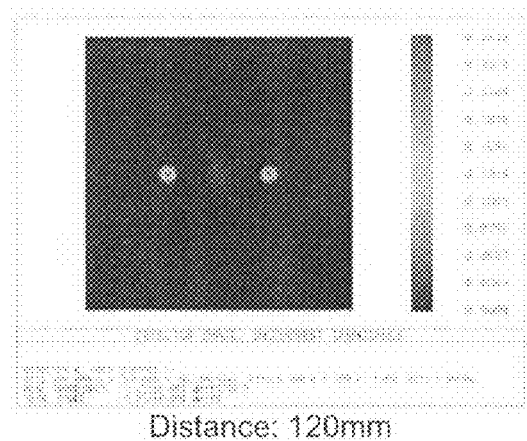
Distance: 120mm
FIG. 25D3
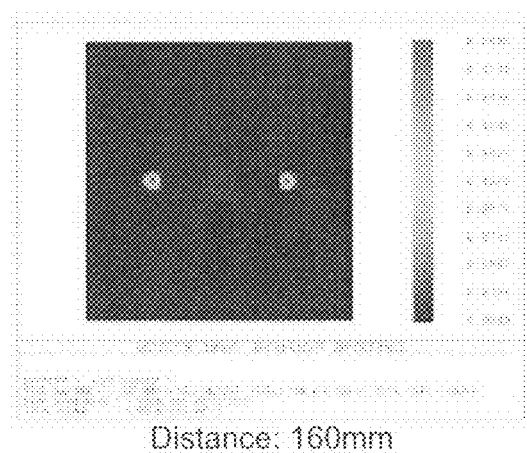
Distance: 160mm
FIG. 25D4
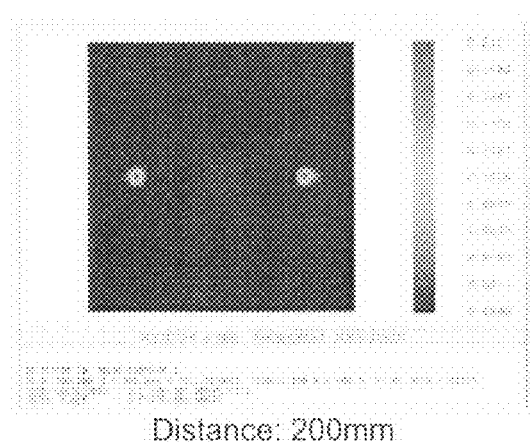
Distance: 200mm
FIG. 25D5

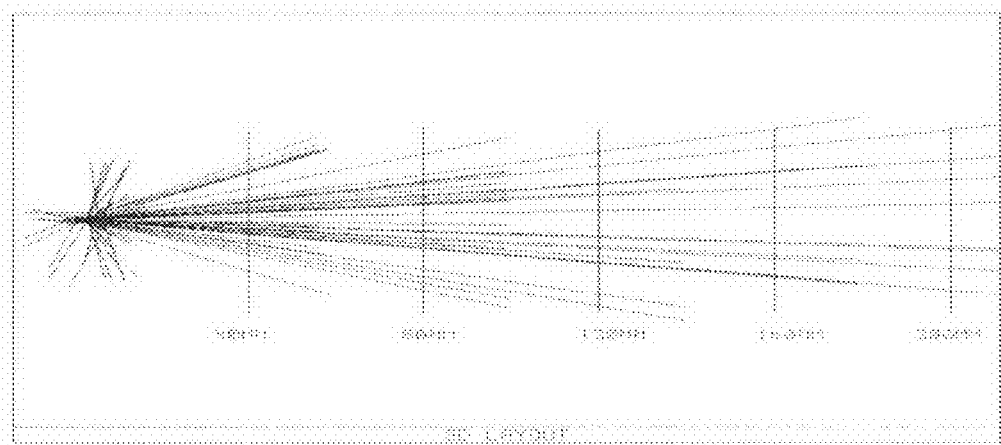
FIG. 26C
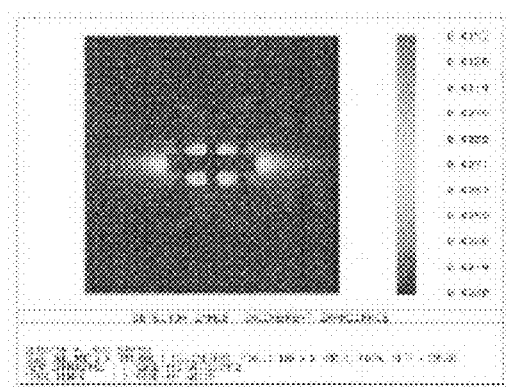 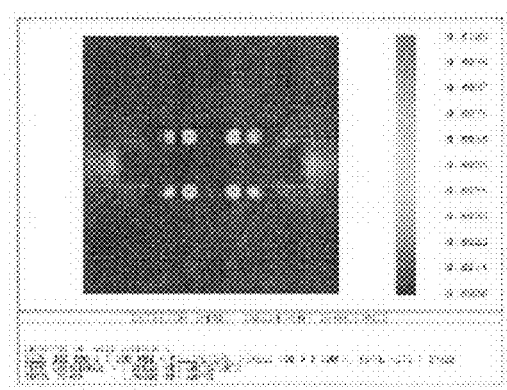
FIG. 26D1          FIG. 26D2

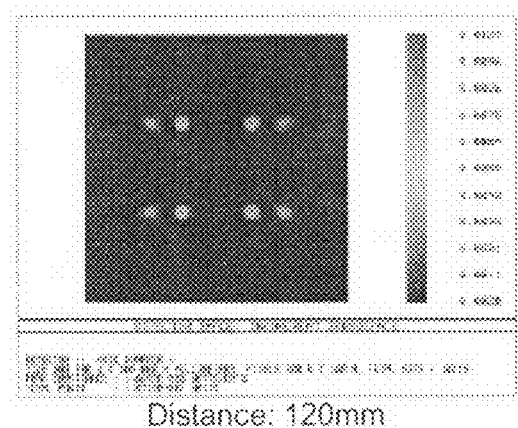
Distance: 120mm
FIG. 26D3
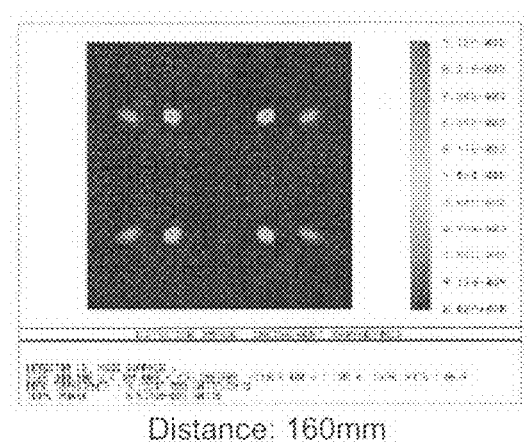
Distance: 160mm
FIG. 26D4
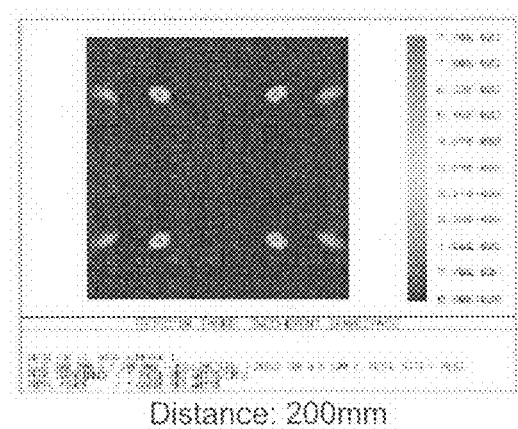
Distance: 200mm
FIG. 26D5

RULE 1: If $A_1(t) = 1$, before $A_2(t) = 1$, then L → R movement.

RULE 2: If $A_2(t) = 1$, before $A_1(t) = 1$, then R → L movement.

RULE 3: If $A_3(t) = 1$, before $A_4(t) = 1$, then U → D movement.

RULE 4: If $A_4(t) = 1$, before $A_3(t) = 1$, then D → U movement.

RULE 5: If L → R or R → L movement is detected, then activate "Pass-Through" mode; otherwise activate "Presentation" mode.

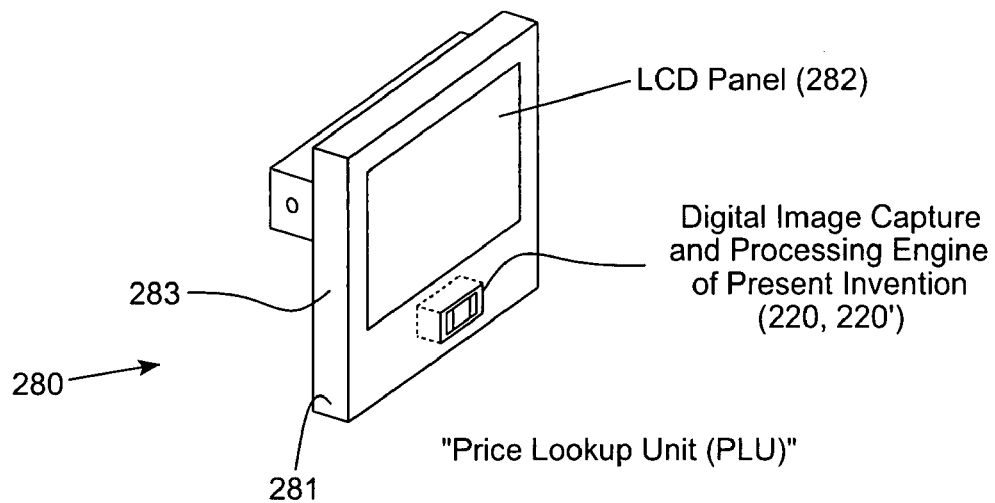
FIG. 53
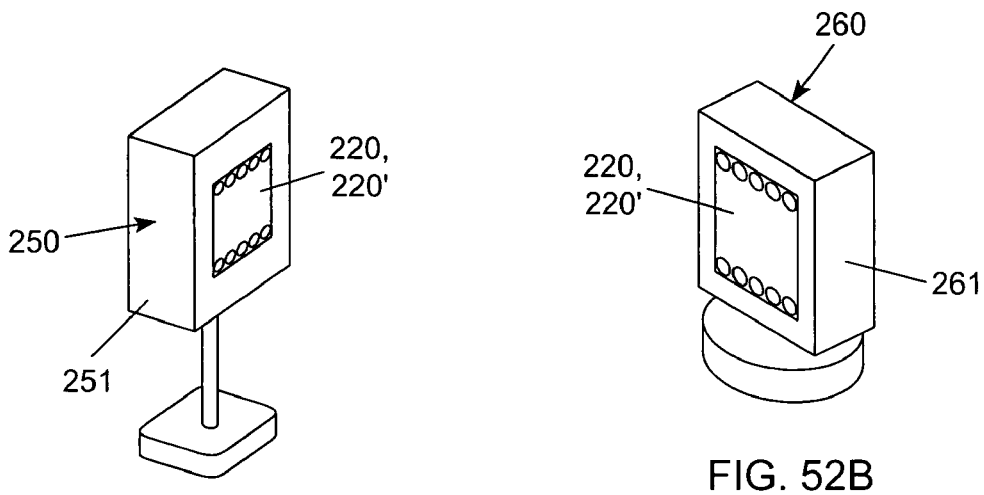
FIG. 52A
FIG. 52B
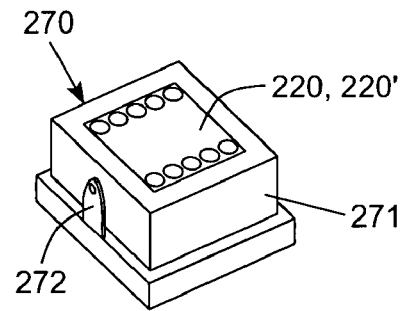
FIG. 52C

AUTOMATIC DIGITAL VIDEO IMAGE CAPTURE AND PROCESSING SYSTEM SUPPORTING IMAGE-PROCESSING BASED CODE SYMBOL READING DURING A PASS-THROUGH MODE OF SYSTEM OPERATION AT A RETAIL POINT OF SALE (POS) STATION

RELATED CASES

This Application is a Continuation-in-Part of the following U.S. Applications: U.S. application Ser. No. 11/818,156 filed Mar. 30, 2007; Ser. No. 11/700,544 filed Jan. 31, 2007; Ser. No. 11/700,543 filed Jan. 31, 2007; Ser. No. 11/700,737 filed Jan. 31, 2007; Ser. No. 11/700,400 filed Jan. 31, 2007; Ser. No. 11/699,761 filed Jan. 30, 2007, now U.S. Pat. No. 7,487,917; Ser. No. 11/699,760 filed Jan. 30, 2007, now U.S. Pat. No. 7,484,666; Ser. No. 11/699,746 filed Jan. 30, 2007; Ser. No. 11/648,758 filed Dec. 29, 2006, now U.S. Pat. No. 7,494,063; Ser. No. 11/648,759 filed Dec. 29, 2006; Ser. No. 11/489,259 filed Jul. 19, 2006; and Ser. No. 11/408,268 filed Apr. 20, 2006, now U.S. Pat. No. 7,464,877; Ser. No. 11/305,895 filed Dec. 16, 2005; Ser. No. 10/989,220 filed Nov. 15, 2004 now U.S. Pat. No. 7,490,774; and Ser. No. 10/712,787 filed Nov. 13, 2003, now U.S. Pat. No. 7,128,266. Each said patent application is assigned to and commonly owned by Metrologic Instruments, Inc. of Blackwood, N.J., and is incorporated herein by reference in its entirety.

BACKGROUND OF INVENTION

1. Field of Invention

The present invention relates to hand-supportable and portable area-type digital bar code readers having diverse modes of digital image processing for reading one-dimensional (1D) and two-dimensional (2D) bar code symbols, as well as other forms of graphically-encoded intelligence.

2. Brief Description of the State of the Art

The state of the automatic-identification industry can be understood in terms of (i) the different classes of bar code symbologies that have been developed and adopted by the industry, and (ii) the kinds of apparatus developed and used to read such bar code symbologies in various user environments.

In general, there are currently three major classes of bar code symbologies, namely: one dimensional (1D) bar code symbologies, such as UPC/EAN, Code 39, etc.; 1D stacked bar code symbologies, Code 49, PDF417, etc.; and two-dimensional (2D) data matrix symbologies.

One Dimensional optical bar code readers are well known in the art. Examples of such readers include readers of the Metrologic Voyager® Series Laser Scanner manufactured by Metrologic Instruments, Inc. Such readers include processing circuits that are able to read one dimensional (1D) linear bar code symbologies, such as the UPC/EAN code, Code 39, etc., that are widely used in supermarkets. Such 1D linear symbologies are characterized by data that is encoded along a single axis, in the widths of bars and spaces, so that such symbols can be read from a single scan along that axis, provided that the symbol is imaged with a sufficiently high resolution along that axis.

In order to allow the encoding of larger amounts of data in a single bar code symbol, a number of 1D stacked bar code symbologies have been developed, including Code 49, as described in U.S. Pat. No. 4,794,239 (Allais), and PDF417, as described in U.S. Pat. No. 5,340,786 (Pavlidis, et al.). Stacked symbols partition the encoded data into multiple rows, each including a respective 1D bar code pattern, all or most of all of which must be scanned and decoded, then linked together to form a complete message. Scanning still requires relatively high resolution in one dimension only, but multiple linear scans are needed to read the whole symbol.

The third class of bar code symbologies, known as 2D matrix symbologies offer orientation-free scanning and greater data densities and capacities than their 1D counterparts. In 2D matrix codes, data is encoded as dark or light data elements within a regular polygonal matrix, accompanied by graphical finder, orientation and reference structures. When scanning 2D matrix codes, the horizontal and vertical relationships of the data elements are recorded with about equal resolution.

In order to avoid having to use different types of optical readers to read these different types of bar code symbols, it is desirable to have an optical reader that is able to read symbols of any of these types, including their various subtypes, interchangeably and automatically. More particularly, it is desirable to have an optical reader that is able to read all three of the above-mentioned types of bar code symbols, without human intervention, i.e., automatically. This in turn, requires that the reader have the ability to automatically discriminate between and decode bar code symbols, based only on information read from the symbol itself. Readers that have this ability are referred to as "auto-discriminating" or having an "auto-discrimination" capability.

If an auto-discriminating reader is able to read only 1D bar code symbols (including their various subtypes), it may be said to have a 1D auto-discrimination capability. Similarly, if it is able to read only 2D bar code symbols, it may be said to have a 2D auto-discrimination capability. If it is able to read both 1D and 2D bar code symbols interchangeably, it may be said to have a 1D/2D auto-discrimination capability. Often, however, a reader is said to have a 1D/2D auto-discrimination capability even if it is unable to discriminate between and decode 1D stacked bar code symbols.

Optical readers that are capable of 1D auto-discrimination are well known in the art. An early example of such a reader is Metrologic's VoyagerCG® Laser Scanner, manufactured by Metrologic Instruments, Inc.

Optical readers, particularly hand held optical readers, that are capable of 1D/2D auto-discrimination and based on the use of an asynchronously moving 1D image sensor, are described in U.S. Pat. Nos. 5,288,985 and 5,354,977, which applications are hereby expressly incorporated herein by reference. Other examples of hand held readers of this type, based on the use of a stationary 2D image sensor, are described in U.S. Pat. Nos. 6,250,551; 5,932,862; 5,932,741; 5,942,741; 5,929,418; 5,914,476; 5,831,254; 5,825,006; 5,784,102, which are also expressly incorporated herein by reference.

Optical readers, whether of the stationary or movable type, usually operate at a fixed scanning rate, which means that the readers are designed to complete some fixed number of scans during a given amount of time. This scanning rate generally has a value that is between 30 and 200 scans/sec for 1D readers. In such readers, the results the successive scans are decoded in the order of their occurrence.

Imaging-based bar code symbol readers have a number advantages over laser scanning based bar code symbol readers, namely: they are more capable of reading stacked 2D symbologies, such as the PDF 417 symbology; more capable of reading matrix 2D symbologies, such as the Data Matrix symbology; more capable of reading bar codes regardless of their orientation; have lower manufacturing costs; and have the potential for use in other applications, which may or may not be related to bar code scanning, such as OCR, security systems, etc Prior art imaging-based bar code symbol readers suffer from a number of additional shortcomings and drawbacks.

Most prior art hand held optical reading devices can be reprogrammed by reading bar codes from a bar code programming menu or with the use of a local host processor as taught in U.S. Pat. No. 5,929,418. However, these devices are generally constrained to operate within the modes in which they have been programmed to operate, either in the field or on the bench, before deployment to end-user application environments. Consequently, the statically-configured nature of such prior art imaging-based bar code reading systems has limited their performance.

Prior art imaging-based bar code symbol readers with integrated illumination subsystems also support a relatively short range of the optical depth of field. This limits the capabilities of such systems from reading big or highly dense bar code labels.

Prior art imaging-based bar code symbol readers generally require a separate apparatus for producing a visible aiming beam to help the user to aim the camera's field of view at the bar code label on a particular target object.

Prior art imaging-based bar code symbol readers generally require capturing multiple frames of image data of a bar code symbol, and a special apparatus for synchronizing the decoding process with the image capture process within such readers, as required in U.S. Pat. Nos. 5,932,862 and 5,942,741 assigned to Welch Allyn, Inc.

Prior art imaging-based bar code symbol readers generally require large arrays of LEDs in order to flood the field of view within which a bar code symbol might reside during image capture operations, oftentimes wasting large amounts of electrical power which can be significant in portable or mobile imaging-based readers.

Prior art imaging-based bar code symbol readers generally require processing the entire pixel data set of capture images to find and decode bar code symbols represented therein. On the other hand, some prior art imaging systems use the inherent programmable (pixel) windowing feature within conventional CMOS image sensors to capture only partial image frames to reduce pixel data set processing and enjoy improvements in image processing speed and thus imaging system performance.

Many prior art imaging-based bar code symbol readers also require the use of decoding algorithms that seek to find the orientation of bar code elements in a captured image by finding and analyzing the code words of 2-D bar code symbologies represented therein.

Some prior art imaging-based bar code symbol readers generally require the use of a manually-actuated trigger to actuate the image capture and processing cycle thereof.

Prior art imaging-based bar code symbol readers generally require separate sources of illumination for producing visible aiming beams and for producing visible illumination beams used to flood the field of view of the bar code reader.

Prior art imaging-based bar code symbol readers are generally utilize during a single image capture and processing cycle, and a single decoding methodology for decoding bar code symbols represented in captured images.

Some prior art imaging-based bar code symbol readers require exposure control circuitry integrated with the image detection array for measuring the light exposure levels on selected portions thereof.

Also, many imaging-based readers also require processing portions of captured images to detect the image intensities thereof and determine the reflected light levels at the image detection component of the system, and thereafter to control the LED-based illumination sources to achieve the desired image exposure levels at the image detector.

Prior art imaging-based bar code symbol readers employing integrated illumination mechanisms control image brightness and contrast by controlling the time the image sensing device is exposed to the light reflected from the imaged objects. While this method has been proven for the CCD-based bar code scanners, it is not suitable, however, for the CMOS-based image sensing devices, which require a more sophisticated shuttering mechanism, leading to increased complexity, less reliability and, ultimately, more expensive bar code scanning systems.

Prior Art Field of View (FOV) Aiming, Targeting, Indicating and Marking Techniques The need to target, indicate and/or mark the field of view (FOV) of 1D and 2D image sensors within hand-held imagers has also been long recognized in the industry.

In U.S. Pat. No. 4,877,949, Danielson et al disclosed on Aug. 8, 1966 an imaging-based bar code symbol reader having a 2D image sensor with a field of view (FOV) and also a pair of LEDs mounted about a 1D (i.e. linear) image sensor to project a pair of light beams through the FOV focusing optics and to produce a pair of spots on a target surface supporting a 1D bar code, thereby indicating the location of the FOV on the target and enables the user to align the bar code therewithin.

In U.S. Pat. No. 5,019,699, Koenck et al disclosed on Aug. 31, 1988 an imaging-based bar code symbol reader having a 2D image sensor with a field of view (FOV) and also a set of four LEDs (each with lenses) about the periphery of a 2D (i.e. area) image sensor to project four light beams through the FOV focusing optics and produce four spots on a target surface to mark the corners of the FOV intersecting with the target, to help the user align 1D and 2D bar codes therewithin in an easy manner.

In FIGS. 48-50 of U.S. Pat. Nos. 5,841,121 and 6,681,994, Koenck disclosed on Nov. 21, 1990, an imaging-based bar code symbol reader having a 2D image sensor with a field of view (FOV) and also an apparatus for marking the perimeter of the FOV, using four light sources and light shaping optics (e.g. cylindrical lens).

In U.S. Pat. No. 5,378,883, Batterman et al disclosed on Jul. 29, 1991, a hand-held imaging-based bar code symbol reader having a 2D image sensor with a field of view (FOV) and also a laser light source and fixed lens to produce a spotter beam that helps the operator aim the reader at a candidate bar code symbol. As disclosed, the spotter beam is also used to measure the distance to the bar code symbol during automatic focus control operations supported within the bar code symbol reader.

In U.S. Pat. No. 5,659,167, Wang et al disclosed on Apr. 5, 1994, an imaging-based bar code symbol reader comprising a 2D image sensor with a field of view (FOV), a user display for displaying a visual representation of a dataform (e.g. bar code symbol), and visual guide marks on the user display for indicating whether or not the dataform being imaged is in focus when its image is within the guide marks, and out of focus when its image is within the guide marks.

In U.S. Pat. No. 6,347,163, Roustaei disclosed on May 19, 1995, a system for reading 2D images comprising a 2D image sensor, an array of LED illumination sources, and an image framing device which uses a VLD for producing a laser beam and a light diffractive optical element for transforming the laser beam into a plurality of beamlets having a beam edge and a beamlet spacing at the 2D image, which is at least as large as the width of the 2D image.

In U.S. Pat. No. 5,783,811, Feng et al disclosed on Feb. 26, 1996, a portable imaging assembly comprising a 2D image sensor with a field of view (FOV) and also a set of LEDs and a lens array which produces a cross-hair type illumination pattern in the FOV for aiming the imaging assembly at a target.

In U.S. Pat. No. 5,793,033, Feng et al disclosed on Mar. 29, 1996, a portable imaging assembly comprising a 2D image sensor with a field of view (FOV), and a viewing assembly having a pivoting member which, when positioned at a predetermined distance from the operator's eye, provides a view through its opening which corresponds to the target area (FOV) of the imaging assembly for displaying a visual representation of a dataform (e.g. bar code symbol).

In U.S. Pat. No. 5,780,834, Havens et al disclosed on May 14, 1996, a portable imaging and illumination optics assembly having a 2D image sensor with a field of view (FOV), an array of LEDs for illumination, and an aiming or spotting light (LED) indicating the location of the FOV.

In U.S. Pat. No. 5,949,057, Feng et al disclosed on Jan. 31, 1997, a portable imaging device comprising a 2D image sensor with a field of view (FOV), and first and second sets of targeting LEDs and first and second targeting optics, which produces first and second illumination targeting patterns, which substantially coincide to form a single illumination targeting pattern when the imaging device is arranged at a "best focus" position.

In U.S. Pat. No. 6,060,722, Havens et al disclosed on Sep. 24, 1997, a portable imaging and illumination optics assembly comprising a 2D image sensor with a field of view (FOV), an array of LEDs for illumination, and an aiming pattern generator including at least a point-like aiming light source and a light diffractive element for producing an aiming pattern that remains approximately coincident with the FOV of the imaging device over the range of the reader-to-target distances over which the reader is used.

In U.S. Pat. No. 6,340,114, filed Jun. 12, 1998, Correa et al disclosed an imaging engine comprising a 2D image sensor with a field of view (FOV) and an aiming pattern generator using one or more laser diodes and one or more light diffractive elements to produce multiple aiming frames having different, partially overlapping, solid angle fields or dimensions corresponding to the different fields of view of the lens assembly employed in the imaging engine. The aiming pattern includes a centrally-located marker or cross-hair pattern. Each aiming frame consists of four corner markers, each comprising a plurality of illuminated spots, for example, two multiple spot lines intersecting at an angle of 90 degrees.

As a result of the limitations in the field of view (FOV) marking, targeting and pointing subsystems employed within prior art imaging-based bar code symbol readers, such prior art readers generally fail to enable users to precisely identify which portions of the FOV read by the high-density 1D bar codes with the ease and simplicity of laser scanning based bar code symbol readers, and also 2D symbologies, such as PDF 417 and Data Matrix.

Also, as a result of limitations in the mechanical, electrical, optical, and software design of prior art imaging-based bar code symbol readers, such prior art readers generally: (i) fail to enable users to read high-density 1D bar codes with the ease and simplicity of laser scanning based bar code symbol readers and also 2D symbologies, such as PDF 417 and Data Matrix, and (iii) have not enabled end-users to modify the features and functionalities of such prior art systems without detailed knowledge about the hard-ware platform, communication interfaces and the user interfaces of such systems.

Also, control operations in prior art image-processing bar code symbol reading systems have not been sufficiently flexible or agile to adapt to the demanding lighting conditions presented in challenging retail and industrial work environments where 1D and 2D bar code symbols need to be reliably read.

Thus, there is a great need in the art for an improved method of and apparatus for reading bar code symbols using image capture and processing techniques which avoid the shortcomings and drawbacks of prior art methods and apparatus.

OBJECTS AND SUMMARY OF THE PRESENT INVENTION

Accordingly, a primary object of the present invention is to provide a novel method of and apparatus for enabling the reading of 1D and 2D bar code symbologies using image capture and processing based systems and devices, which avoid the shortcomings and drawbacks of prior art methods and apparatus.

Another object of the present invention is to provide a novel hand-supportable digital imaging-based bar code symbol reader capable of automatically reading 1D and 2D bar code symbologies using the state-of-the art imaging technology, and at the speed and with the reliability achieved by conventional laser scanning bar code symbol readers.

Another object of the present invention is to provide a novel hand-supportable digital imaging-based bar code symbol reader that is capable of reading stacked 2D symbologies such as PDF417, as well as Data Matrix.

Another object of the present invention is to provide a novel hand-supportable digital imaging-based bar code symbol reader that is capable of reading bar codes independent of their orientation with respect to the reader.

Another object of the present invention is to provide a novel hand-supportable digital imaging-based bar code symbol reader that utilizes an architecture that can be used in other applications, which may or may not be related to bar code scanning, such as OCR, OCV, security systems, etc.

Another object of the present invention is to provide a novel hand-supportable digital imaging-based bar code symbol reader that is capable of reading high-density bar codes, as simply and effectively as "flying-spot" type laser scanners do.

Another object of the present invention is to provide a hand-supportable imaging-based bar code symbol reader capable of reading 1D and 2D bar code symbologies in a manner as convenient to the end users as when using a conventional laser scanning bar code symbol reader.

Another object of the present invention is to provide a hand-supportable imaging-based bar code symbol reader having a multi-mode bar code symbol reading subsystem, which is dynamically reconfigured in response to real-time processing operations carried out on captured images.

Another object of the present invention is to provide a hand-supportable imaging-based bar code symbol reader having an integrated LED-based multi-mode illumination subsystem for generating a visible narrow-area illumination beam for aiming on a target object and illuminating a 1D bar code symbol aligned therewith during a narrow-area image capture mode of the system, and thereafter illuminating randomly-oriented 1D or 2D bar code symbols on the target object during a wide-area image capture mode of the system.

Another object of the present invention is to provide a hand-supportable imaging-based bar code symbol reader employing an integrated multi-mode illumination subsystem which generates a visible narrow-area illumination beam for aiming onto a target object, then illuminates a 1D bar code symbol aligned therewith, captures an image thereof, and thereafter generates a wide-area illumination beam for illuminating 1D or 2D bar code symbols on the object and capturing an image thereof and processing the same to read the bar codes represented therein.

Another object of the present invention is to provide a hand-supportable imaging-based bar code symbol reader employing automatic object presence and range detection to control the generation of near-field and far-field wide-area illumination beams during bar code symbol imaging operations.

Another object of the present invention is to provide such a hand-supportable imaging-based bar code symbol reader employing a CMOS-type image sensing array using global exposure control techniques.

Another object of the present invention is to provide such a hand-supportable imaging-based bar code symbol reader employing a CMOS-type image sensing array with a band-pass optical filter subsystem integrated within the hand-supportable housing thereof, to allow only narrow-band illumination from the multi-mode illumination subsystem to expose the CMOS image sensing array.

Another object of the present invention is to provide a hand-supportable imaging-based auto-discriminating 1D/2D bar code symbol reader employing a multi-mode image-processing based bar code symbol reading subsystem dynamically reconfigurable in response to real-time image analysis during bar code reading operations.

Another object of the present invention is to provide a hand-supportable imaging-based bar code symbol reader employing a continuously operating automatic light exposure measurement and illumination control subsystem.

Another object of the present invention is to provide a hand-supportable imaging-based bar code symbol reader employing a multi-mode led-based illumination subsystem.

Another object of the present invention is to provide a hand-supportable imaging-based bar code symbol reader having 1D/2D auto-discrimination capabilities.

Another object of the present invention is to provide a method of performing auto-discrimination of 1D/2D bar code symbologies in an imaging-based bar code symbol reader having both narrow-area and wide-area image capture modes of operation.

Another object of the present invention is to provide a method of and apparatus for processing captured images within an imaging-based bar code symbol reader in order to read (i.e. recognize) bar code symbols graphically represented therein.

Another object of the present invention is to provide a hand-supportable imaging-based bar code symbol reader employing an integrated LED-based multi-mode illumination subsystem with far-field and near-field illumination arrays responsive to control signals generated by an IR-based object presence and range detection subsystem during a first mode of system operation and a system control subsystem during a second mode of system operation.

Another object of the present invention is to provide a hand-supportable imaging-based bar code symbol reader employing an integrated LED-based multi-mode illumination subsystem driven by an automatic light exposure measurement and illumination control subsystem responsive to control activation signals generated by a CMOS image sensing array and an IR-based object presence and range detection subsystem during object illumination and image capturing operations.

Another object of the present invention is to provide a hand-supportable imaging-based bar code symbol reader employing a CMOS image sensing array which activates LED illumination driver circuitry to expose a target object to narrowly-tuned LED-based illumination when all of the rows of pixels in said CMOS image sensing array are in a state of integration, thereby capturing high quality images independent of the relative motion between said bar code reader and the target object.

Another object of the present invention is to provide a hand-supportable imaging-based bar code symbol reader, wherein the exposure time of narrow-band illumination on its CMOS image sensing array is managed by controlling the illumination time of its LED-based illumination arrays using control signals generated by an automatic light exposure measurement and illumination control subsystem and the CMOS image sensing array while controlling narrow-band illumination thereto by way of a band-pass optical filter subsystem.

Another object of the present invention is to provide a hand-supportable imaging-based bar code symbol reader employing a mechanism of controlling the image brightness and contrast by controlling the time the illumination subsystem illuminates the target object, thus, avoiding the need for a complex shuttering mechanism for CMOS-based image sensing arrays employed therein.

Another object of the present invention is to provide an imaging-based bar code symbol reader having a multi-mode image-processing based bar code symbol reading subsystem which operates on captured high-resolution images having an image size of 32768×32768 pixels.

Another object of the present invention is to provide such an imaging-based bar code symbol reader having target applications at point of sales in convenience stores, gas stations, quick markets, and liquor stores, where 2D bar code reading is required for age verification and the like.

Another object of the present invention is to provide an improved imaging-based bar code symbol reading engine for integration into diverse types of information capture and processing systems, such as bar code driven portable data terminals (PDT) having wireless interfaces with their base stations, reverse-vending machines, retail bar code driven kiosks, and the like.

Another object of the present invention is to provide a hand-supportable semi-automatic imaging-based bar code reading system wherein an LED-based illumination subsystem automatically illuminates a target object in a narrow-area field of illumination while a multi-mode image formation and detection (IFD) subsystem captures a narrow-area image of an aligned 1D bar code symbol therein, and when manually switched into a wide-area illumination and image capture mode by a trigger switch, the LED-based illumination subsystem illuminates the target object in a wide-area field of illumination, while the multi-mode IFD subsystem captures a wide-area image of randomly-oriented 1D or 2D code symbols thereon.

Another object of the present invention is to provide a hand-supportable imaging-based bar code symbol reader employing a multi-mode illumination subsystem enabling narrow-area illumination for aiming at a target object and illuminating aligned 1D bar code symbols during the narrow-area image capture mode, and wide-area illumination for illuminating randomly-oriented 1D and 2D bar code symbols during the wide-area image capture mode.

Another object of the present invention is to provide a hand-supportable imaging-based bar code symbol reader employing automatic object presence and range detection to control the generation of near-field and far-field wide-area illumination during bar code symbol imaging operations.

Another object of the present invention is to provide a hand-supportable imaging-based bar code symbol reader employing a CMOS-type image sensor using global exposure techniques.

Another object of the present invention is to provide a hand-supportable imaging-based bar code symbol reader employing a CMOS-type image sensing array with a band-pass optical filter subsystem integrated within the hand-supportable housing thereof.

Another object of the present invention is to provide a hand-supportable imaging-based auto-discriminating 1D/2D bar code symbol reader employing a multi-mode image processing bar code symbol reading subsystem having a plurality of modes of operation which are dynamically reconfigurable in response to real-time image analysis.

Another object of the present invention is to provide a hand-supportable digital imaging-based bar code reading system wherein, during each imaging cycle, a single frame of pixel data is automatically detected by a CMOS area-type image sensing array when substantially all of the rows of pixels therein are in a state of integration and have a common integration time, and then pixel data is transmitted from said CMOS area-type image sensing array into a FIFO buffer, and then mapped into memory for subsequent image processing.

Another object of the present invention is to provide a hand-supportable digital image-processing based bar code symbol reading system employing an image cropping zone (ICZ) framing and post-image capture cropping process.

Another object of the present invention is to provide a hand-supportable digital imaging-based bar code symbol reading system employing a high-precision field of view (FOV) marking subsystem employing automatic image cropping, scaling, and perspective correction.

Another object of the present invention is to provide a digital image capture and processing engine employing a high-precision field of view (FOV) marking subsystem employing automatic image cropping, scaling, and perspective correction.

Another object of the present invention is to provide a digital image capture and processing engine employing optical waveguide technology for the measuring of the light intensity within the central portion of the FOV of the engine for use in automatic illumination control of one or more LED illumination arrays illuminating the field of the view (FOV) of the system.

Another object of the present invention is to provide a digital image-processing based bar code symbol reading system that is highly flexible and agile to adapt to the demanding lighting conditions presented in challenging retail and industrial work environments where 1D and 2D bar code symbols need to be reliably read.

Another object of the present invention is to provide a novel method of dynamically and adaptively controlling system control parameters (SCPs) in a multi-mode image capture and processing system, wherein (i) automated real-time exposure quality analysis of captured digital images is automatically performed in a user-transparent manner, and (ii) system control parameters (e.g. illumination and exposure control parameters) are automated and reconfigured based on the results of such exposure quality analysis, so as to achieve improved system functionality and/or performance in diverse environments.

Another object of the present invention is to provide such a multi-mode imaging-based bar code symbol reading system, wherein such system control parameters (SCPs) include, for example: the shutter mode of the image sensing array employed in the system; the electronic gain of the image sensing array; the programmable exposure time for each block of imaging pixels within the image sensing array; the illumination mode of the system (e.g. ambient/OFF, LED continuous, and LED strobe/flash); automatic illumination control (i.e. ON or OFF); illumination field type (e.g. narrow-area near-field illumination, and wide-area far-field illumination, narrow-area field of illumination, and wide-area field of illumination); image capture mode (e.g. narrow-area image capture mode, wide-area image capture mode); image capture control (e.g. single frame, video frames); and the automatic object detection mode of operation (e.g. ON or OFF).

Another object of the present invention is to provide an image capture and processing system, wherein object illumination and image capturing operations are dynamically controlled by an adaptive control process involving the real-time analysis of the exposure quality of captured digital images and the reconfiguration of system control parameters (SCPs) based on the results of such exposure quality analysis.

Another object of the present invention is to provide an image capture and processing engine, wherein object illumination and image capturing operations are dynamically controlled by an adaptive control process involving the real-time analysis of the exposure quality of captured digital images and the reconfiguration of system control parameters (SCPs) based on the results of such exposure quality analysis.

Another object of the present invention is to provide an automatic imaging-based bar code symbol reading system, wherein object illumination and image capturing operations are dynamically controlled by an adaptive control process involving the real-time analysis of the exposure quality of captured digital images and the reconfiguration of system control parameters (SCPs) based on the results of such exposure quality analysis.

Another object of the present invention is to provide a digital image capture and processing engine which is adapted for POS applications, wherein its illumination/aiming subassembly having a central aperture is mounted adjacent a light transmission (i.e. imaging) window in the engine housing, whereas the remaining subassembly is mounted relative to the bottom of the engine housing so that the optical axis of the camera lens is parallel with respect to the light transmission aperture, and a field of view (FOV) folding mirror is mounted beneath the illumination/aiming subassembly for directing the FOV of the system out through the central aperture formed in the illumination/aiming subassembly.

Another object of the present invention is to provide an automatic imaging-based bar code symbol reading system supporting a presentation-type mode of operation using wide-area illumination and video image capture and processing techniques.

Another object of the present invention is to provide such an automatic imaging-based bar code symbol reading system, wherein its image-processing based bar code symbol reading subsystem carries out real-time exposure quality analysis of captured digital images in accordance with the adaptive system control method of the present invention.

Another object of the present invention is to provide an automatic imaging-based bar code symbol reading system supporting a pass-through mode of operation using narrow-area illumination and video image capture and processing techniques, as well as a presentation-type mode of operation using wide-area illumination and video image capture and processing techniques.

Another object of the present invention is to provide such an automatic imaging-based bar code symbol reading system, wherein an automatic light exposure measurement and illumination control subsystem is adapted to measure the light exposure on a central portion of the CMOS image sensing array and control the operation of the LED-based multi-mode illumination subsystem in cooperation with the multi-mode image processing based bar code symbol reading subsystem, carrying out real-time exposure quality analysis of captured digital images in accordance with the adaptive system control method of the present invention.

Another object of the present invention is to provide such an automatic imaging-based bar code symbol reading system, wherein a narrow-area field of illumination and image capture is oriented in the vertical direction with respect to the counter surface of the POS environment, to support the pass-through mode of the system, and an automatic IR-based object presence and direction detection subsystem which comprises four independent IR-based object presence and direction detection channels.

Another object of the present invention is to provide such an automatic imaging-based bar code symbol reading system, wherein the automatic IR-based object presence and direction detection subsystem supports four independent IR-based object presence and direction detection channels which automatically generate activation control signals for four orthogonal directions within the FOV of the system, wherein the signals are automatically received and processed by a signal analyzer and control logic block to generate a trigger signal for use by the system controller.

Another object of the present invention is to provide a price lookup unit (PLU) system employing a digital image capture and processing subsystem of the present invention identifying bar coded consumer products in retail store environments, and displaying the price thereof on the LCD panel integrated in the system.

These and other objects of the present invention will become more apparently understood hereinafter and in the Claims to Invention appended hereto.

BRIEF DESCRIPTION OF THE DRAWINGS OF PRESENT INVENTION

For a more complete understanding of how to practice the Objects of the Present Invention, the following Detailed Description of the Illustrative Embodiments can be read in conjunction with the accompanying Drawings, briefly described below:

Figure 2B:
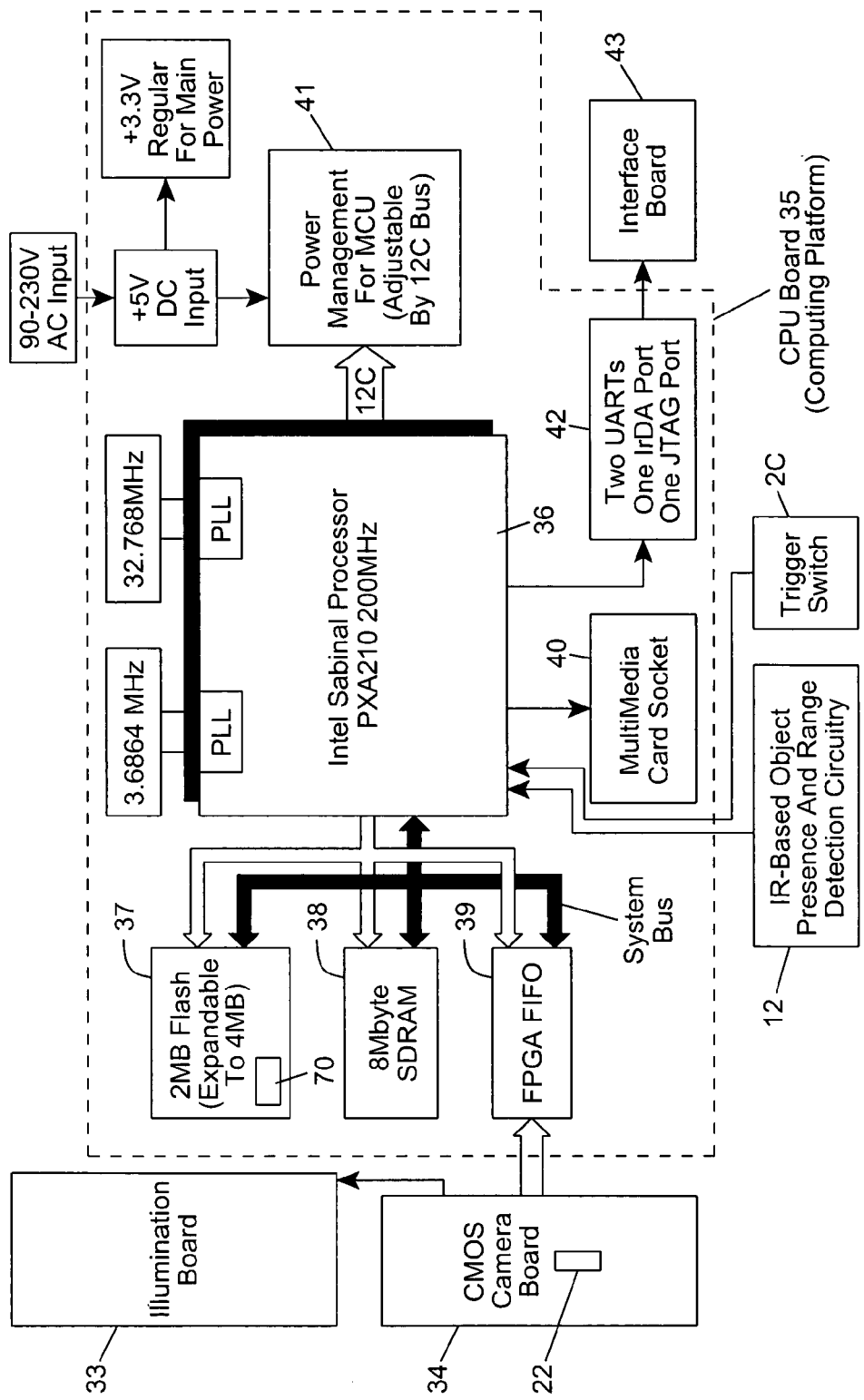
Figure 3A:
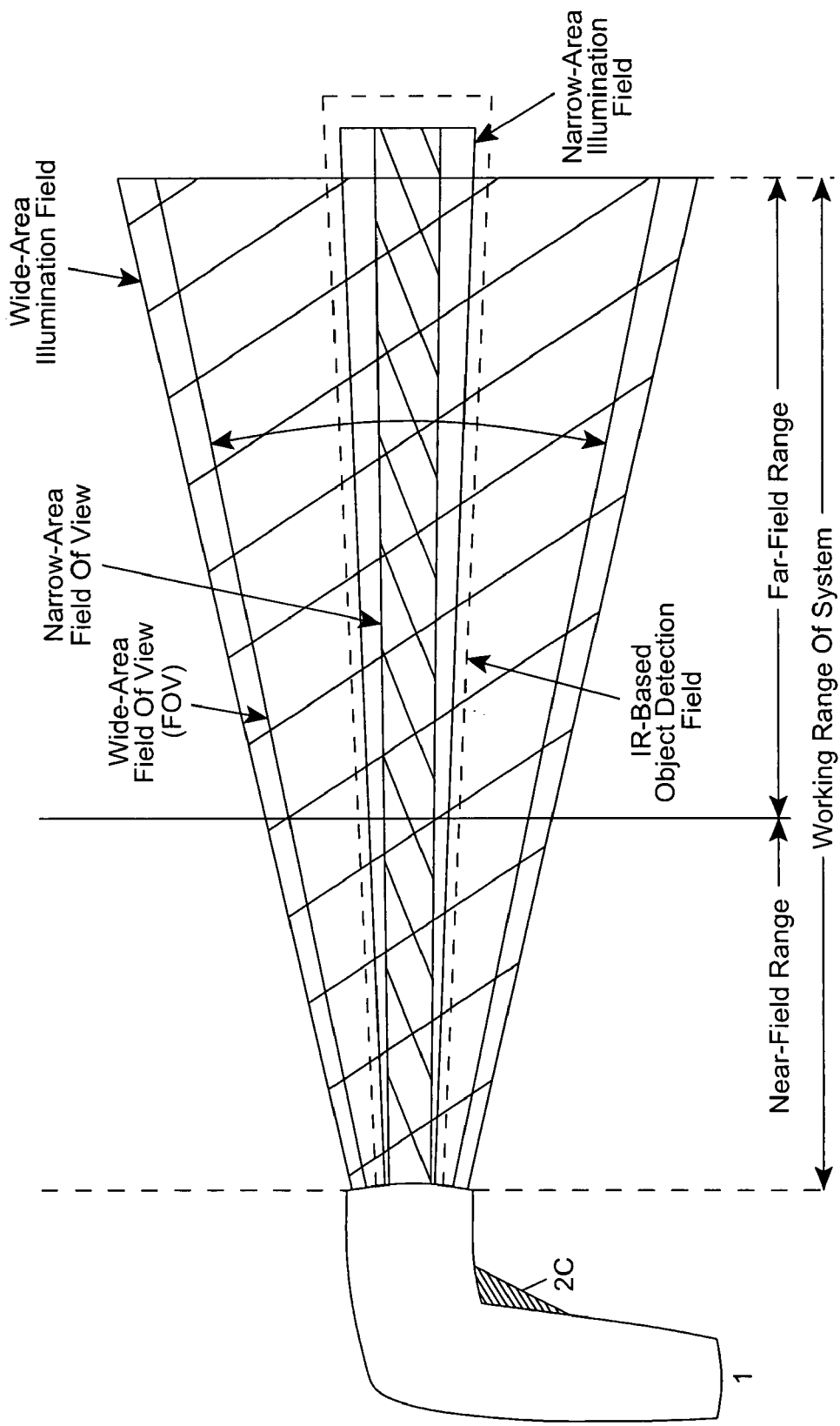
Figure 3B:
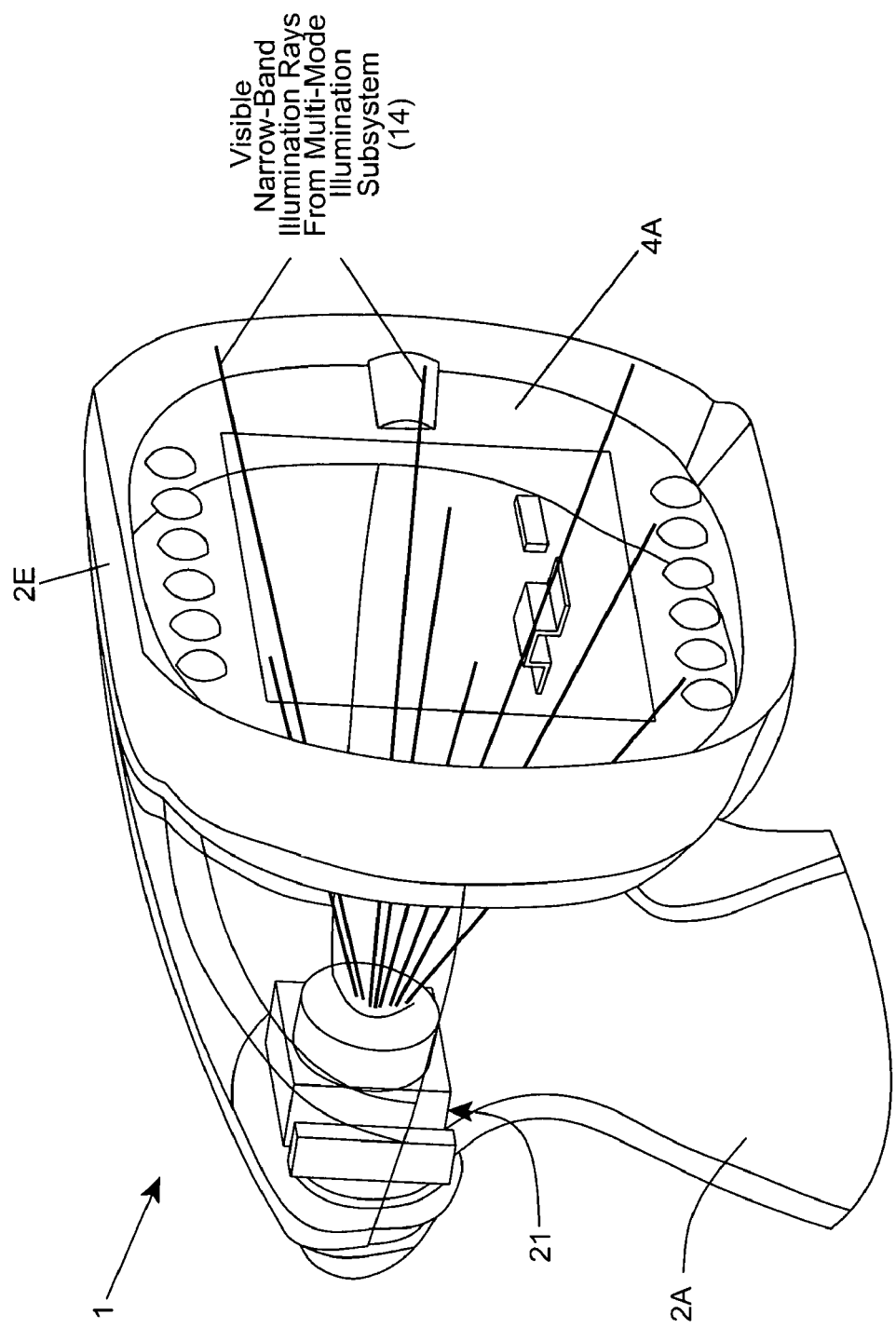
Figure 3C:
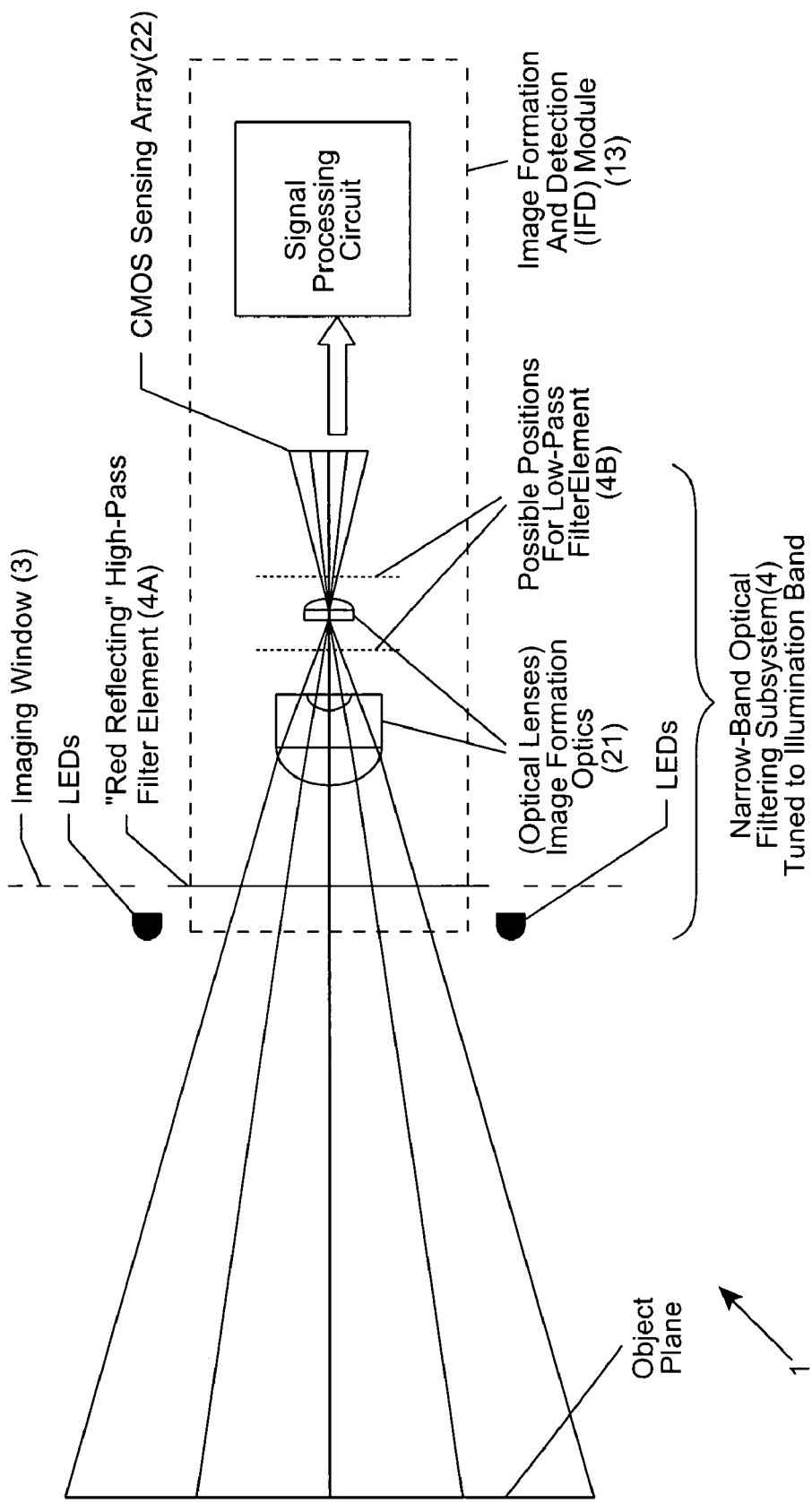
Figure 3D:
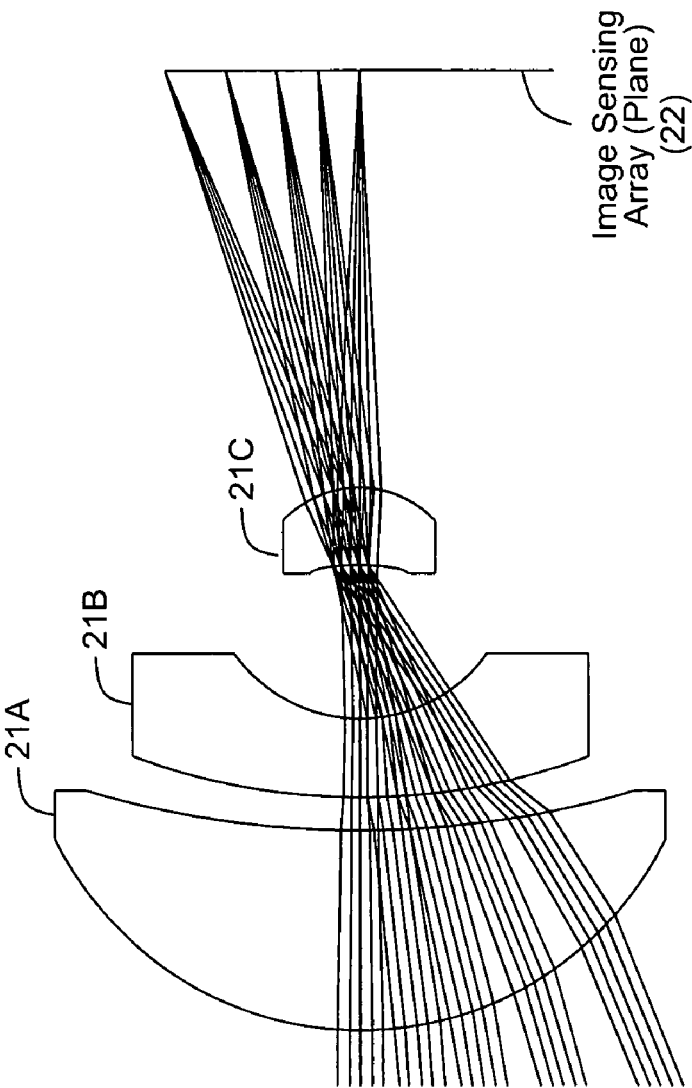
Figure 3E:
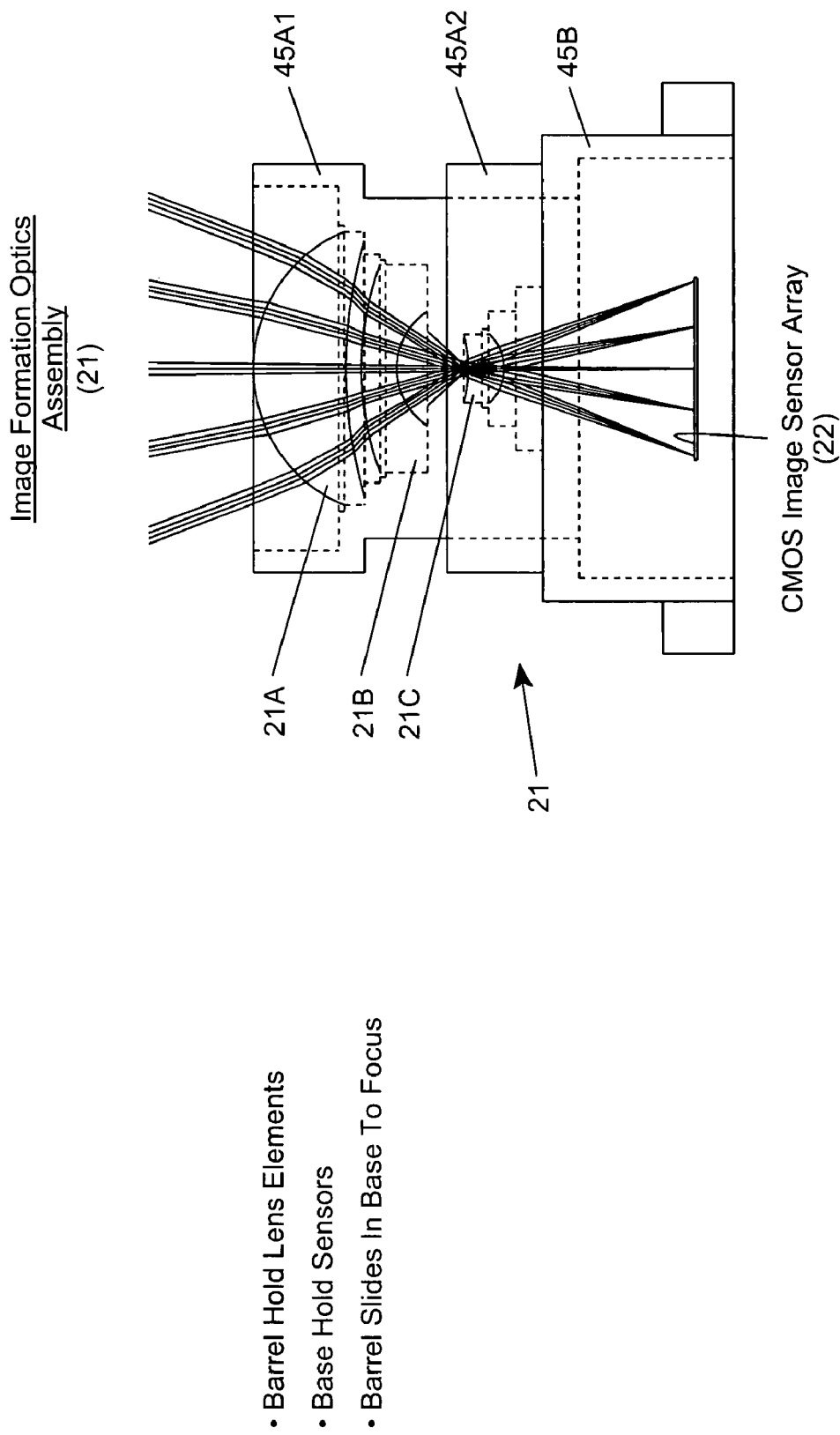
Figure 4A:
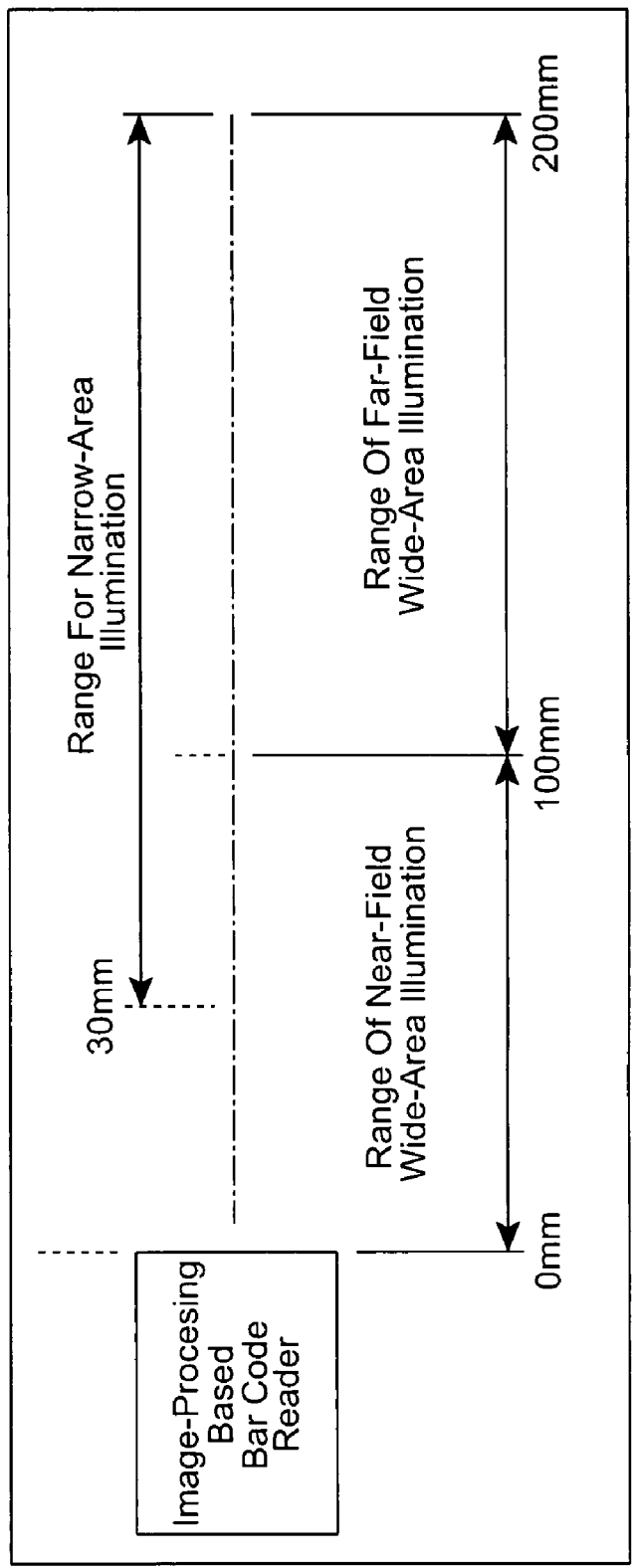
Figure 6B:
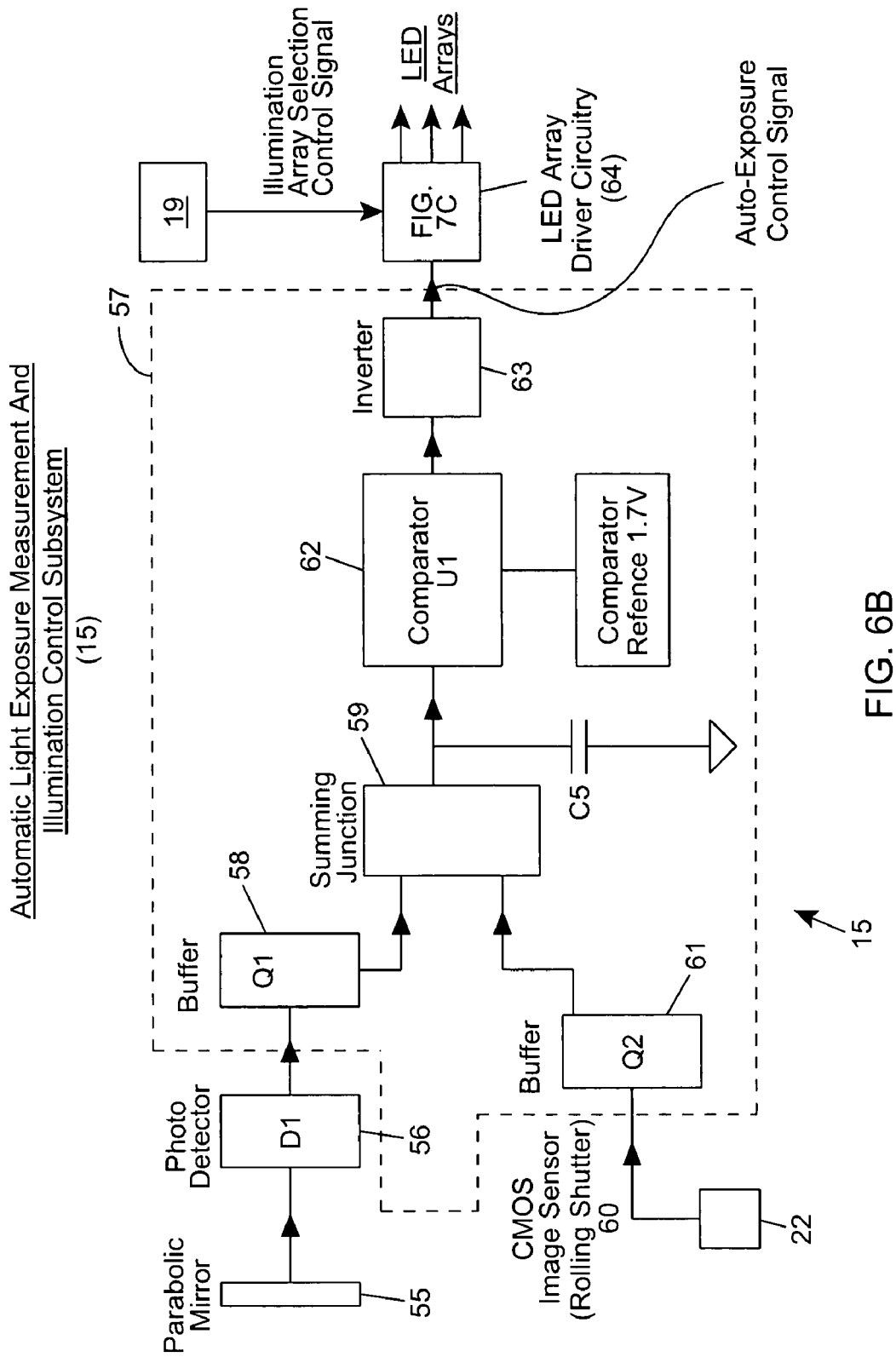
Figure 6D:
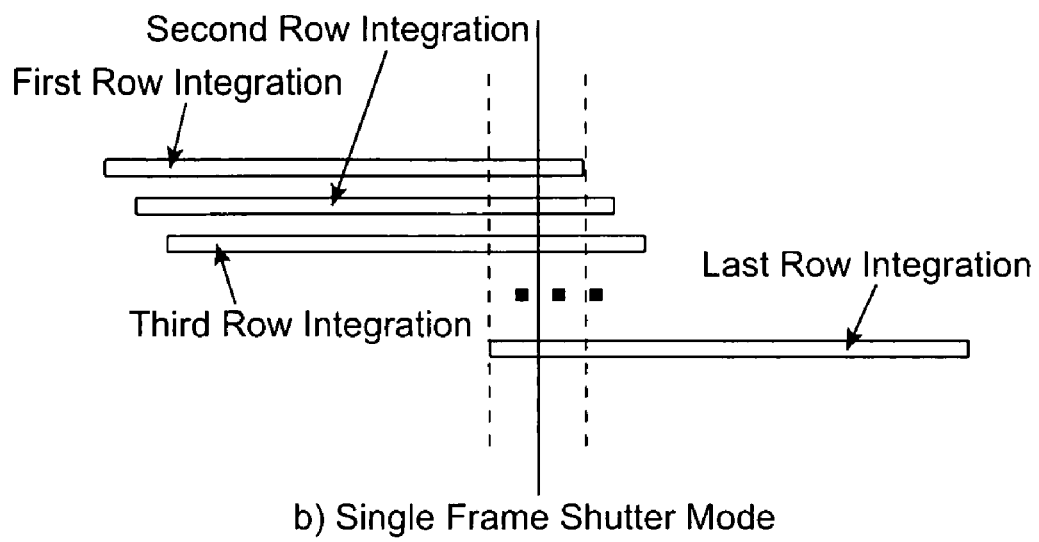
Figure 7:
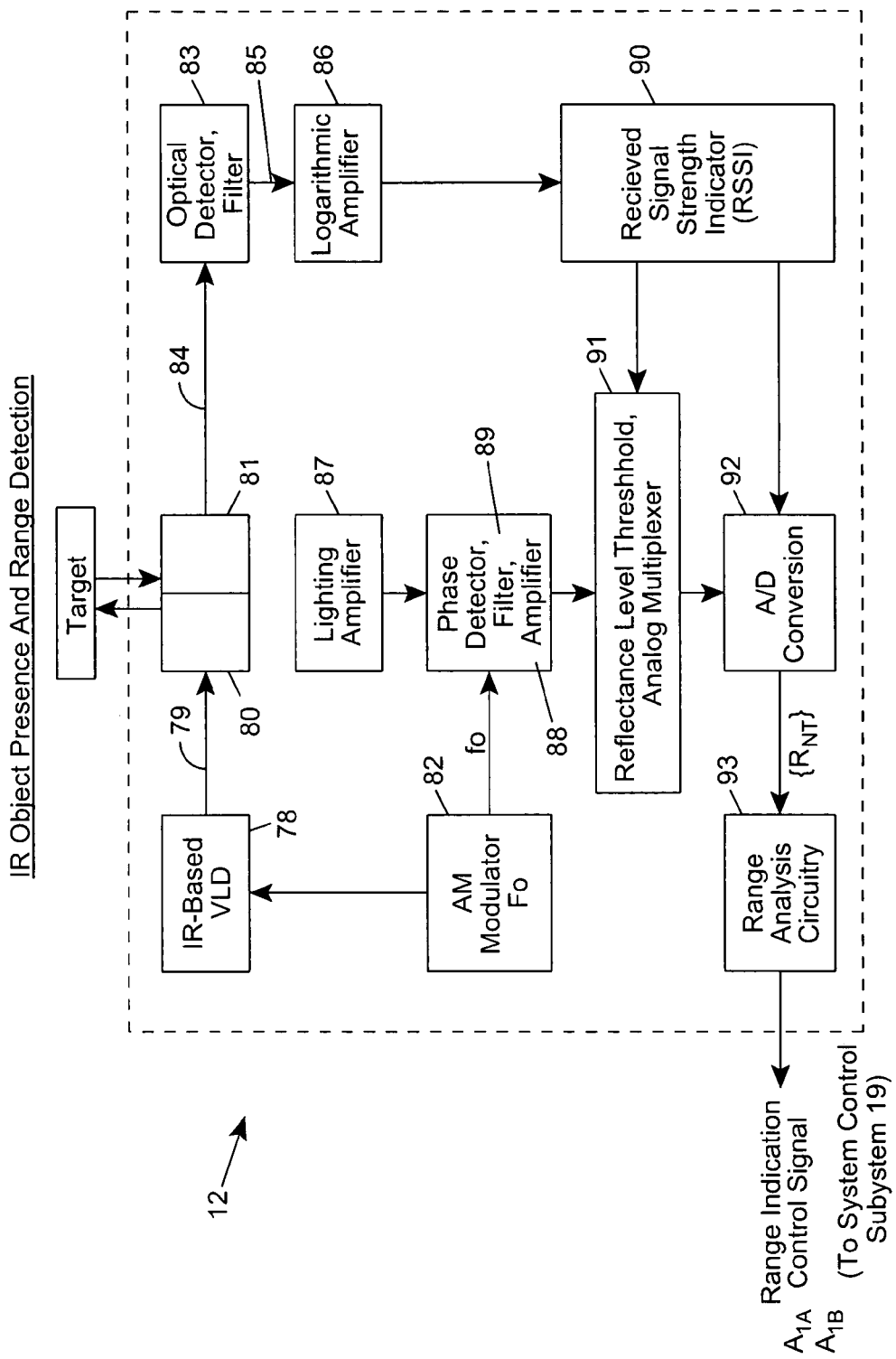
Figure 8:
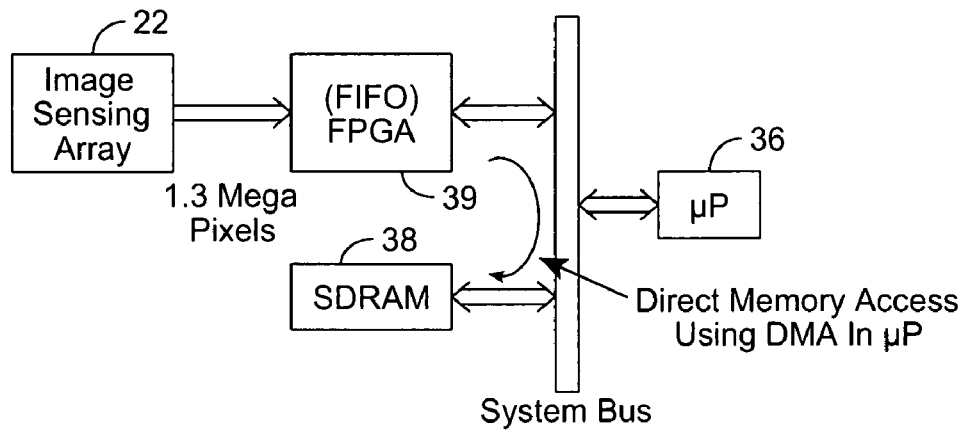
Figure 9:
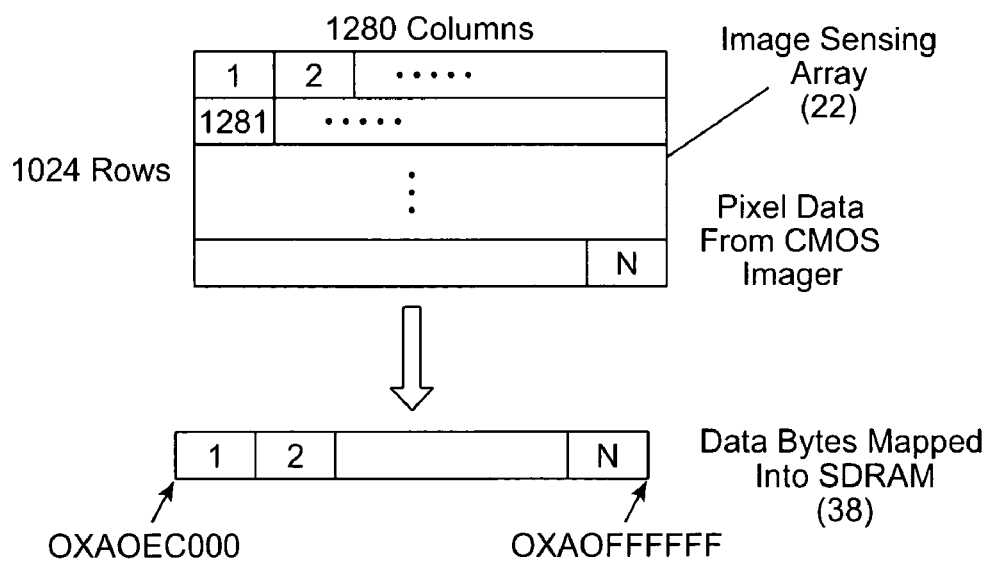
Figure 10:
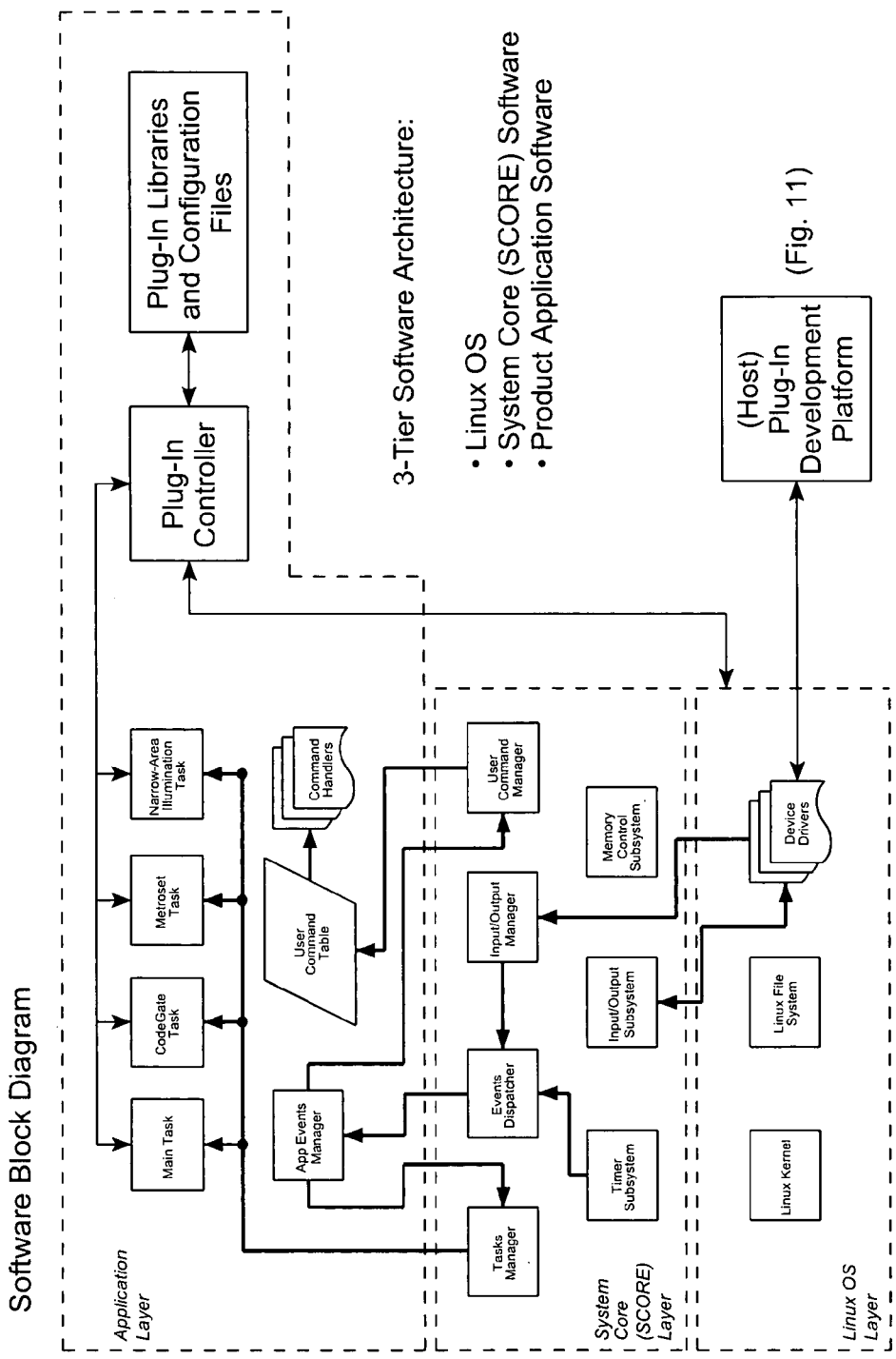
Figure 13:
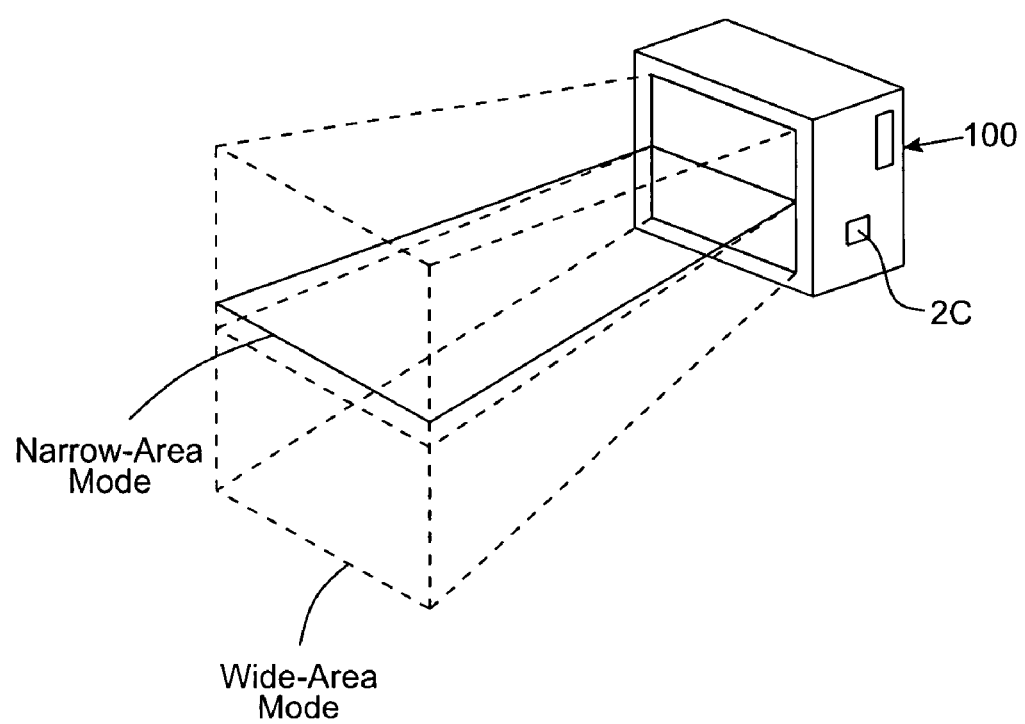
Figure 14:
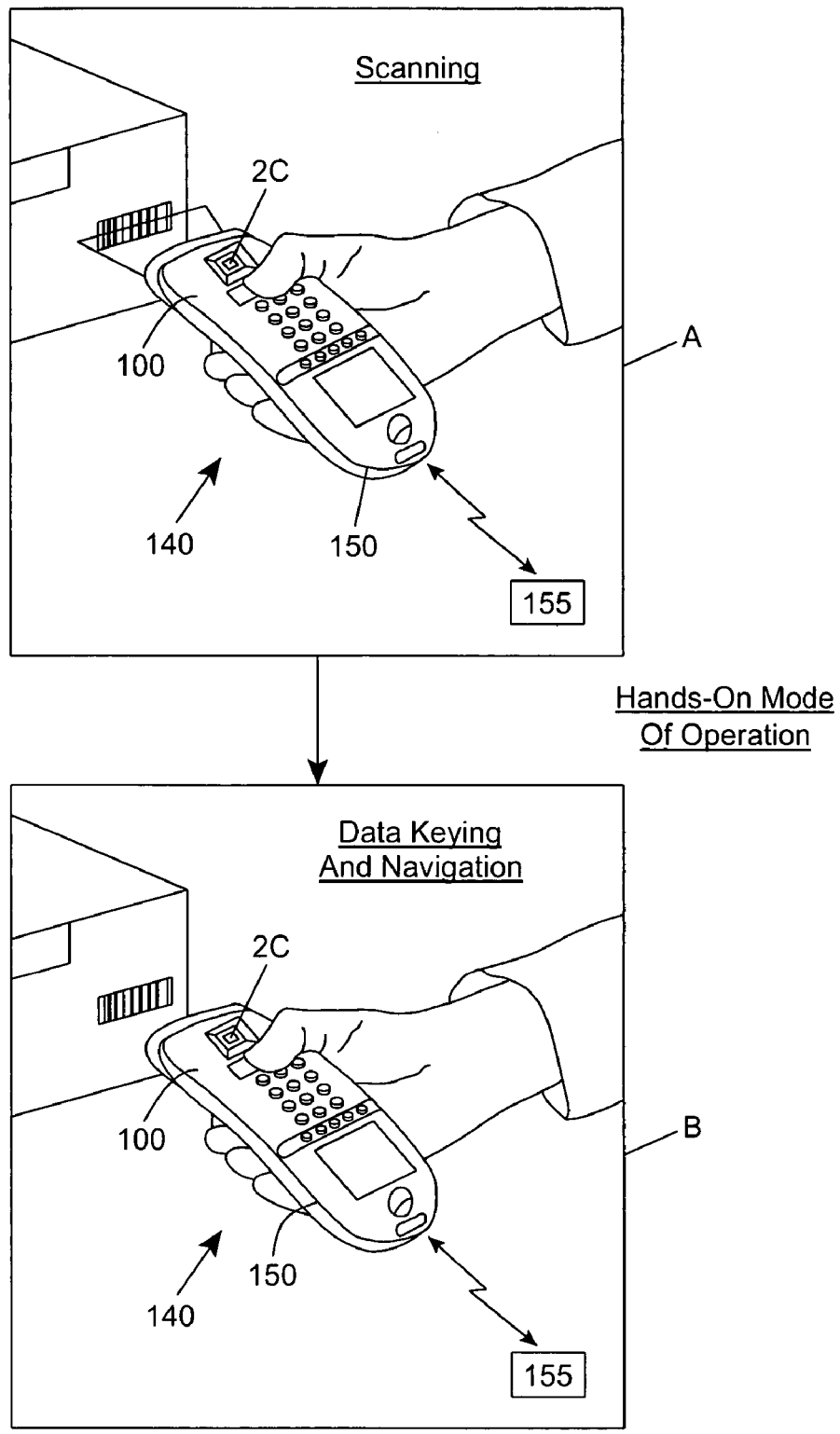
Figure 15:
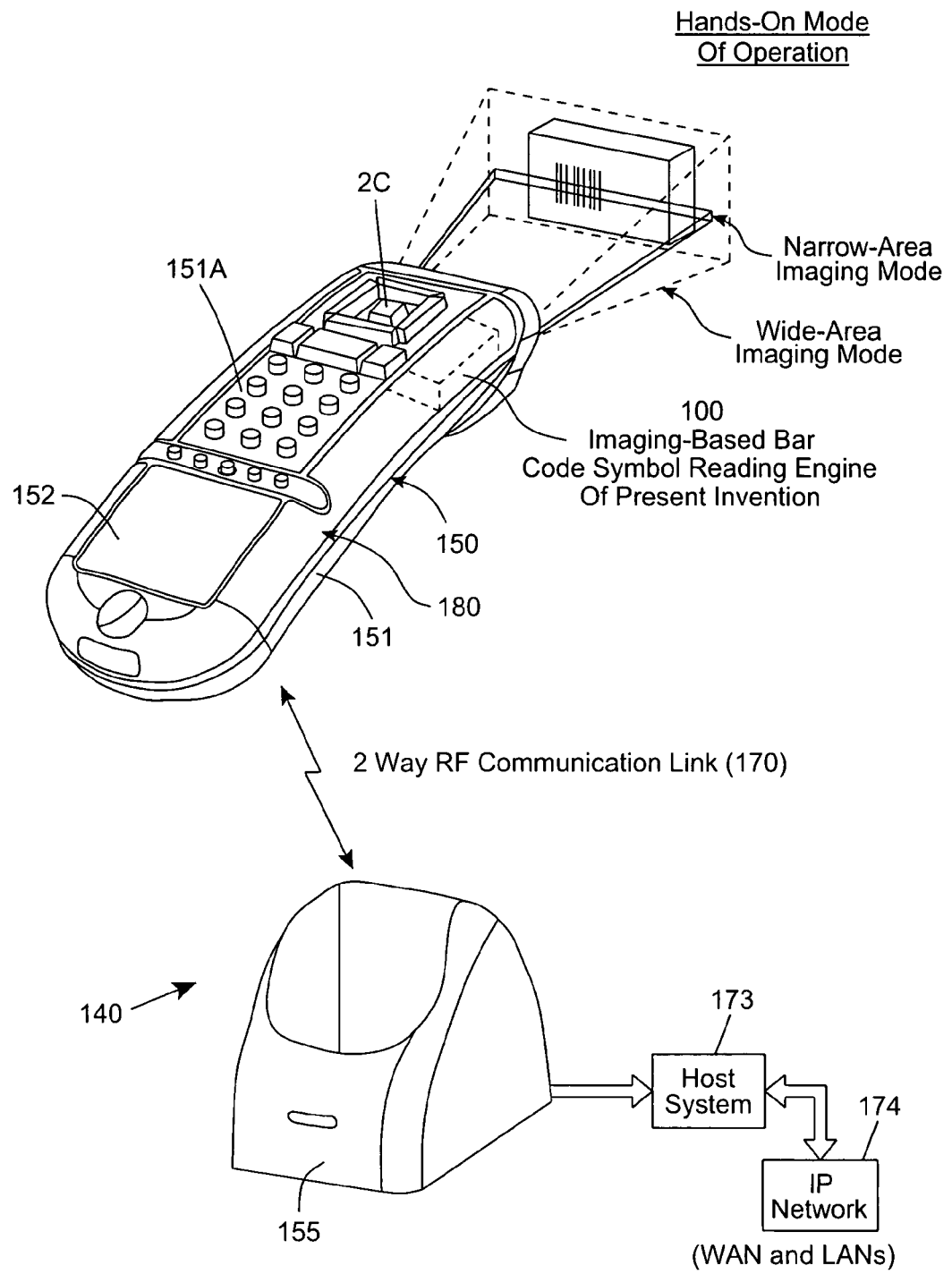
Figure 16:
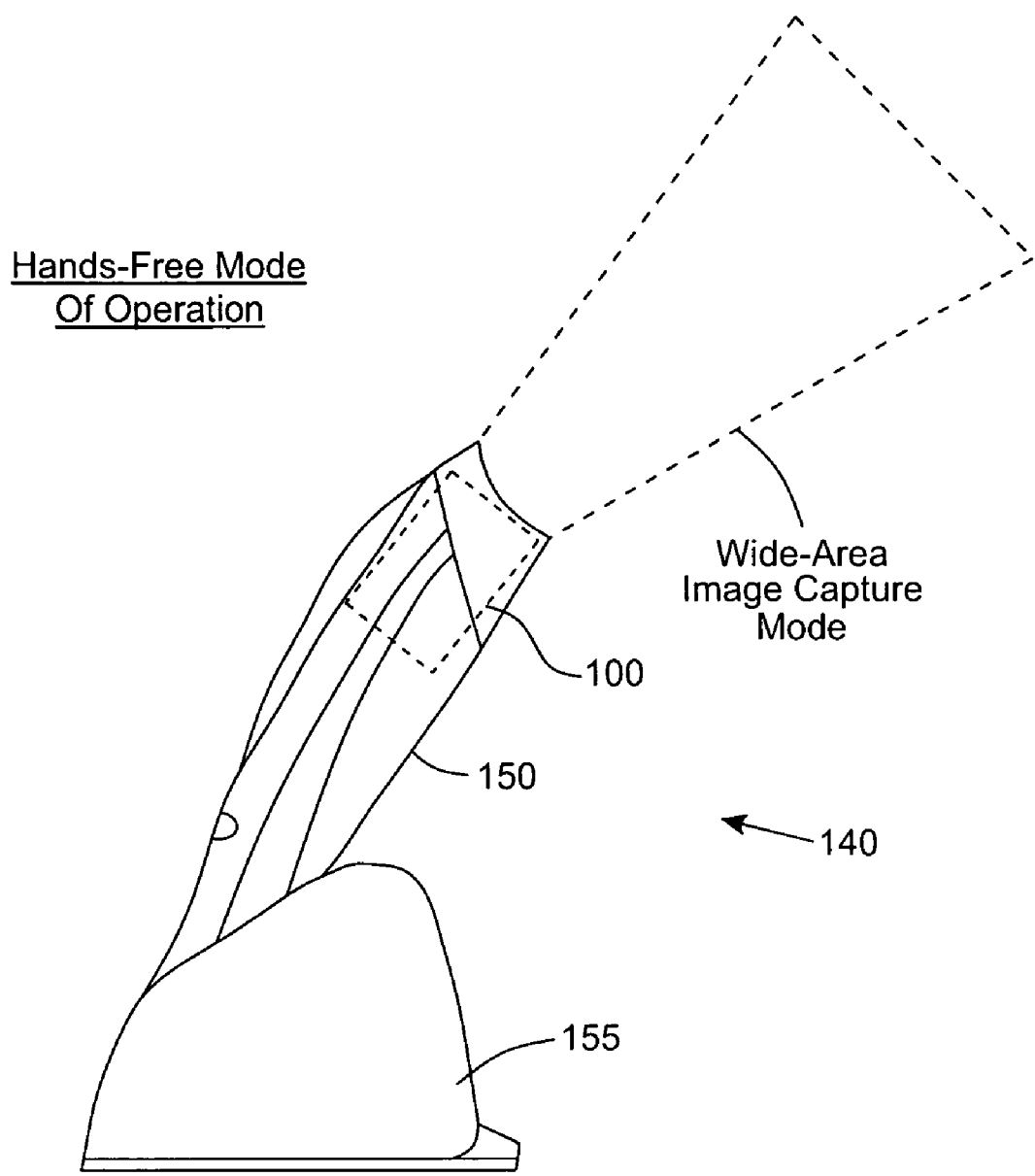
Figure 17:
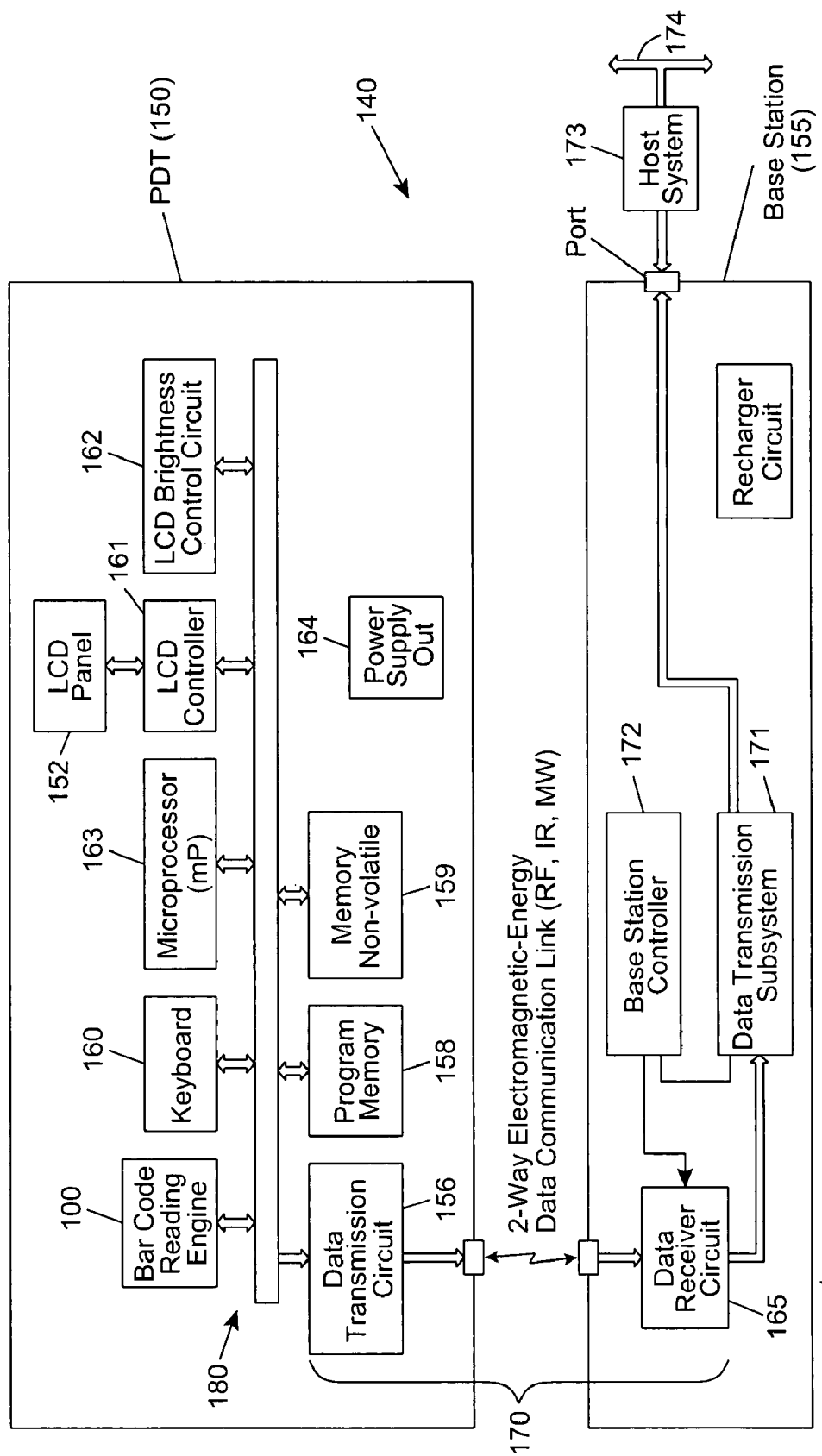
Figure 18:
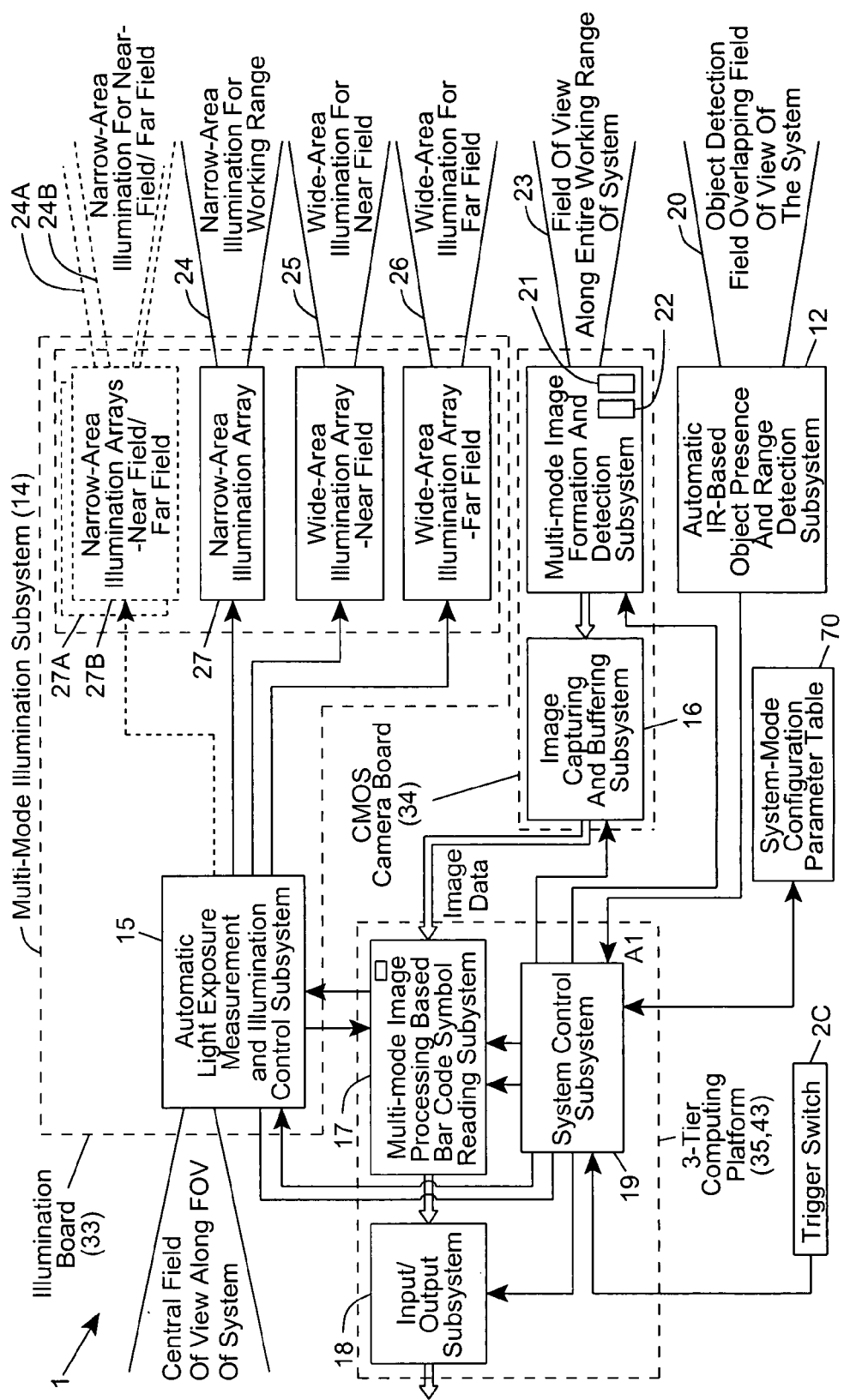
Figure 19A:
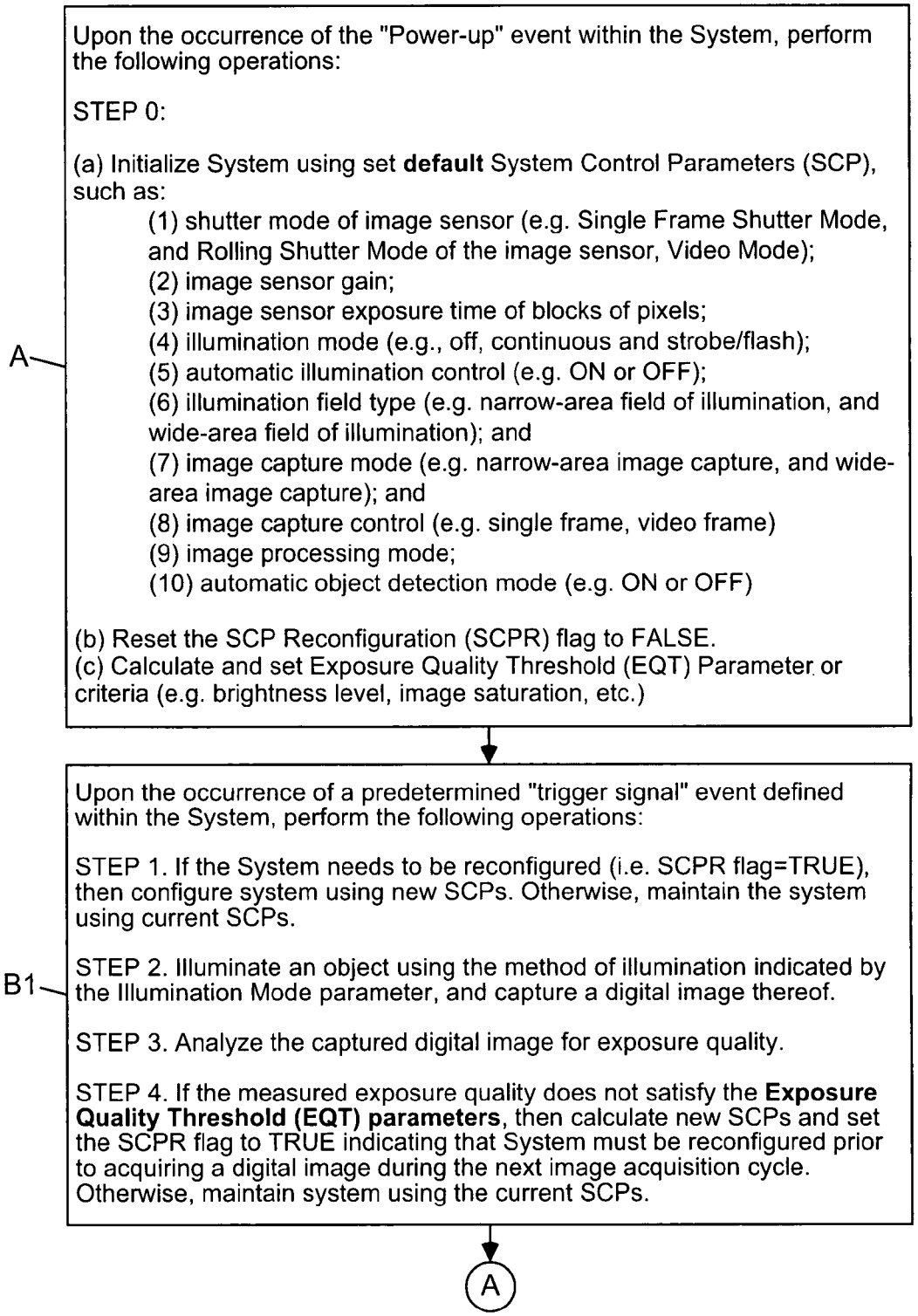
Figure 19B:
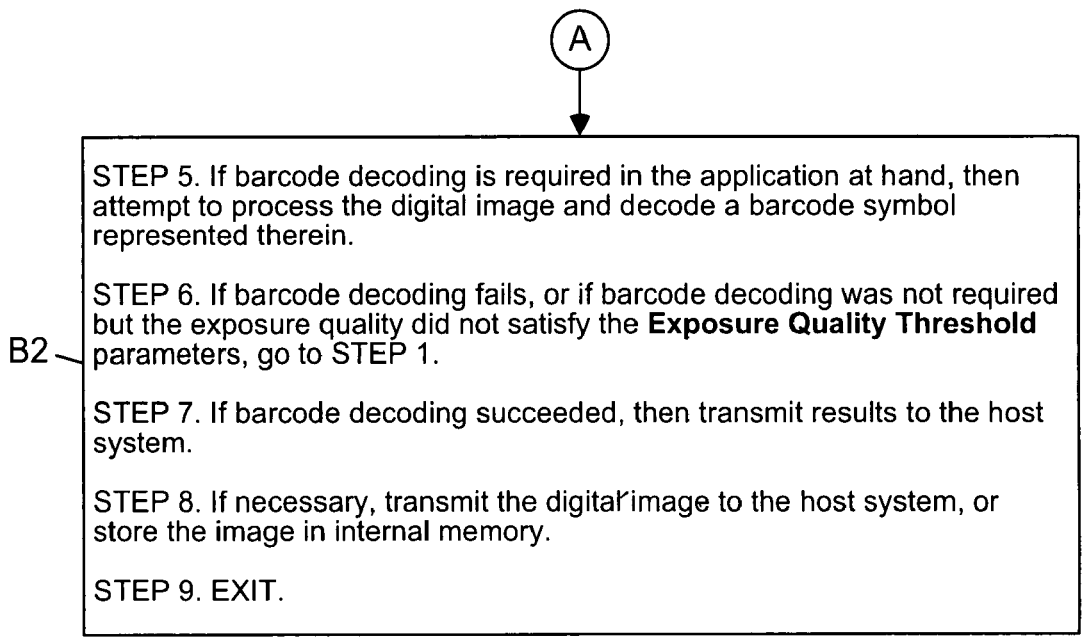
Figure 19C:
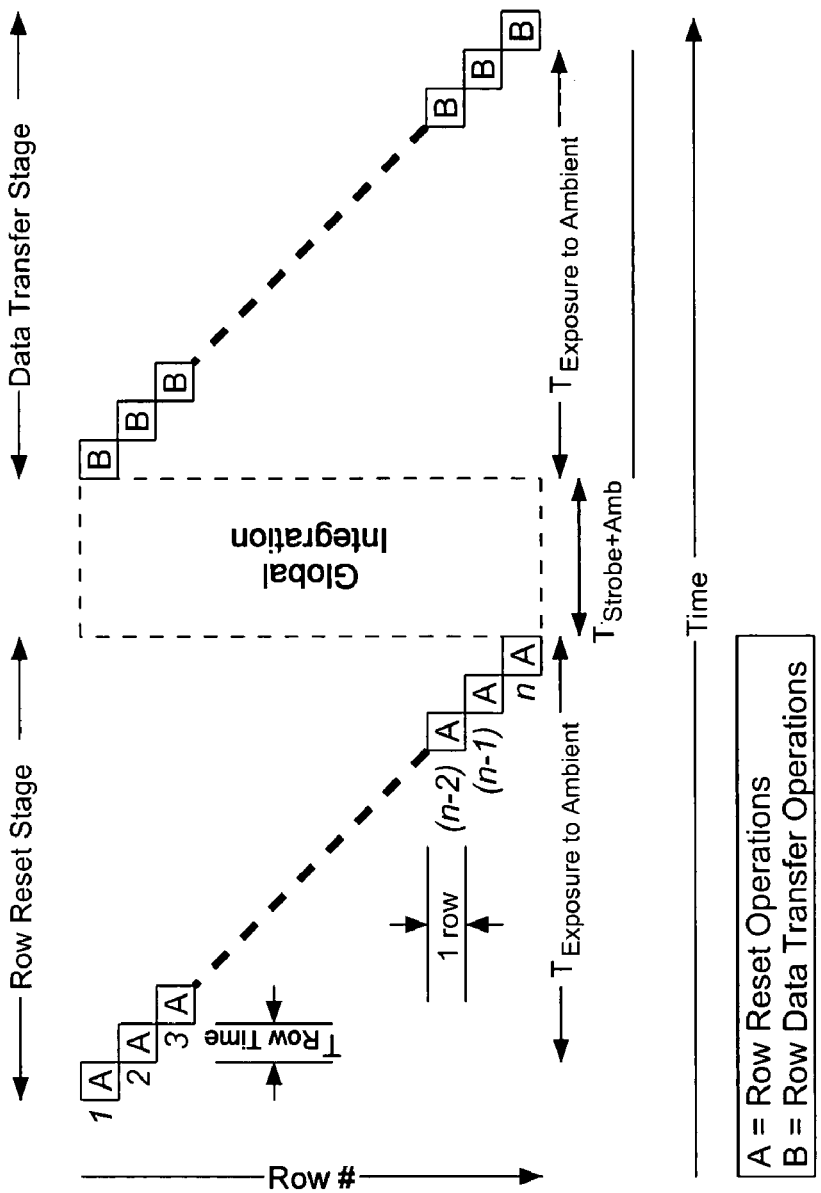
Figure 19D:
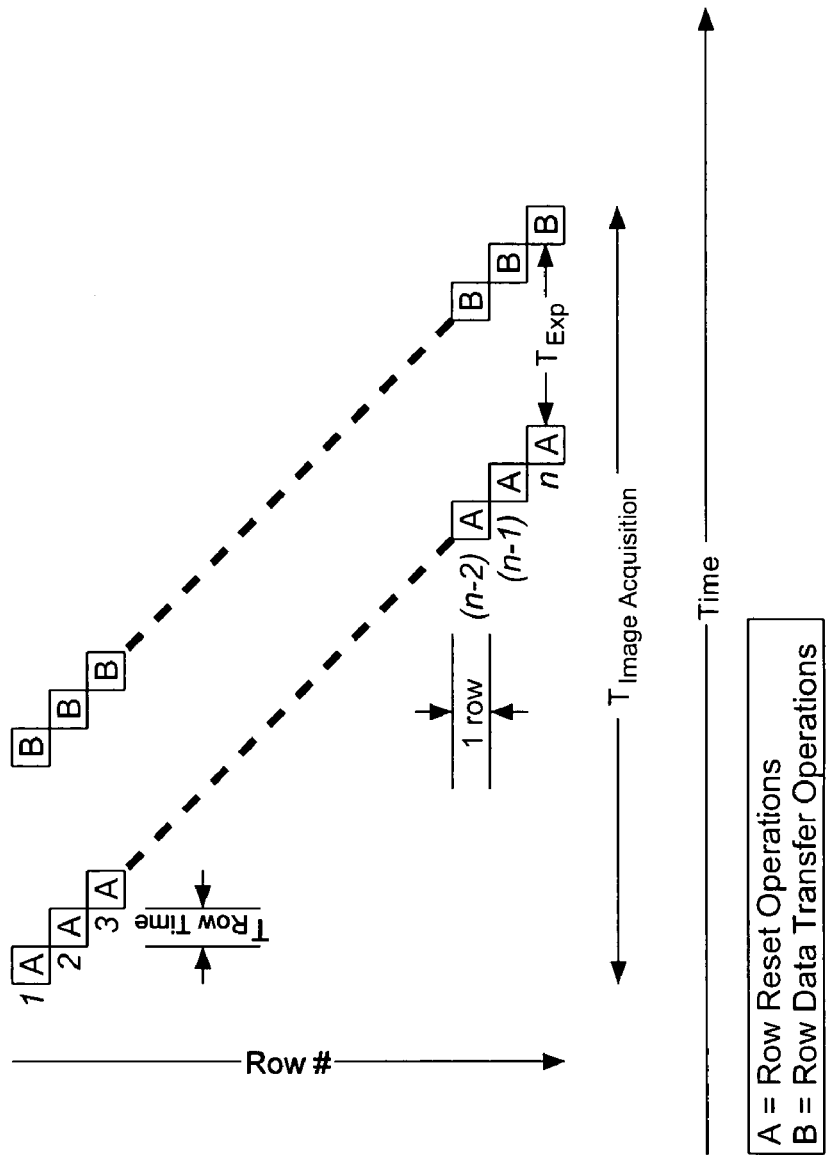
Figure 19E:
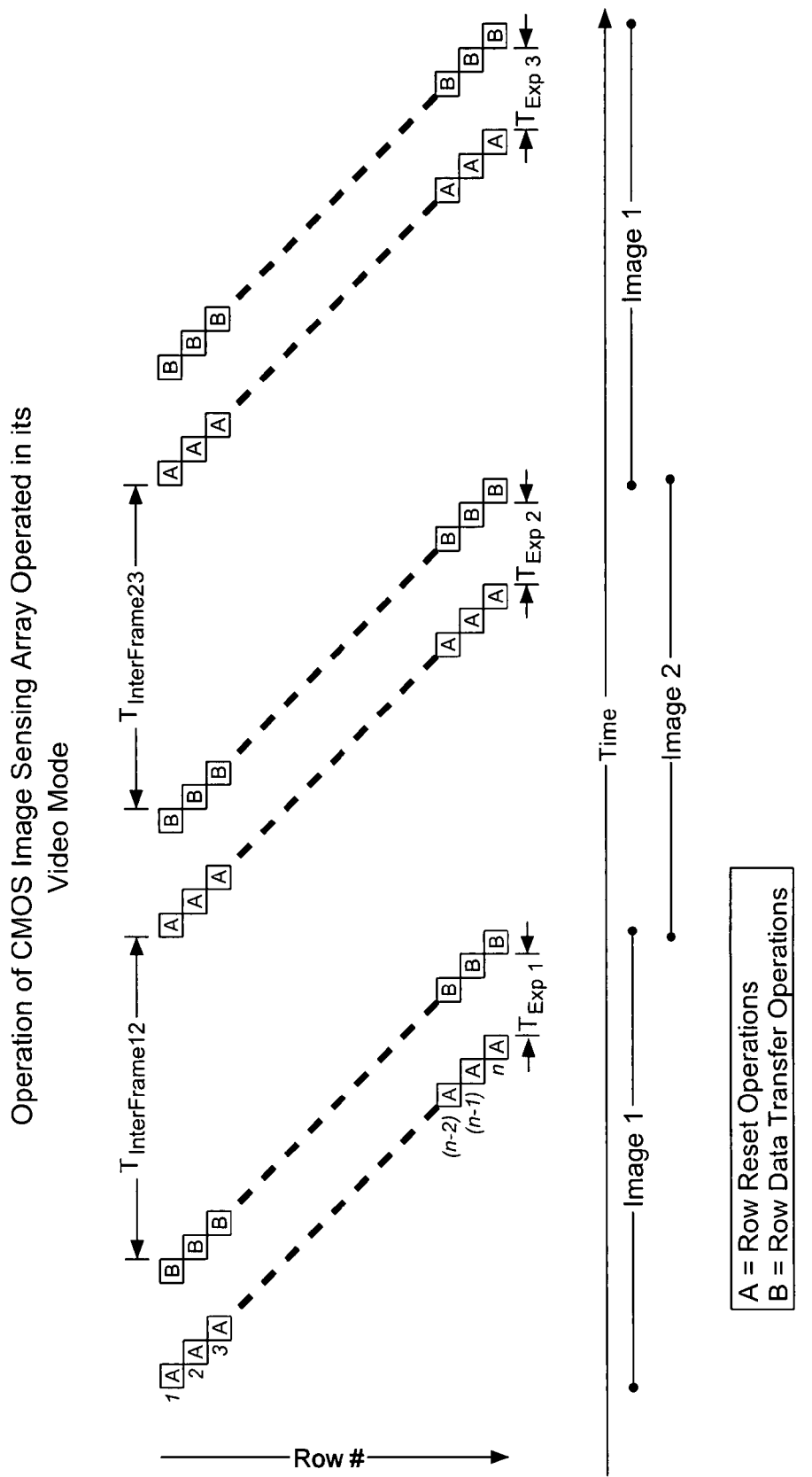
Figure 20:
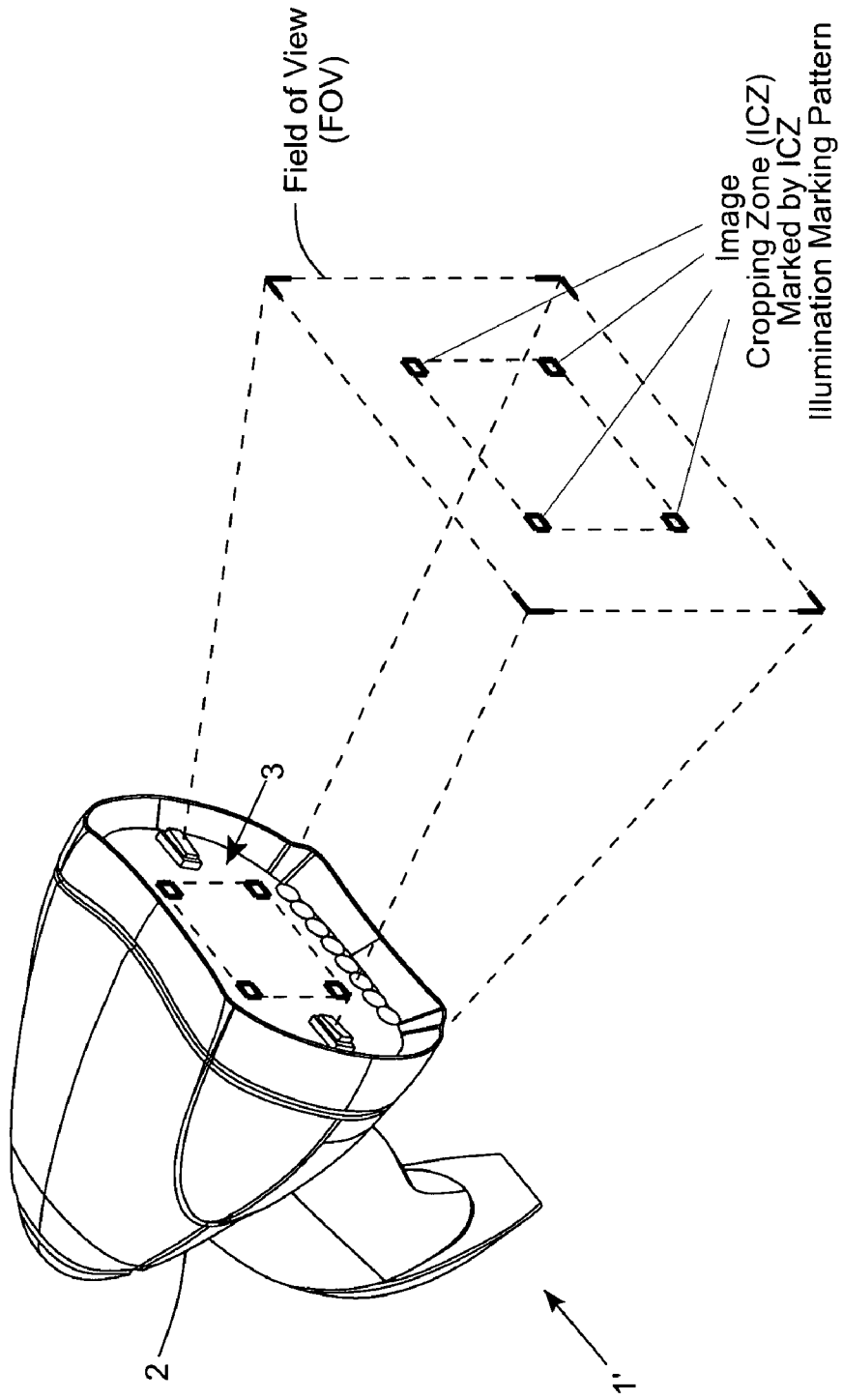
Figure 21:
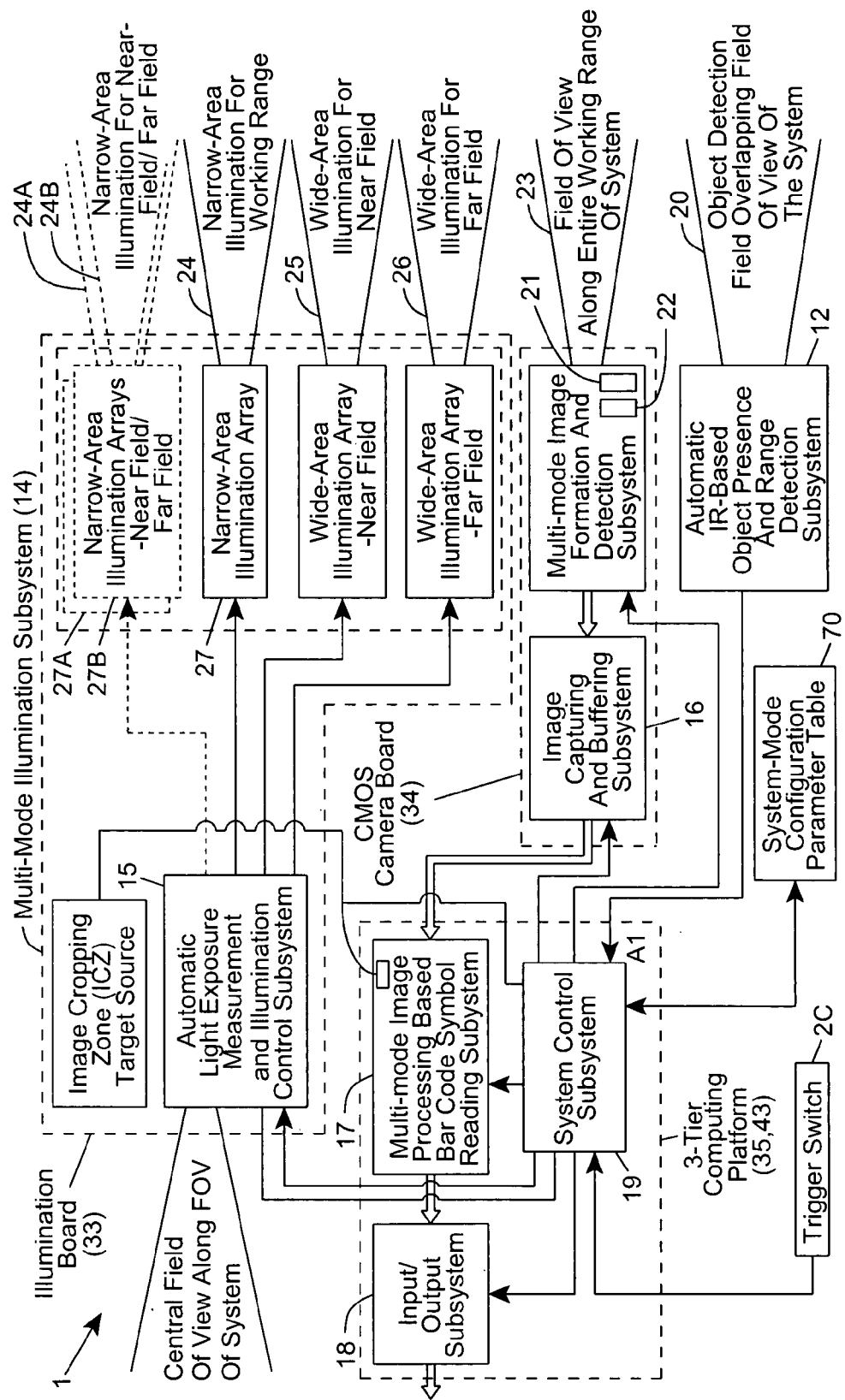
Figure 22:
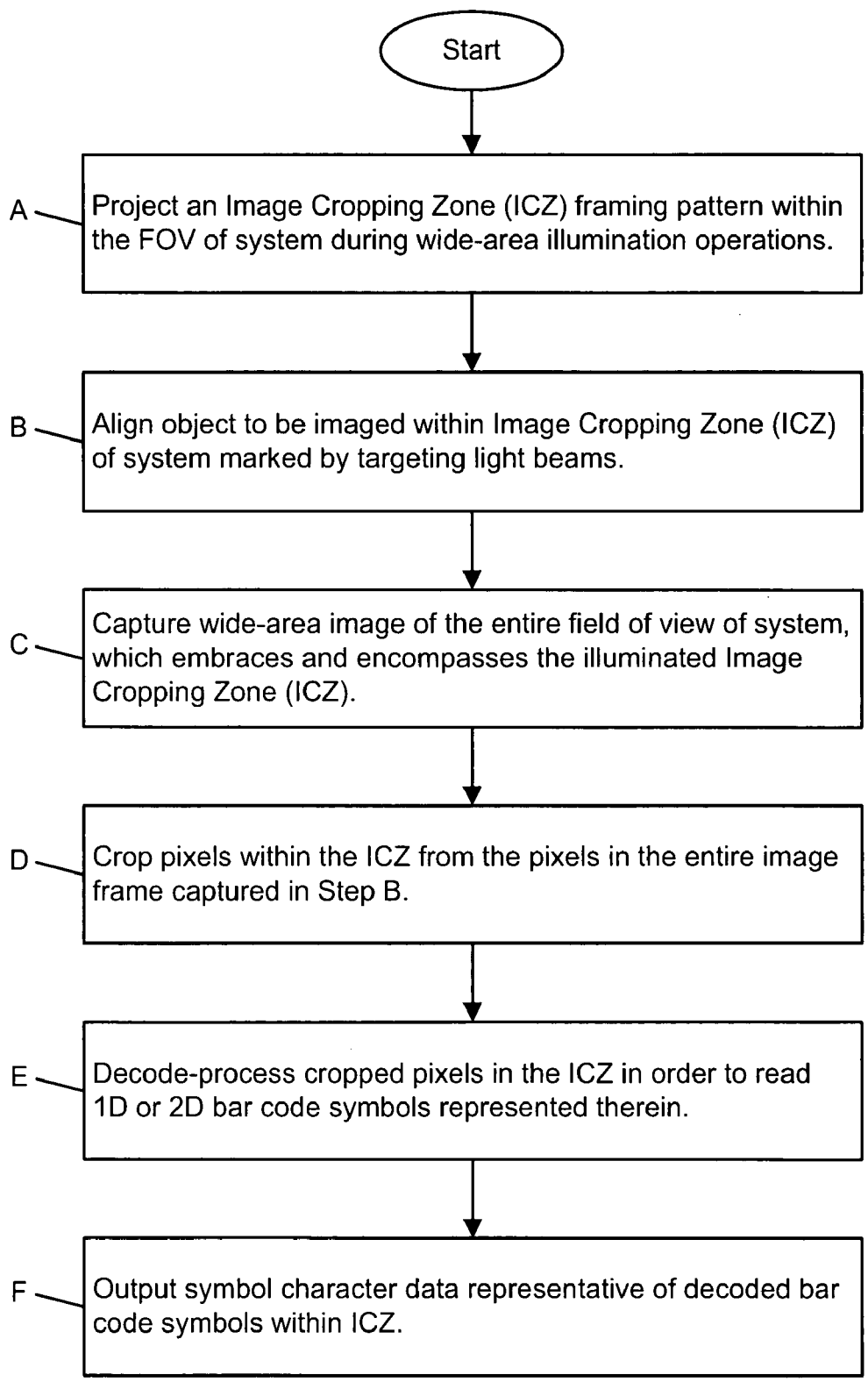
Figure 23:
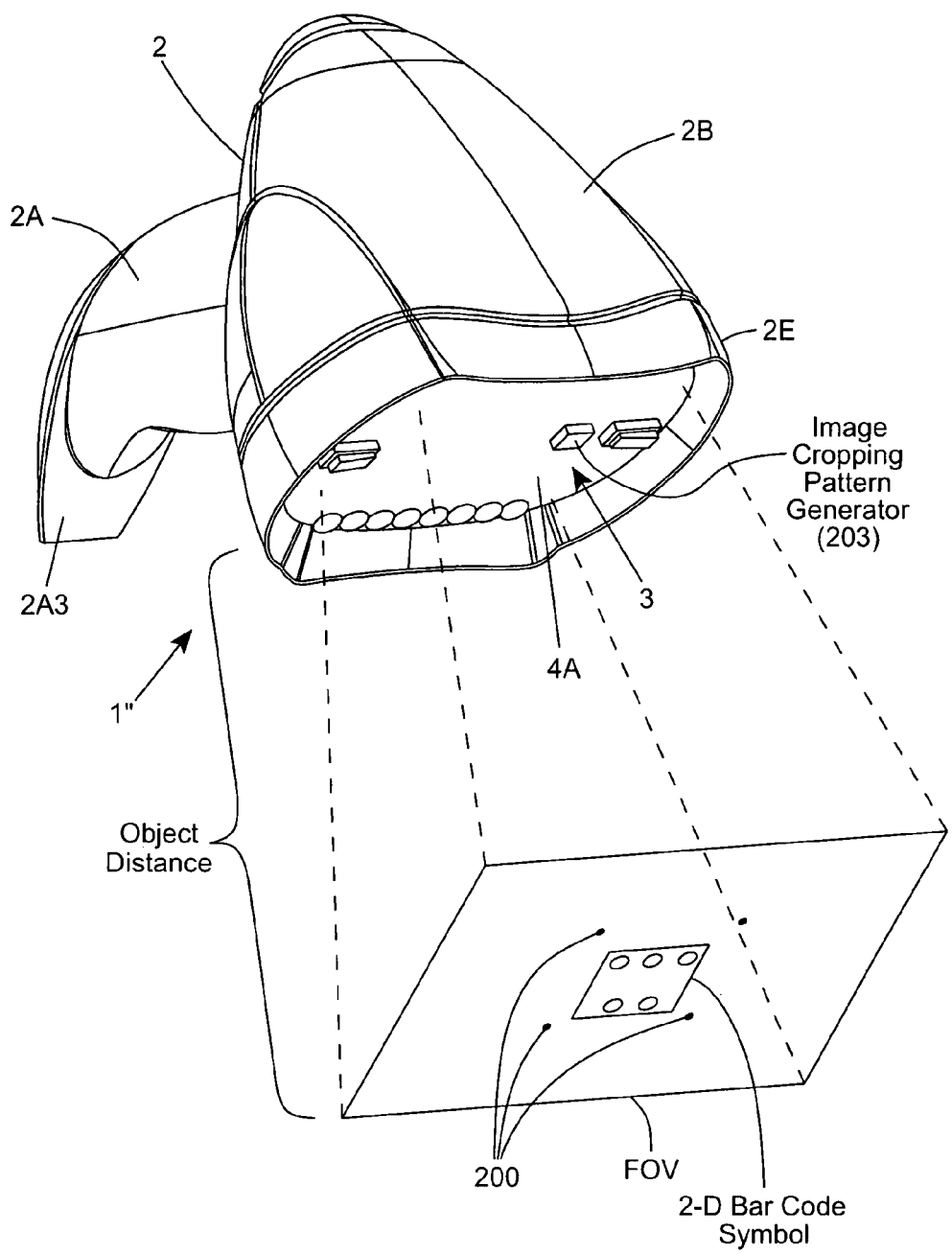
Figure 24:
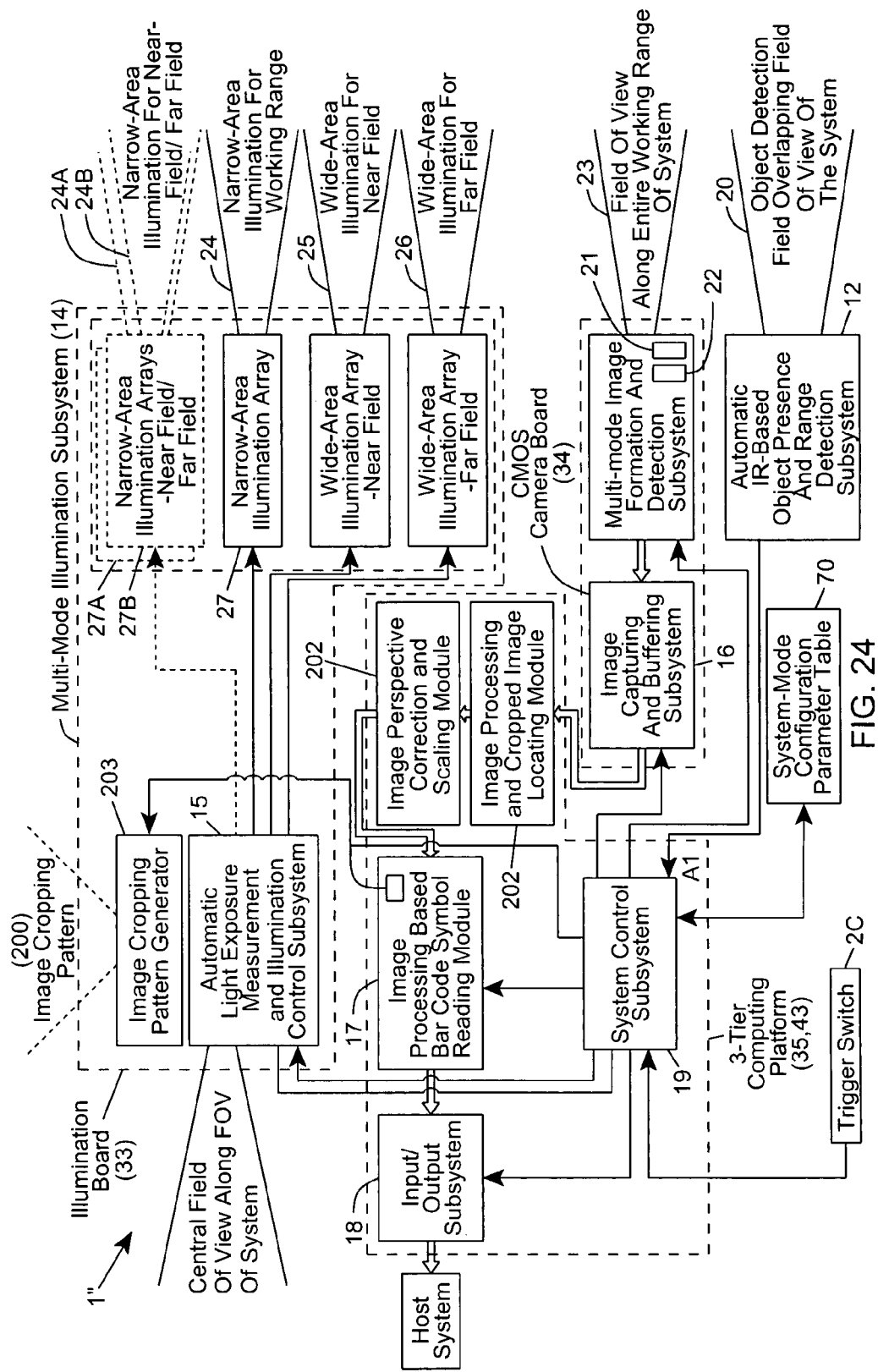
Figure 25A:
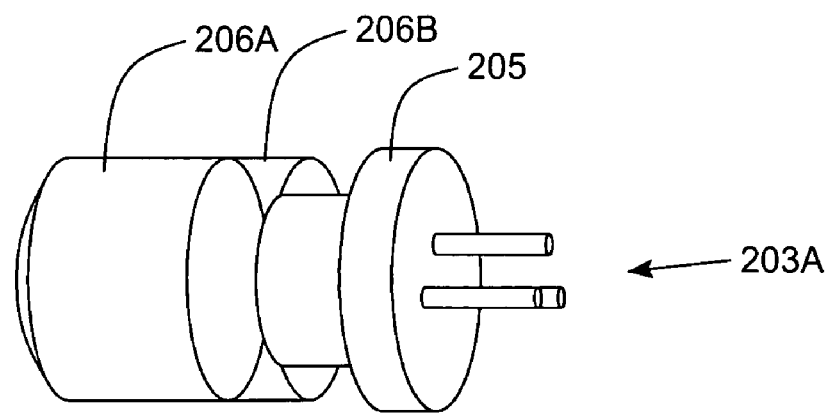
Figure 25B:
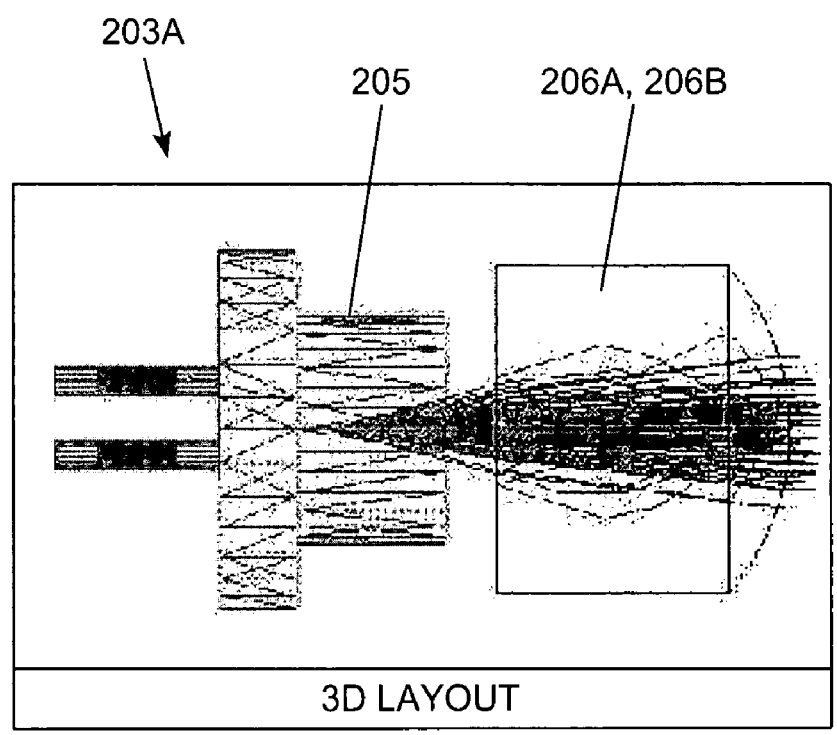
Figure 26A:
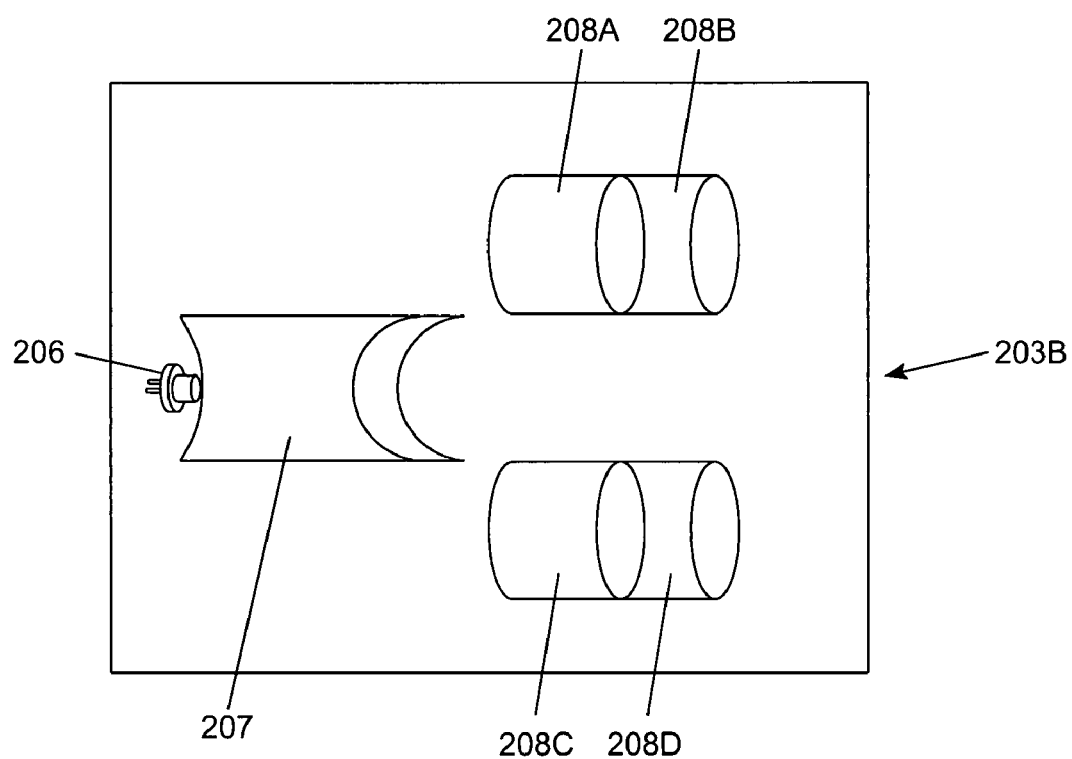
Figure 26B:
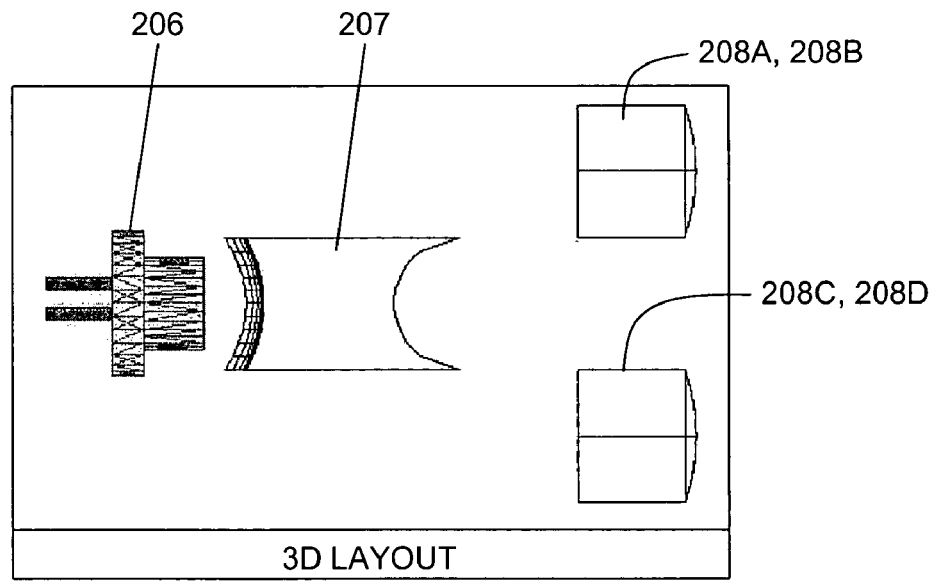
Figure 27:
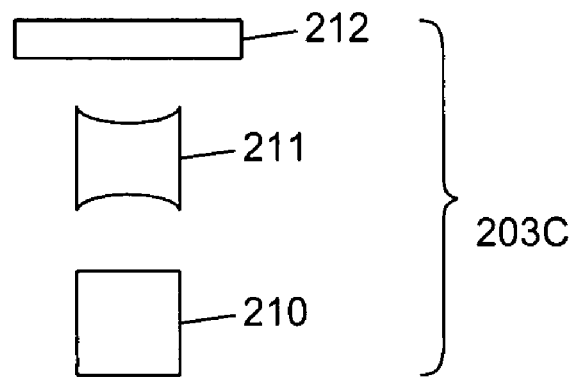
Figure 28:
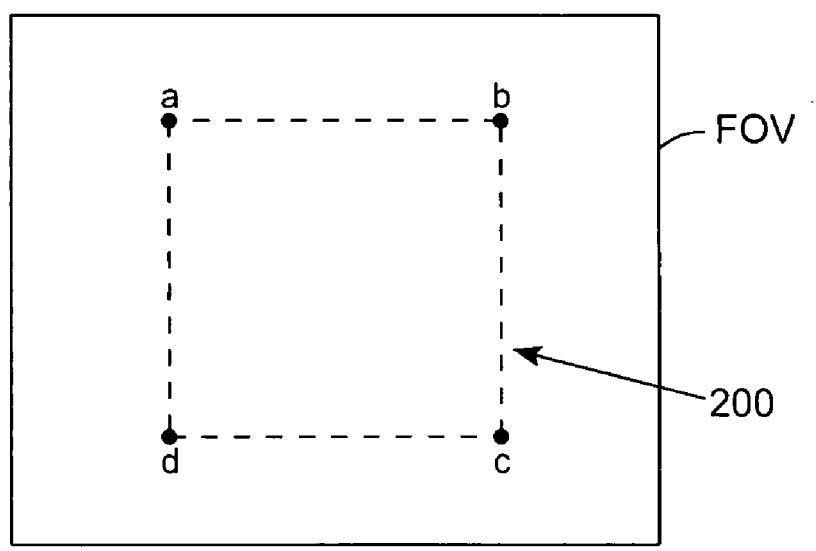
Figure 29:
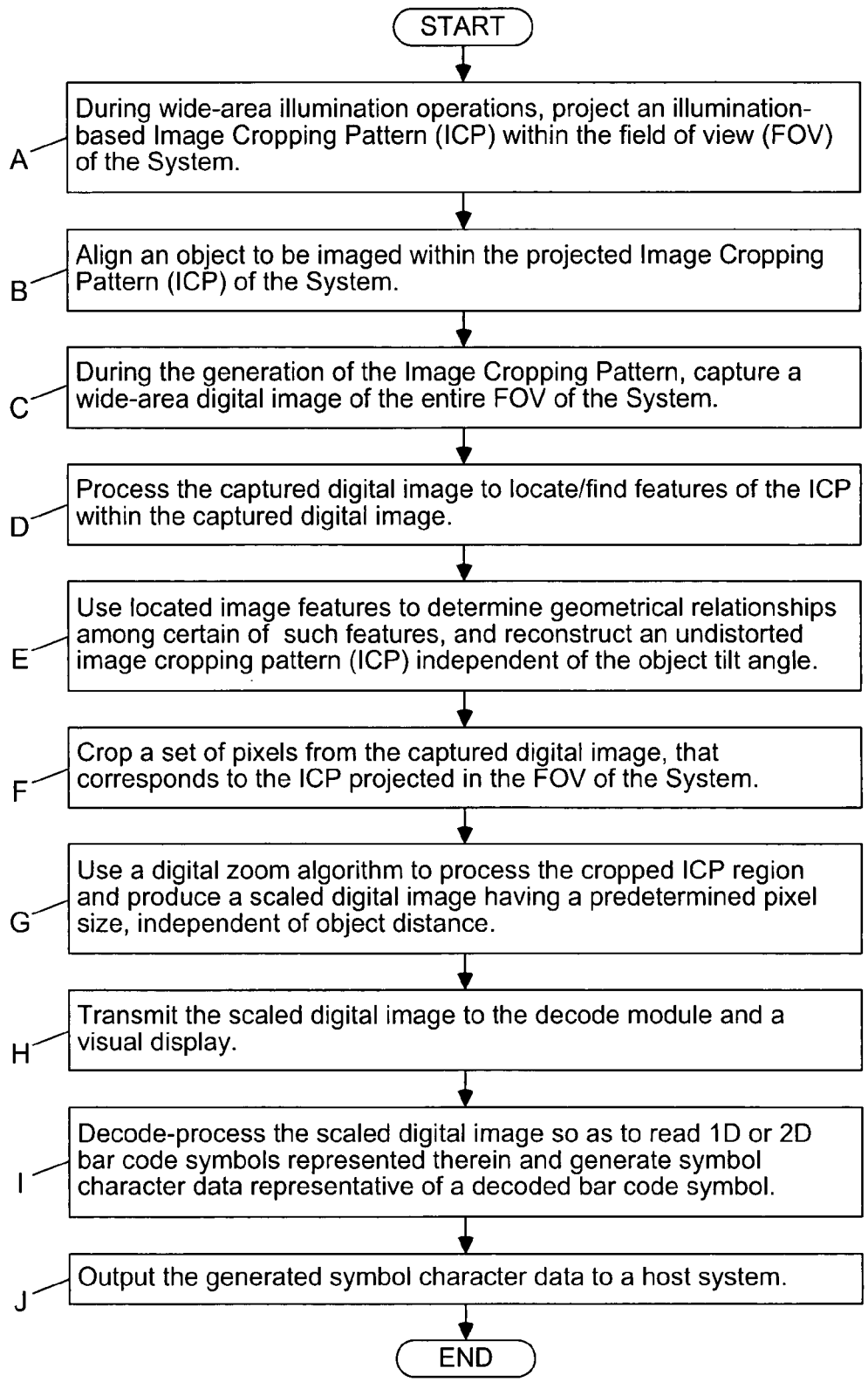
Figure 30:
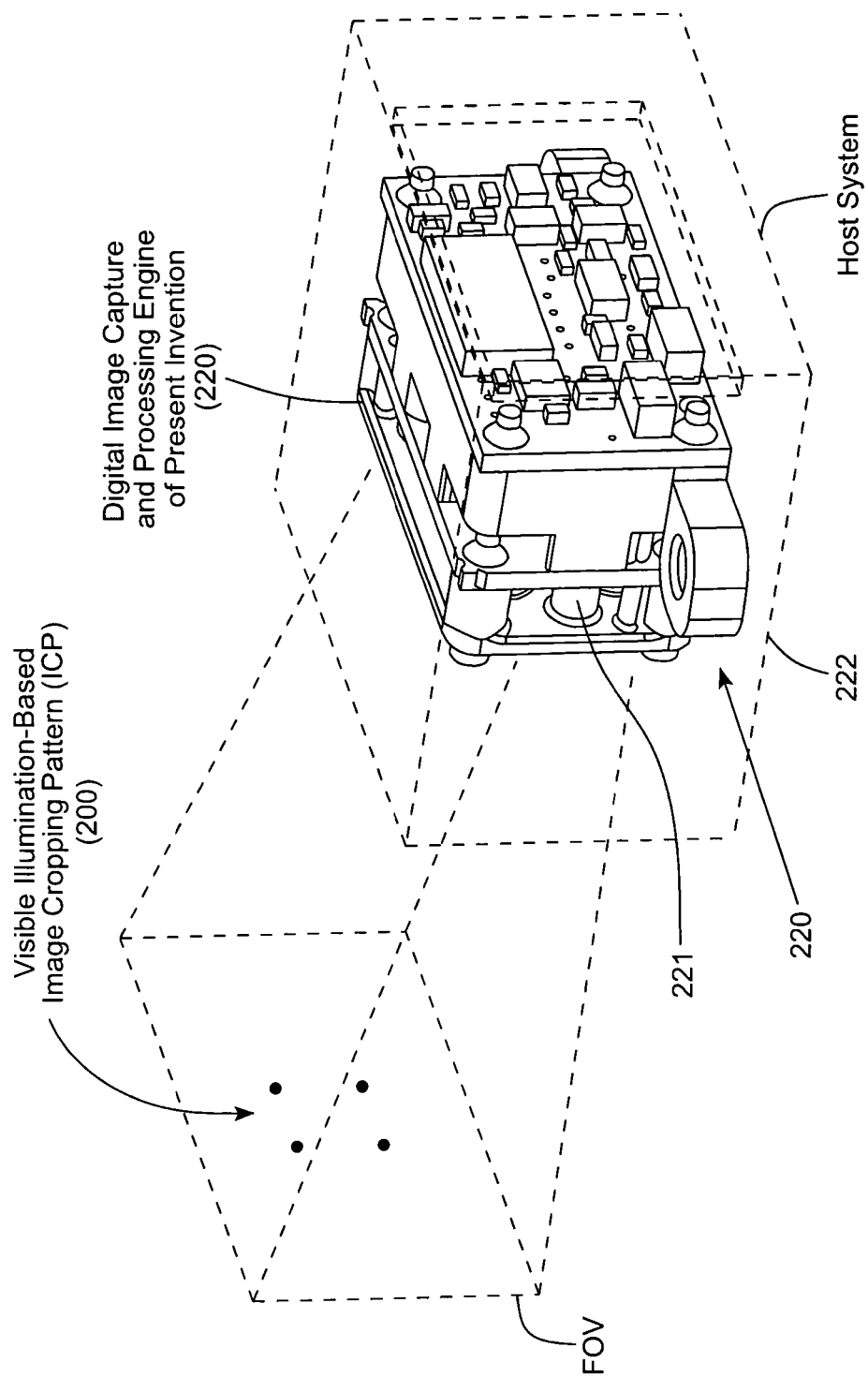
Figure 31A:
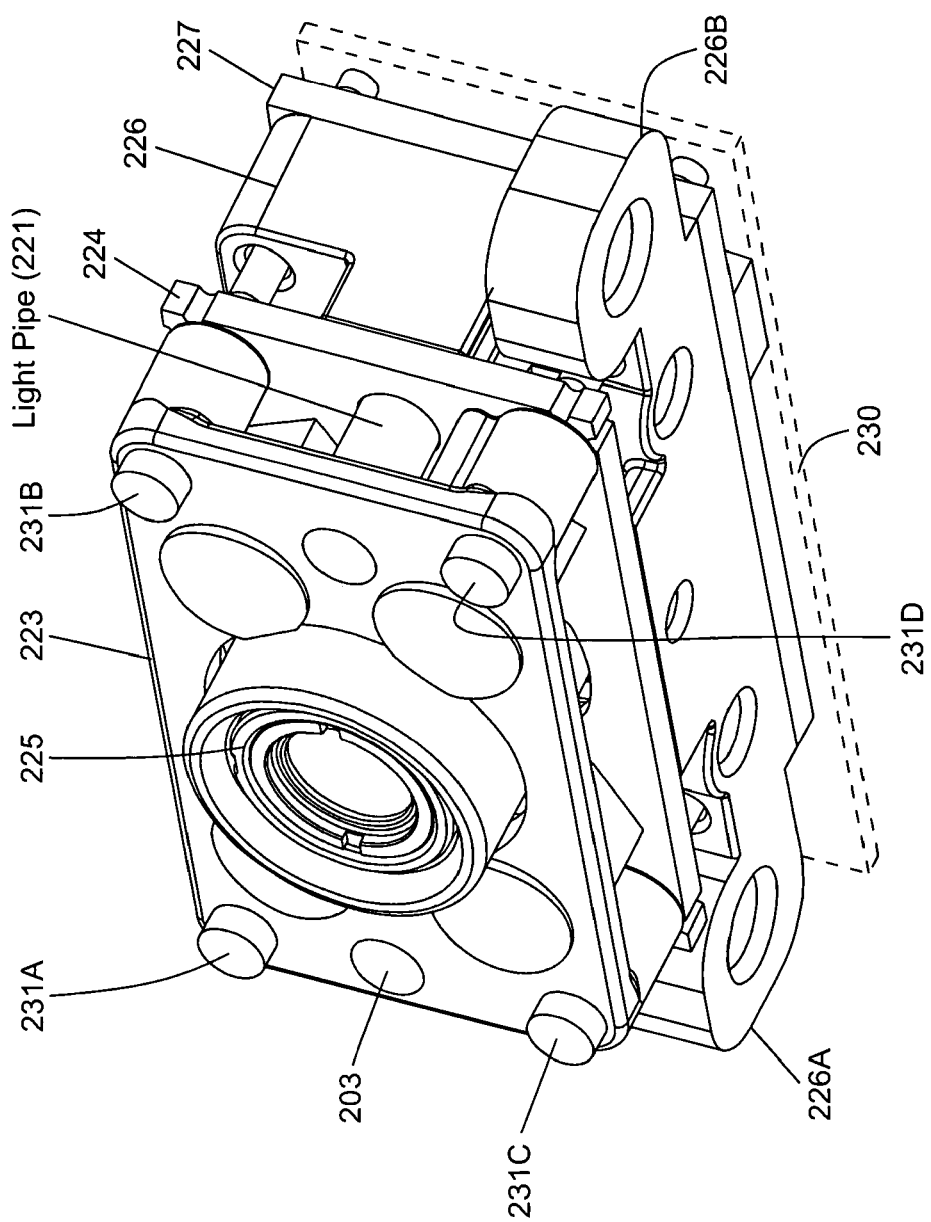
Figure 31B:
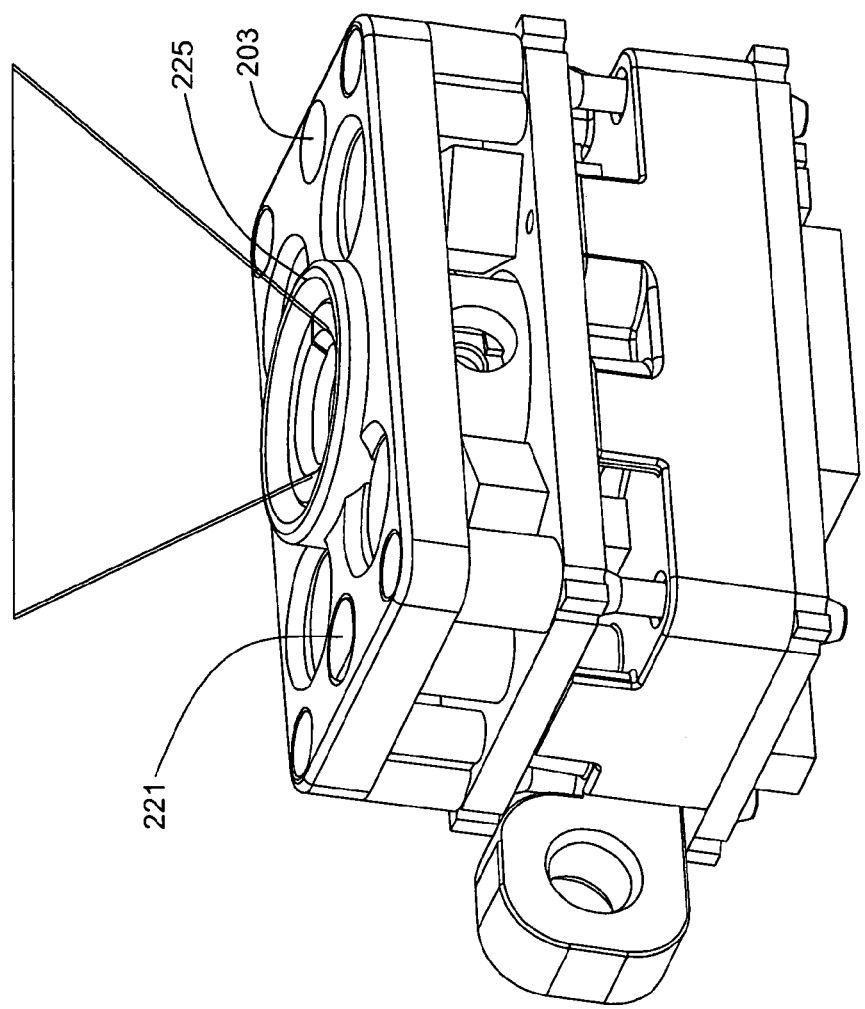
Figure 32:
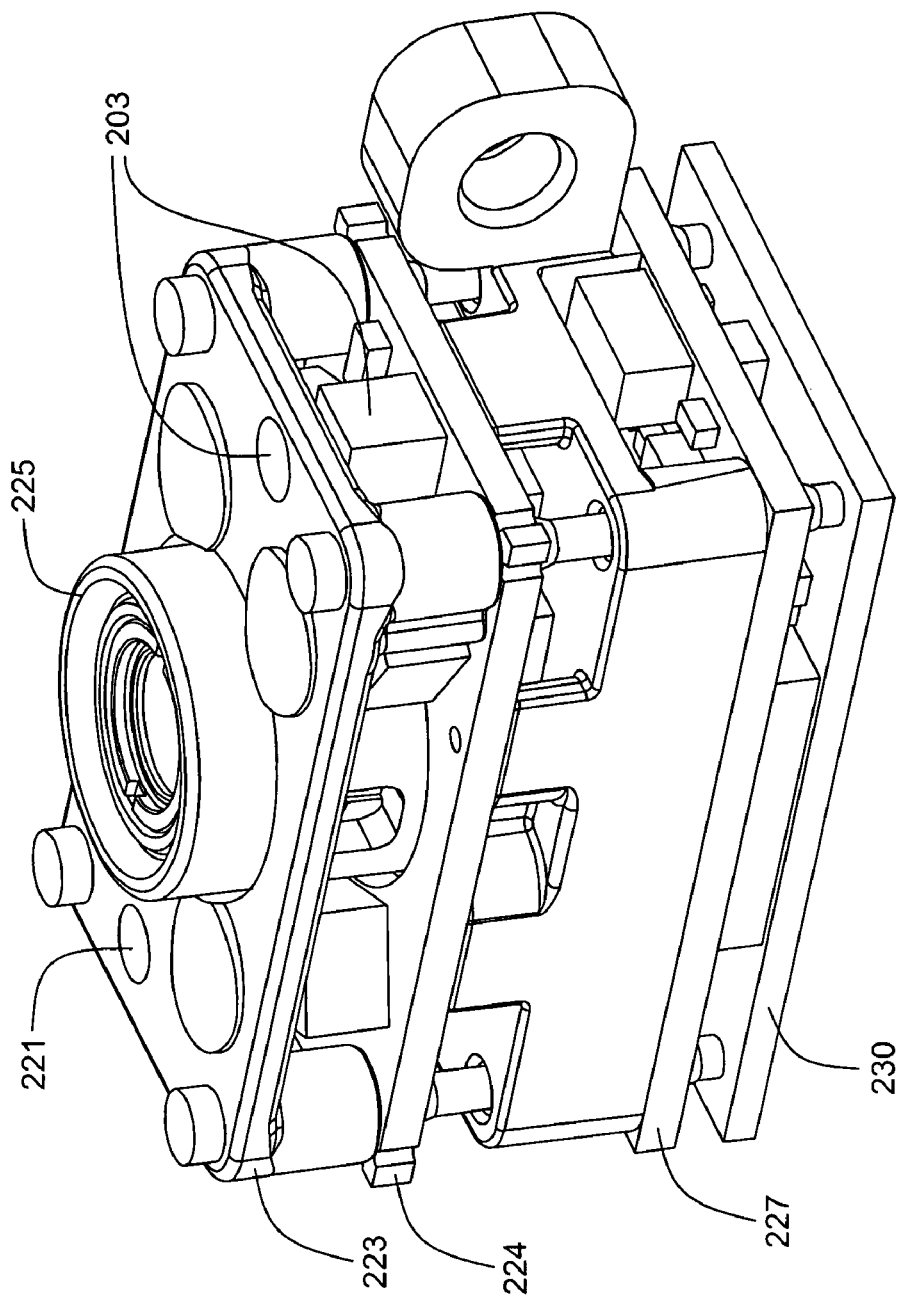
Figure 33:
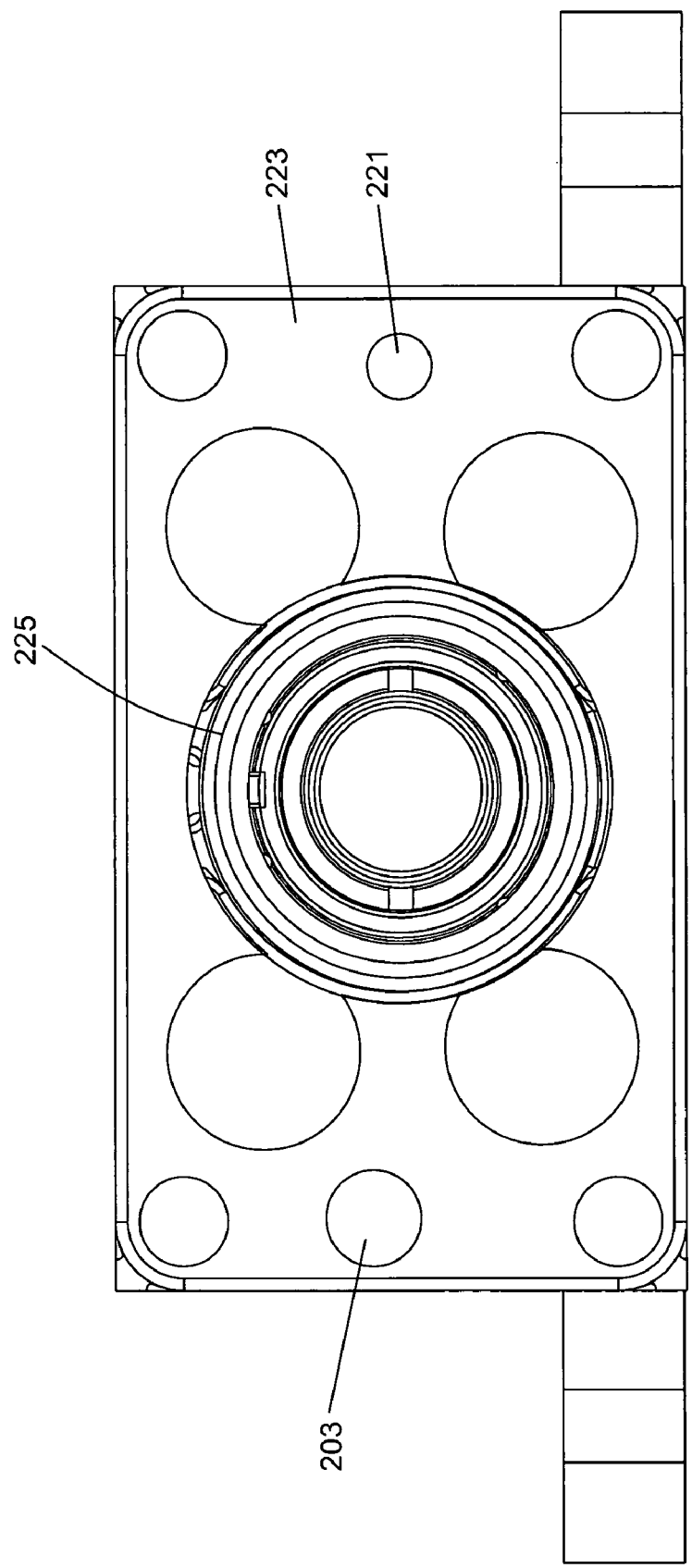
Figure 34:
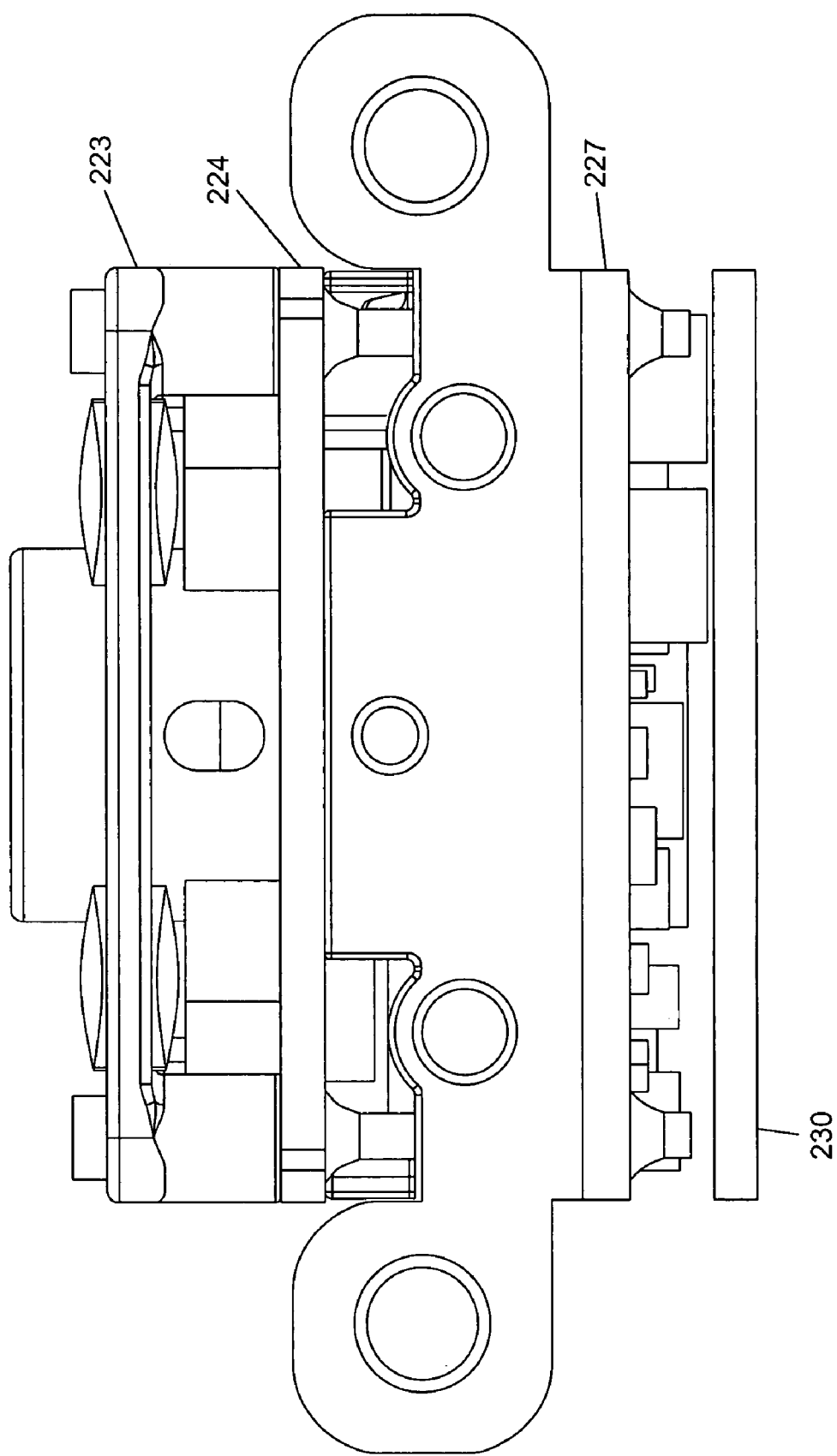
Figure 35:
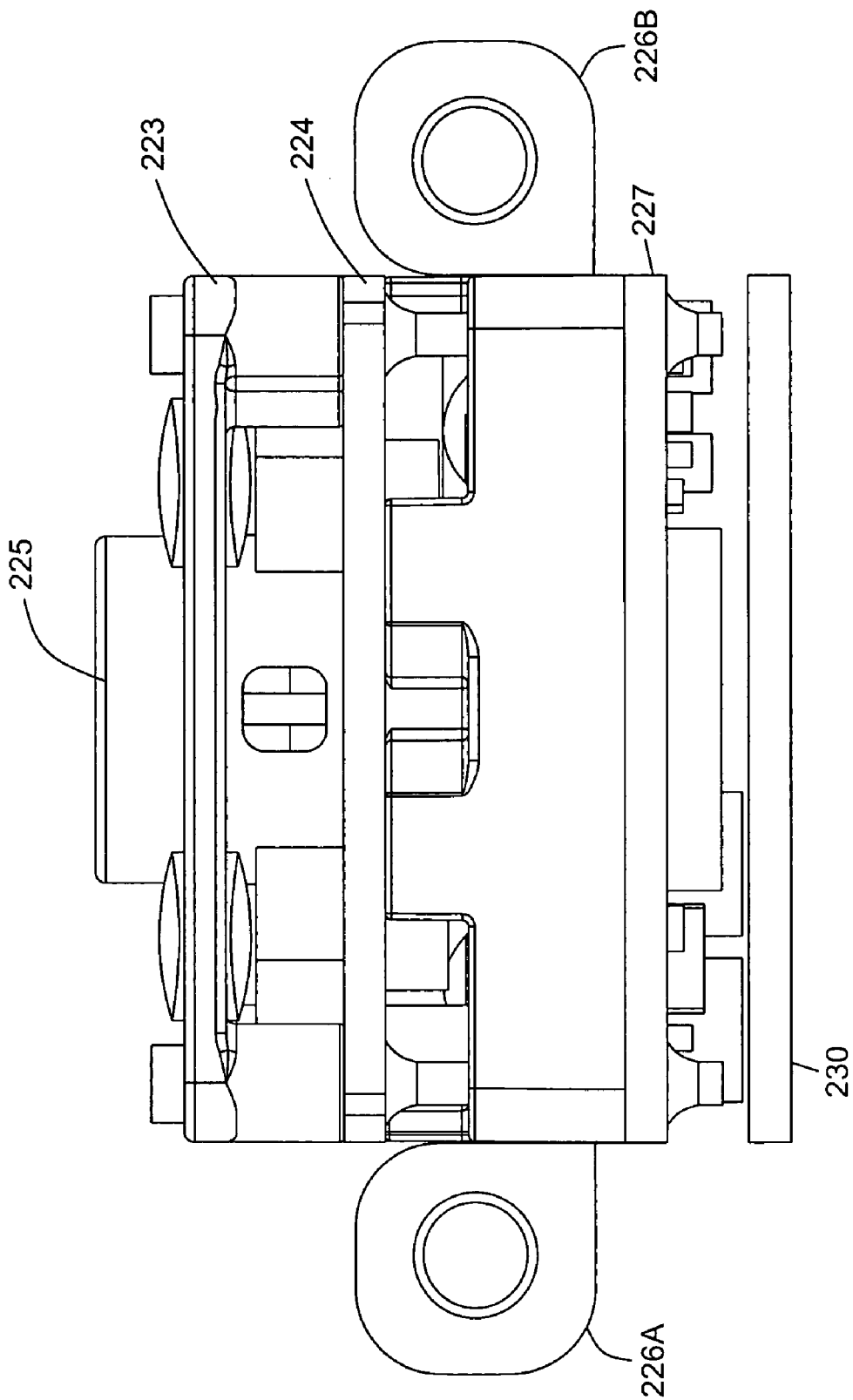
Figure 36:
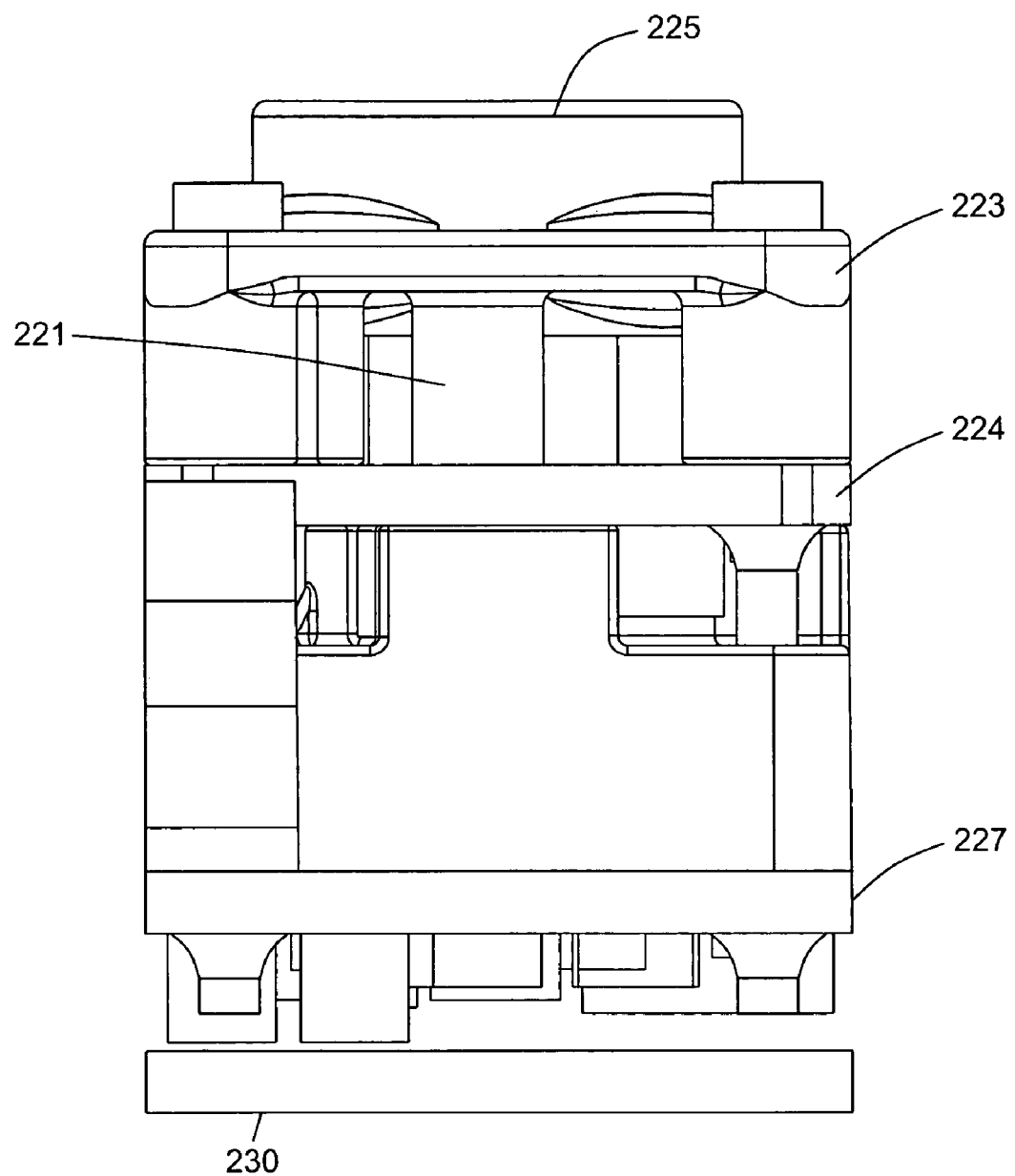
Figure 37:
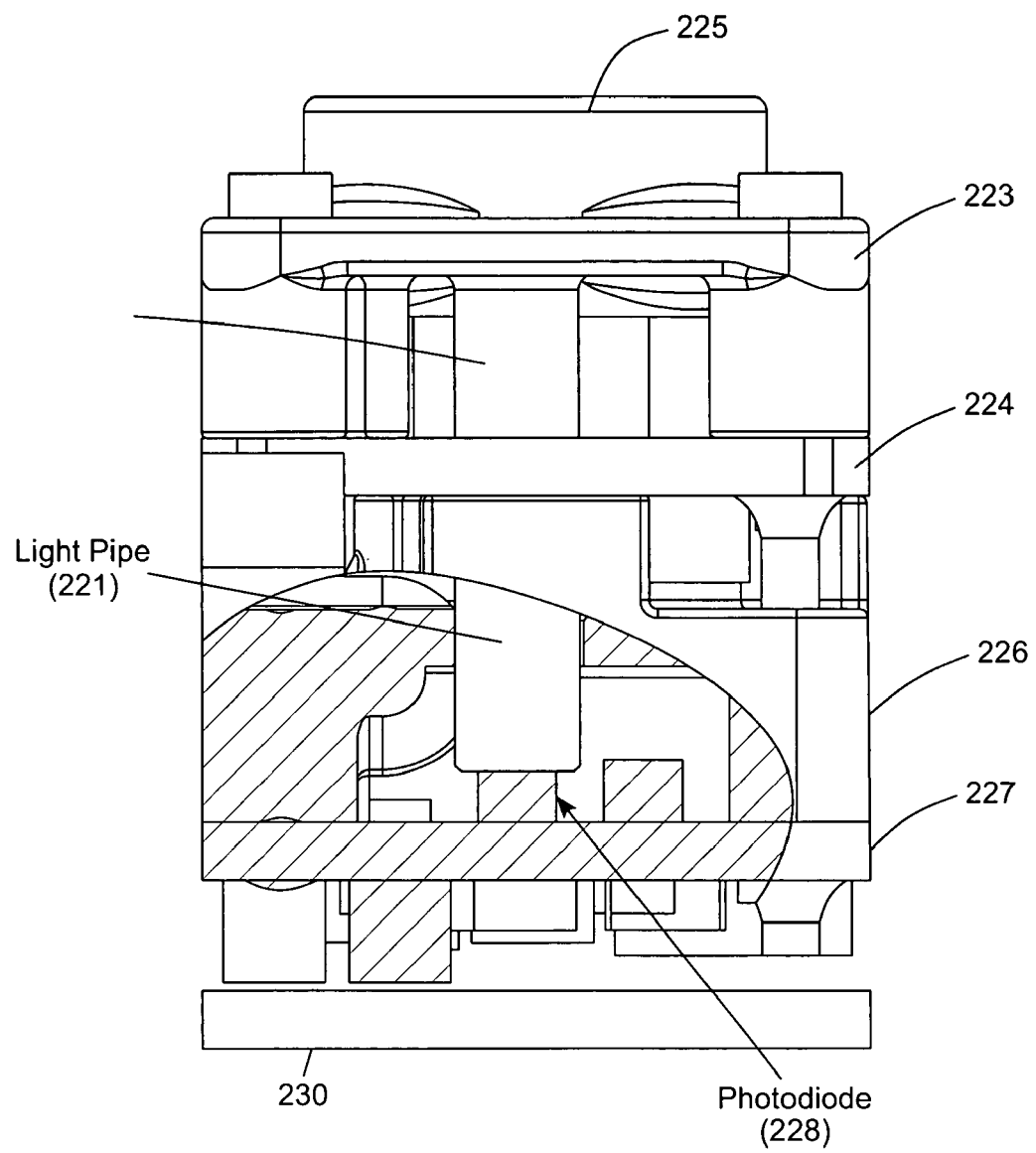
Figure 38:
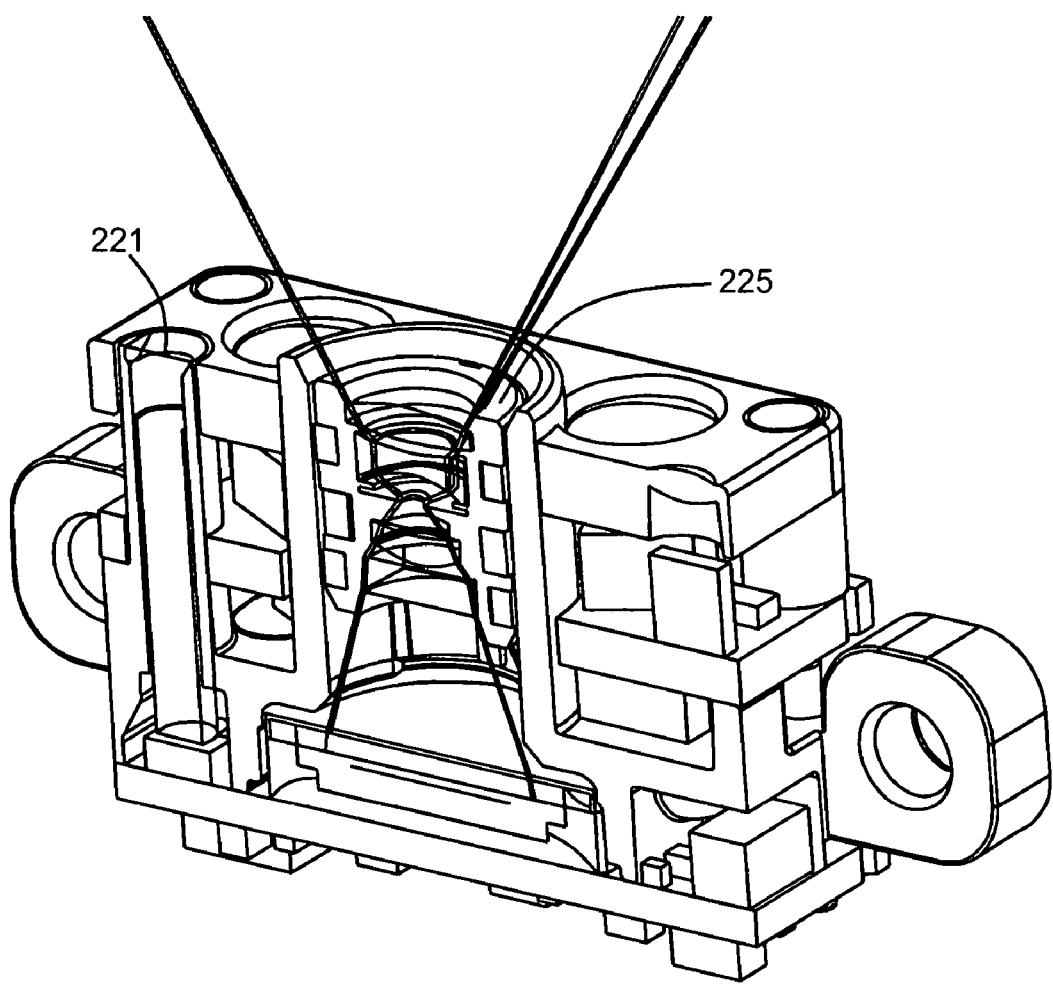
Figure 39A:
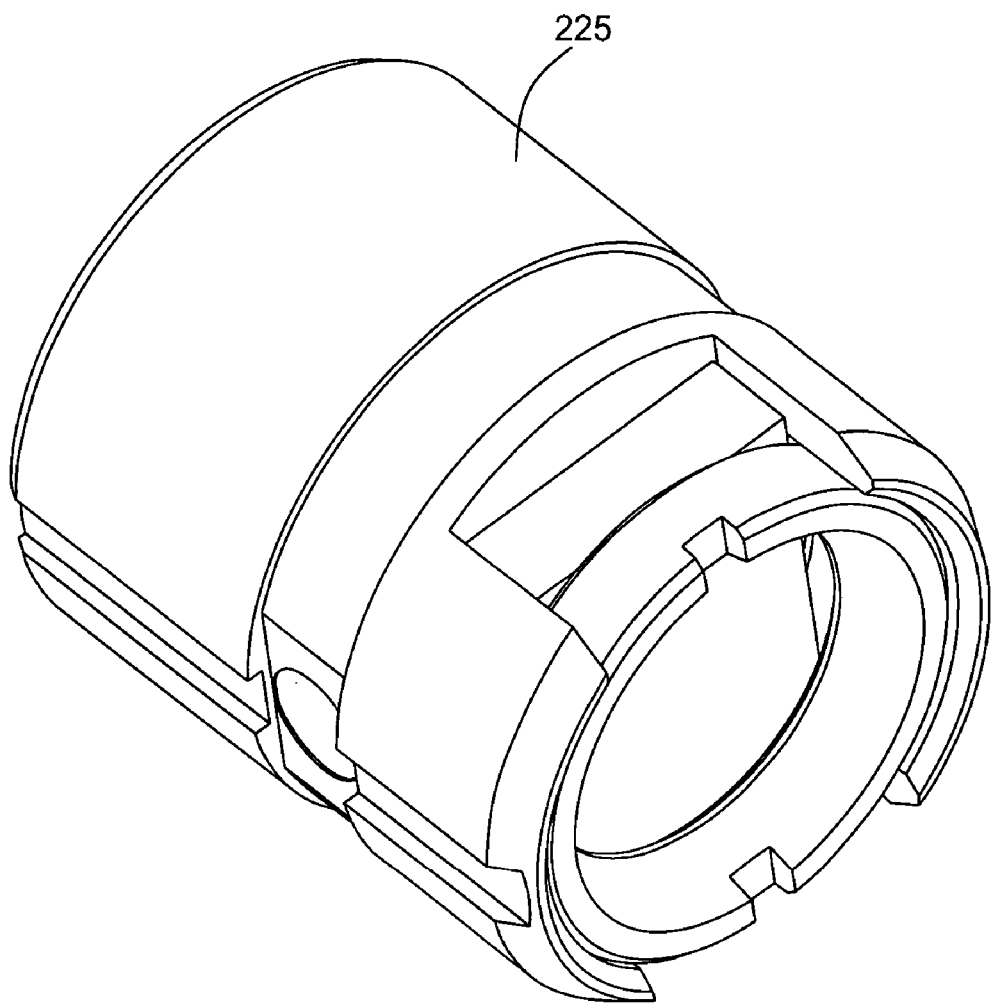
Figure 39B:
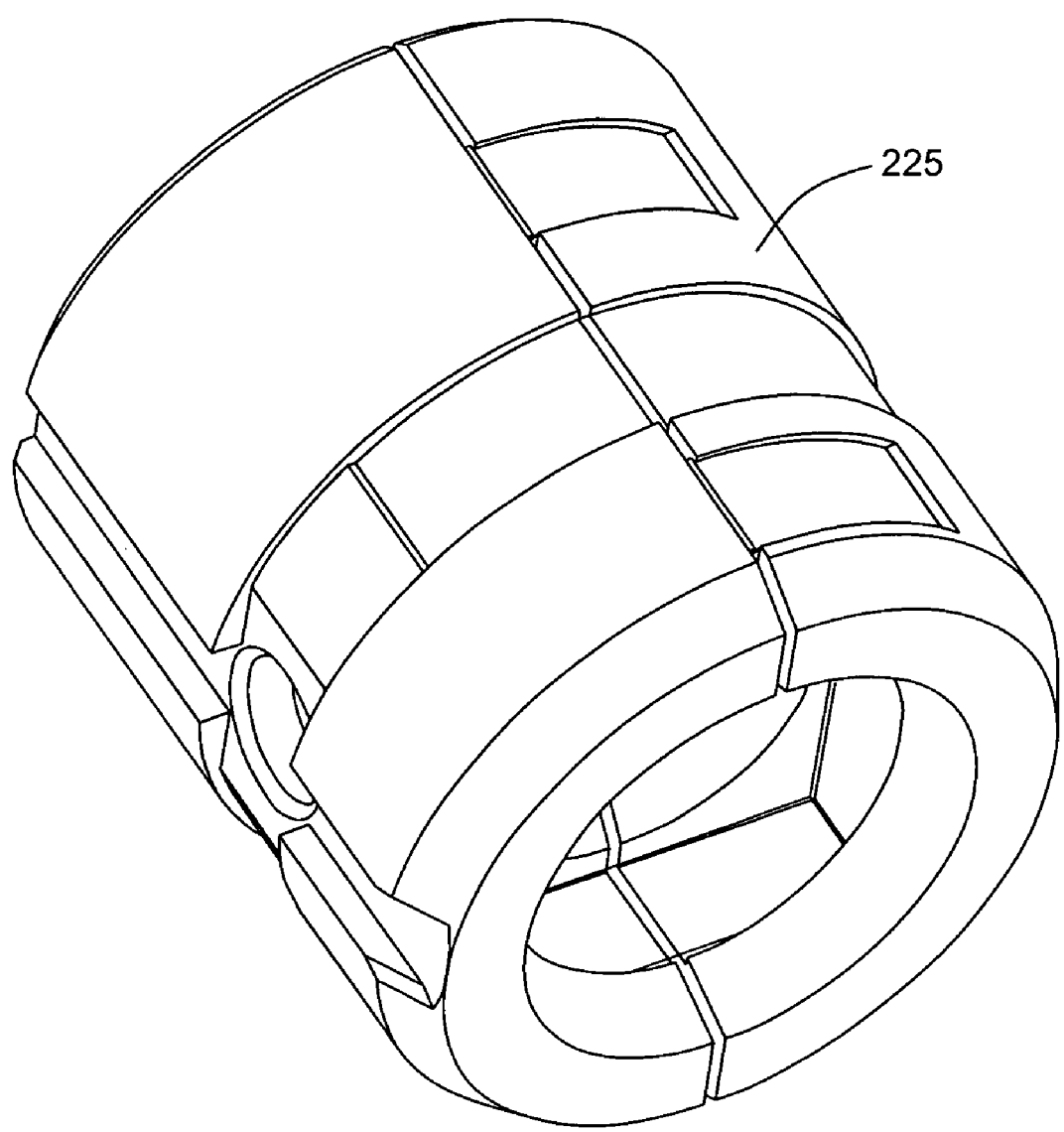
Figure 39C:
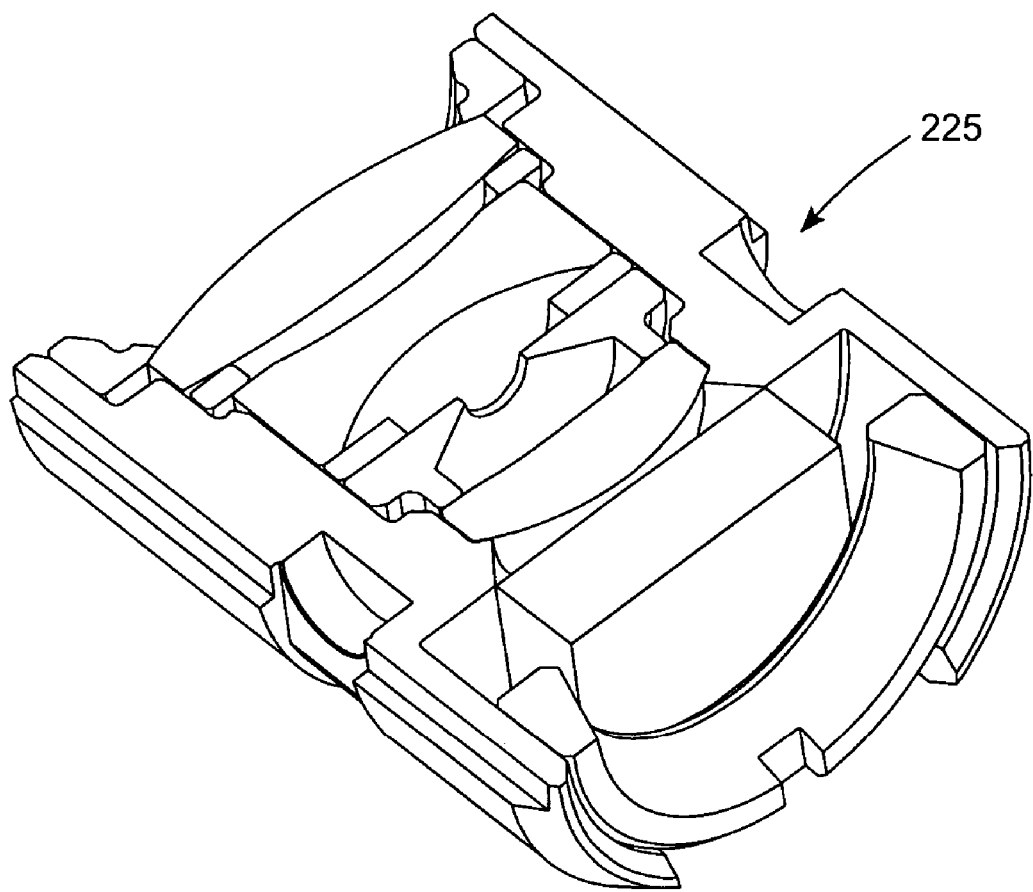
Figure 39D:
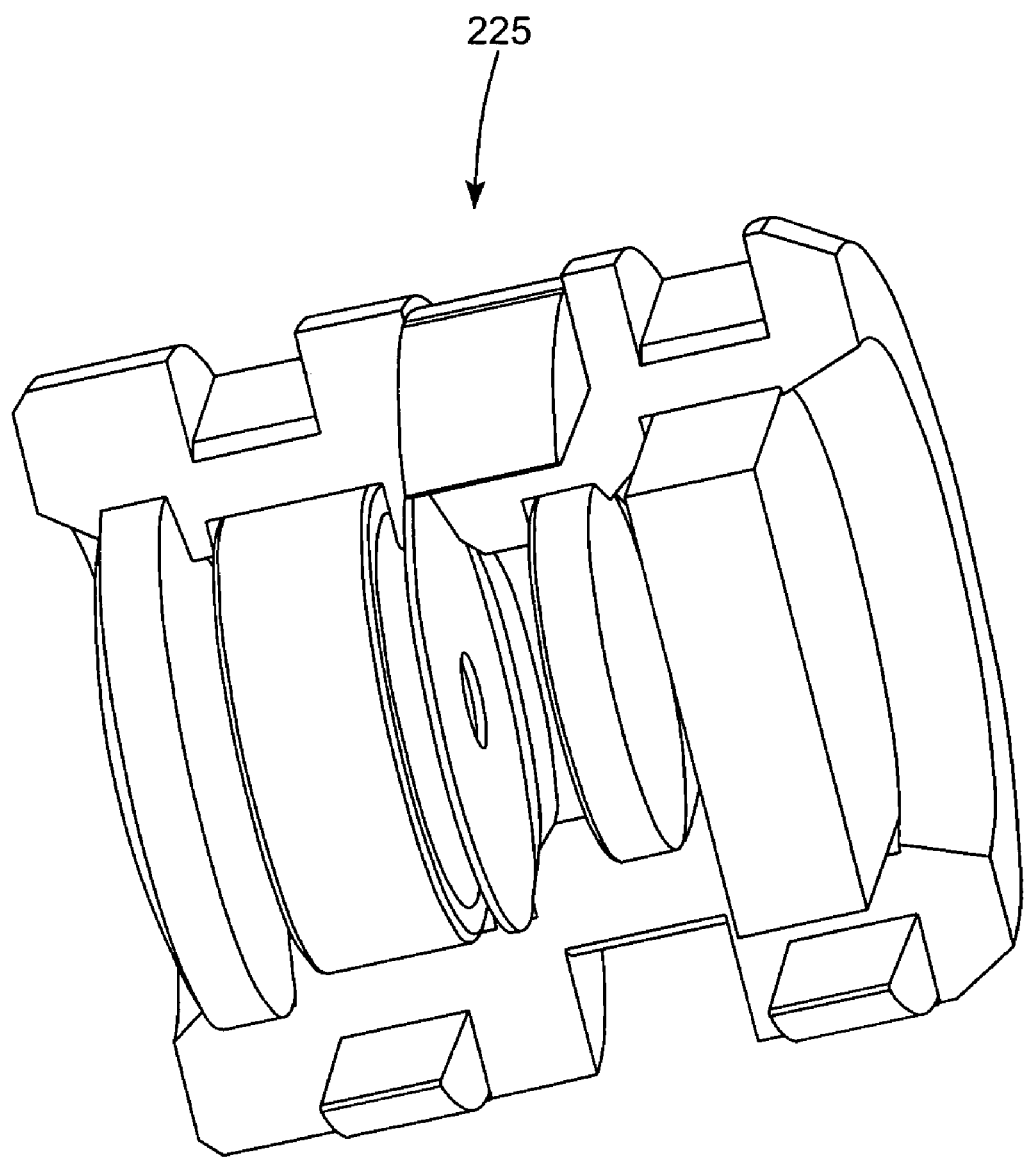
Figure 39E:
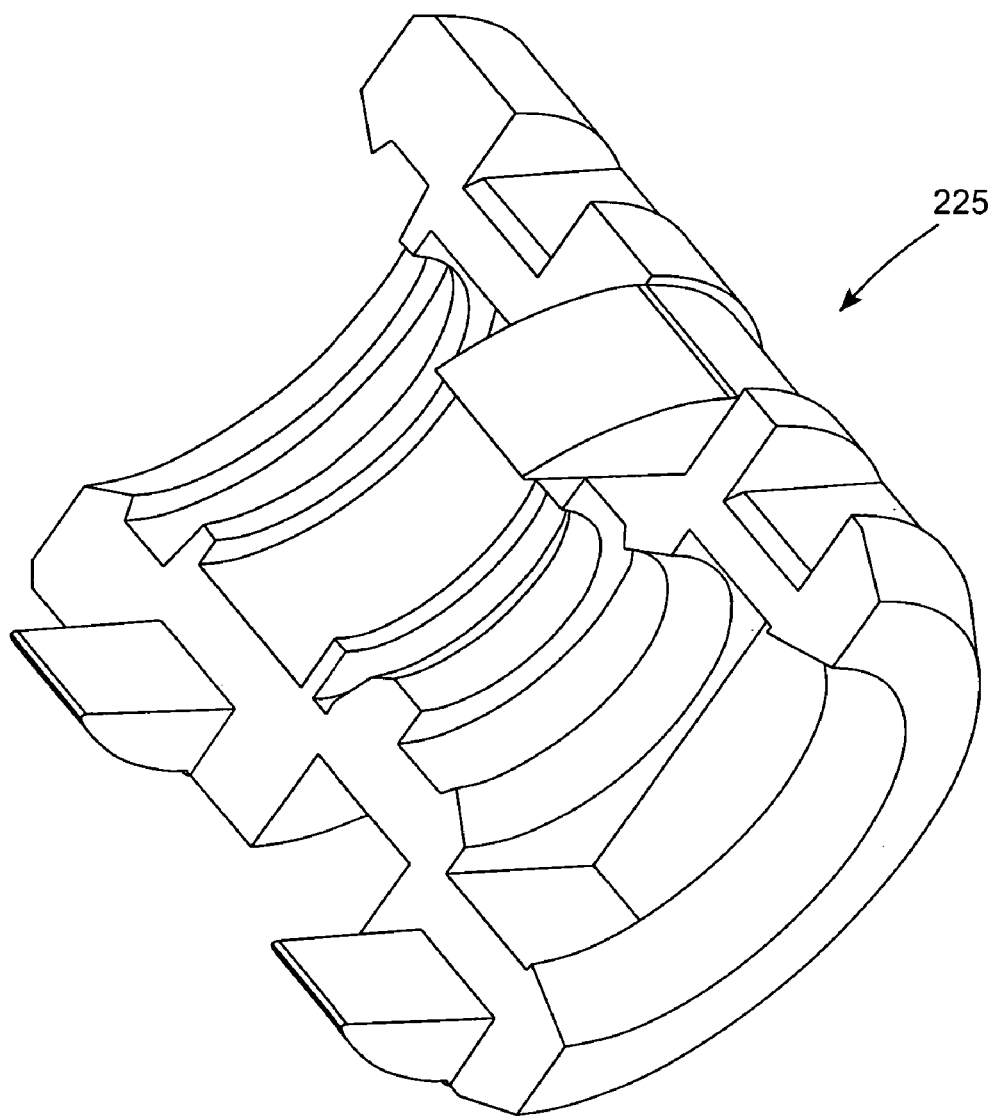
Figure 40:
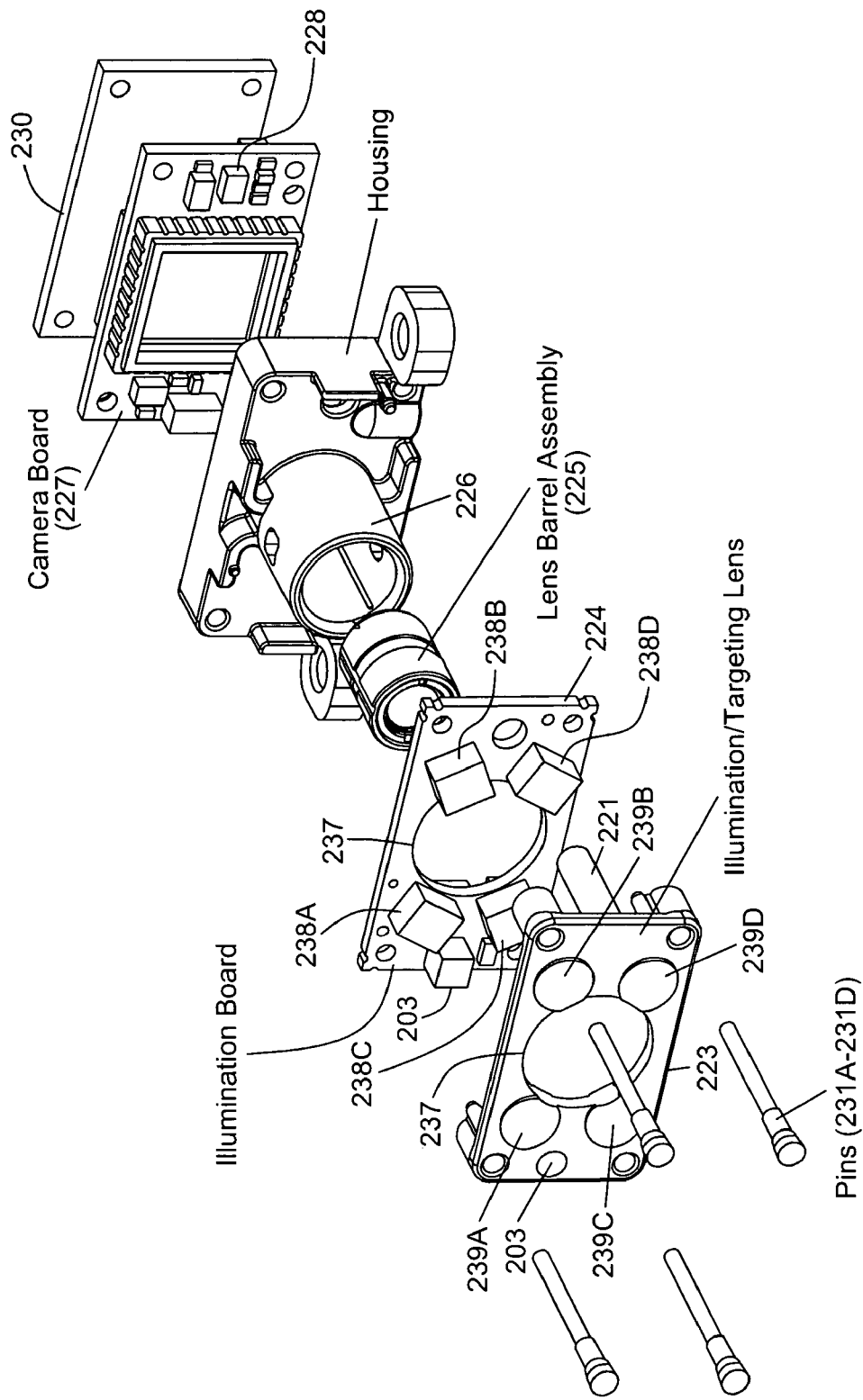
Figure 41:
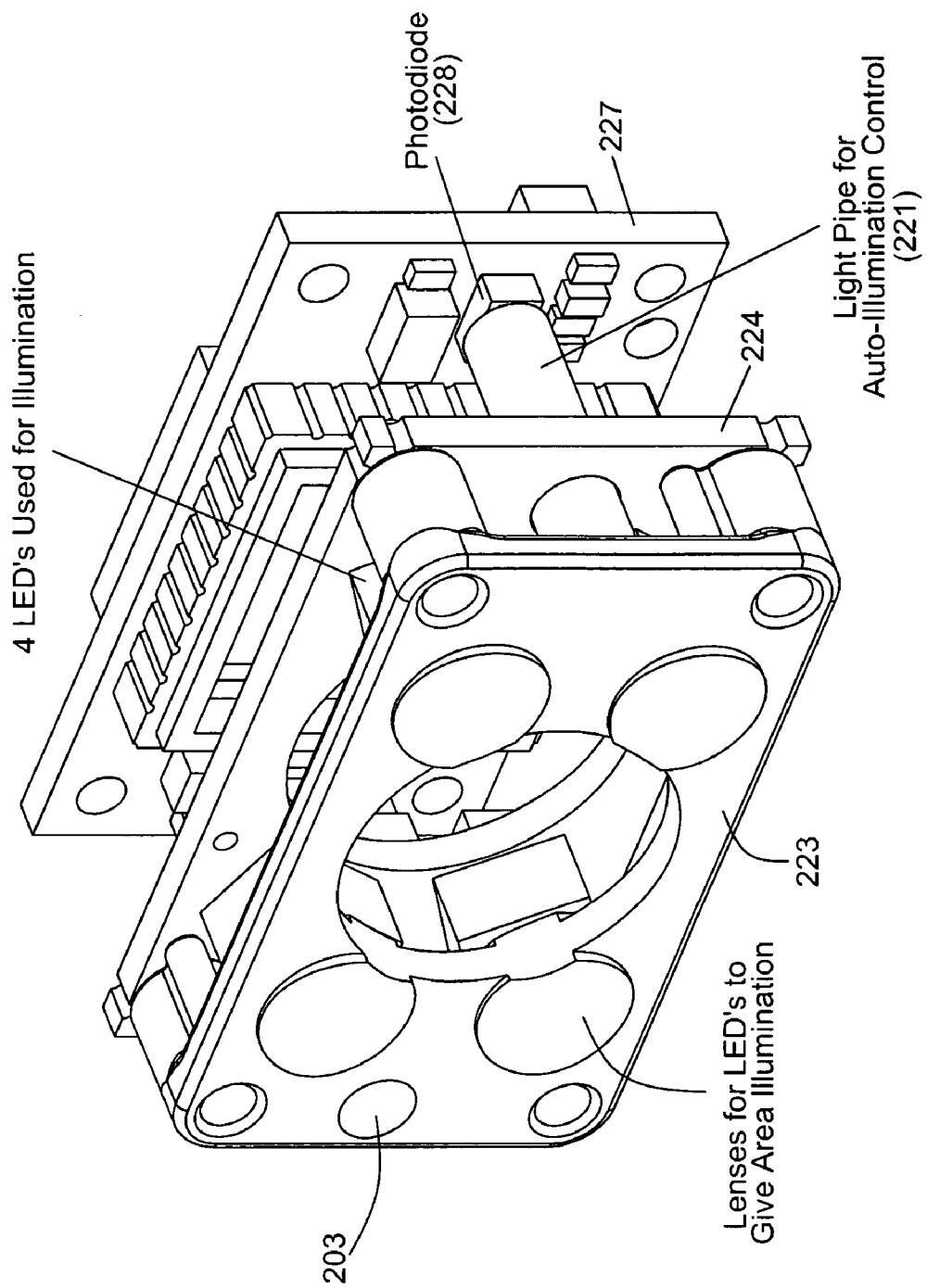
Figure 42:
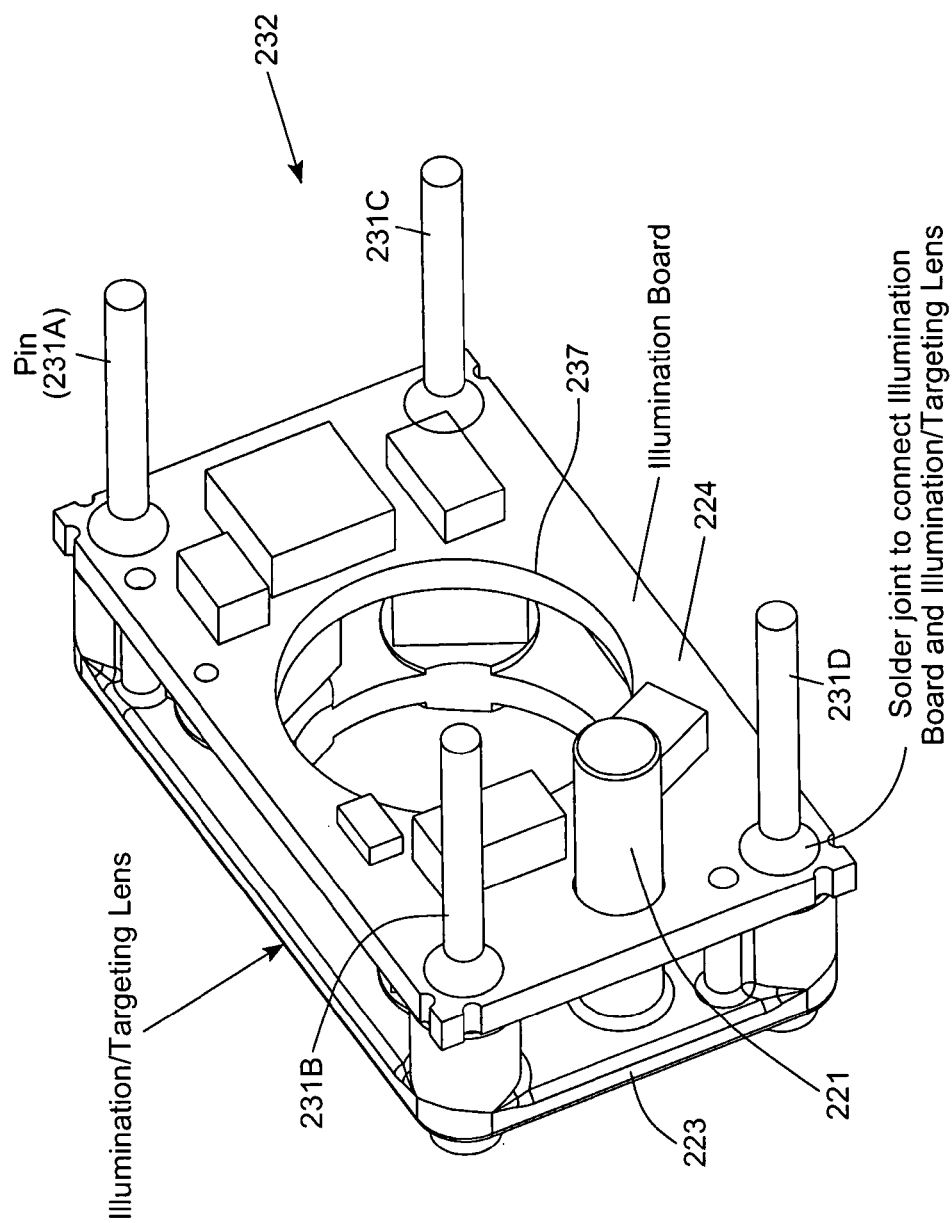
Figure 43:
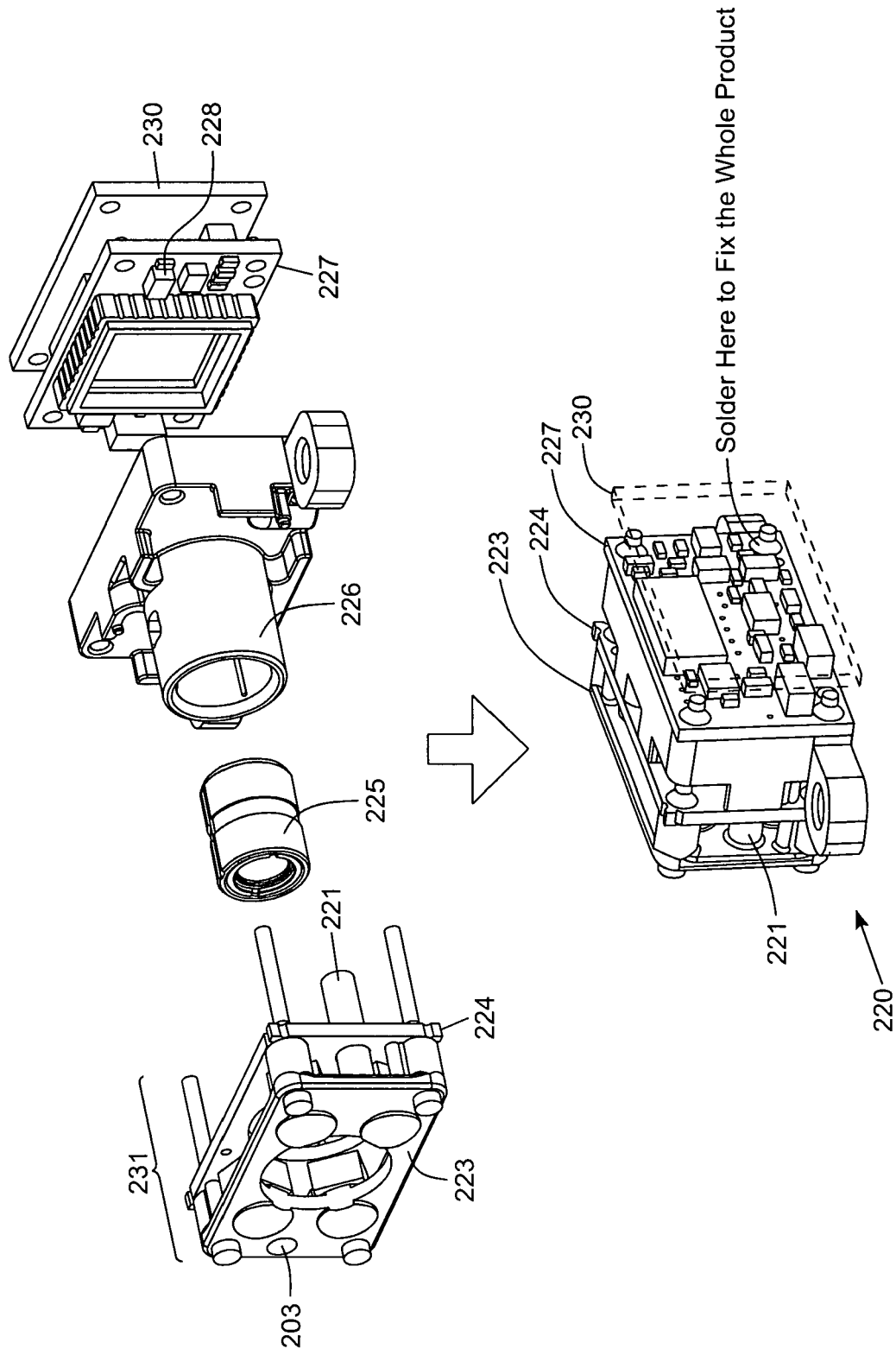
Figure 44:
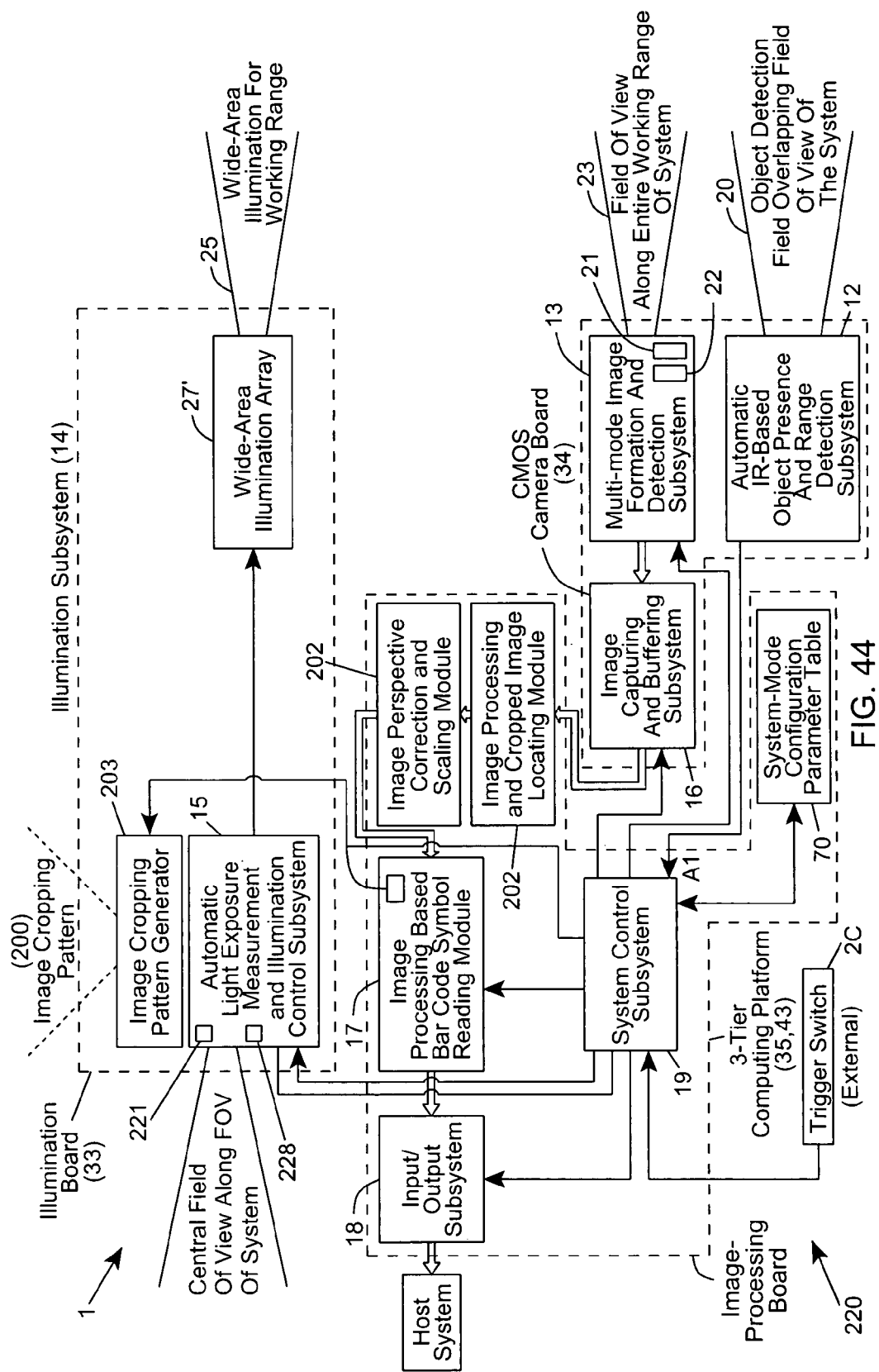
Figure 45:
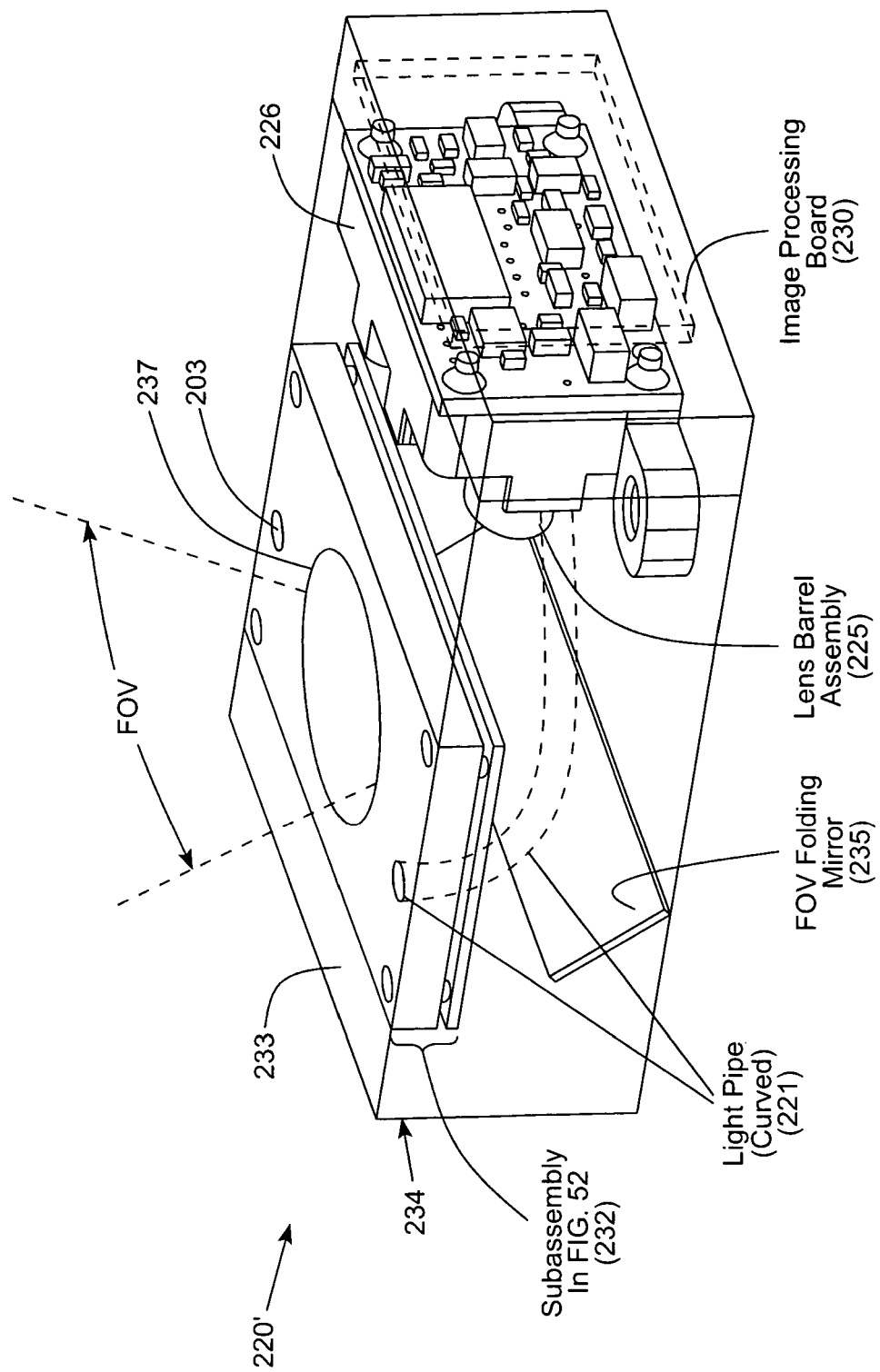
Figure 46:
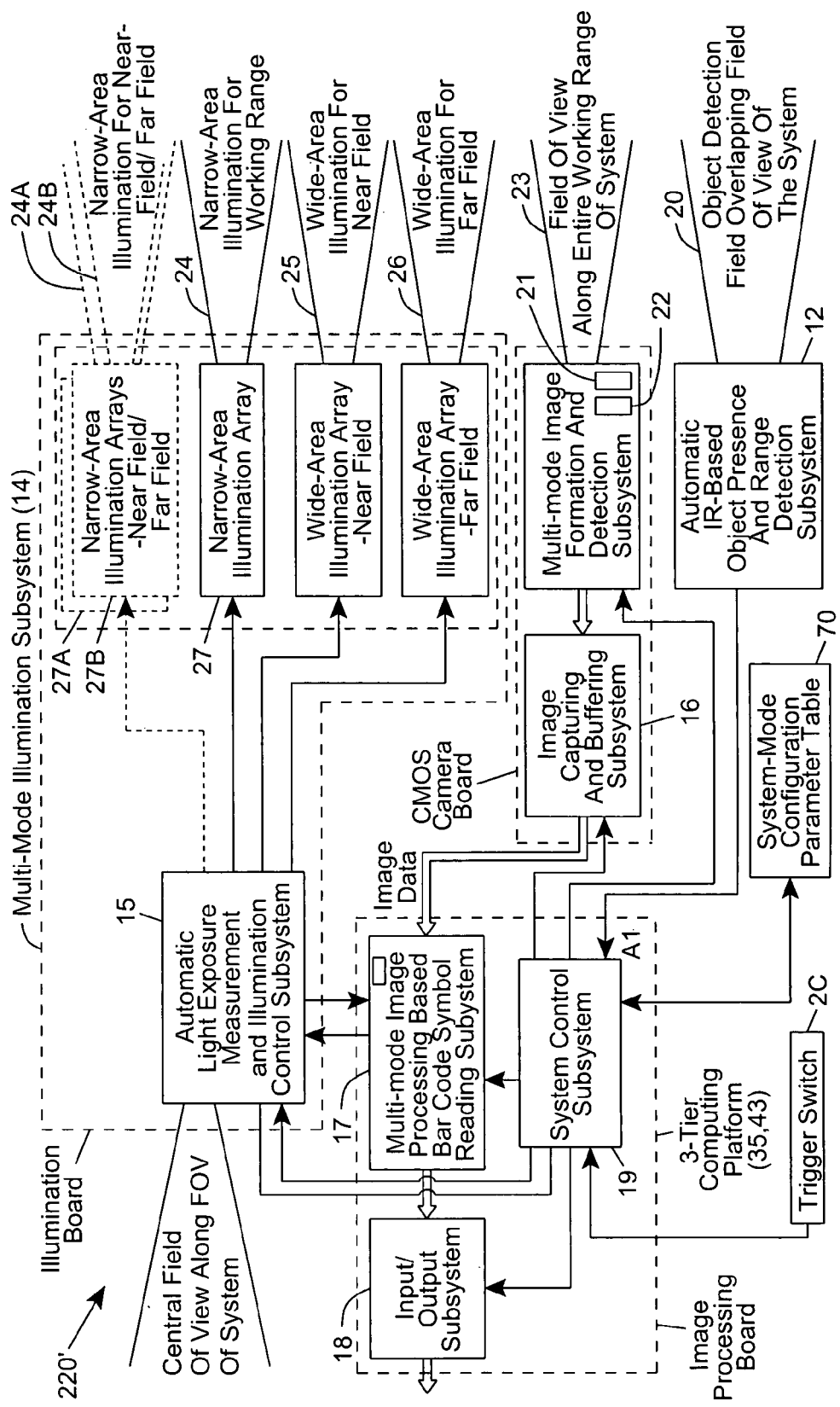
Figure 47A:
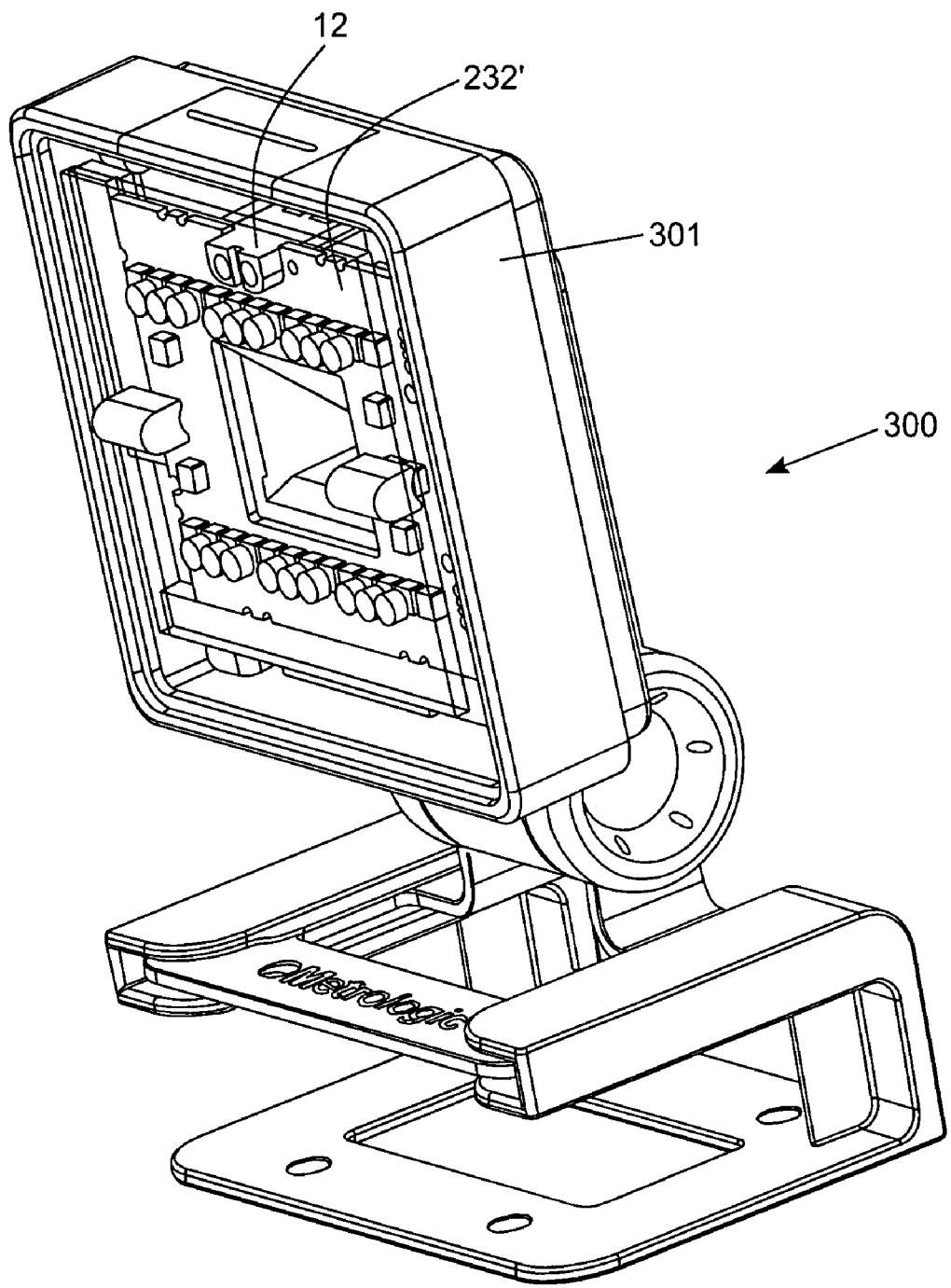
Figure 47B:
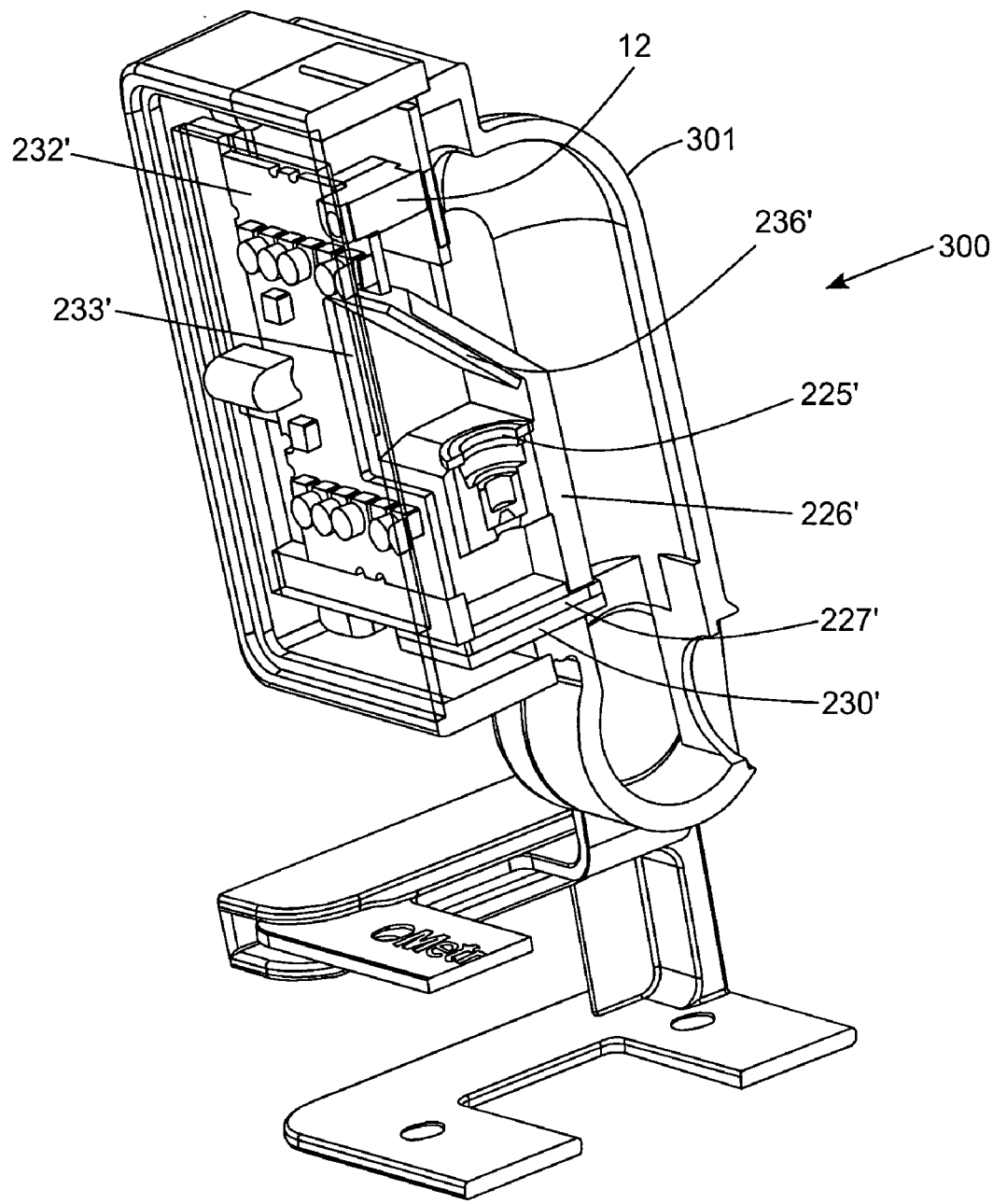
Figure 48:
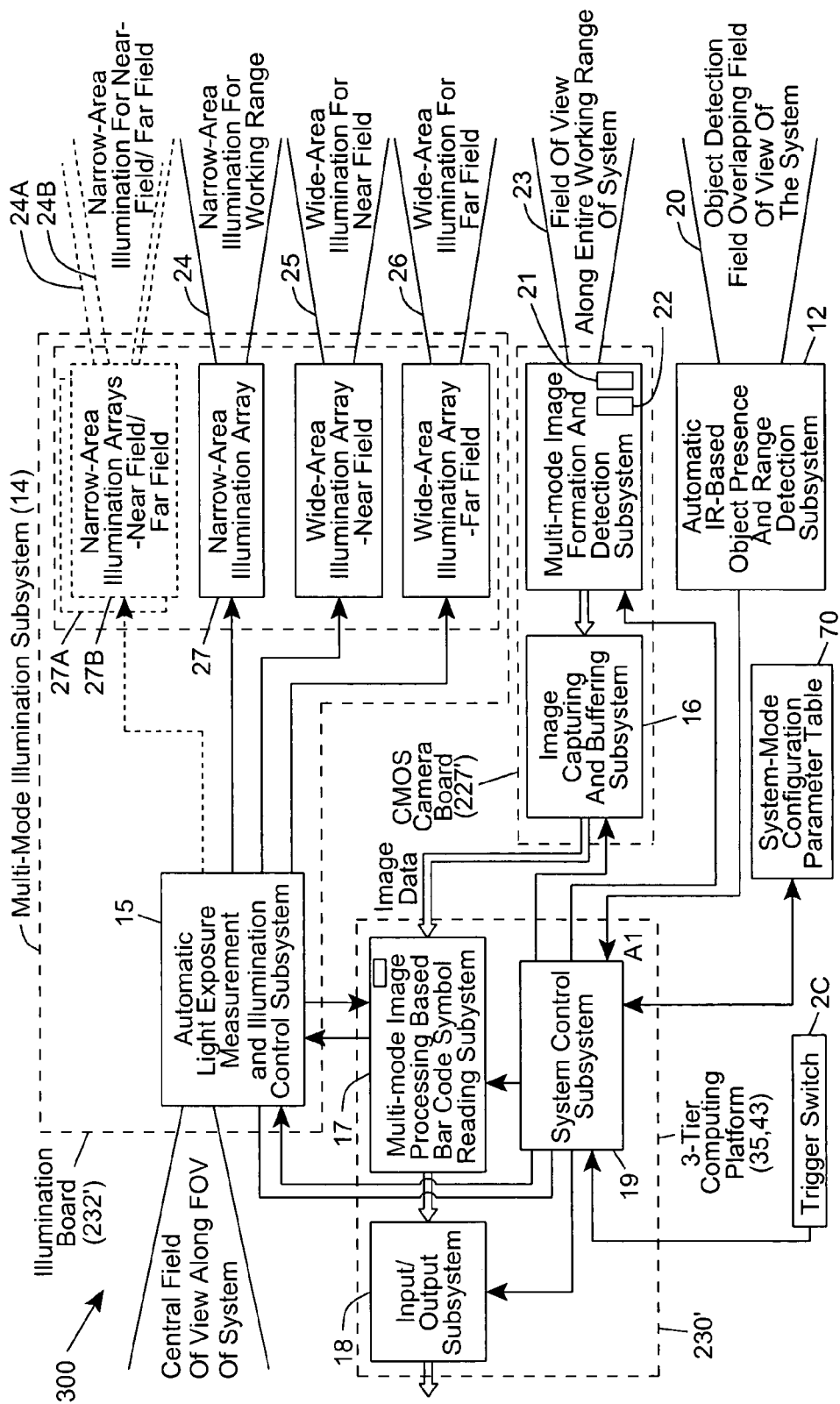
Figure 49A:
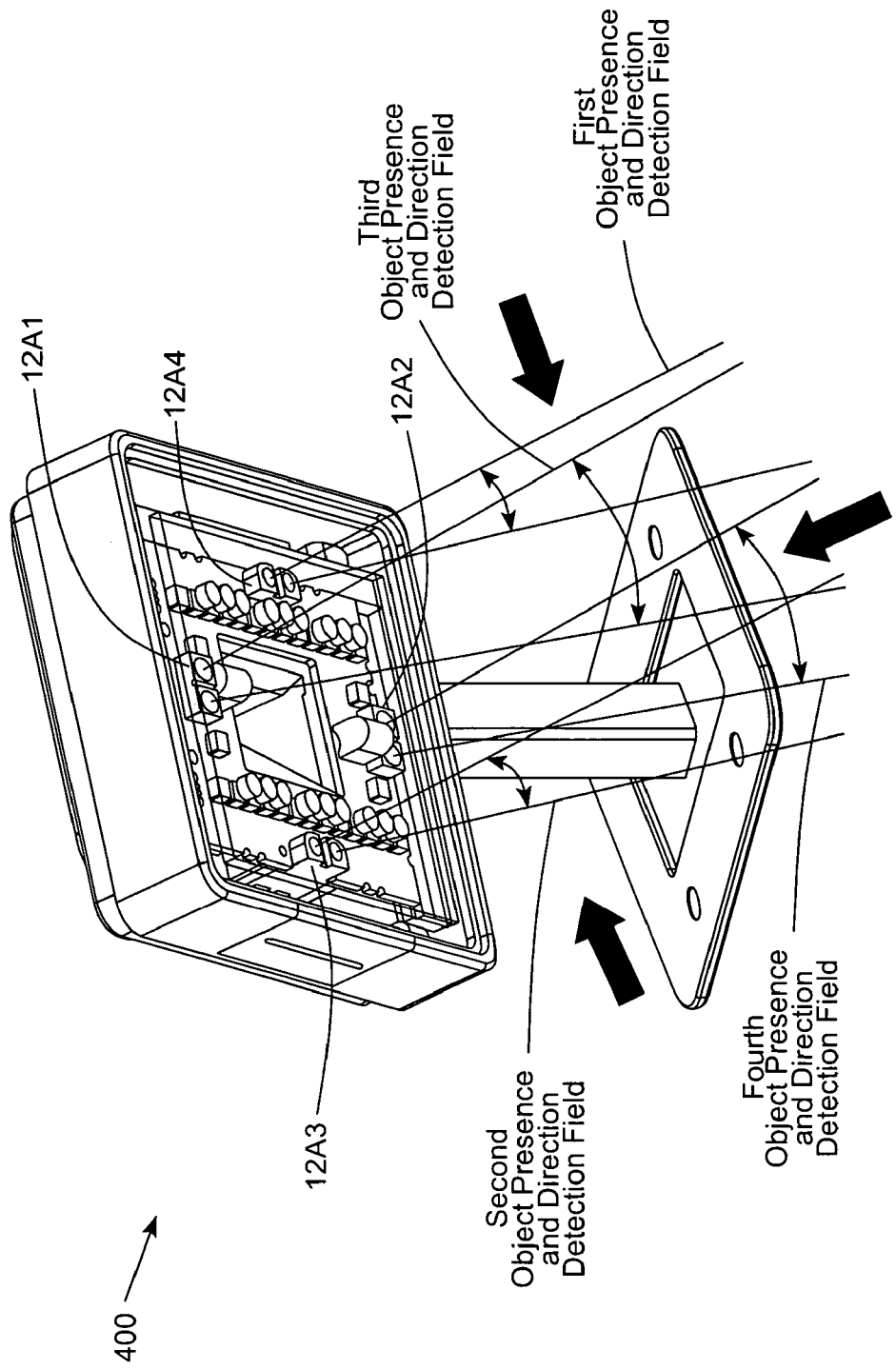
Figure 49B:
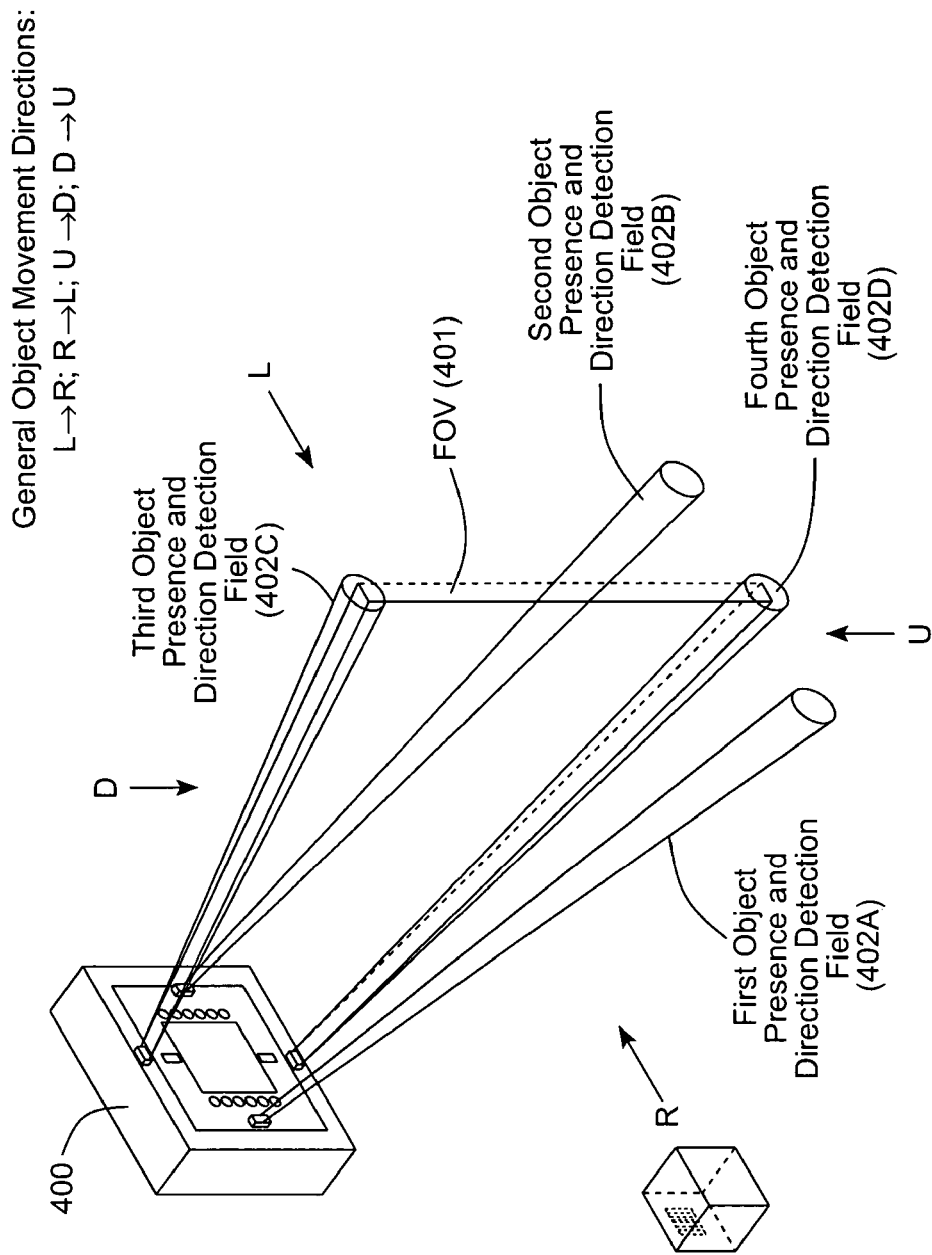
Figure 49C:
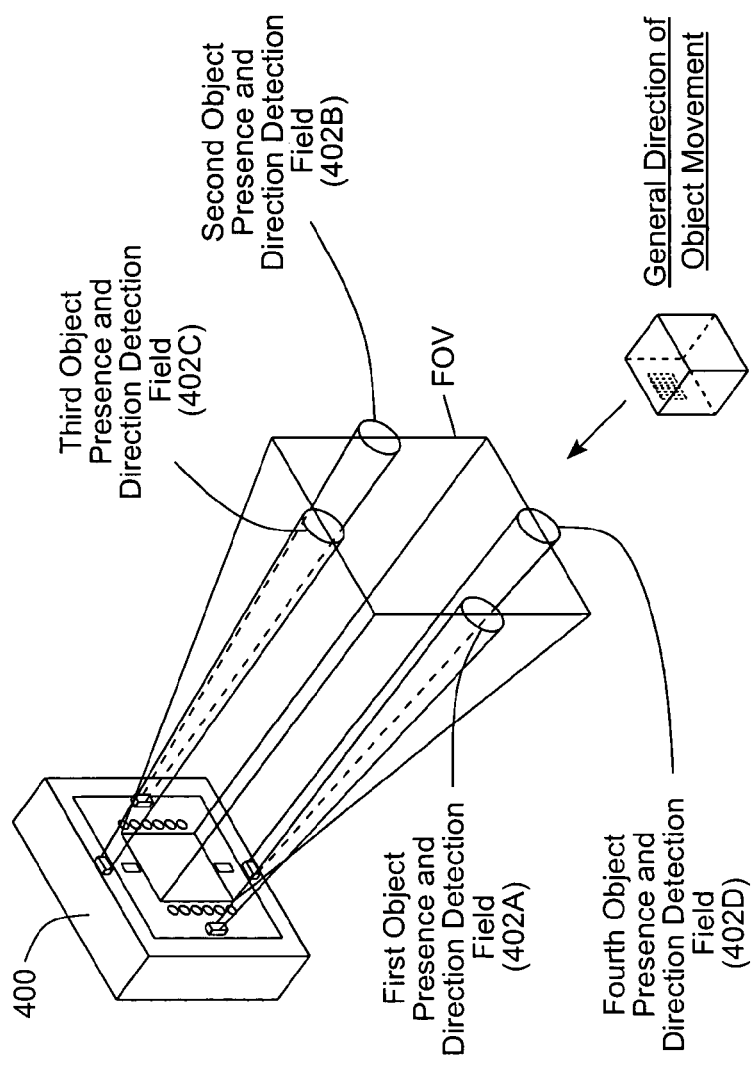
Figure 50:
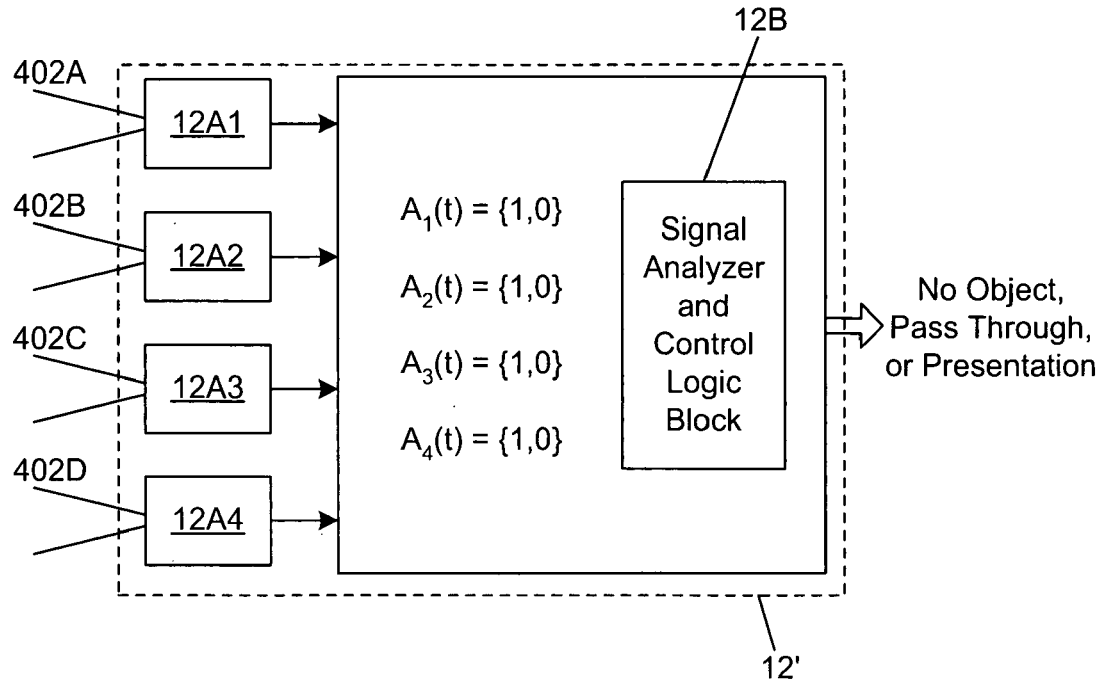
Figure 51:
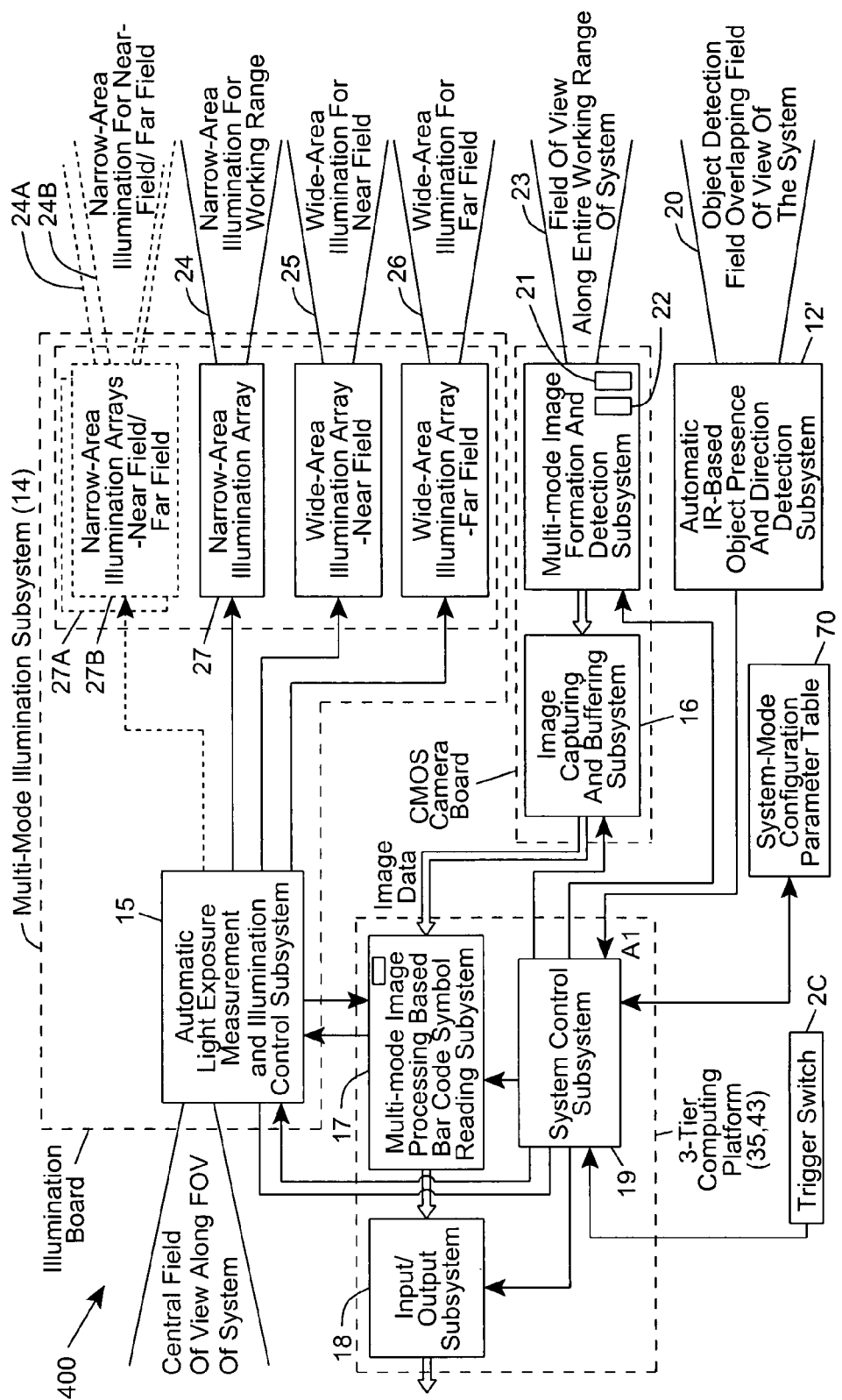

FIG. 2A1 is a schematic block diagram representative of a system design for the hand-supportable digital imaging-based bar code symbol reading device illustrated in FIGS. 1A through 1E, wherein the system design is shown comprising (1) a Multi-Mode Area-Type Image Formation and Detection (i.e. Camera) Subsystem having image formation (camera) optics for producing a field of view (FOV) upon an object to be imaged and a CMOS or the like area-type image sensing array for detecting imaged light reflected off the object during illumination operations in either (i) a narrow-area image capture mode in which a few central rows of pixels on the image sensing array are enabled, or (ii) a wide-area image capture mode in which all rows of the image sensing array are enabled, (2) a Multi-Mode LED-Based Illumination Subsystem for producing narrow and wide area fields of narrow-band illumination within the FOV of the Image Formation And Detection Subsystem during narrow and wide area modes of image capture, respectively, so that only light transmitted from the Multi-Mode Illumination Subsystem and reflected from the illuminated object and transmitted through a narrow-band transmission-type optical filter realized within the hand-supportable housing (i.e. using a red-wavelength high-pass reflecting window filter element disposed at the light transmission aperture thereof and a low-pass filter before the image sensor) is detected by the image sensor and all other components of ambient light are substantially rejected, (3) an IR-based object presence and range detection subsystem for producing an IR-based object detection field within the FOV of the Image Formation and Detection Subsystem, (4) an Automatic Light Exposure Measurement and Illumination Control Subsystem for controlling the operation of the LED-Based Multi-Mode Illumination Subsystem, (5) an Image Capturing and Buffering Subsystem for capturing and buffering 2-D images detected by the Image Formation and Detection Subsystem, (6) a Multimode Image-Processing Based Bar Code Symbol Reading Subsystem for processing images captured and buffered by the Image Capturing and Buffering Subsystem and reading 1D and 2D bar code symbols represented, and (7) an Input/Output Subsystem for outputting processed image data and the like to an external host system or other information receiving or responding device, in which each said subsystem component is integrated about (7) a System Control Subsystem, as shown;

FIG. 2A2 is a schematic block representation of the Multi-Mode Image-Processing Based Bar Code Symbol Reading Subsystem, realized using the three-tier computing platform illustrated in Fig.;

FIG. 2B is a schematic diagram representative of a system implementation for the hand-supportable digital imaging-based bar code symbol reading device illustrated in wherein the system implementation is shown comprising (1) an illumination board 33 carrying components realizing electronic functions performed by the Multi-Mode LED-Based Illumination Subsystem and the Automatic Light Exposure Measurement And Illumination Control Subsystem, (2) a CMOS camera board carrying a high resolution (1280×1024 7-bit 6 micron pixel size) CMOS image sensor array running at 25 Mhz master clock, at 7 frames/second at 1280*1024 resolution with randomly accessible region of interest (ROI) window capabilities, realizing electronic functions performed by the multi-mode area-type Image Formation and Detection Subsystem, (3) a CPU board (i.e. computing platform) including (i) an Intel Sabinal 32-Bit Microprocessor PXA210 running at 200 Mhz 1.0 core voltage with a 16 bit 100 Mhz external bus speed, (ii) an expandable (e.g. 7+ megabyte) Intel J3 Asynchronous 16-bit Flash memory, (iii) a 16 Megabytes of 100 MHz SDRAM, (iv) a Xilinx Spartan II FPGA FIFO 39 running at 50 Mhz clock frequency and 60 MB/Sec data rate, configured to control the camera timings and drive and image acquisition process, (v) a multimedia card socket, for realizing the other subsystems of the system, (vi) a power management module for the MCU adjustable by the system bus, and (vii) a pair of UARTs (one for an IRDA port and one for a JTAG port), (4) an interface board for realizing the functions performed by the I/O subsystem, and (5) an IR-based object presence and range detection circuit for realizing the IR-based Object Presence And Range Detection Subsystem;

FIG. 3A is a schematic representation showing the spatial relationships between the near and far and narrow and wide area fields of narrow-band illumination within the FOV of the Multi-Mode Image Formation and Detection Subsystem during narrow and wide area image capture modes of operation;

FIG. 3B is a perspective partially cut-away view of the hand-supportable digital imaging-based bar code symbol reading device of the first illustrative embodiment, showing the LED-Based Multi-Mode Illumination Subsystem transmitting visible narrow-band illumination through its narrow-band transmission-type optical filter system and illuminating an object with such narrow-band illumination, and also showing the image formation optics, including the low pass filter before the image sensing array, for collecting and focusing light rays reflected from the illuminated object, so that an image of the object is formed and detected using only the optical components of light contained within the narrow-band of illumination, while all other components of ambient light are substantially rejected before image detection at the image sensing array;

FIG. 3C is a schematic representation showing the geometrical layout of the optical components used within the hand-supportable digital imaging-based bar code symbol reading device of the first illustrative embodiment, wherein the red-wavelength reflecting high-pass lens element is positioned at the imaging window of the device before the image formation lens elements, while the low-pass filter is disposed before the image sensor between the image formation elements, so as to image the object at the image sensing array using only optical components within the narrow-band of illumination, while rejecting all other components of ambient light;

FIG. 3D is a schematic representation of the image formation optical subsystem employed within the hand-supportable digital imaging-based bar code symbol reading device of the first illustrative embodiment, wherein all three lenses are made as small as possible (with a maximum diameter of 12 mm), all have spherical surfaces, all are made from common glass, e.g. LAK2 (~LaK9), ZF10 (=SF8), LAF2 (~LaF3);

FIG. 3E is a schematic representation of the lens holding assembly employed in the image formation optical subsystem of the hand-supportable digital imaging-based bar code symbol reading device of the first illustrative embodiment, showing a two-piece barrel structure which holds the lens elements, and a base structure which holds the image sensing array, wherein the assembly is configured so that the barrel structure slides within the base structure so as to focus the assembly;

FIG. 3F1 is a first schematic representation showing, from a side view, the physical position of the LEDs used in the Multi-Mode Illumination Subsystem, in relation to the image formation lens assembly, the image sensing array employed therein (e.g. a Motorola MCM20027 or National Semiconductor LM9638 CMOS 2-D image sensing array having a 1280×1024 pixel resolution (½" format), 6 micron pixel size, 13.5 Mhz clock rate, with randomly accessible region of interest (ROI) window capabilities;

FIG. 3F2 is a second schematic representation showing, from an axial view, the physical layout of the LEDs used in the Multi-Mode Illumination Subsystem of the digital imaging-based bar code symbol reading device, shown in relation to the image formation lens assembly, and the image sensing array employed therein;

FIG. 4A is a schematic representation specifying the range of narrow-area illumination, near-field wide-area illumination, and far-field wide-area illumination produced from the LED-Based Multi-Mode Illumination Subsystem employed in the hand-supportable digital imaging-based bar code symbol reading device of the present invention;

FIG. 5A1 is a schematic representation showing the red-wavelength reflecting (high-pass) imaging window integrated within the hand-supportable housing of the digital imaging-based bar code symbol reading device, and the low-pass optical filter disposed before its CMOS image sensing array therewithin, cooperate to form a narrow-band optical filter subsystem for transmitting substantially only the very narrow band of wavelengths (e.g. 620-700 nanometers) of visible illumination produced from the Multi-Mode Illumination Subsystem employed in the digital imaging-based bar code symbol reading device, and rejecting all other optical wavelengths outside this narrow optical band however generated (i.e. ambient light sources);

FIG. 5A2 is a schematic representation of transmission characteristics (energy versus wavelength) associated with the low-pass optical filter element disposed after the red-wavelength reflecting high-pass imaging window within the hand-supportable housing of the digital imaging-based bar code symbol reading device, but before its CMOS image sensing array, showing that optical wavelengths below 620 nanometers are transmitted and wavelengths above 620 nm are substantially blocked (e.g. absorbed or reflected);

FIG. 5A3 is a schematic representation of transmission characteristics (energy versus wavelength) associated with the red-wavelength reflecting high-pass imaging window integrated within the hand-supportable housing of the digital imaging-based bar code symbol reading device of the present invention, showing that optical wavelengths above 700 nanometers are transmitted and wavelengths below 700 nm are substantially blocked (e.g. absorbed or reflected);

FIG. 5A4 is a schematic representation of the transmission characteristics of the narrow-based spectral filter subsystem integrated within the hand-supportable imaging-based bar code symbol reading device of the present invention, plotted against the spectral characteristics of the LED-emissions produced from the Multi-Mode Illumination Subsystem of the illustrative embodiment of the present invention;

FIG. 6A is a schematic representation showing the geometrical layout of the spherical/parabolic light reflecting/collecting mirror and photodiode associated with the Automatic Light Exposure Measurement and Illumination Control Subsystem, and arranged within the hand-supportable digital imaging-based bar code symbol reading device of the illustrative embodiment, wherein incident illumination is collected from a selected portion of the center of the FOV of the system using a spherical light collecting mirror, and then focused upon a photodiode for detection of the intensity of reflected illumination and subsequent processing by the Automatic Light Exposure Measurement and Illumination Control Subsystem, so as to then control the illumination produced by the LED-based Multi-Mode Illumination Subsystem employed in the digital imaging-based bar code symbol reading device of the present invention;

FIG. 6B is a schematic diagram of the Automatic Light Exposure Measurement and Illumination Control Subsystem employed in the hand-supportable digital imaging-based bar code symbol reading device of the present invention, wherein illumination is collected from the center of the FOV of the system and automatically detected so as to generate a control signal for driving, at the proper intensity, the narrow-area illumination array as well as the far-field and narrow-field wide-area illumination arrays of the Multi-Mode Illumination Subsystem, so that the CMOS image sensing array produces digital images of illuminated objects of sufficient brightness;

FIGS. 6C1 and 6C2, taken together, set forth a schematic diagram of a hybrid analog/digital circuit designed to implement the Automatic Light Exposure Measurement and Illumination Control Subsystem of FIG. 6B employed in the hand-supportable digital imaging-based bar code symbol reading device of the present invention;

FIG. 6D is a schematic diagram showing that, in accordance with the principles of the present invention, the CMOS image sensing array employed in the digital imaging-based bar code symbol reading device of the illustrative embodiment, once activated by the System Control Subsystem (or directly by the trigger switch), and when all rows in the image sensing array are in a state of integration operation, automatically activates the Automatic Light Exposure Measurement and Illumination Control Subsystem which, in response thereto, automatically activates the LED illumination driver circuitry to automatically drive the appropriate LED illumination arrays associated with the Multi-Mode Illumination Subsystem in a precise manner and globally expose the entire CMOS image detection array with narrowly tuned LED-based illumination when all of its rows of pixels are in a state of integration, and thus have a common integration time, thereby capturing high quality images independent of the relative motion between the bar code reader and the object;

FIGS. 6E1 and 6E2, taken together, set forth a flow chart describing the steps involved in carrying out the global exposure control method of the present invention, within the digital imaging-based bar code symbol reading device of the illustrative embodiments;

FIG. 7 is a schematic block diagram of the IR-based automatic Object Presence and Range Detection Subsystem employed in the hand-supportable digital imaging-based bar code symbol reading device of the present invention, wherein a first range indication control signal is generated upon detection of an object within the near-field region of the Multi-Mode Illumination Subsystem, and wherein a second range indication control signal is generated upon detection of an object within the far-field region of the Multi-Mode Illumination Subsystem;

FIG. 8 is a schematic representation of the hand-supportable digital imaging-based bar code symbol reading device of the present invention, showing that its CMOS image sensing array is operably connected to its microprocessor through a FIFO (realized by way of a an FPGA) and a system bus, and that its SDRAM is also operably connected to the microprocessor by way of the system bus, enabling the mapping of pixel data captured by the imaging array into the SDRAM under the control of the direct memory access (DMA) module within the microprocessor;

FIG. 9 is a schematic representation showing how the bytes of pixel data captured by the CMOS imaging array within the hand-supportable digital imaging-based bar code symbol reading device of the present invention, are mapped into the addressable memory storage locations of its SDRAM during each image capture cycle carried out within the device;

FIG. 10 is a schematic representation showing the software modules associated with the three-tier software architecture of the hand-supportable digital imaging-based bar code symbol reading device of the present invention, namely: the Main Task module, the CodeGate Task module, the Narrow-Area Illumination Task module, the Metroset Task module, the Application Events Manager module, the User Commands Table module, the Command Handler module, Plug-In Controller, and Plug-In Libraries and Configuration Files, all residing within the Application layer of the software architecture; the Tasks Manager module, the Events Dispatcher module, the Input/Output Manager module, the User Commands Manager module, the Timer Subsystem module, the Input/Output Subsystem module and the Memory Control Subsystem module residing with the System Core (SCORE) layer of the software architecture; and the Linux Kernal module in operable communication with the Plug-In Controller, the Linux File System module, and Device Drivers modules residing within the Linux Operating System (OS) layer of the software architecture, and in operable communication with an external Development Platform via standard or proprietary communication interfaces;

FIGS. 11A and 11B provide a table listing the primary Programmable Modes of Bar Code Reading Operation supported within the hand-supportable Digital Imaging-Based Bar Code Symbol Reading Device of the present invention, namely:

Programmed Mode of System Operation No. 1—Manually-Triggered Single-Attempt 1D Single-Read Mode Employing the No-Finder Mode of the Multi-Mode Bar Code Reading Subsystem;

Programmed Mode Of System Operation No. 2—Manually-Triggered Multiple-Attempt 1D Single-Read Mode Employing the No-Finder Mode of the Multi-Mode Bar Code Reading Subsystem;

Programmed Mode Of System Operation No. 3—Manually-Triggered Single-Attempt 1D/2D Single-Read Mode Employing the No-Finder Mode And The Automatic Or Manual Modes of the Multi-Mode Bar Code Reading Subsystem;

Programmed Mode of System Operation No. 4—Manually-Triggered Multiple-Attempt 1D/2D Single-Read Mode Employing the No-Finder Mode And The Automatic Or Manual Modes of the Multi-Mode Bar Code Reading Subsystem;

Programmed Mode of System Operation No. 5—Manually-Triggered Multiple-Attempt 1D/2D Multiple-Read Mode Employing the No-Finder Mode And The Automatic Or Manual Modes of the Multi-Mode Bar Code Reading Subsystem;

Programmed Mode of System Operation No. 6—Automatically-Triggered Single-Attempt 1D Single-Read Mode Employing The No-Finder Mode Of the Multi-Mode Bar Code Reading Subsystem:

Programmed Mode of System Operation No. 7—Automatically-Triggered Multi-Attempt 1D Single-Read Mode Employing The No-Finder Mode Of the Multi-Mode Bar Code Reading Subsystem;

Programmed Mode of System Operation No. 7—Automatically-Triggered Multi-Attempt 1D/2D Single-Read Mode Employing The No-Finder Mode and Manual and/or Automatic Modes Of the Multi-Mode Bar Code Reading Subsystem;

Programmed Mode of System Operation No. 9—Automatically-Triggered Multi-Attempt 1D/2D Multiple-Read Mode Employing The No-Finder Mode and Manual and/or Automatic Modes Of the Multi-Mode Bar Code Reading Subsystem;

Programmable Mode of System Operation No. 10—Automatically-Triggered Multiple-Attempt 1D/2D Single-Read Mode Employing The Manual, Automatic or Omniscan Modes Of the Multi-Mode Bar Code Reading Subsystem;

Programmed Mode of System Operation No. 11—Semi-Automatic-Triggered Single-Attempt 1D/2D Single-Read Mode Employing The No-Finder Mode And The Automatic Or Manual Modes Of the Multi-Mode Bar Code Reading Subsystem;

Programmable Mode of System Operation No. 12—Semi-Automatic-Triggered Multiple-Attempt 1D/2D Single-Read Mode Employing The No-Finder Mode And The Automatic Or Manual Modes Of the Multi-Mode Bar Code Reading Subsystem;

Programmable Mode of Operation No. 13—Semi-Automatic-Triggered Multiple-Attempt 1D/2D Multiple-Read Mode Employing The No-Finder Mode And The Automatic Or Manual Modes Of the Multi-Mode Bar Code Reading Subsystem;

Programmable Mode of Operation No. 14—Semi-Automatic-Triggered Multiple-Attempt 1D/2D Multiple-Read Mode Employing The No-Finder Mode And The Omniscan Modes Of the Multi-Mode Bar Code Reading Subsystem;

Programmable Mode of Operation No. 15—Continuously-Automatically-Triggered Multiple-Attempt 1D/2D Multiple-Read Mode Employing The Automatic, Manual and/or Omniscan Modes Of the Multi-Mode Bar Code Reading Subsystem;

Programmable Mode of System Operation No. 16—Diagnostic Mode Of Imaging-Based Bar Code Reader Operation; and Programmable Mode of System Operation No. 17—Live Video Mode Of Imaging-Based Bar Code Reader Operation;

FIG. 12A is a first perspective view of a second illustrative embodiment of the portable POS digital imaging-based bar code reading device of the present invention, shown having a hand-supportable housing of a different form factor than that of the first illustrative embodiment, and configured for use in its hands-free/presentation mode of operation, supporting primarily wide-area image capture;

FIG. 12B is a second perspective view of the second illustrative embodiment of the portable POS digital imaging-based bar code reading device of the present invention, shown configured and operated in its hands-free/presentation mode of operation, supporting primarily wide-area image capture;

FIG. 12C is a third perspective view of the second illustrative embodiment of the portable digital imaging-based bar code reading device of the present invention, shown configured and operated in a hands-on type mode, supporting both narrow and wide area modes of image capture;

FIG. 13 is a perspective view of a third illustrative embodiment of the digital imaging-based bar code reading device of the present invention, realized in the form of a Multi-Mode Image Capture And Processing Engine that can be readily integrated into various kinds of information collection and processing systems, including wireless portable data terminals (PDTs), reverse-vending machines, retail product information kiosks and the like;

FIG. 14 is a schematic representation of a wireless bar code-driven portable data terminal embodying the imaging-based bar code symbol reading engine of the present invention, shown configured and operated in a hands-on mode;

FIG. 15 is a perspective view of the wireless bar code-driven portable data terminal of FIG. 14 shown configured and operated in a hands-on mode, wherein the imaging-based bar code symbol reading engine embodied therein is used to read a bar code symbol on a package and the symbol character data representative of the read bar code is being automatically transmitted to its cradle-providing base station by way of an RF-enabled 2-way data communication link;

FIG. 16 is a side view of the wireless bar code-driven portable data terminal of FIGS. 14 and 15 shown configured and operated in a hands-free mode, wherein the imaging-based bar code symbol reading engine is configured in a wide-area image capture mode of operation, suitable for presentation-type bar code reading at point of sale (POS) environments;

FIG. 17 is a block schematic diagram showing the various subsystem blocks associated with a design model for the Wireless Hand-Supportable Bar Code Driven Portable Data Terminal System of FIGS. 14, 15 and 16, shown interfaced with possible host systems and/or networks;

FIG. 18 is a schematic block diagram representative of a system design for the hand-supportable digital imaging-based bar code symbol reading device according to an alternative embodiment of the present invention, wherein the system design is similar to that shown in FIG. 2A1, except that the Automatic Light Exposure Measurement and Illumination Control Subsystem is adapted to measure the light exposure on a central portion of the CMOS image sensing array and control the operation of the LED-Based Multi-Mode Illumination Subsystem in cooperation with a software-based illumination metering program realized within the Multi-Mode Image Processing Based Bar Code Symbol Reading Subsystem, involving the real-time analysis of captured digital images for unacceptable spatial-intensity distributions;

FIGS. 19A and 19B, taken together, set forth a flow chart illustrating the steps involved in carrying out the adaptive method of controlling system operations (e.g. illumination, image capturing, image processing, etc.) within the multi-mode image-processing based bar code symbol reader system of the illustrative embodiment of the present invention, wherein the "exposure quality" of captured digital images is automatically analyzed in real-time and system control parameters (SCPs) are automatically reconfigured based on the results of such exposure quality analysis;

FIG. 19C is a schematic representation illustrating the Single Frame Shutter Mode of operation of the CMOS image sensing array employed within the multi-mode image-processing based bar code symbol reader system of the illustrative embodiment of the present invention, while the system is operated in its Global Exposure Mode of Operation illustrated in FIGS. 6D through 6E2;

FIG. 19D is a schematic representation illustrating the Rolling Shutter Mode of operation of the CMOS image sensing array employed within the multi-mode image-processing based bar code symbol reader system of the illustrative embodiment of the present invention, while the system is operated according to its adaptive control method illustrated in FIGS. 19A through 19B;

FIG. 19E is a schematic representation illustrating the Video Mode of operation of the CMOS image sensing array employed within the multi-mode image-processing based bar code symbol reader system of the illustrative embodiment of the present invention, while the system is operated according to its adaptive control method illustrated in FIGS. 19A through 19B;

FIG. 20 is a perspective view of a hand-supportable image-processing based bar code symbol reader employing an image cropping zone (ICZ) targeting/marking pattern, and automatic post-image capture cropping methods to abstract the ICZ within which the targeted object to be imaged has been encompassed during illumination and imaging operations;

FIG. 21 is a schematic system diagram of the hand-supportable image-processing based bar code symbol reader shown in FIG. 20, shown employing an image cropping zone (ICZ) illumination targeting/marking source(s) operated under the control of the System Control Subsystem;

FIG. 22 is a flow chart setting forth the steps involved in carrying out the first illustrative embodiment of the image cropping zone targeting/marking and post-image capture cropping process of the present invention embodied within the bar code symbol reader illustrated in FIGS. 20 and 21;

FIG. 23 is a perspective view of another illustrative embodiment of the hand-supportable image-processing based bar code symbol reader of the present invention, showing its visible illumination-based Image Cropping Pattern (ICP) being projected within the field of view (FOV) of its Multi-Mode Image Formation And Detection Subsystem;

FIG. 24 is a schematic block diagram representative of a system design for the hand-supportable digital imaging-based bar code symbol reading device illustrated in FIG. 23, wherein the system design is shown comprising (1) a Multi-Mode Area-Type Image Formation and Detection (i.e. Camera) Subsystem having image formation (camera) optics for producing a field of view (FOV) upon an object to be imaged and a CMOS or like area-type image sensing array for detecting imaged light reflected off the object during illumination operations in either (i) a narrow-area image capture mode in which a few central rows of pixels on the image sensing array are enabled, or (ii) a wide-area image capture mode in which substantially all rows of the image sensing array are, enabled, (2) a Multi-Mode LED-Based Illumination Subsystem for producing narrow and wide area fields of narrow-band illumination within the FOV of the Image Formation And Detection Subsystem during narrow and wide area modes of image capture, respectively, so that only light transmitted from the Multi-Mode Illumination Subsystem and reflected from the illuminated object and transmitted through a narrow-band transmission-type optical filter realized within the hand-supportable housing (i.e. using a red-wavelength high-pass reflecting window filter element disposed at the light transmission aperture thereof and a low-pass filter before the image sensor) is detected by the image sensor and all other components of ambient light are substantially rejected, and an Image Cropping Pattern Generator for generating a visible illumination-based Image Cropping Pattern (ICP) projected within the field of view (FOV) of the Multi-Mode Area-type Image Formation and Detection Subsystem, (3) an IR-based object presence and range detection subsystem for producing an IR-based object detection field within the FOV of the Image Formation and Detection Subsystem, (4) an Automatic Light Exposure Measurement and Illumination Control Subsystem for measuring illumination levels in the FOV and controlling the operation of the LED-Based Multi-Mode Illumination Subsystem, (5) an Image Capturing and Buffering Subsystem for capturing and buffering 2-D images detected by the Image Formation and Detection Subsystem, (6) an Image Processing and Cropped Image Locating Module for processing captured and buffered images to locate the image region corresponding to the region defined by the Image Cropping Pattern (ICP), (7) an Image Perspective Correction and Scaling Module for correcting the perspective of the cropped image region and scaling the corrected image to a predetermined (i.e. fixed) pixel image size suitable for decode-processing, (8) a Multimode Image-Processing Based Bar Code Symbol Reading Subsystem for processing cropped and scaled images generated by the Image Perspective and Scaling Module and reading 1D and 2D bar code symbols represented, and (9) an Input/Output Subsystem for outputting processed image data and the like to an external host system or other information receiving or responding device, in which each said subsystem component is integrated about (10) a System Control Subsystem, as shown;

FIG. 25A is a schematic representation of a first illustrative embodiment of the VLD-based Image Cropping Pattern Generator of the present invention, comprising a VLD located at the symmetrical center of the focal plane of a pair of flat-convex lenses arranged before the VLD, and capable of generating and projecting a two (2) dot image cropping pattern (ICP) within the field of view of the of the Multi-Mode Area-type Image Formation and Detection Subsystem;

FIGS. 25B and 25C, taken together provide a composite ray-tracing diagram for the first illustrative embodiment of the VLD-based Image Cropping Pattern Generator depicted in FIG. 33A, showing that the pair of flat-convex lenses focus naturally diverging light rays from the VLD into two substantially parallel beams of laser illumination to produce a two (2) dot image cropping pattern (ICP) within the field of view of the Multi-Mode Area-type Image Formation and Detection Subsystem, wherein the distance between the two spots of illumination in the ICP is a function of distance from the pair of lenses;

FIG. 25D1 is a simulated image of the two dot Image Cropping Pattern produced by the ICP Generator of FIG. 25A, at a distance of 40 mm from its pair of flat-convex lenses, within the field of view of the Multi-Mode Area-type Image Formation and Detection Subsystem;

FIG. 25D2 is a simulated image of the two dot Image Cropping Pattern produced by the ICP Generator of FIG. 33A, at a distance of 80 mm from its pair of flat-convex lenses, within the field of view of the Multi-Mode Area-type Image Formation and Detection Subsystem;

FIG. 25D3 is a simulated image of the two dot Image Cropping Pattern produced by the ICP Generator of FIG. 25A, at a distance of 120 mm from its pair of flat-convex lenses, within the field of view of the Multi-Mode Area-type Image Formation and Detection Subsystem;

FIG. 25D4 is a simulated image of the two dot Image Cropping Pattern produced by the ICP Generator of FIG. 25A, at a distance of 160 mm from its pair of flat-convex lenses, within the field of view of the Multi-Mode Area-type Image Formation and Detection Subsystem;

FIG. 25D5 is a simulated image of the two dot Image Cropping Pattern produced by the ICP Generator of FIG. 25A, at a distance of 200 mm from its pair of flat-convex lenses, within the field of view of the Multi-Mode Area-type Image Formation and Detection Subsystem;

FIG. 26A is a schematic representation of a second illustrative embodiment of the VLD-based Image Cropping Pattern Generator of the present invention, comprising a VLD located at the focus of a biconical lens (having a biconical surface and a cylindrical surface) arranged before the VLD, and four flat-convex lenses arranged in four corners, and which optical assembly is capable of generating and projecting a four (4) dot image cropping pattern (ICP) within the field of view of the of the Multi-Mode Area-type Image Formation and Detection Subsystem;

FIGS. 26B and 26C, taken together provide a composite ray-tracing diagram for the third illustrative embodiment of the VLD-based Image Cropping Pattern Generator depicted in FIG. 26A, showing that the biconical lens enlarges naturally diverging light rays from the VLD in the cylindrical direction (but not the other) and thereafter, the four flat-convex lenses focus the enlarged laser light beam to generate a four parallel beams of laser illumination which form a four (4) dot image cropping pattern (ICP) within the field of view of the Multi-Mode Area-type Image Formation and Detection Subsystem, wherein the spacing between the four dots of illumination in the ICP is a function of distance from the flat-convex lens;

FIG. 26D1 is a simulated image of the linear Image Cropping Pattern produced by the ICP Generator of FIG. 26A, at a distance of 40 mm from its flat-convex lens, within the field of view of the Multi-Mode Area-type Image Formation and Detection Subsystem;

FIG. 26D2 is a simulated image of the linear Image Cropping Pattern produced by the ICP Generator of FIG. 26A, at a distance of 80 mm from its flat-convex lens, within the field of view of the Multi-Mode Area-type Image Formation and Detection Subsystem;

FIG. 26D3 is a simulated image of the linear Image Cropping Pattern produced by the ICP Generator of FIG. 26A, at a distance of 120 mm from its flat-convex lens, within the field of view of the Multi-Mode Area-type Image Formation and Detection Subsystem;

FIG. 26D4 is a simulated image of the linear Image Cropping Pattern produced by the ICP Generator of FIG. 26A, at a distance of 160 mm from its flat-convex lens, within the field of view of the Multi-Mode Area-type Image Formation and Detection Subsystem;

FIG. 26D5 is a simulated image of the linear Image Cropping Pattern produced by the ICP Generator of FIG. 26A, at a distance of 200 mm from its flat-convex lens, within the field of view of the Multi-Mode Area-type Image Formation and Detection Subsystem;

FIG. 27 is a schematic representation of a third illustrative embodiment of the VLD-based Image Cropping Pattern Generator of the present invention, comprising a VLD and a light diffractive optical (DOE) element (e.g. volume holographic optical element) forming an optical assembly which is capable of generating and projecting a four (4) dot image cropping pattern (ICP) within the field of view of the of the Multi-Mode Area-type Image Formation and Detection Subsystem, similar to that generated using the refractive optics based device shown in FIG. 26A;

FIG. 28 is a schematic representation of a digital image captured within the field of view (FOV) of the bar code symbol reader illustrated in FIGS. 23 and 24, wherein the clusters of pixels indicated by reference characters (a, b, c, d) represent the four illumination spots (i.e. dots) associated with the Image Cropping Pattern (ICP) projected in the FOV;

FIG. 29 is a flow chart setting forth the steps involved in carrying out the second illustrative embodiment of the image cropping pattern targeting/marking and post-image capture cropping process of the present invention embodied in embodied within the bar code symbol reader illustrated in FIGS. 23 and 24;

FIG. 30 is a perspective view of the digital image capture and processing engine of the present invention, showing the projection of a visible illumination-based Image Cropping Pattern (ICP) within the field of view (FOV) of the engine, during object illumination and image capture operations;

FIG. 31A is a close-up, perspective view of the digital image capture and processing engine of the present invention depicted in FIG. 30, showing the assembly of an illumination/targeting optics panel, an illumination board, a lens barrel assembly, a camera housing, and a camera board, into a an ultra-compact form factor offering advantages of light-weight construction, excellent thermal management, and exceptional image capture performance;

FIG. 31B is a perspective view of the digital image capture and processing engine of FIG. 30;

FIG. 32 is a side perspective view of the digital image capture and processing engine of FIG. 30, showing how the various components are arranged with respect to each other;

FIG. 33 is an elevated front view of the digital image capture and processing engine of FIG. 30, taken along the optical axis of its image formation optics;

FIG. 34 is a bottom view of the digital image capture and processing engine of FIG. 30, showing the bottom of its mounting base for use in mounting the engine within diverse host systems;

FIG. 35 is a top view of the digital image capture and processing engine of FIG. 30;

FIG. 36 is a first side view of the digital image capture and processing engine of FIG. 30;

FIG. 37 is a second partially cut-away side view of the digital image capture and processing engine taken in FIG. 36, revealing the light conductive pipe used to collect and conduct light energy from the FOV of the Multi-Mode Area-Type Image Formation and Detection Subsystem, and direct it to the photo-detector associated with the Automatic Light Exposure Measurement and Illumination Control Subsystem;

FIG. 38 is a first cross-sectional view of the digital image capture and processing engine taken in FIG. 36, revealing the light conductive pipe used to collect and conduct light energy from the FOV of the Multi-Mode Area-Type Image Formation and Detection Subsystem;

FIG. 39A is a perspective view of the light conductive pipe shown in FIGS. 36 and 37;

FIG. 39B is a first perspective view of the lens barrel assembly used in the digital image capture and processing engine of FIG. 36;

FIG. 39C is a first cross-sectional perspective view of the lens barrel assembly used in the digital image capture and processing engine of FIG. 36;

FIG. 39D is a second cross-sectional perspective view of the lens barrel assembly used in the digital image capture and processing engine of FIG. 36, showing the optical lens components used to form and construct the image formation optics of the engine;

FIG. 39E is a first perspective view of one half portion of the lens barrel assembly used in the digital image capture and processing engine of FIG. 36;

FIG. 40 is an exploded, perspective view of the digital image capture and processing engine of FIG. 30, showing how the illumination/targeting optics panel, the illumination board, the lens barrel assembly, the camera housing, the camera board and its assembly pins are arranged and assembled with respect to each other in accordance with the principles of the present invention;

FIG. 41 is a perspective view of the illumination/targeting optics panel, the illumination board and the camera board of digital image capture and processing engine of FIG. 40, shown completely assembled with the lens barrel assembly and the camera housing removed for clarity of illustration;

FIG. 42 is a perspective view of the illumination/targeting optics panel and the illumination board of the engine of the present invention assembled together as a subassembly using the assembly pins;

FIG. 43 is a perspective view of the subassembly of FIG. 42 arranged in relation to the lens barrel assembly, the camera housing and the camera board of the engine of the present invention, and showing how these system components are assembled together to produce the digital image capture and processing engine of FIG. 40;

FIG. 44 is a schematic block diagram representative of a system design for the digital image capture and processing engine illustrated in FIGS. 40 through 43, wherein the system design is shown comprising (1) a Multi-Mode Area-Type Image Formation and Detection (i.e. Camera) Subsystem having image formation (camera) optics for producing a field of view (FOV) upon an object to be imaged and a CMOS or like area-type image sensing array for detecting imaged light reflected off the object during illumination operations in either (i) a narrow-area image capture mode in which a few central rows of pixels on the image sensing array are enabled, or (ii) a wide-area image capture mode in which substantially all rows of the image sensing array are enabled, (2) an LED-Based Illumination Subsystem for producing a wide area field of narrow-band illumination within the FOV of the Image Formation And Detection Subsystem during the image capture mode, so that only light transmitted from the LED-Based Illumination Subsystem and reflected from the illuminated object and transmitted through a narrow-band transmission-type optical filter realized within the hand-supportable housing (i.e. using a red-wavelength high-pass reflecting window filter element disposed at the light transmission aperture thereof and a low-pass filter before the image sensor) is detected by the image sensor and all other components of ambient light are substantially rejected, and an Image Cropping Pattern Generator for generating a visible illumination-based Image Cropping Pattern (ICP) projected within the field of view (FOV) of the Multi-Mode Area-type Image Formation and Detection Subsystem, (3) an IR-based object presence and range detection subsystem for producing an IR-based object detection field within the FOV of the Image Formation and Detection Subsystem, (4) an Automatic Light Exposure Measurement and Illumination Control Subsystem for measuring illumination levels in the FOV and controlling the operation of the LED-Based Multi-Mode Illumination Subsystem, during the image capture mode, (5) an Image Capturing and Buffering Subsystem for capturing and buffering 2-D images detected by the Image Formation and Detection Subsystem, (6) an Image Processing and Cropped Image Locating Module for processing captured and buffered images to locate the image region corresponding to the region defined by the Image Cropping Pattern (ICP), (7) an Image Perspective Correction and Scaling Module for correcting the perspective of the cropped image region and scaling the corrected image to a predetermined (i.e. fixed) pixel image size suitable for decode-processing, (8) a Multimode Image-Processing Based Bar Code Symbol Reading Subsystem for processing cropped and scaled images generated by the Image Perspective and Scaling Module and reading 1D and 2D bar code symbols represented, and (9) an Input/Output Subsystem for outputting processed image data and the like to an external host system or other information receiving or responding device, in which each said subsystem component is integrated about (10) a System Control Subsystem, as shown;

FIG. 45 is a perspective view of an alternative illustrative embodiment of the digital image capture and processing engine shown in FIGS. 40 through 43, adapted for POS applications and reconfigured so that the illumination/aiming subassembly shown in FIG. 42 is mounted adjacent the light transmission window of the engine housing, whereas the remaining subassembly is mounted relative to the bottom of the engine housing so that the optical axis of the camera lens is parallel with the light transmission aperture, and a field of view (FOV) folding mirror is mounted beneath the illumination/aiming subassembly for directing the FOV of the system out through the central aperture formed in the illumination/aiming subassembly;

FIG. 46 is a schematic block diagram representative of a system design for the digital image capture and processing engine of the present invention shown in FIG. 45, wherein the system design is similar to that shown in FIG. 2A1, except that the Automatic Light Exposure Measurement and Illumination Control Subsystem is adapted to measure the light exposure on a central portion of the CMOS image sensing array and control the operation of the LED-Based Multi-Mode Illumination Subsystem in cooperation with a software-based illumination metering program realized within the Multi-Mode Image Processing Based Bar Code Symbol Reading Subsystem, involving the real-time exposure quality analysis of captured digital images in accordance with the adaptive system control method of the present invention, illustrated in FIGS. 19A through 19E;

FIG. 47A is a perspective view of an automatic imaging-based bar code symbol reading system of the present invention supporting a presentation-type mode of operation using wide-area illumination and video image capture and processing techniques, and employing the general engine design shown in FIG. 45;

FIG. 47B is a cross-sectional view of the system shown in FIG. 47A;

FIG. 48 is a schematic block diagram representative of a system design for the digital image capture and processing engine of the present invention shown in FIG. 47A, wherein the system design is similar to that shown in FIG. 2A1, except that the Automatic Light Exposure Measurement and Illumination Control Subsystem are adapted to measure the light exposure on a central portion of the CMOS image sensing array and control the operation of the LED-Based Multi-Mode Illumination Subsystem in cooperation with a software-based illumination metering program realized within the Multi-Mode Image Processing Based Bar Code Symbol Reading Subsystem, performing the real-time exposure quality analysis of captured digital images in accordance with the adaptive system control method of the present invention, illustrated in FIGS. 19A through 19E;

FIG. 49A is a perspective view of an automatic imaging-based bar code symbol reading system of the present invention supporting a pass-through mode of operation using narrow-area illumination and video image capture and processing techniques, as well as a presentation-type mode of operation using wide-area illumination and video image capture and processing techniques FIG. 49B is a schematic representation illustrating the system of FIG. 49A operated in its Pass-Through Mode of system operation;

FIG. 49C is a schematic representation illustrating the system of FIG. 49A operated in its Presentation Mode of system operation;

FIG. 50 is a schematic block diagram representative of a system design for the digital image capture and processing engine of the present invention shown in FIGS. 49A and 49B, wherein the system design is similar to that shown in FIG. 2A1, except for the following differences: (1) the Automatic Light Exposure Measurement and Illumination Control Subsystem is adapted to measure the light exposure on a central portion of the CMOS image sensing array and control the operation of the LED-Based Multi-Mode Illumination Subsystem in cooperation with the Multi-Mode Image Processing Based Bar Code Symbol Reading Subsystem, carrying out real-time quality analysis of captured digital images in accordance with the adaptive system control method of the present invention, illustrated in FIGS. 19A through 19E; (2) the narrow-area field of illumination and image capture is oriented in the vertical direction with respect to the counter surface of the POS environment, to support the Pass-Through Mode of the system, as illustrated in FIG. 49B; and (3) the IR-based object presence and range detection system employed in FIG. 46 is replaced with an automatic IR-based object presence and direction detection subsystem which comprises four independent IR-based object presence and direction detection channels;

FIG. 51 is a schematic block diagram of the automatic IR-based object presence and direction detection subsystem employed in the bar code reading system illustrated in FIGS. 49A and 50, showing four independent IR-based object presence and direction detection channels which automatically generate activation control signals for four orthogonal directions within the FOV of the system, which are received and processed by a signal analyzer and control logic block;

FIG. 52A is a perspective view of a first illustrative embodiment of a projection-type POS image-processing based bar code symbol reading system, employing the digital image capture and processing engine shown in FIG. 45;

FIG. 52B is a perspective view of a second illustrative embodiment of a projection-type POS image-processing based bar code symbol reading system, employing the digital image capture and processing engine shown in FIG. 45;

FIG. 52C is a perspective view of a third illustrative embodiment of a projection-type POS image-processing based bar code symbol reading system, employing the digital image capture and processing engine shown in FIG. 45; and FIG. 53 is a perspective view of a price lookup unit (PLU) system employing a digital image capture and processing subsystem of the present invention identifying bar coded consumer products in retail store environments, and displaying the price thereof on the LCD panel integrated in the system.

DETAILED DESCRIPTION OF THE ILLUSTRATIVE EMBODIMENTS OF THE PRESENT INVENTION

Referring to the figures in the accompanying Drawings, the various illustrative embodiments of the hand-supportable imaging-based bar code symbol reading system of the present invention will be described in great detail, wherein like elements will be indicated using like reference numerals.

Figure 1A:
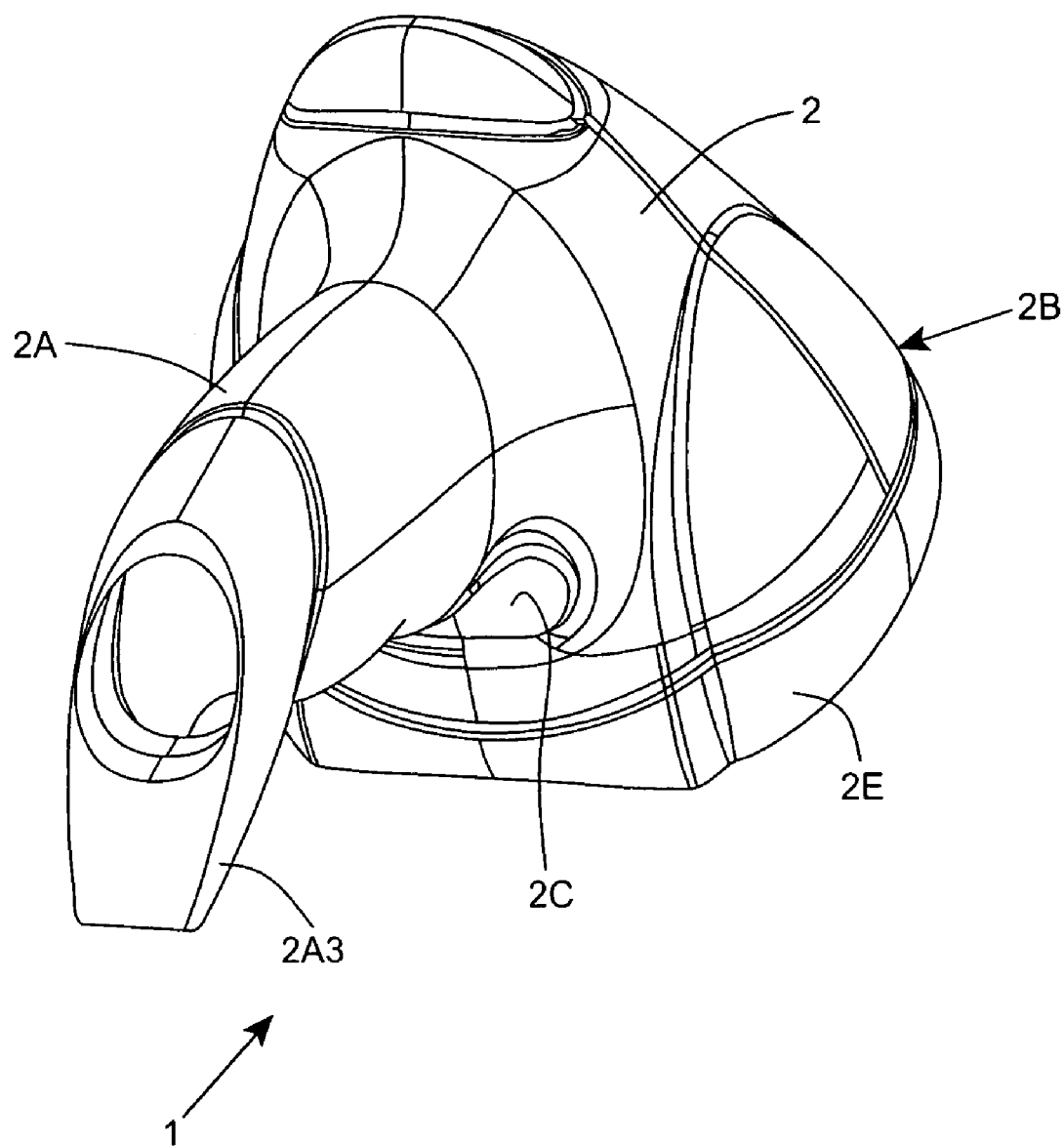
FIG. 1A is a rear perspective view of the hand-supportable digital imaging-based bar code symbol reading device of the first illustrative embodiment of the present invention.
Figure 1B:
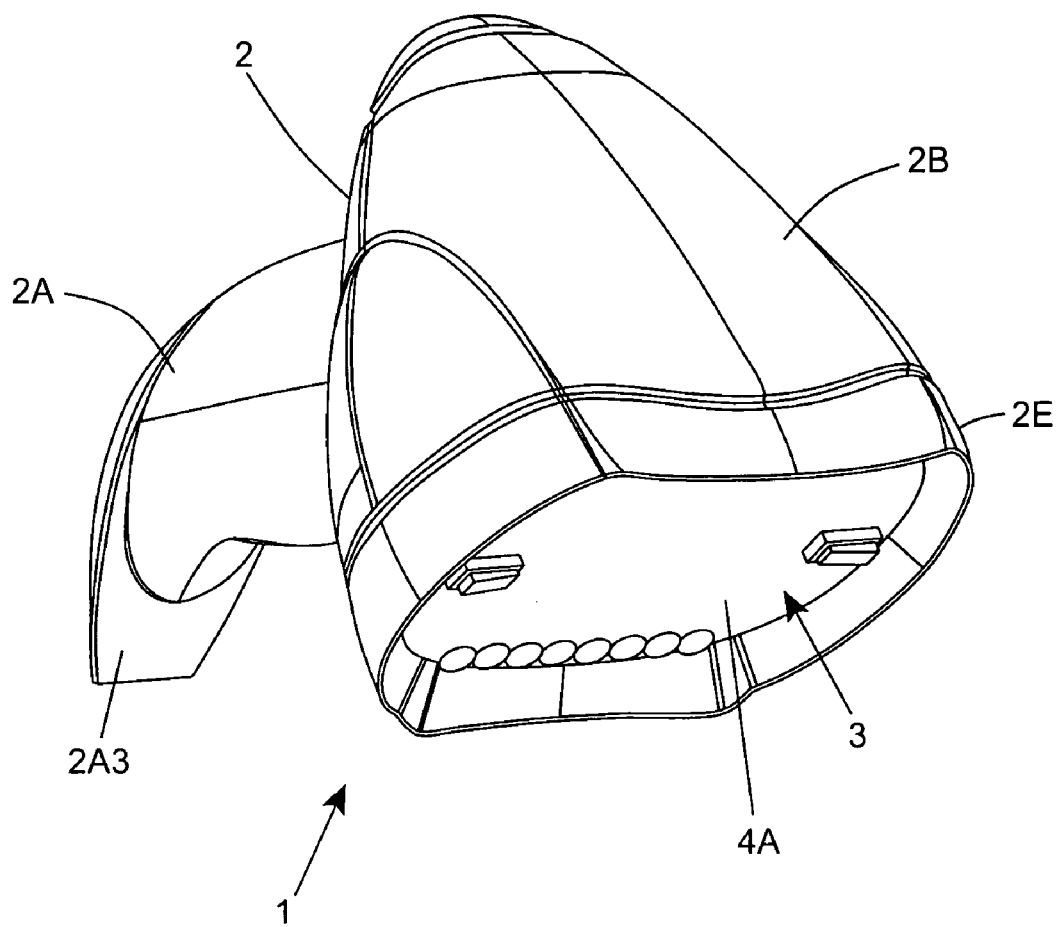
FIG. 1B is a front perspective view of the hand-supportable digital imaging-based bar code symbol reading device of the first illustrative embodiment of the present invention.
Figure 1C:
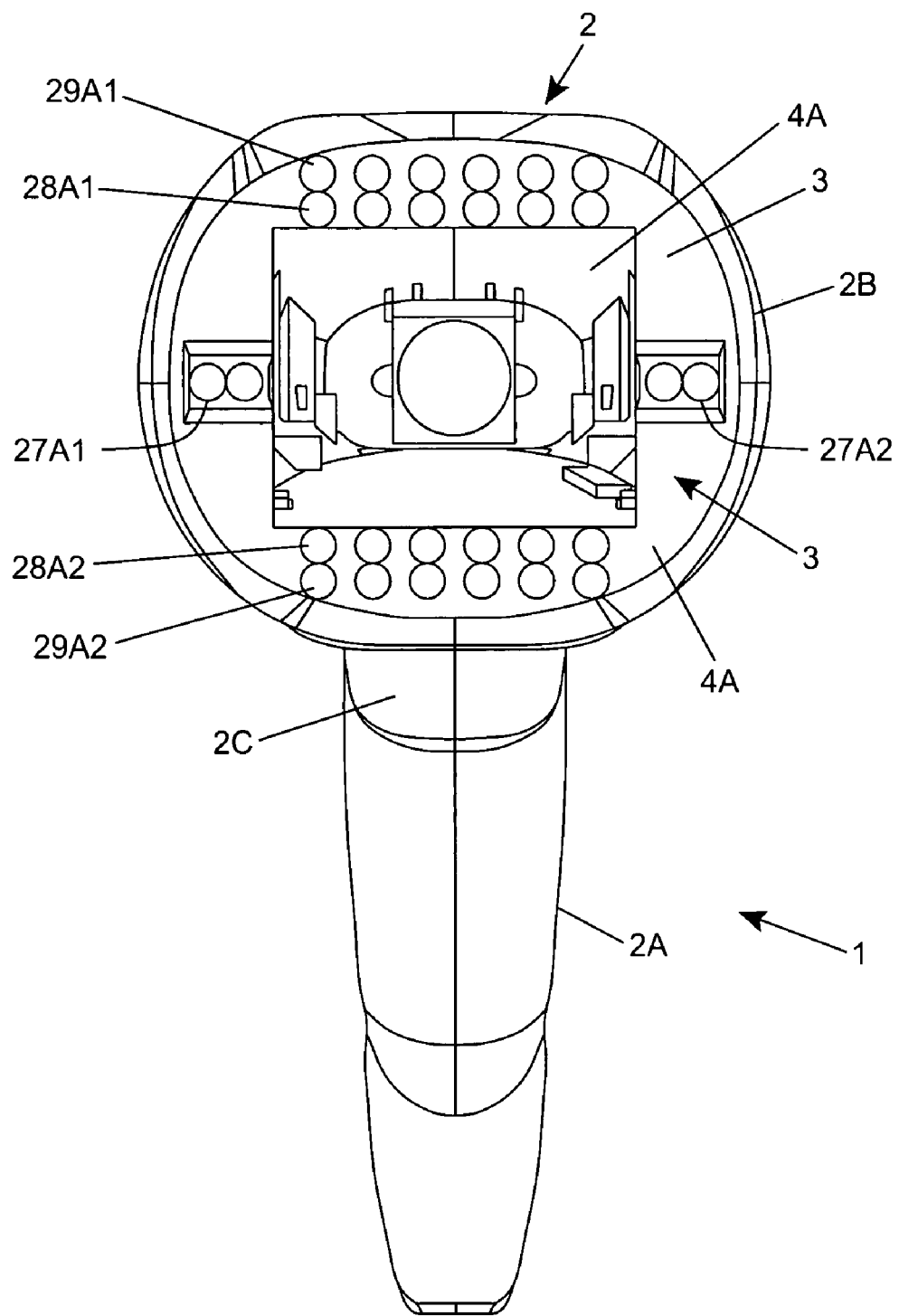
FIG. 1C is an elevated front view of the hand-supportable digital imaging-based bar code symbol reading device of the first illustrative embodiment of the present invention, showing components associated with its illumination subsystem and its image capturing subsystem.
Figure 1D:
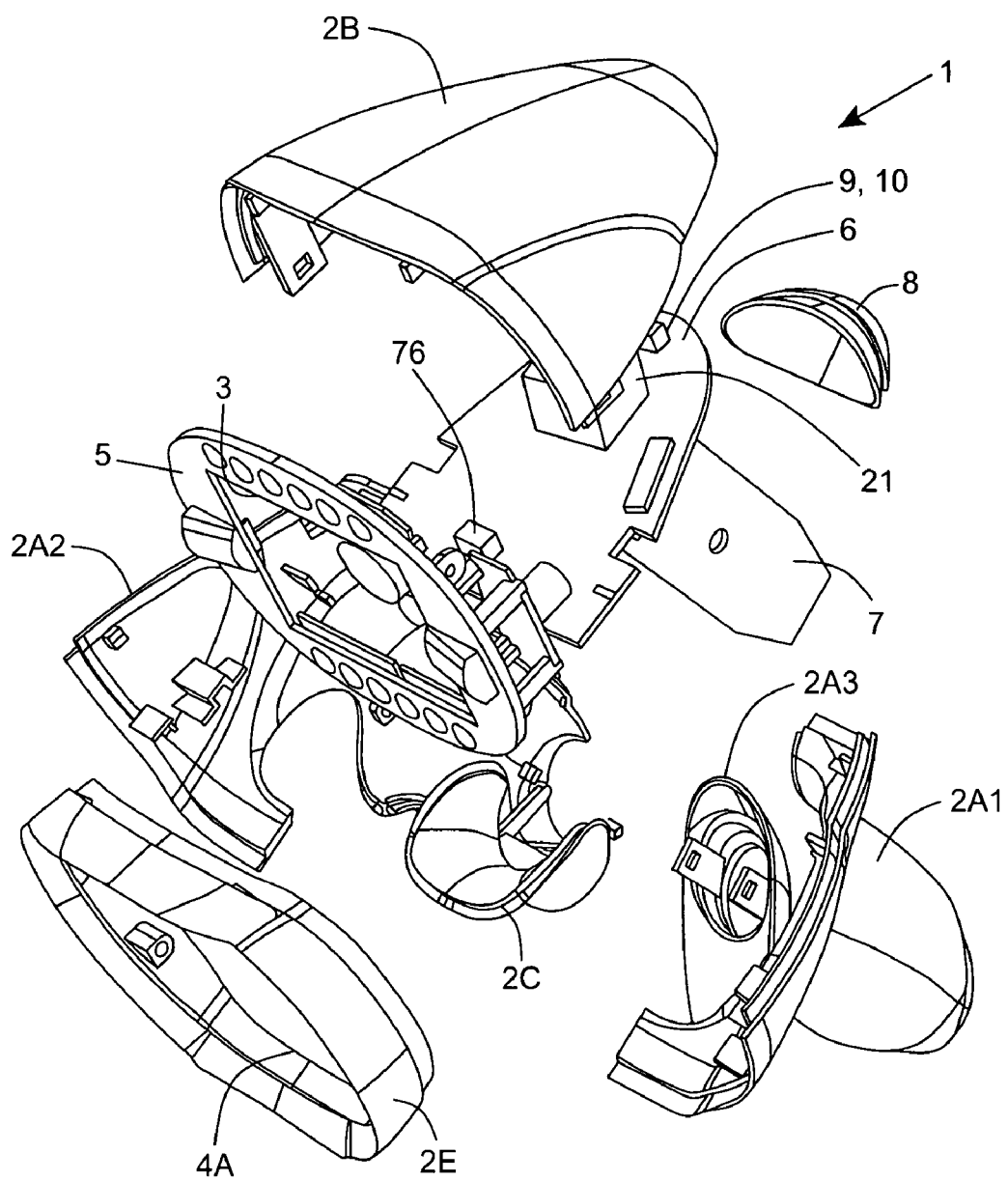
FIG. 1D is a first perspective exploded view of the hand-supportable digital imaging-based bar code symbol reading device of the first illustrative embodiment of the present invention.
Figure 1E:
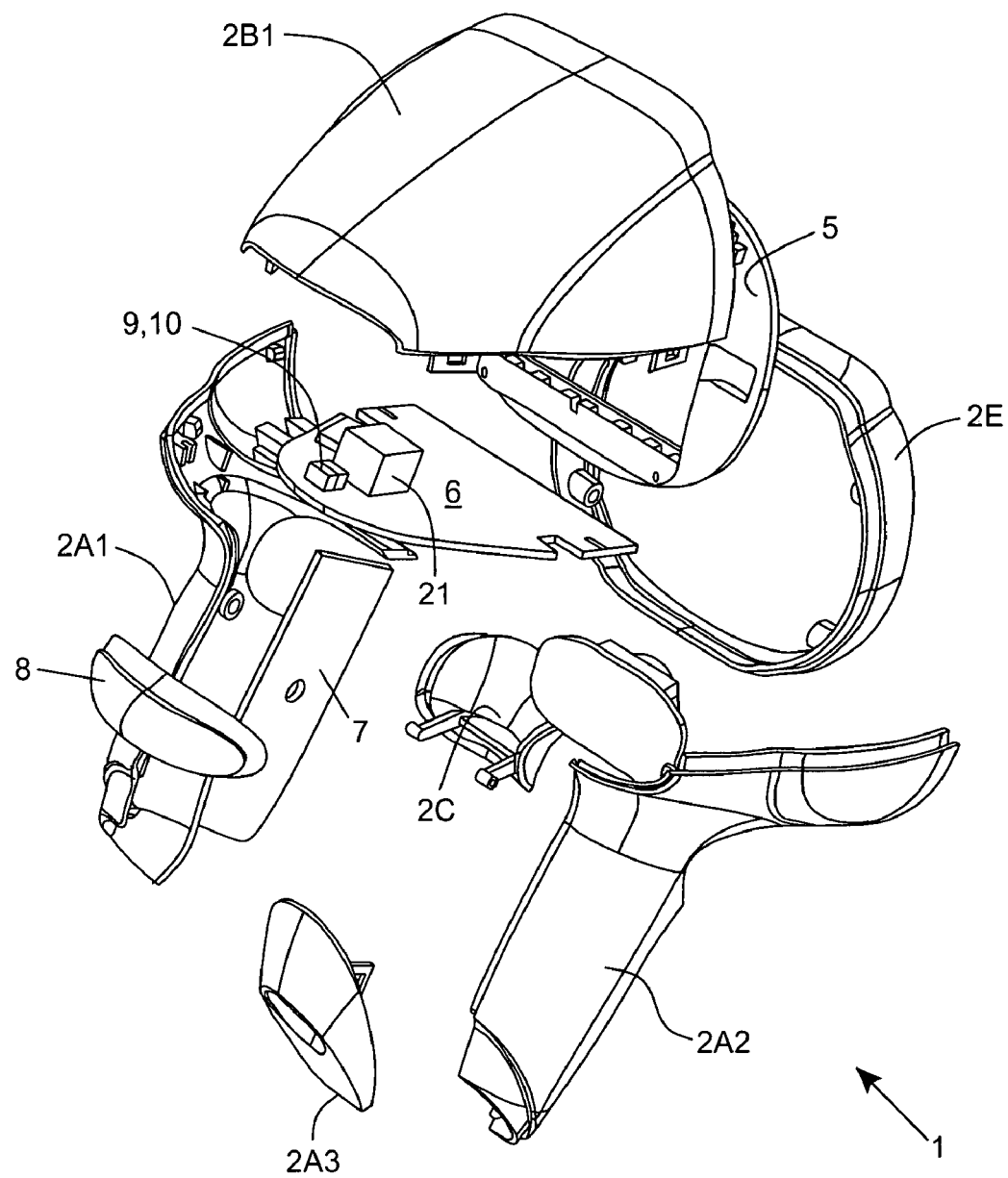
FIG. 1E is a second perspective exploded view of the hand-supportable digital imaging-based bar code symbol reading device of the first illustrative embodiment of the present invention.

Schematic Block Functional Diagram as System Design Model for the Hand-Supportable Digital Image-Based Bar Code Reading Device of the Present Invention As shown in the system design model of FIG. 1E, the hand-supportable Digital Imaging-Based Bar Code Symbol Reading Device 1 of the illustrative embodiment comprises: an IR-based Object Presence and Range Detection Subsystem 12; a Multi-Mode Area-type Image Formation and Detection (i.e. camera) Subsystem 13 having narrow-area mode of image capture, near-field wide-area mode of image capture, and a far-field wide-area mode of image capture; a Multi-Mode LED-Based Illumination Subsystem 14 having narrow-area mode of illumination, near-field wide-area mode of illumination, and a far-field wide-area mode of illumination; an Automatic Light Exposure Measurement and Illumination Control Subsystem 15; an Image Capturing and Buffering Subsystem 16; a Multi-Mode Image-Processing Bar Code Symbol Reading Subsystem 17 having five modes of image-processing based bar code symbol reading indicated in FIG. 2A2 and to be described in detail hereinabove; an Input/Output Subsystem 18; a manually-actuatable trigger switch 2C for sending user-originated control activation signals to the device; a System Mode Configuration Parameter Table 70; and a System Control Subsystem 18 integrated with each of the above-described subsystems, as shown.

The primary function of the IR-based Object Presence and Range Detection Subsystem 12 is to automatically produce an IR-based object detection field 20 within the FOV of the Multi-Mode Image Formation and Detection Subsystem 13, detect the presence of an object within predetermined regions of the object detection field (20A, 20B), and generate control activation signals A1 which are supplied to the System Control Subsystem 19 for indicating when and where an object is detected within the object detection field of the system.

In the first illustrative embodiment, the Multi-Mode Image Formation And Detection (i.e. Camera) Subsystem 13 has image formation (camera) optics 21 for producing a field of view (FOV) 23 upon an object to be imaged and a CMOS area-image sensing array 22 for detecting imaged light reflected off the object during illumination and image acquisition/capture operations.

In the first illustrative embodiment, the primary function of the Multi-Mode LED-Based Illumination Subsystem 14 is to produce a narrow-area illumination field 24, near-field wide-area illumination field 25, and a far-field wide-area illumination field 25, each having a narrow optical-bandwidth and confined within the FOV of the Multi-Mode Image Formation And Detection Subsystem 13 during narrow-area and wide-area modes of imaging, respectively. This arrangement is designed to ensure that only light transmitted from the Multi-Mode Illumination Subsystem 14 and reflected from the illuminated object is ultimately transmitted through a narrow-band transmission-type optical filter subsystem 4 realized by (1) high-pass (i.e. red-wavelength reflecting) filter element 4A mounted at the light transmission aperture 3 immediately in front of panel 5, and (2) low-pass filter element 4B mounted either before the image sensing array 22 or anywhere after panel 5 as shown in FIG. 3C. FIG. 5A4 sets forth the resulting composite transmission characteristics of the narrow-band transmission spectral filter subsystem 4, plotted against the spectral characteristics of the emission from the LED illumination arrays employed in the Multi-Mode Illumination Subsystem 14.

The primary function of the narrow-band integrated optical filter subsystem 4 is to ensure that the CMOS image sensing array 22 only receives the narrow-band visible illumination transmitted by the three sets of LED-based illumination arrays 27, 28 and 29 driven by LED driver circuitry 30 associated with the Multi-Mode Illumination Subsystem 14, whereas all other components of ambient light collected by the light collection optics are substantially rejected at the image sensing array 22, thereby providing improved SNR thereat, thus improving the performance of the system.

The primary function of the Automatic Light Exposure Measurement and Illumination Control Subsystem 15 is to twofold: (1) to measure, in real-time, the power density [joules/cm] of photonic energy (i.e. light) collected by the optics of the system at about its image sensing array 22, and generate Auto-Exposure Control Signals indicating the amount of exposure required for good image formation and detection; and (2) in combination with Illumination Array Selection Control Signal provided by the System Control Subsystem 19, automatically drive and control the output power of selected LED arrays 27, 28 and/or 29 in the Multi- Mode Illumination Subsystem, so that objects within the FOV of the system are optimally exposed to LED-based illumination and optimal images are formed and detected at the image sensing array 22.

The primary function of the Image Capturing and Buffering Subsystem 16 is to (1) detect the entire 2-D image focused onto the 2D image sensing array 22 by the image formation optics 21 of the system, (2) generate a frame of digital pixel data 31 for either a selected region of interest of the captured image frame, or for the entire detected image, and then (3) buffer each frame of image data as it is captured. Notably, in the illustrative embodiment, a single 2D image frame (31) is captured during each image capture and processing cycle, or during a particular stage of a processing cycle, so as to eliminate the problems associated with image frame overwriting, and synchronization of image capture and decoding processes, as addressed in U.S. Pat. Nos. 5,932,862 and 5,942,741 assigned to Welch Allyn, and incorporated herein by reference.

The primary function of the Multi-Mode Imaging-Based Bar Code Symbol Reading Subsystem 17 is to process images that have been captured and buffered by the Image Capturing and Buffering Subsystem 16, during both narrow-area and wide-area illumination modes of system operation. Such image processing operation includes image-based bar code decoding methods illustrated in FIG. 2A2, and described in detail in Applicants' WIPO International Publication No. WO 2005/050390, incorporated herein by reference in its entirety.

The primary function of the Input/Output Subsystem 18 is to support standard and/or proprietary communication interfaces with external host systems and devices, and output processed image data and the like to such external host systems or devices by way of such interfaces. Examples of such interfaces, and technology for implementing the same, are given in U.S. Pat. No. 6,619,549, incorporated herein by reference in its entirety.

The primary function of the System Control Subsystem 19 is to provide some predetermined degree of control or management signaling services to each subsystem component integrated, as shown. While this subsystem can be implemented by a programmed microprocessor, in the illustrative embodiment, it is implemented by the three-tier software architecture supported on computing platform shown in FIG. 2B, and as represented in FIG. 10, and detailed in WIPO International Publication No. WO 2005/050390, supra.

The primary function of the manually-activatable Trigger Switch 2C integrated with the hand-supportable housing is to enable the user to generate a control activation signal upon manually depressing the Trigger Switch 2C, and to provide this control activation signal to the System Control Subsystem 19 for use in carrying out its complex system and subsystem control operations, described in detail herein.

The primary function of the System Mode Configuration Parameter Table 70 is to store (in non-volatile/persistent memory) a set of configuration parameters for each of the available Programmable Modes of System Operation specified in the Programmable Mode of Operation Table shown in FIGS. 11A and 11B, and which can be read and used by the System Control Subsystem 19 as required during its complex operations.

The detailed structure and function of each subsystem will now be described in detail above.

Schematic Diagram as System Implementation Model for the Hand-Supportable Digital Imaging-Based Bar Code Reading Device of the Present Invention FIG. 2B shows a schematic diagram of a system implementation for the hand-supportable Digital Imaging-Based Bar Code Symbol Reading Device 1 illustrated in FIGS. 1A through 1E. As shown in this system implementation, the bar code symbol reading device is realized using a number of hardware component comprising: an illumination board 33 carrying components realizing electronic functions performed by the LED-Based Multi-Mode Illumination Subsystem 14 and Automatic Light Exposure Measurement And Illumination Control Subsystem 15; a CMOS camera board 34 carrying high resolution (1280× 1024 7-bit 6 micron pixel size) CMOS image sensing array 22 running at 25 Mhz master clock, at 7 frames/second at 1280*1024 resolution with randomly accessible region of interest (ROI) window capabilities, realizing electronic functions performed by the Multi-Mode Image Formation and Detection Subsystem 13; a CPU board 35 (i.e. computing platform) including (i) an Intel Sabinal 32-Bit Microprocessor PXA210 36 running at 200 mHz 1.0 core voltage with a 16 bit 100 Mhz external bus speed, (ii) an expandable (e.g. 7+ megabyte) Intel J3 Asynchronous 16-bit Flash memory 37, (iii) an 16 Megabytes of 100 MHz SDRAM 38, (iv) an Xilinx Spartan II FPGA FIFO 39 running at 50 Mhz clock frequency and 60 MB/Sec data rate, configured to control the camera timings and drive an image acquisition process, (v) a multimedia card socket 40, for realizing the other subsystems of the system, (vi) a power management module 41 for the MCU adjustable by the I2C bus, and (vii) a pair of UARTs 42A and 42B (one for an IRDA port and one for a JTAG port); an interface board 43 for realizing the functions performed by the I/O subsystem 18; and an IR-based object presence and range detection circuit 44 for realizing Subsystem 12, which includes a pair of IR LEDs and photodiodes 12A for transmitting and receiving a pencil-shaped IR-based object-sensing signal.

In the illustrative embodiment, the image formation optics 21 supported by the bar code reader provides a field of view of 103 mm at the nominal focal distance to the target, of approximately 70 mm from the edge of the bar code reader. The minimal size of the field of view (FOV) is 62 mm at the nominal focal distance to the target of approximately 10 mm. In the illustrative embodiment, the depth of field of the image formation optics varies from approximately 69 mm for the bar codes with resolution of 5 mils per narrow module, to 181 mm for the bar codes with resolution of 13 mils per narrow module.

The Multi-Mode Illumination Subsystem 14 is designed to cover the optical field of view (FOV) 23 of the bar code symbol reader with sufficient illumination to generate high-contrast images of bar codes located at both short and long distances from the imaging window. The illumination subsystem also provides a narrow-area (thin height) targeting beam 24 having dual purposes: (a) to indicate to the user where the optical view of the reader is; and (b) to allow a quick scan of just a few lines of the image and attempt a super-fast bar code decoding if the bar code is aligned properly. If the bar code is not aligned for a linearly illuminated image to decode, then the entire field of view is illuminated with a wide-area illumination field 25 or 26 and the image of the entire field of view is acquired by Image Capture and Buffering Subsystem 16 and processed by Multi-Mode Bar Code Symbol Reading Subsystem 17, to ensure reading of a bar code symbol presented therein regardless of its orientation.

The interface board 43 employed within the bar code symbol reader provides the hardware communication interfaces for the bar code symbol reader to communicate with the outside world. The interfaces implemented in system will typically include RS232, keyboard wedge, and/or USB, or some combination of the above, as well as others required or demanded by the particular application at hand.

Specification of the Area-Type Image Formation and Detection (i.e. Camera) Subsystem During its Narrow-Area (Linear) and Wide-Area Modes of Imaging, Supported by the Narrow and Wide Area Fields of Narrow-Band Illumination, Respectively As shown in FIGS. 3B through 3E, the Multi-Mode Image Formation And Detection (IFD) Subsystem 13 has a narrow-area image capture mode (i.e. where only a few central rows of pixels about the center of the image sensing array are enabled) and a wide-area image capture mode of operation (i.e. where all pixels in the image sensing array are enabled). The CMOS image sensing array 22 in the Image Formation and Detection Subsystem 13 has image formation optics 21 which provides the image sensing array with a field of view (FOV) 23 on objects to be illuminated and imaged. As shown, this FOV is illuminated by the Multi-Mode Illumination Subsystem 14 integrated within the bar code reader.

The Multi-Mode Illumination Subsystem 14 includes three different LED-based illumination arrays 27, 28 and 29 mounted on the light transmission window panel 5, and arranged about the light transmission window 4A. Each illumination array is designed to illuminate a different portion of the FOV of the bar code reader during different modes of operation. During the narrow-area (linear) illumination mode of the Multi-Mode Illumination Subsystem 14, the central narrow-wide portion of the FOV indicated by 23 is illuminated by the narrow-area illumination array 27, shown in FIG. 3A. During the near-field wide-area illumination mode of the Multi-Mode Illumination Subsystem 14, which is activated in response to the IR Object Presence and Range Detection Subsystem 12 detecting an object within the near-field portion of the FOV, the near-field wide-area portion of the FOV is illuminated by the near-field wide-area illumination array 28, shown in FIG. 3A. During the far-field wide-area illumination mode of the Multi-Mode Illumination Subsystem 14, which is activated in response to the IR Object Presence and Range Detection Subsystem 12 detecting an object within the far-field portion of the FOV, the far-field wide-area portion of the FOV is illuminated by the far-field wide-area illumination array 29, shown in FIG. 3A. In FIG. 3A, the spatial relationships are shown between these fields of narrow-band illumination and the far and near field portions the FOV of the Image Formation and Detection Subsystem 13.

In FIG. 3B, the Multi-Mode LED-Based Illumination Subsystem 14 is shown transmitting visible narrow-band illumination through its narrow-band transmission-type optical filter subsystem 4, shown in FIG. 3C and integrated within the hand-supportable Digital Imaging-Based Bar Code Symbol Reading Device. The narrow-band illumination from the Multi-Mode Illumination Subsystem 14 illuminates an object with the FOV of the image formation optics of the Image Formation and Detection Subsystem 13, and light rays reflected and scattered therefrom are transmitted through the high-pass and low-pass optical filters 4A and 4B and are ultimately focused onto image sensing array 22 to form of a focused detected image thereupon, while all other components of ambient light are substantially rejected before reaching image detection at the image sensing array 22. Notably, in the illustrative embodiment, the red-wavelength reflecting high-pass optical filter element 4A is positioned at the imaging window of the device before the image formation optics 21, whereas the low-pass optical filter element 4B is disposed before the image sensing array 22 between the focusing lens elements of the image formation optics 21. This forms narrow-band optical filter subsystem 4 which is integrated within the bar code reader to ensure that the object within the FOV is imaged at the image sensing array 22 using only spectral components within the narrow-band of illumination produced from Subsystem 14, while rejecting substantially all other components of ambient light outside this narrow range (e.g. 15 nm).

As shown in FIG. 3D, the Image Formation And Detection Subsystem 14 employed within the hand-supportable image-based bar code reading device comprising three lenses 21A, 21B and 21C, each made as small as possible (with a maximum diameter of 12 mm), having spherical surfaces, and made from common glass, e.g. LAK2 (~LaK9), ZF10 (=SF8), LAF2 (~LaF3). Collectively, these lenses are held together within a lens holding assembly 45, as shown in FIG. 3E, and form an image formation subsystem arranged along the optical axis of the CMOS image sensing array 22 of the bar code reader.

As shown in FIG. 3E, the lens holding assembly 45 comprises: a barrel structure 45A1, 45A2 for holding lens elements 21A, 21B and 21C; and a base structure 45B for holding the image sensing array 22; wherein the assembly is configured so that the barrel structure 45A slides within the base structure 45B so as to focus the fixed-focus lens assembly during manufacture.

In FIGS. 3F1 and 3F2, the lens holding assembly 45 and imaging sensing array 22 are mounted along an optical path defined along the central axis of the system. In the illustrative embodiment, the image sensing array 22 has, for example, a 1280×1024 pixel resolution (½" format), 6 micron pixel size, with randomly accessible region of interest (ROI) window capabilities. It is understood, though, that many others kinds of imaging sensing devices (e.g. CCD) can be used to practice the principles of the present invention disclosed herein, without departing from the scope or spirit of the present invention.

Details regarding a preferred Method of Designing the Image Formation (i.e. Camera) Optics Within the Image-Based Bar Code Reader Of The Present Invention Using The Modulation Transfer Function (MTF) are described in WIPO International Publication No. WO 2005/050390, supra.

Specification of Multi-Mode LED-Based Illumination Subsystem Employed in the Hand-Supportable Image-Based Bar Code Reading System of the Present Invention In the illustrative embodiment, the LED-Based Multi-Mode Illumination Subsystem 14 comprises: narrow-area illumination array 27; near-field wide-area illumination array 28; and far-field wide-area illumination array 29. The three fields of narrow-band illumination produced by the three illumination arrays of subsystem 14 are schematically depicted in FIG. 4. As will be described hereinafter, with reference to FIGS. 27 and 28, narrow-area illumination array 27 can be realized as two independently operable arrays, namely: a near-field narrow-area illumination array and a far-field narrow-area illumination array, which are activated when the target object is detected within the near and far fields, respectively, of the automatic IR-based Object Presence and Range Detection Subsystem 12 during wide-area imaging modes of operation. However, for purposes of illustration, the first illustrative embodiment of the present invention employs only a single field narrow-area (linear) illumination array which is designed to illuminate over substantially entire working range of the system, as shown in FIG. 4.

As shown in FIG. 1C, the narrow-area (linear) illumination array 27 includes two pairs of LED light sources 27A1 and 27A2 provided with cylindrical lenses, and mounted on left and right portions of the light transmission window panel 5. During the narrow-area image capture mode of the Image Formation and Detection Subsystem 13, the narrow-area (linear) illumination array 27 produces narrow-area illumination field 24 of narrow optical-bandwidth within the FOV of the system. In the illustrative embodiment, narrow-area illumination field 24 has a height less than 10 mm at far field, creating the appearance of substantially linear or rather planar illumination field.

The near-field wide-area illumination array 28 includes two sets of (flattop) LED light sources 28A1 and 28A2 without any lenses mounted on the top and bottom portions of the light transmission window panel 5, as shown in FIG. 1C. During the near-field wide-area image capture mode of the Image Formation and Detection Subsystem 13, the near-field wide-area illumination array 28 produces a near-field wide-area illumination field 25 of narrow optical-bandwidth within the FOV of the system.

As shown in FIG. 1C, the far-field wide-area illumination array 29 includes two sets of LED light sources 29A1 and 29A2 provided with spherical (i.e. plano-convex) lenses, and mounted on the top and bottom portions of the light transmission window panel 5. During the far-field wide-area image capture mode of the Image Formation and Detection Subsystem 13, the far-field wide-area illumination array 29 produces a far-field wide-area illumination beam of narrow optical-bandwidth within the FOV of the system.

Narrow-Area (Linear) Illumination Arrays Employed in the Multi-Mode Illumination Subsystem As shown in FIG. 4, the narrow-area (linear) illumination field 24 extends from about 30 mm to about 200 mm within the working range of the system, and covers both the near and far fields of the system. The near-field wide-area illumination field 25 extends from about 0 mm to about 100 mm within the working range of the system. The far-field wide-area illumination field 26 extends from about 100 mm to about 200 mm within the working range of the system.

The narrow-area illumination array 27 employed in the Multi-Mode LED-Based Illumination Subsystem 14 is optically designed to illuminate a thin area at the center of the field of view (FOV) of the imaging-based bar code symbol reader, measured from the boundary of the left side of the field of view to the boundary of its right side, as specified in FIG. 4A1. As will be described in greater detail hereinafter, the narrow-area illumination field 24 is automatically generated by the Multi-Mode LED-Based Illumination Subsystem 14 in response to the detection of an object within the object detection field of the automatic IR-based Object Presence and Range Detection Subsystem 12. In general, the object detection field of the IR-based Object Presence and Range Detection Subsystem 12 and the FOV of the Image Formation and Detection Subsystem 13 are spatially co-extensive and the object detection field spatially overlaps the FOV along the entire working distance of the imaging-based bar code symbol reader. The narrow-area illumination field 24, produced in response to the detection of an object, serves a dual purpose: it provides a visual indication to an operator about the location of the optical field of view of the bar code symbol reader, thus, serves as a field of view aiming instrument; and during its image acquisition mode, the narrow-area illumination beam is used to illuminated a thin area of the FOV within which an object resides, and a narrow 2-D image of the object can be rapidly captured (by a small number of rows of pixels in the image sensing array 22), buffered and processed in order to read any linear bar code symbols that may be represented therewithin.

Near-Field Wide-Area Illumination Arrays Employed in the Multi-Mode Illumination Subsystem The near-field wide-area illumination array 28 employed in the LED-Based Multi-Mode Illumination Subsystem 14 is optically designed to illuminate a wide area over a near-field portion of the field of view (FOV) of the imaging-based bar code symbol reader, as defined in FIG. 4A1. As will be described in greater detail hereinafter, the near-field wide-area illumination field 28 is automatically generated by the LED-based Multi-Mode Illumination Subsystem 14 in response to: (1) the detection of any object within the near-field of the system by the IR-based Object Presence and Range Detection Subsystem 12; and (2) one or more of following events, including, for example: (i) failure of the image processor to successfully decode process a linear bar code symbol during the narrow-area illumination mode; (ii) detection of code elements such as control words associated with a 2-D bar code symbol; and/or (iii) detection of pixel data in the image which indicates that object was captured in a state of focus.

In general, the object detection field of the IR-based Object Presence and Range Detection Subsystem 12 and the FOV of the Image Formation And Detection Subsystem 13 are spatially co-extensive and the object detection field spatially overlaps the FOV along the entire working distance of the imaging-based bar code symbol reader. The near-field wide-area illumination field 23, produced in response to one or more of the events described above, illuminates a wide area over a near-field portion of the field of view (FOV) of the imaging-based bar code symbol reader, as defined in FIG. 5A, within which an object resides, and a 2-D image of the object can be rapidly captured by all rows of the image sensing array 22, buffered and decode-processed in order to read any 1D or 2-D bar code symbols that may be represented therewithin, at any orientation, and of virtually any bar code symbology. The intensity of the near-field wide-area illumination field during object illumination and image capture operations is determined by how the LEDs associated with the near-field wide array illumination arrays 28 are electrically driven by the Multi-Mode Illumination Subsystem 14. The degree to which the LEDs are driven is determined by the intensity of reflected light measured near the image formation plane by the automatic light exposure and control subsystem 15. If the intensity of reflected light at the photodetector of the Automatic Light Exposure Measurement and Illumination Control Subsystem 15 is weak, indicative that the object exhibits low light reflectivity characteristics and a more intense amount of illumination will need to be produced by the LEDs to ensure sufficient light exposure on the image sensing array 22, then the Automatic Light Exposure Measurement and Illumination Control Subsystem 15 will drive the LEDs more intensely (i.e. at higher operating currents).

Far-Field Wide-Area Illumination Arrays Employed in the Multi-Mode Illumination Subsystem The far-field wide-area illumination array 26 employed in the Multi-Mode LED-based Illumination Subsystem 14 is optically designed to illuminate a wide area over a far-field portion of the field of view (FOV) of the imaging-based bar code symbol reader, as defined in FIG. 4A1. As will be described in greater detail hereinafter, the far-field wide-area illumination field 26 is automatically generated by the LED-Based Multi-Mode Illumination Subsystem 14 in response to: (1) the detection of any object within the near-field of the system by the IR-based Object Presence and Range Detection Subsystem 12; and (2) one or more of following events, including, for example: (i) failure of the image processor to successfully decode process a linear bar code symbol during the narrow-area illumination mode; (ii) detection of code elements such as control words associated with a 2-D bar code symbol; and/or (iii) detection of pixel data in the image which indicates that object was captured in a state of focus. In general, the object detection field of the IR-based Object Presence and Range Detection Subsystem 12 and the FOV 23 of the image detection and formation subsystem 13 are spatially co-extensive and the object detection field 20 spatially overlaps the FOV 23 along the entire working distance of the imaging-based bar code symbol reader. The far-field wide-area illumination field 26, produced in response to one or more of the events described above, illuminates a wide area over a far-field portion of the field of view (FOV) of the imaging-based bar code symbol reader, as defined in FIG. 5A, within which an object resides, and a 2-D image of the object can be rapidly captured (by all rows of the image sensing array 22), buffered and processed in order to read any 1D or 2-D bar code symbols that may be represented therewithin, at any orientation, and of virtually any bar code symbology. The intensity of the far-field wide-area illumination field during object illumination and image capture operations is determined by how the LEDs associated with the far-field wide-area illumination array 29 are electrically driven by the Multi-Mode Illumination Subsystem 14. The degree to which the LEDs are driven (i.e. measured in terms of junction current) is determined by the intensity of reflected light measured near the image formation plane by the Automatic Light Exposure Measurement And Illumination Control Subsystem 15. If the intensity of reflected light at the photo-detector of the Automatic Light Exposure Measurement and Illumination Control Subsystem 15 is weak, indicative that the object exhibits low light reflectivity characteristics and a more intense amount of illumination will need to be produced b the LEDs to ensure sufficient light exposure on the image sensing array 22, then the Automatic Light Exposure Measurement and Illumination Control Subsystem 15 will drive the LEDs more intensely (i.e. at higher operating currents).

During both near and far field wide-area illumination modes of operation, the Automatic Light Exposure Measurement and Illumination Control Subsystem (i.e. module) 15 measures and controls the time duration which the Multi-Mode Illumination Subsystem 14 exposes the image sensing array 22 to narrow-band illumination (e.g. 633 nanometers, with approximately 15 nm bandwidth) during the image capturing/acquisition process, and automatically terminates the generation of such illumination when such computed time duration expires. In accordance with the principles of the present invention, this global exposure control process ensures that each and every acquired image has good contrast and is not saturated, two conditions essential for consistent and reliable bar code reading

Specification of the Narrow-Band Optical Filter Subsystem Integrated Within the Hand-Supportable Housing of the Imager of the Present Invention As shown in FIG. 5A1, the hand-supportable housing of the bar code reader of the present invention has integrated within its housing, narrow-band optical filter subsystem 4 for transmitting substantially only the very narrow band of wavelengths (e.g. 620-700 nanometers) of visible illumination produced from the narrow-band Multi-Mode Illumination Subsystem 14, and rejecting all other optical wavelengths outside this narrow optical band however generated (i.e. ambient light sources). As shown, narrow-band optical filter subsystem 4 comprises: red-wavelength reflecting (high-pass) imaging window filter 4A integrated within its light transmission aperture 3 formed on the front face of the hand-supportable housing; and low pass optical filter 4B disposed before the CMOS image sensing array 22. These optical filters 4A and 4B cooperate to form the narrow-band optical filter subsystem 4 for the purpose described above. As shown in FIG. 5A2, the light transmission characteristics (energy versus wavelength) associated with the low-pass optical filter element 4B indicate that optical wavelengths below 620 nanometers are transmitted therethrough, whereas optical wavelengths above 620 nm are substantially blocked (e.g. absorbed or reflected). As shown in FIG. 5A3, the light transmission characteristics (energy versus wavelength) associated with the high-pass imaging window filter 4A indicate that optical wavelengths above 700 nanometers are transmitted therethrough, thereby producing a red-color appearance to the user, whereas optical wavelengths below 700 nm are substantially blocked (e.g. absorbed or reflected) by optical filter 4A.

During system operation, spectral band-pass filter subsystem 4 greatly reduces the influence of the ambient light, which falls upon the CMOS image sensing array 22 during the image capturing operations. By virtue of the optical filter of the present invention, a optical shutter mechanism is eliminated in the system. In practice, the optical filter can reject more than 85% of incident ambient light, and in typical environments, the intensity of LED illumination is significantly more than the ambient light on the CMOS image sensing array 22. Thus, while an optical shutter is required in nearly most conventional CMOS imaging systems, the imaging-based bar code reading system of the present invention effectively manages the exposure time of narrow-band illumination onto its CMOS image sensing array 22 by simply controlling the illumination time of its LED-based illumination arrays 27, 28 and 29 using control signals generated by Automatic Light Exposure Measurement and Illumination Control Subsystem 15 and the CMOS image sensing array 22 while controlling illumination thereto by way of the band-pass optical filter subsystem 4 described above. The result is a simple system design, without moving parts, and having a reduced manufacturing cost.

While the band-pass optical filter subsystem 4 is shown comprising a high-pass filter element 4A and low-pass filter element 4B, separated spatially from each other by other optical components along the optical path of the system, subsystem 4 may be realized as an integrated multi-layer filter structure installed in front of the image formation and detection (IFD) module 13, or before its image sensing array 22, without the use of the high-pass window filter 4A, or with the use thereof so as to obscure viewing within the imaging-based bar code symbol reader while creating an attractive red-colored protective window. Preferably, the red-color window filter 4A will have substantially planar surface characteristics to avoid focusing or defocusing of light transmitted therethrough during imaging operations.

Specification of the Automatic Light Exposure Measurement and Illumination Control Subsystem of the Present Invention The primary function of the Automatic Light Exposure Measurement and Illumination Control Subsystem 15 is to control the brightness and contrast of acquired images by (i) measuring light exposure at the image plane of the CMOS imaging sensing array 22 and (ii) controlling the time duration that the Multi-Mode Illumination Subsystem 14 illuminates the target object with narrow-band illumination generated from the activated LED illumination array. Thus, the Automatic Light Exposure Measurement and Illumination Control Subsystem 15 eliminates the need for a complex shuttering mechanism for CMOS-based image sensing array 22. This novel mechanism ensures that the imaging-based bar code symbol reader of the present invention generates non-saturated images with enough brightness and contrast to guarantee fast and reliable image-based bar code decoding in demanding end-user applications.

During object illumination, narrow-band LED-based light is reflected from the target object (at which the hand-supportable bar code reader is aimed) and is accumulated by the CMOS image sensing array 22. Notably, the object illumination process must be carried out for an optimal duration so that the acquired image frame has good contrast and is not saturated. Such conditions are required for the consistent and reliable bar code decoding operation and performance. The Automatic Light Exposure Measurement and Illumination Control Subsystem 15 measures the amount of light reflected from the target object, calculates the maximum time that the CMOS image sensing array 22 should be kept exposed to the actively-driven LED-based illumination array associated with the Multi-Mode Illumination Subsystem 14, and then automatically deactivates the illumination array when the calculated time to do so expires (i.e. lapses).

As shown in FIG. 6A of the illustrative embodiment, the Automatic Light Exposure Measurement and Illumination Control Subsystem 15 comprises: a parabolic light-collecting mirror 55 mounted within the head portion of the hand-supportable housing, for collecting narrow-band LED-based light reflected from a central portion of the FOV of the system, which is then transmitted through the narrow-band optical filter subsystem 4 eliminating wide band spectral interference; a light-sensing device (e.g. photo-diode) 56 mounted at the focal point of the light collection mirror 55, for detecting the filtered narrow-band optical signal focused therein by the light collecting mirror 55; and an electronic circuitry 57 for processing electrical signals produced by the photo-diode 56 indicative of the intensity of detected light exposure levels within the focal plane of the CMOS image sensing array 22. During light exposure measurement operations, incident narrow-band LED-based illumination is gathered from the center of the FOV of the system by the spherical light collecting mirror 55 and narrow-band filtered by the narrow-band optical filter subsystem 4 before being focused upon the photo-diode 56 for intensity detection. The photo-diode 56 converts the detected light signal into an electrical signal having an amplitude which directly corresponds to the intensity of the collected light signal.

As shown in FIG. 6B, the System Control Subsystem 19 generates an illumination array selection control signal which determines which LED illumination array (i.e. the narrow-area illumination array 27 or the far-field and narrow-field wide-area illumination arrays 28 or 29) will be selectively driven at any instant in time of system operation by LED Array Driver Circuitry 64 in the Automatic Light Exposure Measurement and Illumination Control Subsystem 15. As shown, electronic circuitry 57 processes the electrical signal from photo-detector 56 and generates an auto exposure control signal for the selected LED illumination array. In term, this auto exposure control signal is provided to the LED array driver circuitry 64, along with an illumination array selection control signal from the System Control Subsystem 19, for selecting and driving (i.e. energizing) one or more LED illumination array(s) so as to generate visible illumination at a suitable intensity level and for suitable time duration so that the CMOS image sensing array 22 automatically detects digital high-resolution images of illuminated objects, with sufficient contrast and brightness, while achieving global exposure control objectives of the present invention disclosed herein. As shown in FIGS. 6B, 6C1 and 6C2, the illumination array selection control signal is generated by the System Control Subsystem 19 in response to (i) reading the system mode configuration parameters from the system mode configuration parameter table 70, shown in FIG. 2A1, for the programmed mode of system operation at hand, and (ii) detecting the output from the automatic IR-based Object Presence and Range Detection Subsystem 12.

Notably, in the illustrative embodiment, there are three possible LED-based illumination arrays 27, 28 and 29 which can be selected for activation by the System Control Subsystem 19, and the upper and/or lower LED subarrays in illumination arrays 28 and 29 can be selectively activated or deactivated on a subarray-by-subarray basis, for various purposes taught herein, including automatic specular reflection noise reduction during wide-area image capture modes of operation.

Each one of these illumination arrays can be driven to different states depending on the auto-exposure control signal generated by electronic signal processing circuit 57, which will be generally a function of object distance, object surface reflectivity and the ambient light conditions sensed at photo-detector 56, and measured by signal processing circuit 57. The operation of signal processing circuitry 57 will now be detailed below.

As shown in FIG. 6B, the narrow-band filtered optical signal that is produced by the parabolic light focusing mirror 55 is focused onto the photo-detector D1 56 which generates an analog electrical signal whose amplitude corresponds to the intensity of the detected optical signal. This analog electrical signal is supplied to the signal processing circuit 57 for various stages of processing. The first step of processing involves converting the analog electrical signal from a current-based signal to a voltage-based signal which is achieved by passing it through a constant-current source buffer circuit 58, realized by one half of transistor Q1 (58). This inverted voltage signal is then buffered by the second half of the transistor Q1 (58) and is supplied as a first input to a summing junction 59. As shown in FIGS. 6C1 and 6C2, the CMOS image sensing array 22 produces, as output, a digital electronic rolling shutter (ERS) pulse signal 60, wherein the duration of this ERS pulse signal 60 is fixed to a maximum exposure time allowed in the system. The ERS pulse signal 60 is buffered through transistor Q2 61 and forms the other side of the summing junction 59. The outputs from transistors Q1 and Q2 form an input to the summing junction 59. A capacitor C5 is provided on the output of the summing junction 59 and provides a minimum integration time sufficient to reduce any voltage overshoot in the signal processing circuit 57. The output signal across the capacitor C5 is further processed by a comparator U1 62. In the illustrative embodiment, the comparator reference voltage signal is set to 1.7 volts. This reference voltage signal sets the minimum threshold level for the light exposure measurement circuit 57. The output signal from the comparator 62 is inverted by inverter U3 63 to provide a positive logic pulse signal which is supplied, as auto exposure control signal, to the input of the LED array driver circuit 64.

As will be explained in greater detail below, the LED array driver circuit 64 automatically drives an activated LED illuminated array, and the operation of LED array driver circuit 64 depends on the mode of operation in which the Multi-Mode Illumination Subsystem 14 is configured. In turn, the mode of operation in which the Multi-Mode Illumination Subsystem 14 is configured at any moment in time will typically depend on (i) the state of operation of the Object Presence and Range Detection Subsystem 12 and (ii) the programmed mode of operation in which the entire Imaging-Based Bar Code Symbol Reading System is configured using system mode configuration parameters read from Table 70 shown in FIG. 2A1.

In the illustrative embodiment, the LED array driver circuit 64 comprises analog and digital circuitry which receives two input signals: (i) the auto exposure control signal from signal processing circuit 57; and (ii) the illumination array selection control signal. The LED array driver circuit 64 generates, as output, digital pulse-width modulated (PCM) drive signals provided to either the narrow-area illumination array 27, the upper and/or lower LED sub-array employed in the near-field wide-area illumination array 28, and/or the upper and/or lower LED sub-arrays employed in the far-field wide-area illumination array 29. Depending on which mode of system operation the imaging-based bar code symbol reader has been configured, the LED array driver circuit 64 will drive one or more of the above-described LED illumination arrays during object illumination and imaging operations. As will be described in greater detail below, when all rows of pixels in the CMOS image sensing array 22 are in a state of integration (and thus have a common integration time), such LED illumination array(s) are automatically driven by the LED array driver circuit 64 at an intensity and for duration computed (in an analog manner) by the Automatic Light Exposure and Illumination Control Subsystem 15 so as to capture digital images having good contrast and brightness, independent of the light intensity of the ambient environment and the relative motion of target object with respect to the imaging-based bar code symbol reader.

Global Exposure Control Method of the Present Invention Carried Out Using the CMOS Image Sensing Array In the illustrative embodiment, the CMOS image sensing array 22 is operated in its Single Frame Shutter Mode (i.e. rather than its Continuous Frame Shutter Mode) as shown in FIG. 6D, and employs a novel exposure control method which ensure that all rows of pixels in the CMOS image sensing array 22 have a common integration time, thereby capturing high quality images even when the object is in a state of high speed motion. This novel exposure control technique shall be referred to as "the global exposure control method" of the present invention, and the flow chart of FIGS. 6E1 and 6E2 describes clearly and in great detail how this method is implemented in the imaging-based bar code symbol reader of the illustrative embodiment. The global exposure control method will now be described in detail below.

As indicated at Block A in FIG. 6E1, Step A in the global exposure control method involves selecting the single frame shutter mode of operation for the CMOS imaging sensing array provided within an imaging-based bar code symbol reading system employing an automatic light exposure measurement and illumination control subsystem, a multi-mode illumination subsystem, and a system control subsystem integrated therewith, and image formation optics providing the CMOS image sensing array with a field of view into a region of space where objects to be imaged are presented.

As indicated in Block B in FIG. 6E1, Step B in the global exposure control method involves using the automatic light exposure measurement and illumination control subsystem to continuously collect illumination from a portion of the field of view, detect the intensity of the collected illumination, and generate an electrical analog signal corresponding to the detected intensity, for processing.

As indicated in Block C in FIG. 6E1, Step C in the global exposure control method involves activating (e.g. by way of the system control subsystem 19 or directly by way of trigger switch 2C) the CMOS image sensing array so that its rows of pixels begin to integrate photonically generated electrical charge in response to the formation of an image onto the CMOS image sensing array by the image formation optics of the system.

As indicated in Block D in FIG. 6E1, Step D in the global exposure control method involves the CMOS image sensing array 22 automatically (i) generating an electronic rolling shutter (ERS) digital pulse signal when all rows of pixels in the image sensing array are operated in a state of integration, and providing this ERS pulse signal to the Automatic Light Exposure Measurement And Illumination Control Subsystem 15 so as to activate light exposure measurement and illumination control functions/operations therewithin.

As indicated in Block E in FIG. 6E2, Step E in the global exposure control method involves, upon activation of light exposure measurement and illumination control functions within Subsystem 15, (i) processing the electrical analog signal being continuously generated therewithin, (ii) measuring the light exposure level within a central portion of the field of view 23 (determined by light collecting optics 55 shown in FIG. 6A), and (iii) generating an auto-exposure control signal for controlling the generation of visible field of illumination from at least one LED-based illumination array (27, 28 and/or 29) in the Multi-Mode Illumination Subsystem 14 which is selected by an illumination array selection control signal produced by the System Control Subsystem 19.

Finally, as indicated at Block F in FIG. 6E2, Step F in the global exposure control method involves using (i) the auto exposure control signal and (ii) the illumination array selection control signal to drive the selected LED-based illumination array(s) and illuminate the field of view of the CMOS image sensing array 22 in whatever image capture mode it may be configured, precisely when all rows of pixels in the CMOS image sensing array are in a state of integration, as illustrated in FIG. 6D, thereby ensuring that all rows of pixels in the CMOS image sensing array have a common integration time. By enabling all rows of pixels in the CMOS image sensing array 22 to have a common integration time, high-speed "global exposure control" is effectively achieved within the imaging-based bar code symbol reader of the present invention, and consequently, high quality images are captured independent of the relative motion between the bar code symbol reader and the target object.

Specification of the IR-Based Automatic Object Presence and Range Detection Subsystem Employed in the Hand-Supportable Digital Image-Based Bar Code Reading Device of the Present Invention As shown in FIG. 7, IR-wavelength based Automatic Object Presence and Range Detection Subsystem 12 is realized in the form of a compact optics module 76 mounted on the front portion of optics bench 6, as shown in FIG. 1C. As shown, the object presence and range detection module 12 of the illustrative embodiment comprises a number of subcomponents, namely: an optical bench 77 having an ultra-small footprint for supporting optical and electro-optical components used to implement the subsystem 12; at least one IR laser diode 78 mounted on the optical bench 77, for producing a low power IR laser beam 79; IR beam shaping optics 80, supported on the optical bench for shaping the IR laser beam (e.g. into a pencil-beam like geometry) and directing the same into the central portion of the object detection field 20 defined by the field of view (FOV) of IR light collection/focusing optics 81 supported on the optical bench 77; an amplitude modulation (AM) circuit 82 supported on the optical bench 77, for modulating the amplitude of the IR laser beam produced from the IR laser diode at a frequency $f_0$ (e.g. 75 Mhz) with up to 7.5 milliwatts of optical power; optical detector (e.g. an avalanche-type IR photo-detector) 83, mounted at the focal point of the IR light collection/focusing optics 81, for receiving the IR optical signal reflected off an object within the object detection field, and converting the received optical signal 84 into an electrical signal 85; an amplifier and filter circuit 86, mounted on the optical bench 77, for isolating the $f_0$ signal component and amplifying it; a limiting amplifier 87, mounted on the optical bench, for maintaining a stable signal level; a phase detector 88, mounted on the optical bench 77, for mixing the reference signal component $f_0$ from the AM circuit 82 and the received signal component $f_0$ reflected from the packages and producing a resulting signal which is equal to a DC voltage proportional to the Cosine of the phase difference between the reference and the reflected $f_0$ signals; an amplifier circuit 89, mounted on the optical bench 77, for amplifying the phase difference signal; a received signal strength indicator (RSSI) 90, mounted on the optical bench 77, for producing a voltage proportional to a LOG of the signal reflected from the target object which can be used to provide additional information; a reflectance level threshold analog multiplexer 91 for rejecting information from the weak signals; and a 12 bit A/D converter 92, mounted on the optical bench 77, for converting the DC voltage signal from the RSSI circuit 90 into sequence of time-based range data elements $\{R_{n,i}\}$, taken along nT discrete instances in time, where each range data element $R_{n,i}$ provides a measure of the distance of the object referenced from (i) the IR laser diode 78 to (ii) a point on the surface of the object within the object detection field 20; and range analysis circuitry 93 described below.

In general, the function of range analysis circuitry 93 is to analyze the digital range data from the A/D converter 90 and generate two control activation signals, namely: (i) "an object presence detection" type of control activation signal $A_{1A}$ indicating simply whether an object is presence or absent from the object detection field, regardless of the mode of operation in which the Multi-Mode Illumination Subsystem 14 might be configured; and (ii) "a near-field/far-field" range indication type of control activation signal $A_{1B}$ indicating whether a detected object is located in either the predefined near-field or far-field portions of the object detection field, which correspond to the near-field and far-field portions of the FOV of the Multi-Mode Image Formation and Detection Subsystem 13.

Various kinds of analog and digital circuitry can be designed to implement the IR-based Automatic Object Presence and Range Detection Subsystem 12. Alternatively, this subsystem can be realized using various kinds of range detection techniques as taught in U.S. Pat. No. 6,637,659, and WIPO International Publication No. WO 2005/050390, incorporated herein by reference in their entirely.

In the illustrative embodiment, Automatic Object Presence and Range Detection Subsystem 12 operates as follows. In System Modes of Operation requiring automatic object presence and/or range detection, Automatic Object Presence and Range Detection Subsystem 12 will be activated at system start-up and operational at all times of system operation, typically continuously providing the System Control Subsystem 19 with information about the state of objects within both the far and near portions of the object detection field 20 of the imaging-based symbol reader. In general, this Subsystem detects two basic states of presence and range, and therefore has two basic states of operation. In its first state of operation, the IR-based automatic Object Presence and Range Detection Subsystem 12 automatically detects an object within the near-field region of the FOV 20, and in response thereto generates a first control activation signal which is supplied to the System Control Subsystem 19 to indicate the occurrence of this first fact. In its second state of operation, the IR-based automatic Object Presence and Range Detection Subsystem 12 automatically detects an object within the far-field region of the FOV 20, and in response thereto generates a second control activation signal which is supplied to the System Control Subsystem 19 to indicate the occurrence of this second fact. As will be described in greater detail and throughout this patent specification, these control activation signals are used by the System Control Subsystem 19 during particular stages of the system control process, such as determining (i) whether to activate either the near-field and/or far-field LED illumination arrays, and (ii) how strongly should these LED illumination arrays be driven to ensure quality image exposure at the CMOS image sensing array 22.

Specification of the Mapping of Pixel Data Captured by the Imaging Array into the SDRAM Under the Control of the Direct Memory Access (DMA) Module Within the Microprocessor As shown in FIG. 8, the CMOS image sensing array 22 employed in the digital imaging-based bar code symbol reading device hereof is operably connected to its microprocessor 36 through FIFO 39 (realized by way of a FPGA) and system bus shown in FIG. 2M. As shown, SDRAM 38 is also operably connected to the microprocessor 36 by way of the system bus, thereby enabling the mapping of pixel data captured by the CMOS image sensing array 22 into the SDRAM 38 under the control of the direct memory access (DMA) module within the microprocessor 36.

Referring to FIG. 9, details will now be given on how the bytes of pixel data captured by CMOS image sensing array 22 are automatically mapped (i.e. captured and stored) into the addressable memory storage locations of its SDRAM 38 during each image capture cycle carried out within the hand-supportable imaging-based bar code reading device of the present invention.

In the implementation of the illustrative embodiment, the CMOS image sensing array 22 sends 7-bit gray-scale data bytes over a parallel data connection to FPGA 39 which implements a FIFO using its internal SRAM. The FIFO 39 stores the pixel data temporarily and the microprocessor 36 initiates a DMA transfer from the FIFO (which is mapped to address OXOCOOOOOO, chip select 3) to the SDRAM 38. In general, modern microprocessors have internal DMA modules, and a preferred microprocessor design, the DMA module will contain a 32-byte buffer. Without consuming any CPU cycles, the DMA module can be programmed to read data from the FIFO 39, store read data bytes in the DMA's buffer, and subsequently write the data to the SDRAM 38. Alternatively, a DMA module can reside in FPGA 39 to directly write the FIFO data into the SDRAM 38. This is done by sending a bus request signal to the microprocessor 36, so that the microprocessor 36 releases control of the bus to the FPGA 39 which then takes over the bus and writes data into the SDRAM 38.

Below, a brief description will be given on where pixel data output from the CMOS image sensing array 22 is stored in the SDRAM 38, and how the microprocessor (i.e. implementing a decode algorithm) 36 accesses such stored pixel data bytes. FIG. 9F represents the memory space of the SDRAM 38. A reserved memory space of 1.3 MB is used to store the output of the CMOS image sensing array 22. This memory space is a 1:1 mapping of the pixel data from the CMOS image sensing array 22. Each byte represents a pixel in the image sensing array 22. Memory space is a mirror image of the pixel data from the image sensing array 22. Thus, when the decode program (36) accesses the memory, it is as if it is accessing the raw pixel image of the image sensing array 22. No time code is needed to track the data since the modes of operation of the bar code reader guarantee that the microprocessor 36 is always accessing the up-to-date data, and the pixel data sets are a true representation of the last optical exposure. To prevent data corruption, i.e. new data coming in while old data are still being processed, the reserved space is protected by disabling further DMA access once a whole frame of pixel data is written into memory. The DMA module is re-enabled until either the microprocessor 36 has finished going through its memory, or a timeout has occurred.

During image acquisition operations, the image pixels are sequentially read out of the image sensing array 22. Although one may choose to read and column-wise or row-wise for some CMOS image sensors, without loss of generality, the row-by-row read out of the data is preferred. The pixel image data set is arranged in the SDRAM 38 sequentially, starting at address OXAOEC0000. To randomly access any pixel in the SDRAM 38 is a straightforward matter: the pixel at row y ¼ column x located is at address (OXAOEC0000+y×1280+x).

As each image frame always has a frame start signal out of the image sensing array 22, that signal can be used to start the DMA process at address OXAOEC0000, and the address is continuously incremented for the rest of the frame. But the reading of each image frame is started at address OXAOEC0000 to avoid any misalignment of data. Notably, however, if the microprocessor 36 has programmed the CMOS image sensing array 22 to have a ROI window, then the starting address will be modified to (OXAOEC0000+ 1280×$R_1$), where $R_1$ is the row number of the top left corner of the ROI.

Specification of the Three-Tier Software Architecture of the Hand-Supportable Digital Image-Based Bar Code Reading Device of the Present Invention As shown in FIG. 10, the hand-supportable digital imaging-based bar code symbol reading device of the present invention 1 is provided with a three-tier software architecture comprising the following software modules: (1) the Main Task module, the CodeGate Task module, the Metroset Task module, the Application Events Manager module, the User Commands Table module, the Command Handler module, the Plug-In Controller (Manager) and Plug-In Libraries and Configuration Files, each residing within the Application layer of the software architecture; (2) the Tasks Manager module, the Events Dispatcher module, the Input/Output Manager module, the User Commands Manager module, the Timer Subsystem module, the Input/Output Subsystem module and the Memory Control Subsystem module, each residing within the System Core (SCORE) layer of the software architecture; and (3) the Linux Kernal module, the Linux File System module, and Device Drivers modules, each residing within the Linux Operating System (OS) layer of the software architecture.

While the operating system layer of the imaging-based bar code symbol reader is based upon the Linux operating system, it is understood that other operating systems can be used (e.g. Microsoft Windows, Max OXS, Unix, etc), and that the design preferably provides for independence between the main Application Software Layer and the Operating System Layer, and therefore, enables of the Application Software Layer to be potentially transported to other platforms. Moreover, the system design principles of the present invention provides an extensibility of the system to other future products with extensive usage of the common software components, which should make the design of such products easier, decrease their development time, and ensure their robustness.

In the illustrative embodiment, the above features are achieved through the implementation of an event-driven multi-tasking, potentially multi-user, Application layer running on top of the System Core software layer, called SCORE. The SCORE layer is statically linked with the product Application software, and therefore, runs in the Application Level or layer of the system. The SCORE layer provides a set of services to the Application in such a way that the Application would not need to know the details of the underlying operating system, although all operating system APIs are, of course, available to the application as well. The SCORE software layer provides a real-time, event-driven, OS-independent framework for the product Application to operate. The event-driven architecture is achieved by creating a means for detecting events (usually, but not necessarily, when the hardware interrupts occur) and posting the events to the Application for processing in real-time manner. The event detection and posting is provided by the SCORE software layer. The SCORE layer also provides the product Application with a means for starting and canceling the software tasks, which can be running concurrently, hence, the multi-tasking nature of the software system of the present invention.

Specification of Software Modules Within the SCORE Layer of the System Software Architecture Employed in Imaging-Based Bar Code Reader of the Present Invention The SCORE layer provides a number of services to the Application layer.

The Tasks Manager provides a means for executing and canceling specific application tasks (threads) at any time during the product Application run.

The Events Dispatcher provides a means for signaling and delivering all kinds of internal and external synchronous and asynchronous events When events occur, synchronously or asynchronously to the Application, the Events Dispatcher dispatches them to the Application Events Manager, which acts on the events accordingly as required by the Application based on its current state. For example, based on the particular event and current state of the application, the Application Events Manager can decide to start a new task, or stop currently running task, or do something else, or do nothing and completely ignore the event.

The Input/Output Manager provides a means for monitoring activities of input/output devices and signaling appropriate events to the Application when such activities are detected.

The Input/Output Manager software module runs in the background and monitors activities of external devices and user connections, and signals appropriate events to the Application Layer, which such activities are detected. The Input/Output Manager is a high-priority thread that runs in parallel with the Application and reacts to the input/output signals coming asynchronously from the hardware devices, such as serial port, user trigger switch 2C, bar code reader, network connections, etc. Based on these signals and optional input/output requests (or lack thereof) from the Application, it generates appropriate system events, which are delivered through the Events Dispatcher to the Application Events Manager as quickly as possible as described above.

The User Commands Manager provides a means for managing user commands, and utilizes the User Commands Table provided by the Application, and executes appropriate User Command Handler based on the data entered by the user.

The Input/Output Subsystem software module provides a means for creating and deleting input/output connections and communicating with external systems and devices The Timer Subsystem provides a means of creating, deleting, and utilizing all kinds of logical timers.

The Memory Control Subsystem provides an interface for managing the multi-level dynamic memory with the device, fully compatible with standard dynamic memory management functions, as well as a means for buffering collected data. The Memory Control Subsystem provides a means for thread-level management of dynamic memory. The interfaces of the Memory Control Subsystem are fully compatible with standard C memory management functions. The system software architecture is designed to provide connectivity of the device to potentially multiple users, which may have different levels of authority to operate with the device.

The User Commands Manager, which provides a standard way of entering user commands, and executing application modules responsible for handling the same. Each user command described in the User Commands Table is a task that can be launched by the User Commands Manager per user input, but only if the particular user's authority matches the command's level of security.

The Events Dispatcher software module provides a means of signaling and delivering events to the Application Events Manager, including the starting of a new task, stopping a currently running task, or doing something or nothing and simply ignoring the event.

Technical details relating to these software modules within the SCORE layer of the system are described in WIPO International Publication No. WO 2005/050390, supra.

Specification of Software Modules Within the
Application Layer of the System Software
Architecture Employed in Imaging-Based Bar Code
Reader of the Present Invention The image processing software employed within the system hereof performs its bar code reading function by locating and recognizing the bar codes within the frame of a captured image comprising pixel data. The modular design of the image processing software provides a rich set of image processing functions, which could be utilized in the future for other potential applications, related or not related to bar code symbol reading, such as: optical character recognition (OCR) and verification (OCV); reading and verifying directly marked symbols on various surfaces; facial recognition and other biometrics identification; etc.

The CodeGate Task, in an infinite loop, performs the following task. It illuminates a "thin" narrow horizontal area at the center of the field-of-view (FOV) and acquires a digital image of that area. It then attempts to read bar code symbols represented in the captured frame of image data using the image processing software facilities supported by the Image-Processing Bar Code Symbol Reading Subsystem 17 of the present invention to be described in greater detail hereinafter. If a bar code symbol is successfully read, then Subsystem 17 saves the decoded data in the special Decode Data Buffer. Otherwise, it clears the Decode Data Buffer. Then, it continues the loop. The CodeGate Task routine never exits on its own. It can be canceled by other modules in the system when reacting to other events. For example, when a user pulls the trigger switch 2C, the event TRIGGER_ON is posted to the application. The Application software responsible for processing this event, checks if the CodeGate Task is running, and if so, it cancels it and then starts the Main Task. The CodeGate Task can also be canceled upon OBJECT_DETECT_OFF event, posted when the user moves the bar code reader away from the object, or when the user moves the object away from the bar code reader. The CodeGate Task routine is enabled (with Main Task) when "semi-automatic-triggered" system modes of programmed operation (Modes of System Operation Nos. 11-14 in FIGS. 11A-11B) are to be implemented on the illumination and imaging platform of the present invention.

The Narrow-Area Illumination Task is a simple routine which is enabled (with Main Task) when "manually-triggered" system modes of programmed operation (Modes of System Operation Nos. 1-5 in FIGS. 11A-11B) are to be implemented on the illumination and imaging platform of the present invention. However, this routine is never enabled simultaneously with CodeGate Task.

Depending the System Mode in which the imaging-based bar code symbol reader is configured, Main Task will typically perform differently. For example, when the imaging-based bar code symbol reader is configured in the Programmable Mode of System Operation No. 12 (i.e. Semi-Automatic-Triggered Multiple-Attempt 1D/2D Single-Read Mode) to be described in greater detail hereinafter, the Main Task first checks if the Decode Data Buffer contains data decoded by the CodeGate Task. If so, then it immediately sends the data out to the user by executing the Data Output procedure and exits. Otherwise, in a loop, the Main Task does the following: it illuminates an entire area of the field-of-view and acquires a full-frame image of that area. It attempts to read a bar code symbol the captured image. If it successfully reads a bar code symbol, then it immediately sends the data out to the user by executing the Data Output procedure and exits. Otherwise, it continues the loop. Notably, upon successful read and prior to executing the Data Output procedure, the Main Task analyzes the decoded data for a "reader programming" command or a sequence of commands. If necessary, it executes the MetroSelect functionality. The Main Task can be canceled by other modules within the system when reacting to other events. For example, the bar code reader of the present invention can be re-configured using standard Metrologic configuration methods, such as MetroSelec® and MetroSet®. The MetroSelect functionality is executed during the Main Task.

The MetroSet functionality is executed by the special MetroSet Task. When the Focus RS232 software driver detects a special NULL-signal on its communication lines, it posts the METROSET_ON event to the Application. The Application software responsible for processing this event starts the MetroSet task. Once the MetroSet Task is completed, the scanner returns to its normal operation.

The function of the Plug-In Controller (i.e. Manager) is to read configuration files and find plug-in libraries within the Plug-In and Configuration File Library, and install plug-ins into the memory of the operating system, which returns back an address to the Plug-In Manager indicating where the plug-in has been installed, for future access. As will be described in greater detail hereinafter, the Plug-In Development Platform support development of plug-ins that enhance, extend and/or modify the features and functionalities of the image-processing based bar code symbol reading system, and once developed, to upload developed plug-ins within the file system of the operating system layer, while storing the addresses of such plug-ins within the Plug-In and Configuration File Library in the Application Layer. Details regarding the development and installation of plug-ins for the computing platform of the present invention are disclosed in Applicant's International Patent Application No. PCT/US2006/048148 filed Dec. 18, 2006, and incorporated herein by reference in its entirety.

Modes of System Operation Nos. 6-10 can be readily implemented on the illumination and imaging platform of the present invention by making software system modifications, including for example, the addition of an Auto-Read Task routine to the system routine library (wherein Auto-Read Task could be an infinite loop routine where the primary operations of CodeGate Task and Main Task are sequenced together to attempt first automatic narrow-area illumination and image capture and processing, followed by automatic wide-area illumination and image capture and processing, and repeating the wide-area operation in an infinite loop, until the object is no longer detected within a particular predetermined time period.

Operating System Layer Software Modules Within the Application Layer of the System Software Architecture Employed in Imaging-Based Bar Code Reader of the Present Invention The Devices Drivers software modules, which includes trigger drivers, provide a means for establishing a software connection with the hardware-based manually-actuated trigger switch 2C employed on the imaging-based device, an image acquisition driver for implementing image acquisition functionality aboard the imaging-based device, and an IR driver for implementing object detection functionality aboard the imaging-based device.

Typically, the Device Drive software modules include: trigger drivers for establishing a software connection with the hardware-based manually-actuated trigger switch 2C employed on the imaging-based bar code symbol reader of the present invention; an image acquisition driver for implementing image acquisition functionality aboard the imaging-based bar code symbol reader; and an IR driver for implementing object detection functionality aboard the imaging-based bar code symbol reader.

Basic System Operations Supported by the Three-Tier Software Architecture of the Hand-Supportable Digital Imaging-Based Bar Code Reading Device of the Present Invention The basic systems operations supported by the three-tier software architecture of the digital imaging-based bar code symbol reader of the present invention are schematically depicted. Notably, these basic operations represent functional modules (or building blocks) with the system architecture of the present invention, which can be combined in various combinations to implement the numerous Programmable Modes of System Operation described in WIPO International Publication No. WO 2005/050390, supra, using the image acquisition and processing platform disclosed herein Specification of Symbologies and Modes Supported by the Multi-Mode Bar Code Symbol Reading Subsystem Module Employed Within the Hand-Supportable Digital Image-Based Bar Code Reading Device of the Present Invention The Multi-Mode Bar Code Symbol Reading Subsystem 17 employed within the hand-supportable digital imaging-based bar code symbol reading device of the present invention supports bar code symbologies including: Code 128; Code 39; 12of5; Code93; Codabar; UPC/EAN; Telepen; UK-Plessey; Trioptic; Matrix 2of5; Ariline 2of5; Straight 2of5; MSI-Plessey; Code11; and PDF417.

Specification of the Various Modes of Operation in the Multi-Mode Bar Code Symbol Reading Subsystem of the Present Invention As shown in FIG. 2A2, the Multi-Mode Image-Processing Based Bar Code Symbol Reading Subsystem 17 of the illustrative embodiment supports five primary modes of operation, namely: the Automatic Mode of Operation; the Manual Mode of Operation; the ROI-Specific Mode of Operation; the No-Finder Mode of Operation; and Omniscan Mode of Operation. As described in detail in WIPO International Publication No. WO 2005/050390, supra, these modes of operation can be used during the lifecycle of the image-processing based bar code reading process of the present invention.

Programmable Modes of Bar Code Reading Operation Within the Hand-Supportable Digital Image-Based Bar Code Reading Device of the Present Invention As indicated in FIGS. 11A and 11B, the imaging-based bar code symbol reader of the present invention has at least seventeen (17) Programmable System Modes of Operation, namely: Programmed Mode of System Operation No. 1—Manually-Triggered Single-Attempt 1D Single-Read Mode Employing the No-Finder Mode of the Multi-Mode Bar Code Reading Subsystem; Programmed Mode Of System Operation No. 2—Manually-Triggered Multiple-Attempt 1D Single-Read Mode Employing the No-Finder Mode of the Multi-Mode Bar Code Reading Subsystem; Programmed Mode Of System Operation No. 3—Manually- Triggered Single-Attempt 1D/2D Single-Read Mode Employing the No-Finder Mode And The Automatic Or Manual Modes of the Multi-Mode Bar Code Reading Subsystem; Programmed Mode of System Operation No. 4—Manually-Triggered Multiple-Attempt 1D/2D Single-Read Mode Employing the No-Finder Mode And The Automatic Or Manual Modes of the Multi-Mode Bar Code Reading Subsystem; Programmed Mode of System Operation No. 5—Manually-Triggered Multiple-Attempt 1D/2D Multiple-Read Mode Employing the No-Finder Mode And The Automatic Or Manual Modes of the Multi-Mode Bar Code Reading Subsystem; Programmed Mode of System Operation No. 6—Automatically-Triggered Single-Attempt 1D Single-Read Mode Employing The No-Finder Mode Of the Multi-Mode Bar Code Reading Subsystem; Programmed Mode of System Operation No. 7—Automatically-Triggered Multi-Attempt 1D Single-Read Mode Employing The No-Finder Mode Of the Multi-Mode Bar Code Reading Subsystem; Programmed Mode of System Operation No. 7—Automatically-Triggered Multi-Attempt 1D/2D Single-Read Mode Employing The No-Finder Mode and Manual and/or Automatic Modes Of the Multi-Mode Bar Code Reading Subsystem; Programmed Mode of System Operation No. 9—Automatically-Triggered Multi-Attempt 1D/2D Multiple-Read Mode Employing The No-Finder Mode and Manual and/or Automatic Modes Of the Multi-Mode Bar Code Reading Subsystem; Programmable Mode of System Operation No. 10—Automatically-Triggered Multiple-Attempt 1D/2D Single-Read Mode Employing The Manual, Automatic or Omniscan Modes Of the Multi-Mode Bar Code Reading Subsystem; Programmed Mode of System Operation No. 11—Semi-Automatic-Triggered Single-Attempt 1D/2D Single-Read Mode Employing The No-Finder Mode And The Automatic Or Manual Modes Of the Multi-Mode Bar Code Reading Subsystem; Programmable Mode of System Operation No. 12—Semi-Automatic-Triggered Multiple-Attempt 1D/2D Single-Read Mode Employing The No-Finder Mode And The Automatic Or Manual Modes Of the Multi-Mode Bar Code Reading Subsystem; Programmable Mode of Operation No. 13—Semi-Automatic-Triggered Multiple-Attempt 1D/2D Multiple-Read Mode Employing The No-Finder Mode And The Automatic Or Manual Modes Of the Multi-Mode Bar Code Reading Subsystem; Programmable Mode of Operation No. 14—Semi-Automatic-Triggered Multiple-Attempt 1D/2D Multiple-Read Mode Employing The No-Finder Mode And The Omniscan Modes Of the Multi-Mode Bar Code Reading Subsystem; Programmable Mode of Operation No. 15—Continuously-Automatically-Triggered Multiple-Attempt 1D/2D Multiple-Read Mode Employing The Automatic, Manual Or Omniscan Modes Of the Multi-Mode Bar Code Reading Subsystem; Programmable Mode of System Operation No. 16—Diagnostic Mode Of Imaging-Based Bar Code Reader Operation; and Programmable Mode of System Operation No. 17—Live Video Mode Of Imaging-Based Bar Code Reader Operation.

Preferably, these Modes Of System Operation can programmed by reading a sequence of bar code symbols from a programming menu as taught, for example, in U.S. Pat. No. 6,565,005, which describes a bar code scanner programming technology developed by Metrologic Instruments, Inc., and marketed under the name MetroSelect® Single Line Configuration Programming Method.

These Programmable System Modes of Operation will be described in detail hereinbelow. Alternatively, the MetroSet® Graphical User Interface (GUI) can be used to view and change configuration parameters in the bar code symbol reader using a PC. Alternatively, a Command Line Interface (CLI) may also be used to view and change configuration parameters in the bar code symbol reader.

Each of these programmable modes of bar code reader operation are described in WIPO International Publication No. WO 2005/050390, supra, with reference to other components of the system that are configured together to implement the same in accordance with the principles of the present invention.

Operating the Hand-Supportable Image-Processing Bar Code Symbol Reader of the Present Invention in a Manually-Triggered Mode of Operation The hand-supportable image-processing bar code symbol reader of the present invention can be programmed to operate in any one of a number of different "manually-triggered" modes of system operation, as identified in Nos. 1 through 5. However, during each of these manually-triggered modes of operation, the image-processing bar code symbol reader controls and coordinates its subsystem components in accordance with a generalized method of manually-triggered operation.

In particular, upon automatic detection of an object within its IR-based object detection field, the IR-based object presence detection subsystem automatically generates an object detection event, and in response thereto, the multi-mode LED-based illumination subsystem automatically produces a narrow-area field of narrow-band illumination within the FOV of said image formation and detection subsystem.

Then, upon the generation of the trigger event by the user depressing the manually-actuatable trigger, the following operations are automatically carried out:

(i) the image capturing and buffering subsystem automatically captures and buffers a narrow-area digital image of the object using the narrow-area field of narrow-band illumination within the FOV, during the narrow-area image capture mode of said multi-mode image formation and detection subsystem; and (ii) the image processing bar code symbol reading subsystem automatically processes said 1D digital image attempts processes the narrow-area digital image in effort to read a 1D bar code symbol represented therein, and upon successfully decoding a 1D bar code symbol therein, automatically produces symbol character data representative thereof.

Then, upon said multi-mode image processing bar code symbol reading subsystem failing to successfully read the 1D bar code symbol represented in the narrow-area digital image, the following operations are automatically carried out:

(i) the multi-mode LED-based illumination subsystem automatically produces a wide-area field of narrow-band illumination within the FOV of the multi-mode image formation and detection subsystem, (ii) the image capturing and buffering subsystem captures and buffers a wide-area digital image during the wide-area image capture mode of the image capturing and buffering subsystem, and (iii) the image processing bar code symbol reading subsystem processes the wide-area digital image in effort to read a 1D or 2D bar code symbol represented therein, and upon successfully decoding a 1D or 2D bar code symbol therein, automatically produces symbol character data representative thereof.

Second Illustrative Embodiment of Digital Imaging-Based Bar Code Symbol Reading Device of the Present Invention Alternatively, the imaging-based bar code symbol reading device of the present invention can have virtually any type of form factor that would support the reading of bar code symbols at diverse application environments. One alternative form factor for the bar code symbol reading device of the present invention is shown in FIGS. 20A through 20C, wherein a portable digital imaging-based bar code symbol reading device of the present invention 1" is shown from various perspective views, while arranged in a Presentation Mode (i.e. configured in Programmed System Mode No. 12).

Second Illustrative Embodiment of the Digital Imaging-Based Bar Code Reading Device of the Present Invention As shown in FIG. 13, the digital imaging-based bar code symbol reading device of the present invention 1', 1" can also be realized in the form of a Digital Imaging-Based Bar Code Reading Engine 100 that can be readily integrated into various kinds of information collection and processing systems. Notably, trigger switch 2C shown in FIG. 13 is symbolically represented on the housing of the engine design, and it is understood that this trigger switch 2C or functionally equivalent device will be typically integrated with the housing of the resultant system into which the engine is embedded so that the user can interact with and actuate the same. Such Engines according to the present invention can be realized in various shapes and sizes and be embedded within various kinds of systems and devices requiring diverse image capture and processing functions as taught herein.

Third Illustrative Embodiment of a Wireless Bar Code-Driven Portable Data Terminal (PDT) System of the Present Invention FIGS. 14, 15, and 16 show a Wireless Bar Code-Driven Portable Data Terminal (PDT) System 140 according to the present invention which comprises: a Bar Code Driven PDT 150 embodying the Digital Imaging-Based Bar Code Symbol Reading Engine of the present invention 100, described herein; and a cradle-providing Base Station 155.

As shown in FIGS. 17 and 18, the Digital Imaging-Based Bar Code Symbol Reading Engine 100 can be used to read bar code symbols on packages and the symbol character data representative of the read bar code can be automatically transmitted to the cradle-providing Base Station 155 by way of an RF-enabled 2-way data communication link 170. At the same time, robust data entry and display capabilities are provided on the PDT 150 to support various information based transactions that can be carried out using System 140 in diverse retail, industrial, educational and other environments.

As shown in FIG. 23, the Wireless Bar Code Driven Portable Data Terminal System 140 comprises: a hand-supportable housing 151; Digital Imaging-Based Bar Code Symbol Reading Engine 100 as shown in FIG. 21, and described herein above, mounted within the head portion of the hand-supportable housing 151; a user control console 151A; a high-resolution color LCD display panel 152 and drivers mounted below the user control console 151A and integrated with the hand-supportable housing, for displaying, in a real-time manner, captured images, data being entered into the system, and graphical user interfaces (GUIs) generated by the end-user application running on the virtual machine of the wireless PDT; and PDT computing subsystem 180 contained within the PDT housing, for carrying out system control operations according to the requirements of the end-user application to be implemented upon the hardware and software platforms of the wireless PDT 2B of this illustrative embodiment.

As shown in block schematic diagram of FIG. 17, a design model for the Wireless Hand-Supportable Bar Code Driven Portable Data Terminal System 140 shown in FIGS. 31 and 32, and its cradle-supporting Base Station 155 interfaced with possible host systems 173 and/or networks 174, comprises a number of subsystems integrated about a system bus, namely: a data transmission circuit 156 for realizing the PDT side of the electromagnetic-based wireless 2-way data communication link 170; program memory (e.g. DRAM) 158; non-volatile memory (e.g. SRAM) 159; Digital Imaging-Based Bar Code Symbol Reading Engine 100 for optically capturing narrow and wide area images and reading bar code symbols recognized therein; a manual data entry device such as a membrane-switching type keypad 160; LCD panel 152; an LCD controller 161; LCD backlight brightness control circuit 162; and a system processor 163 integrated with a systems bus (e.g. data, address and control buses). Also, a battery power supply circuit 164 is provided for supplying regulated power supplies to the various subsystems, at particular voltages determined by the technology used to implement the PDT device.

As shown in FIG. 17, the Base Station 155 also comprises a number of integrated subsystems, namely: a data receiver circuit 165 for realizing the base side of the electromagnetic-based wireless 2-way data communication link 170; a data transmission subsystem 171 including a communication control module; a base station controller 172 (e.g. programmed microcontroller) for controlling the operations of the Base Station 155. As shown, the data transmission subsystem 171 interfaces with the host system 173 or network 174 by way of the USB or RS232 communication interfaces, TCP/IP, Apple-Talk or the like, well known in the art. Taken together, data transmission and reception circuits 156 and 165 realize the wireless electromagnetic 2-way digital data communication link 170 employed by the wireless PDT of the present invention.

Notably, Wireless Hand-Supportable Bar Code Driven Portable Data Terminal System 140, as well as the POS Digital Imaging-Based Bar Code Symbol Reader 1" shown in FIGS. 12A through 12C, each have two primary modes of operation: (1) a hands-on mode of operation, in which the PDT 150 or POS Reader 1" is removed from its cradle and used as a bar code driven transaction terminal or simply bar code symbol reader; and (2) a hands-free mode of operation, in which the PDT 150 or POS Reader 1" remains in its cradle-providing Base Station 155, and is used a presentation type bar code symbol reader, as required in most retail point-of-sale (POS) environments. Such hands-on and hands-free modes of system operation are described in greater detail in WIPO International Publication No. WO 2005/050390, supra.

In such hands-on and hands-free kinds of applications, the trigger switch 2C employed in the digital imaging-based bar code symbol reading device of the present invention can be readily modified, and augmented with a suitable stand-detection mechanism, which is designed to automatically configure and invoke the PDT 150 and its Engine 100 into its Presentation Mode (i.e. System Mode of Operation No. 12) or other suitable system mode when the PDT is placed in its Base Station 155 as shown in FIG. 24. Then when the PDT 150 is picked up and removed from its cradling supporting Base Station 155 as shown in FIGS. 22 and 23, the trigger switch 2C and stand-detection mechanism, arrangement can be arranged so as to automatically configure and invoke the PDT 150 and its Engine 100 into a suitable hands-on supporting mode of system operation to enable hands-on mode of operation.

Similarly, the trigger switch 2C employed in the POS Digital Imaging Bar Code Symbol Reading Device 1" can be readily modified, and augmented with stand-detection mechanism, which is designed to automatically configure and invoke the POS Reader 1" into its Presentation Mode (i.e. System Mode of Operation No. 12) or other suitable system mode, when the Reader 1" is resting on a countertop surface, as shown in FIGS. 12A and 12B. Then when the POS Reader 1" is picked up off the countertop surface, for use in its hands-on mode of operation, the trigger switch 2C and stand-detection mechanism, arrangement will automatically configure and invoke Reader 1" into a suitable hands-on supporting mode of system operation, as shown in FIG. 12C. In such embodiments, the stand-detection mechanism can employ a physical contact switch, or IR object sensing switch, which is actuated then the device is picked up off the countertop surface. Such mechanisms will become apparent in view of the teachings disclosed herein.

Adaptive Method of Controlling Object Illumination and Image Capturing Operations Within the Multi-Mode Image-Processing Based Bar Code Symbol Reader System of the Illustrative Embodiment of the Present Invention In FIGS. 6D through 6E2, the Global Exposure Control Method of the present invention was described in connection with the automatic illumination measurement and control subsystem of the present invention. Also, an Enhanced Auto-Illumination Control Scheme was described for use in connection with the automatic illumination measurement and control subsystem of the present invention, wherein software-based illumination metering is employed. However, while these techniques provide numerous advantages and benefits, there are many end-user applications and operating environments in which it would be beneficial for the system of the present invention to provide a higher degree of adaptability to ambient illumination levels having great dynamic range. Such challenges are addressed by the adaptive control method set forth in FIGS. 19A and 19B, wherein object illumination and image capturing operations are dynamically controlled within the multi-mode image-processing based bar code symbol reader system of the present invention, by analyzing the exposure quality of captured digital images and reconfiguring system control parameters based on the results of such exposure quality analysis. FIGS. 19C through 19E illustrate the three basic modes of operation of the CMOS image sensing array employed in the illustrative embodiment, (i.e. Single Frame Shutter Mode, Rolling Shutter Mode and Video Mode), which are dynamically and automatically controlled within the system in accordance with the adaptive system control method of the present invention.

The details of the adaptive system control method of the present invention will be generally described below in the content of a multi-mode image-capturing and processing system with bar code reading capabilities.

As indicated at Block A in FIG. 19A, upon the occurrence of the power-up" event within the system (i.e. STEP 0), the following three basic operations are performed:
(a) Initialize System using set default System Control Parameters (SCP), such as:
(1) shutter mode of the image sensing array (e.g. Single Frame Shutter Mode illustrated in FIG. 27C, and Rolling Shutter Mode illustrated in FIG. 19D);
(2) electronic gain of image sensing array;
(3) programmable exposure time for each block of pixels in the image sensing array;
(4) illumination mode (e.g., off, continuous and strobe/flash);
(5) automatic illumination control (e.g. ON or OFF);
(6) illumination field type (e.g. narrow-area near-field illumination, wide-area far-field illumination, narrow-area field of illumination, and wide-area field of illumination);
(7) image capture mode (e.g. narrow-area image capture, and wide-area image capture);
(8) image capture control (e.g. single frame, video frames);
(9) image processing mode; and
(10) automatic object detection mode (e.g. ON or OFF).
(b) Reset the SCP Reconfiguration (SCPR) flag to the value "FALSE".
(c) Calculate and Set Exposure Quality Threshold (EQT) Parameters or criteria (e.g. brightness level, image saturation, etc.)

Then, at Block B, upon the occurrence of the "trigger signal" event within the system, the following control process is executed within the system as generally described below:
STEP 1: If the system needs to be reconfigured (i.e. SCPR flag=TRUE), then configure the system using new SCPs. Otherwise, maintain the system using current SCPs.
STEP 2: Illuminate an object using the method of illumination indicated by the Illumination Mode parameter, and capture a digital image thereof.
STEP 3: Analyze the captured digital image for exposure quality.

In connection with the practice of the present invention, exposure quality is a quantitative measure of the quality of the image brightness. Setting system control parameters (SCPs), such as the type and the intensity of the object illumination, value of the image sensor gain, and the type and the value of the image sensor exposure parameters, will affect the image brightness. The value of the exposure quality can be presented in the range from 0 to 100, with 0 being an extremely poor exposure that would generally be fruitless to process (in cases when the image is too dark or too bright), and 100 being an excellent exposure. It is almost always worthwhile to process an image when the value of the exposure quality is close to 100. Conversely, it is almost never worthwhile to process an image when the value of the exposure quality is as low as 0. As will be explained in greater detail below, for the latter case where the computed exposure quality is as low as 0, the system control parameters (SCPs) will need to be dynamically re-evaluated and set to the proper values in accordance with the principles of the present invention.
STEP 4: If the exposure quality measured in STEP 3 does not satisfy the Exposure Quality Threshold (EQT) parameters set in STEP 0, then calculate new SCPs for the system and set the SCPR flag to TRUE indicating that system must be reconfigured prior to acquiring a digital image during the next image acquisition cycle. Otherwise, maintain the current SCPs for the system.
STEP 5: If barcode decoding is required in the application at hand, then attempt to process the digital image and decode a barcode symbol represented therein.

STEP 6: If barcode decoding fails, or if barcode decoding was not required but the exposure quality did not satisfy the Exposure Quality Threshold parameters, go to STEP 1.

STEP 7: If barcode decoding succeeded, then transmit results to the host system.

STEP 8: If necessary, transmit the digital image to the host system, or store the image in internal memory.

STEP 9: EXIT.

Notably, the system control process is intended for practice during any "system mode" of any digital image capture and processing system, including the bar code symbol reader of the illustrative embodiments, with its various modes of system operation described in FIGS. 11A and 11B. Also as this control method is generally described in FIGS. 19A and 19B, it is understood that its principles will be used to modify particular system control processes that might be supported in any particular digital image capture and processing system. The salient features of this adaptive control method involve using (i) automated real-time analysis of the exposure quality of captured digital images, and (ii) automated reconfiguring of system control parameters (particularly illumination and exposure control parameters) based on the results of such exposure quality analysis, so as to achieve improved system functionality and/or performance in diverse environments.

At this juncture, it will be helpful to describe how the adaptive control process of FIGS. 19A and 19B can be practiced in systems having diverse modes of "system operation" as well as "subsystem operation", as in the case of the multi-mode image-processing bar code reading system of the illustrative embodiment. For illustration purposes, it will helpful to consider this bar code symbol reading system when it is configured with system control parameters (SCPs) associated with the Programmed Modes of System Operation Nos. 8 through 12. In any of these Programmed Modes of System Operation, in response to a "trigger event" (automatically or manually generated), the system will be able to automatically generate, (i) a narrow-area field of illumination during the narrow-area image capture mode of the system; and if the system fails to read a bar code symbol reading during this mode, then the system will automatically generate (ii) a wide-area field of illumination during its wide-area image capture mode. In the context of such modes of system operation, the adaptive control method described in FIGS. 19A and 19B will now be described below as an illustrative embodiment of the control method. It is understood that there are many ways to practice this control method, and in each instance, a system with different operation or behavior can and will typically result.

For illustrative purposes, two (2) different modes of system operation will be considered below in detail to demonstrate the breathe of applicability of the adaptive system control method of the present invention.

Case 1: System Operated in Programmed Mode of System Operation No. 8: Automatically-Triggered Multi-Attempt 1D/2D Single-Read Mode Employing The No-Finder and Manual and/or Automatic Modes of Operation In the first example, upon "power up" of the system, at STEP 0, the system control parameters (SCPs) will be configured to implement the selected Programmed Mode of System Operation. For System Mode No. 8, the SCPs would be initially configured as follows:

(1) the shutter mode parameter will be set to the "single frame shutter mode" (illustrated in FIG. 19C, for implementing the Global Illumination/Exposure Method of the present invention described in FIGS. 6D through 6E2);

(2) the electronic gain of the image sensor will be set to a default value determined during factory calibration;

(3) the exposure time for blocks of image sensor pixels will be set to a default determined during factory calibration;

(4) the illumination mode parameter will be set to "flash/strobe";

(5) the automatic illumination control parameter will be set to "ON";

(6) the illumination field type will be set to "narrow-area field";

(7) the image capture mode parameter will be set to "narrow-area image capture";

(8) the image capture control parameter will be set to "single frame";

(9) the image processing mode will be set, for example, to a default value; and

(10) the automatic object detection mode will be set to ON.

Also, the SCPR flag will be set to its FALSE value.

Upon the occurrence of a trigger signal from the system (e.g. generated by automatic object detection by IR object presence and range detection subsystem in System Mode No. 8-10, or by manually pulling the activation switch in System Modes 11-12), the system will reconfigure itself only if the SCPR flag is TRUE; otherwise, the system will maintain its current SCPs. During the first pass through STEP 1, the SCPR flag will be false, and therefore the system will maintain its SCPs at their default settings.

Then at STEP 2 in FIG. 19A, the object will be illuminated within a narrow-field of LED-based illumination produced by the illumination subsystem, and a narrow-area digital image will be captured by the image formation and detection subsystem.

At STEP 3 in FIG. 19B, the narrow-area digital image will be analyzed for exposure quality (e.g. brightness level, saturation etc.).

At STEP 4, if the measured/calculated exposure quality values do not satisfy the exposure quality threshold (EQT) parameters, then the system recalculates new SCPs and sets the SCPR flag to TRUE, indicating that the system must be reconfigured prior to acquiring a digital image during the next image acquisition cycle. Otherwise, the SCPs are maintained by the system.

At STEP 5, the system attempts to read a 1D bar code symbol in the captured narrow-area image.

At STEP 6, if the system is incapable of reading the bar code symbol (i.e. decoding fails), then the system returns to STEP 1 and reconfigures its SCPs if the SCPR flag is set to TRUE (i.e. indicative of unsatisfactory exposure quality in the captured image). In the case of reconfiguration, the system might reset the SCPs as follows:

(1) the shutter mode parameter—set to "Rolling Shutter Mode" illustrated in FIG. 19D;

(2) the electronic gain of the image sensor—set to the value calculated during STEP 4;

(3) the exposure time for blocks of image sensor pixels—set to a values determined during STEP 4;

(4) the illumination mode parameter—set to "off";

(5) the automatic illumination control parameter will be set to "OFF";

(6) the illumination field type will be set to "narrow-area field";

(7) the image capture mode parameter will be set to "narrow-area image capture";

(8) the image capture control parameter will be set to "single frame";

(9) the image processing mode will be set to the default value; and

(10) the automatic object detection mode will be set to ON.

Then at STEPS 2-4, the system captures a second narrow-area image using ambient illumination and the image sensing array configured in its rolling shutter mode (illustrated in FIG. 19D), and recalculates Exposure Quality Threshold Parameters and if the exposure quality does not satisfy the current Exposure Quality Threshold Parameters, then the system calculates new SCPs (including switching to the wide-area image capture mode, and possibly) and sets the SCPR flag to TRUE. Otherwise, the system maintains the SCPs, and proceeds to attempt to decode a bar code symbol in the narrow-area digital image captured using ambient illumination.

If at STEPS 5 and 6, bar code decoding is successful, then at STEP 7 the system transmits the results (i.e. symbol character data) to the host the system, and/or at STEP 8, transmits the captured digital image to the host system for storage or processing, or to internal memory for storage, and then exits the control process at STEP 9.

If at STEPS 5 and 6 in Block B2 in FIG. 19B, bar code decoding fails, then the system returns to STEP 1, and reconfigures for wide-area illumination and image capture. If while operating in its narrow-area illumination and image capture modes of operation, the image captured by the system had an "exposure quality" which did not satisfy the Exposure Quality Threshold Parameters and indicated that the light exposure was still too bright and saturated, and the recalculated SCPs required switching to a new level of electronic gain, to reduce the exposure brightness level of the analyzed image, then at STEP 1 the SCPs are reconfigured using the SCPs previously computed at STEP 4. Thereafter, the object is illuminated with ambient illumination and captured at STEP 2, and at STEP 3, the captured image is analyzed for exposure quality, as described above. At STEP 4, the exposure quality measured in STEP 3 is compared with the Exposure Quality Threshold parameters, and if it does not satisfy these parameters, then new SCPs are calculated and the SCPR flag is set to TRUE. Otherwise the system maintains the SCPs using current SCPs. At STEPs 5 and 6, bar code decoding is attempted, and if it is successful, then at STEPS 7 and 8, symbol character data and image data are transmitted to the host system, and then the system exits the control process at STEP 9. If bar code decoding fails, then the system returns to STEP 1 to repeat STEPS within Blocks B1 and B2 of FIGS. 19A and 19B, provided that the trigger signal is still persistence. During this second pass through the control loop of Blocks B1 and B2, the system will reconfigure the system as determined by the exposure quality analysis performed at STEP B1, and calculations performed at STEP 4. Notably, such calculations could involve calculating new SCPs that require activating system modes using wide-area LED illumination during the wide-area image capture mode, that is, if analysis of the facts may require, according to the adaptive control process of the present invention. Recycling this control loop will reoccur as long as a bar code symbol has not been successfully read, and the trigger signal is persistently generated.

Case 2: Programmable Mode of System Operation No. 17: Live Video Mode of Imaging Based Bar Code Reader Operation In this second example, upon "power up" of the system, at STEP 0, the system control parameters (SCPs) will be configured to implement the selected Programmed Mode of System Operation. For System Mode No. 17, wherein the digital imaging system of the present invention might be used as a POS-based imager for reading bar code symbols, the SCPs would be initially configured as follows:

(1) the shutter mode parameter will be set to the "Video Mode" (illustrated in FIG. 2E);

(2) the electronic gain of the image sensor will be set to a default value determined during factory calibration;

(3) the exposure time for blocks of image sensor pixels will be set to a default determined during factory calibration;

(4) the illumination mode parameter will be set to "continuous";

(5) the automatic illumination control parameter will be set to "ON";

(6) the illumination field type will be set to "wide-area field";

(7) the image capture mode parameter will be set to "wide-area image capture";

(8) the image capture control parameter will be set to "video frame";

(9) the image processing mode will be set, for example, to a default value; and

(10) the automatic object detection mode will be set to ON.

Also, the SCPR flag will be set to its FALSE value.

Upon the occurrence of a trigger signal from the system (i.e. generated by automatic object detection by IR object presence and range detection subsystem), the system will reconfigure itself only if the SCPR flag is TRUE; otherwise, the system will maintain its current SCPs. During the first pass through STEP 1, the SCPR flag will be FALSE, and therefore the system will maintain its SCPs at their default settings.

Then at STEP 2 in FIG. 19A, the object will be continuously illuminated within a wide-field of LED-based illumination produced by the illumination subsystem, and a wide-area digital image will be captured by the image formation and detection subsystem, while the CMOS image sensing array is operated in its Video Mode of operation.

At STEP 3 in FIG. 19B, the wide-area digital image will be analyzed for exposure quality (e.g. brightness level, saturation etc.).

At STEP 4, if the measured/calculated exposure quality values do not satisfy the exposure quality threshold (EQT) parameters, then the system recalculates new SCPs and sets the SCPR flag to TRUE, indicating that the system must be reconfigured prior to acquiring a digital image during the next image acquisition cycle while the CMOS sensing array is operated in its Video Mode. Otherwise, the SCPs are maintained by the system.

At STEP 5, the system attempts to read a 1D bar code symbol in the captured wide-area digital image.

At STEP 6, if the system is incapable of reading the bar code symbol (i.e. decoding fails), then the system returns to STEP 1 and reconfigures its SCPs if the SCPR flag is set to TRUE (i.e. indicative of unsatisfactory exposure quality in the captured image). In the case of reconfiguration, the system might reset the SCPs as follows:

(1) the shutter mode parameter—set to "Video Mode" illustrated in FIG. 19E;

(2) the electronic gain of the image sensor—set to the value calculated during STEP 4;

(3) the exposure time for blocks of image sensor pixels— set to a values determined during STEP 4;

(4) the illumination mode parameter—set to "continuous";

(5) the automatic illumination control parameter will be set to "ON";

(6) the illumination field type will be set to "wide-area field";

(7) the image capture mode parameter will be set to "wide-area image capture";

(8) the image capture control parameter will be set to "video frame";

(9) the image processing mode will be set to the default value; and

(10) the automatic object detection mode will be set to ON.

Then at STEPS 2-4, the system captures a second wide-area image using continuous LED illumination and the image sensing array configured in its Video Mode (illustrated in FIG. 19E), and recalculates Exposure Quality Threshold Parameters and if the exposure quality does not satisfy the current Exposure Quality Threshold Parameters, then the system calculates new SCPs (including switching to the wide-area image capture mode, and possibly) and sets the SCPR flag to TRUE. Otherwise, the system maintains the SCPs, and proceeds to attempt to decode a bar code symbol in the narrow-area digital image captured using continuous LED illumination.

If at STEPS 5 and 6, bar code decoding is successful, then at STEP 7 the system transmits the results (i.e. symbol character data) to the host the system, and/or at STEP 8, transmits the captured digital image to the host system for storage or processing, or to internal memory for storage, and then exits the control process at STEP 9.

If at STEPS 5 and 6 in Block B2 in FIG. 19B, bar code decoding fails, then the system returns to STEP 1, and reconfigures for wide-area illumination and image capture. If while operating in its wide-area illumination and image capture modes of operation, the image captured by the system had an "exposure quality" which did not satisfy the Exposure Quality Threshold Parameters and indicated that the light exposure was still too bright and saturated, and the recalculated SCPs required switching to a new level of electronic gain (or illumination control), to reduce exposure brightness, then at STEP 1 the SCPs are reconfigured using the SCPs previously computed at STEP 4. Thereafter, the object is illuminated with ambient illumination and captured at STEP 2, and at STEP 3, the captured image is analyzed for exposure quality, as described above. At STEP 4, the exposure quality measured in STEP 3 is compared with the Exposure Quality Threshold parameters, and if it does not satisfy these parameters, then new SCPs are calculated and the SCPR flag is set to TRUE. Otherwise the system maintains the SCPs using current SCPs. At STEPs 5 and 6, bar code decoding is attempted, and if it is successful, then at STEPS 7 and 8, symbol character data and image data are transmitted to the host system, and then the system exits the control process at STEP 9. If bar code decoding fails, then the system returns to STEP 1 to repeat STEPS within Blocks B1 and B2 of FIGS. 19A and 19B, provided that the automatic trigger signal is still persistent (indicative that the object is still within the field of view of the digital imager). During this second pass through the control loop of Blocks B1 and B2, the system will reconfigure the system as determined by the exposure quality analysis performed at STEP B1, and calculations performed at STEP 4. Notably, such calculations could involve calculating new SCPs that require adjusting illumination and/or image sensing array parameters during the wide-area image capture mode, that is, as the analysis of the facts may require, according to the adaptive control process of the present invention. Recycling this control loop will reoccur as long as a bar code symbol has not been successfully read, and the automatic trigger signal is persistently generated by the IR-based automatic object detecting subsystem.

The adaptive control method of the present invention described above can be applied to any of the System Modes of Operation specified in FIGS. 11A and 11B, as well as to any system modes not specifying specified herein. In each such illustrative embodiment, the particular SCPs that will be set in a given system will depend on the structure of and functionalities supported by the system. In each such system, there will be SCPs that relate to the image sensing array of the system, and SCPs that relate to the illumination subsystem thereof, as well as SCPs that relate to other aspects of the system. The subsystems with the system may have a single or multiple modes of suboperation, depending on the nature of the system design. In accordance with the principles of the present invention, each system will involve the using (i) automated real-time analysis of the exposure quality of captured digital images and (ii) automated reconfiguring of system control parameters (particularly illumination and exposure control parameters) based on the results of such exposure quality analysis, so as to achieve improved system functionality and/or performance in diverse environments.

First Illustrative Embodiment of the
Hand-Supportable Digital Image-Processing Based
Bar Code Symbol Reader of the Present Invention,
Employing an Image Cropping Zone (ICZ) Framing
Pattern, and an Automatic Post-Image Capture
Cropping Method The hand-held image-processing bar code symbol readers described hereinabove employs a narrow-area illumination beam which provides a visual indication to the user on the vicinity of the narrow-area field of view of the system. However, while operating the system during its wide-area image capture modes of operation, it may be desirable in particular applications to provide a visual indication of the wide-area field of view of the system. While various techniques are known in the art to provide such targeting/marking functions, a novel method of operation will be described below with reference to FIGS. 20 through 22.

FIG. 20 shows a hand-supportable image-processing based bar code symbol reader of the present invention 1' employing an image cropping zone (ICZ) framing pattern, and an automatic post-image capture cropping method involving the projection of the ICZ within the field of view (FOV) of the reader and onto a targeted object to be imaged during object illumination and imaging operations. As shown in FIG. 21, this hand-supportable image-processing based bar code symbol reader 1' is similar to the designs described above in FIGS. 1B through 11B, except that it includes one or more image cropping zone (ICZ) illumination framing source(s) operated under the control of the System Control Subsystem. Preferably, these ICZ framing sources are realized using four relatively bright LEDs indicating the corners of the ICZ in the FOV, which will be cropped during post-image capture operations. Alternatively, the ICZ framing source could be a VLD that produces a visible laser diode transmitted through a light diffractive element (e.g. volume transmission hologram) to produce four beamlets indicating the corners of the ICZ, or bright lines that appear in the captured image. The ICZ frame created by such corner points or border lines (formed thereby) can be located using edge-tracing algorithms, and then the corners of the ROI can be identified from the traced border lines.

Referring to FIG. 22, the ICZ Framing and Post-Image Capture Cropping Process of the present invention will now be described.

As indicated at Block A in FIG. 30, the first step of the method involves projecting an ICZ framing pattern within the FOV of the system during wide-area illumination and image capturing operations.

As indicated at Block B in FIG. 22, the second step of the method involves the user visually aligning the object to be imaged within the ICZ framing pattern (however it might be realized).

As indicated at Block C in FIG. 22, the third step of the method involves the Image Formation and Detection Subsystem and the Image Capture and Buffering Subsystem forming and capturing the wide-area image of the entire FOV of the system, which embraces (i.e. spatially encompasses) the ICZ framing pattern aligned about the object to be imaged.

As indicated at Block D in FIG. 22, the fourth step of the method involves using an automatic software-based image cropping algorithm, implemented within the Image-Processing Bar Code Reading Subsystem, to automatically crop the pixels within the spatial boundaries defined by the ICZ, from those pixels contained in the entire wide-area image frame captured at Block B. Due to the fact that image distortion may exist in the captured image of the ICZ framing pattern, the cropped rectangular image may partially contain the ICZ framing pattern itself and some neighboring pixels that may fall outside the ICZ framing pattern.

As indicated at Block E in FIG. 22, the fifth step of the method involves the Image-Processing Bar Code Reading Subsystem automatically decode processing the image represented by the cropped image pixels in the ICZ so as to read a 1D or 2D bar code symbol graphically represented therein.

As indicated at Block F in FIG. 22, the sixth step of the method involves the Image-Processing Bar Code Reading Subsystem outputting (to the host system) the symbol character data representative of the decoded bar code symbol.

Notably, in prior art FOV targeting methods, the user captures an image that is somewhat coinciding with what he intended to capture. This situation is analogous to a low-cost point-and-shoot camera, wherein the field of view of the viewfinder and camera lens only substantially coincide with each other. In the proposed scheme employing the above-described ICZ framing and post-processing pixel cropping method, the user captures an image that is exactly what s/he framed with the ICZ framing pattern. The advantage of this system to prior art FOV methods is analogous to the advantage of a SLR camera over a point-and-shoot camera, namely: accuracy and reliability.

Another advantage of using the ICZ framing and post-processing pixel cropping method is that the ICZ framing pattern (however realized) does not have to coincide with the field of view of the Image Formation And Detection Subsystem. The ICZ framing pattern also does not have to have parallel optical axes. The only basic requirement of this method is that the ICZ framing pattern fall within the field of view (FOV) of the Image Formation And Detection Subsystem, along the working distance of the system.

However, one may design the ICZ framing pattern and the optical axis angle of the system such that when the ICZ framing pattern does not fall completely inside the camera's field of view (i.e. the ICZ framing pattern does not fall within the complete acquired image), this visually implies to the user that the captured and cropped image is outside the depth of focus of the imaging system. Thus, the imager can provide a visual or audio feedback to the user so that he may repeat the image acquisition process at a more appropriate distance.

Second Illustrative Embodiment of the Hand-Supportable Digital Image-Processing Based Bar Code Symbol Reader of the Present Invention, Employing an Image Cropping Pattern (ICP), and an Automatic Post-Image Capture Cropping Method Referring to FIGS. 23 through 29, another novel method of operation will be described for use in a hand-held digital image-processing bar code symbol reader operating during its wide-area image capture modes of operation.

As shown in FIG. 23, during object illumination and wide-area image capture modes of operations, the hand-supportable image-processing based bar code symbol reader 1" is provided with the capacity to generate and project a visible illumination-based Image Cropping Pattern (ICP) 200 within the field of view (FOV) of the reader. During these modes of bar code reader operation, the operator will align the visibly projected ICP onto the object (or graphical indicia) to be imaged so that the graphical indicia generally falls within, or is framed by the outer boundaries covered by the ICP. The object to be imaged may be perfectly planar in geometry, or it may have a particular degree of surface curvature. The angle of the object surface may also be inclined with respect to the bar code symbol reader, which may produce "keystone" type effects during the projection process. In either event, during object illumination and image capture operations, the operator will then proceed to use the reader to illuminate the object using its multi-mode illumination subsystem 14, and capture an image of the graphical indicia and the ICP aligned therewith using the multi-mode image formation and detection subsystem 13. After the image has been captured and buffered within the image capturing and buffering system 16, it is then transferred to the ICP locating/finding module 201 for image processing that locates the features and elements of the ICP and determines therefrom an image region (containing the graphical indicia) to be cropped for subsequent processing. The coordinate/pixel location of the ICP elements relative to each other in the captured image are then analyzed using computational analysis to determine whether or not the captured image has been distorted due to rotation or tilting of the object relative to the bar code reader during image capture operations. If this condition is indicated, then the cropped image will be transferred to the image perspective correction and scaling module 202 for several stages of image processing. The first stage of image processing will typically involve correction of image "perspective", which is where the cropped image requires processing to correct for perspective distortion cause by rotation or tilting of the object during imaging. Perspective distortion is also know as keystone effects. The perspective/tilt corrected image is then cropped. Thereafter, the cropped digital image is processed to scale (i.e. magnify or minify) the corrected digital image so that it has a predetermined pixel size (e.g. N×M) optimized for image processing by the image processing based bar code symbol reading module 17. Such digital image scaling, prior to decode processing, enables most conventional image-based decoding processing algorithms to operate on the digital images. The details of this bar code reading method of the present invention will be described in greater detail herein, after the system architecture of the bar code symbol reader is described below.

In most respects, the digital image-processing based bar code symbol reader 1" shown in FIG. 23 is very similar to the system 1 shown in FIGS. 1B through 11B, with the exception of a few additional subcomponents indicated below.

As shown in FIG. 24, the digital imaging-based bar code symbol reading device depicted in FIG. 31 comprises the following system components: a Multi-Mode Area-Type Image Formation and Detection (i.e. Camera) Subsystem 13 having image formation (camera) optics for producing a field of view (FOV) upon an object to be imaged and a CMOS or like area-type image sensing array 22 for detecting imaged light reflected off the object during illumination operations in either (i) a narrow-area image capture mode in which a few central rows of pixels on the image sensing array are enabled, or (ii) a wide-area image capture mode in which substantially all rows of the image sensing array are enabled; a Multi-Mode LED-Based Illumination Subsystem 14 for producing narrow and wide area fields of narrow-band illumination within the FOV of the Image Formation And Detection Subsystem 13 during narrow and wide area modes of image capture, respectively, so that only light transmitted from the Multi-Mode Illumination Subsystem 14 and reflected from the illuminated object and transmitted through a narrow-band transmission-type optical filter realized within the hand-supportable housing (i.e. using a red-wavelength high-pass reflecting window filter element disposed at the light transmission aperture thereof and a low-pass filter before the image sensor) is detected by the image sensor and all other components of ambient light are substantially rejected; an Image Cropping Pattern Generator 203 for generating a visible illumination-based Image Cropping Pattern (ICP) 200 projected within the field of view (FOV) of the Multi-Mode Area-type Image Formation and Detection Subsystem 13; an IR-based object presence and range detection subsystem 12 for producing an IR-based object detection field within the FOV of the Image Formation and Detection Subsystem 13: an Automatic Light Exposure Measurement and Illumination Control Subsystem 15 for measuring illumination levels in the FOV and controlling the operation of the LED-Based Multi-Mode Illumination Subsystem 14; an Image Capturing and Buffering Subsystem for capturing and buffering 2-D images detected by the Image Formation and Detection Subsystem 13; an Image Processing and Cropped Image Locating Module 201 for processing captured and buffered images to locate the image region corresponding to the region defined by the Image Cropping Pattern (ICP) 200; an Image Perspective Correction and Scaling Module 202 for correcting the perspective of the cropped image region and scaling the corrected image to a predetermined (i.e. fixed) pixel image size suitable for decode-processing; (8) a Multi-mode Image-Processing Based Bar Code Symbol Reading Subsystem 17 for processing cropped and scaled images generated by the Image Perspective and Scaling Module 202 and reading 1D and 2D bar code symbols represented, and (9) an Input/Output Subsystem 18 for outputting processed image data and the like to an external host system or other information receiving or responding device, in which each said subsystem component is integrated about a System Control Subsystem 19, as shown.

In general, there are many possible ways of realizing the Image Cropping Pattern Generator 203 employed in the system of FIG. 23. In FIGS. 25A through 26D5, several refractive-based designs are disclosed for generating an image cropping pattern (ICP) 200, from a single two-dot pattern, to a more complex four dot pattern. While the four dot ICP is a preferred pattern, in some applications, the two dot pattern may be suitable for the requirements at hand where 1D bar code symbols are primarily employed. Also, as shown in FIG. 27, light diffractive technology (e.g. volume holograms, computer generated holograms CGHs, etc) can be used in conjunction with a VLD and a light focusing lens to generate an image cropping pattern (ICP) having diverse characteristics. It is appropriate at this juncture to describe these various embodiments for the Image Cropping Pattern Generator of the present invention.

In FIG. 25A, a first illustrative embodiment of the VLD-based Image Cropping Pattern Generator 203A is shown comprising: a VLD 205 located at the symmetrical center of the focal plane of a pair of flat-convex lenses 206A and 206B arranged before the VLD 205, and capable of generating and projecting a two (2) dot image cropping pattern (ICP) 200 within the field of view of the of the Multi-Mode Area-type Image Formation and Detection Subsystem 13. In FIGS. 25B and 25C, a composite ray-tracing diagram is provided for the VLD-based Image Cropping Pattern Generator depicted in FIG. 25A. As shown, the pair of flat-convex lenses 206A and 206B focus naturally diverging light rays from the VLD 205 into two substantially parallel beams of laser illumination which to produce a two (2) dot image cropping pattern (ICP) 200 within the field of view (FOV) of the Multi-Mode Area-type Image Formation and Detection Subsystem. Notably, the distance between the two spots of illumination in the ICP is a function of distance from the pair of lenses 206A and 206B. FIG. 25D1 through 25D5 are simulated images of the two dot Image Cropping Pattern produced by the ICP Generator 203A of FIG. 25A, at distances of 40 mm, 80 mm, 120 mm, 160 mm and 200 mm, respectively, from its pair of flat-convex lenses, within the field of view of the Multi-Mode Area-type Image Formation and Detection Subsystem.

In FIG. 26A, a second illustrative embodiment of the VLD-based Image Cropping Pattern Generator of the present invention 203B is shown comprising: a VLD 206 located at the focus of a biconical lens 207 (having a biconical surface and a cylindrical surface) arranged before the VLD 206, and four flat-convex lenses 208A, 208B, 208C and 208D arranged in four corners. This optical assembly is capable of generating and projecting a four (4) dot image cropping pattern (ICP) within the field of view of the of the Multi-Mode Area-type Image Formation and Detection Subsystem. FIGS. 34B and 34C show a composite ray-tracing diagram for the third illustrative embodiment of the VLD-based Image Cropping Pattern Generator depicted in FIG. 26A. As shown, the biconical lens 207 enlarges naturally diverging light rays from the VLD 206 in the cylindrical direction (but not the other) and thereafter, the four flat-convex lenses 208A through 208D focus the enlarged laser light beam to generate a four parallel beams of laser illumination which form a four (4) dot image cropping pattern (ICP) within the field of view of the Multi-Mode Area-type Image Formation and Detection Subsystem. The spacing between the four dots of illumination in the ICP is a function of distance from the flat-convex lens 208A through 208D. FIGS. 26D1 through 26D5 are simulated images of the linear Image Cropping Pattern produced by the ICP Generator of FIG. 34A, at distance of 40 mm, 80 mm, 120 mm, 160 mm and 200 mm, respectively, from its flat-convex lens, within the field of view of the Multi-Mode Image Formation and Detection Subsystem 13.

In FIG. 27, a third illustrative embodiment of the VLD-based Image Cropping Pattern Generator of the present invention 203C is shown comprising: a VLD 210, focusing optics 211, and a light diffractive optical element (DOE) 212 (e.g. volume holographic optical element) forming an ultra-compact optical assembly. This optical assembly is capable of generating and projecting a four (4) dot image cropping pattern (ICP) within the field of view of the of the Multi-Mode Area-type Image Formation and Detection Subsystem, similar to that generated using the refractive optics based device shown in FIG. 26A.

Hand-Supportable Digital Image-Processing Based Bar Code Symbol Reader of the Present Invention Employing a Second Method of Digital Image Capture and Processing Using an Image Cropping Pattern (ICP) and Automatic Post-Image Capture Cropping and Processing Methods Referring to FIGS. 28 and 29, the second illustrative embodiment of the method of digital image capture and processing will now be described in connection with the bar code symbol reader illustrated in FIGS. 23 and 24.

As indicated at Block A in FIG. 29, the bar code symbol reader during wide-area imaging operations, projects an illumination-based Image Cropping Pattern (ICP) 200 within the field of view (FOV) of the system, as schematically illustrated in FIG. 28.

As indicated at Block B in FIG. 29, the operator aligns an object to be imaged within the projected Image Cropping Pattern (ICP) of the system.

As indicated at Block C in FIG. 29, during the generation of the Image Cropping Pattern, the bar code symbol reader captures a wide-area digital image of the entire FOV of the system.

As indicated at Block D in FIG. 29, the bar code symbol reader uses module 201 to process the captured digital image and locate/find features and elements (e.g. illumination spots) associated with the Image Capture Pattern 200 within the captured digital image. As shown in the schematic representation of FIG. 29, the clusters of pixels indicated by reference characters (a, b, c, d) represent the four illumination spots (i.e. dots) associated with the Image Cropping Pattern (ICP) projected in the FOV. The coordinates associated with such features and elements of the ICP would be located/found using module 201 during this step of the image processing method of the present invention.

As indicated at Block E in FIG. 29, the bar code symbol reader uses module 201 to analyze the coordinates of the located image features (a, b, c, d) and determine the geometrical relationships among certain of such features (e.g. if the vertices of the ICP have been distorted during projection and imaging due to tilt angles, rotation of the object, etc), and reconstruct an undistorted image cropping pattern (ICP) independent of the object tilt angle (or perspective) computed therefrom. Module 210 supports real-time computational analysis to analyze the coordinates of the pixel locations of the ICP elements relative to each other in the captured image, and determine whether or not the captured image has been distorted due to rotation or tilting of the object relative to the bar code reader during image capture operations. If this condition is indicated, then the digital image will be transferred to the image perspective correction and scaling module 202 for several stages of image processing. The first stage of image processing performed by module 202 will typically involve correction of image "perspective", which is where the cropped image requires processing to correct for perspective distortion cause by rotation or tilting of the object during imaging. Perspective distortion is also known as keystone effects.

As indicated at Block F in FIG. 29, the bar code symbol reader uses module 202 to crops a set of pixels from the corrected digital image, that corresponds to the ICP projected in the FOV of the system.

As indicated at Block G in FIG. 37, the bar code symbol reader uses module 202 to carry out a digital zoom algorithm to process the cropped and perspective-corrected ICP region and produce a scaled digital image having a predetermined pixel size independent of object distance. This step involves processing the cropped perspective-corrected image so as to scale (i.e. magnify or minify) the same so that it has a predetermined pixel size (e.g. N×M) optimized for image processing by the image processing based bar code symbol reading module 17. Such image scaling, prior to decode processing, enables conventional image-based decoding processing algorithms to operate on the digital images of constant magnitude.

As indicated at Block H in FIG. 29, the bar code symbol reader transmits the scaled perspective-corrected digital image to the decode processing module 17 (and optionally, a visual display).

As indicated at Block I in FIG. 29, the bar code symbol reader decode-processes the scaled digital image so as to read 1D or 2D bar code symbols represented therein and generate symbol character data representative of a decoded bar code symbol.

As indicated at Block J in FIG. 29, the input/output subsystem 18 of the bar code symbol reader outputs the generated symbol character data to a host system.

Digital Image Capture and Processing Engine of the Present Invention Employing Linear Optical Waveguide Technology for Collecting and Conducting LED-Based Illumination in the Automatic Light Exposure Measurement and Illumination Control Subsystem During Object Illumination and Image Capture Modes of Operation Referring to FIGS. 30 through 44, it is appropriate at this juncture to describe the digital image capture and processing engine of the present invention 220 employing light-pipe technology 221 for collecting and conducting LED-based illumination in the automatic light exposure measurement and illumination control subsystem 15 during object illumination and image capture modes of operation.

As shown in FIG. 30, the digital image capture and processing engine 220 is shown generating and projecting a visible illumination-based Image Cropping Pattern (ICP) 200 within the field of view (FOV) of the engine, during object illumination and image capture operations, as described in connection with FIGS. 23 through 29B. Typically, as shown, the digital image capture and processing engine 220 will be embedded or integrated within a host system 222 which uses the digital output generated from the digital image capture and processing engine 220. The host system 222 can be any system that requires the kind of information that the digital image capture and processing engine 220 can capture and process.

As shown in FIGS. 41 and 47, the digital image capture and processing engine 220 depicted in FIG. 30 is shown comprising: an assembly of an illumination/targeting optics panel 223; an illumination board 224; a lens barrel assembly 225; a camera housing 226; a camera board 227; and image processing board 230. As shown, these components are assembled into an ultra-compact form factor offering advantages of light-weight construction, excellent thermal management, and exceptional image capture and processing performance. Also, camera housing 226 has a pair of integrated engine mounting projections 226A and 226B, each provided with a hole through which a mounting screw can be passed to fix the engine relative to an optical bench or other support structure within the housing of the host system or device.

In FIG. 37, the digital image capture and processing engine 220 shown in FIG. 36 reveals the integration of a linear optical waveguide (i.e. light conductive pipe) component 221 within the engine housing. Preferably, optical waveguide 221 is made from a plastic material having high light transmission characteristics, and low energy absorption characteristics over the optical band of the engine (which is tuned to the spectral characteristics of the LED illumination arrays and band-pass filter employed in the engine design). The function of optical waveguide 221 is to collect and conduct light energy from the FOV of the Multi-Mode Area-Type Image Formation and Detection Subsystem 13, and direct it to the photo-detector 228 mounted on the camera board 227, and associated with the Automatic Light Exposure Measurement and Illumination Control Subsystem 15. Notably, in the engine design of the illustrative embodiment, the optical waveguide 221 replaces the parabolic light collecting mirror 55 which is employed in the system design shown in FIG. 6A. Use of the optical waveguide 221 in subsystem 15 offers the advantage of ultra-small size and tight integration within the miniature housing of the digital image capture and processing engine. Upon assembling the engine components, the optical waveguide 221 aligns with the photodiode 228 on the camera board which supports subsystem 15, specified in great detail in FIGS. 6B through 6C2.

In FIG. 40, an exploded, perspective view of the digital image capture and processing engine 220 is provided to show how the illumination/targeting optics panel 23, the illumination board 224, the lens barrel assembly 225, the camera housing 226, the camera board 227, and its assembly pins 231A through 231D are easily arranged and assembled with respect to each other in accordance with the principles of the present invention.

As shown in FIG. 40, the illumination board 224 of the illustrative embodiment supports four (4) LEDs 238A through 238D, along with driver circuitry, as generally taught in FIGS. 6C1 and 6C2. Also, illumination/targeting optics panel 223 supports light focusing lenses 239A through 239D, for the LEDs in the illumination array supported on the illumination board 224. Optical principles and techniques for specifying lenses 239A through 239D are taught in FIGS. 4B through 4D7, and corresponding disclosure here. While a wide-area near/far field LED illumination array is shown used in the digital image capture and processing engine of the illustrative embodiment 220, it is understood that the illumination array can be readily modified to support separate wide-area near field illumination and wide-area far field illumination, as well as narrow-area far and near fields of illumination, as taught in great detail herein with respect to systems disclosed in FIGS. 1 through 39C2.

In FIG. 41, the illumination/targeting optics panel 223, the illumination board 224 and the camera board 230 of digital image capture and processing engine 220 are shown assembled with the lens barrel assembly 225 and the camera housing 226 removed for clarity of illustration. In FIG. 42, the illumination/targeting optics panel 223 and the illumination board 224 are shown assembled together as a subassembly 232 using the assembly pins. In FIG. 43, the subassembly 232 of FIG. 42 is arranged in relation to the lens barrel assembly 225, the camera housing 226, the camera board 227 and the image processing board 230, showing how these system components are assembled together to produce the digital image capture and processing engine 220 of FIG. 30.

In FIG. 44, the digital image capture and processing engine 220 illustrated in FIGS. 40 through 43, is shown comprising: a Multi-Mode Area-Type Image Formation and Detection (i.e. Camera) Subsystem 14 having image formation (camera) optics for producing a field of view (FOV) upon an object to be imaged and a CMOS or like area-type image sensing array 22 for detecting imaged light reflected off the object during illumination operations in either (i) a narrow-area image capture mode in which a few central rows of pixels on the image sensing array are enabled, or (ii) a wide-area image capture mode in which substantially all rows of the image sensing array are enabled; a LED-Based Illumination Subsystem 14 for producing a wide area field of narrow-band illumination within the FOV of the Image Formation And Detection Subsystem 13 during the image capture mode, so that only light transmitted from the LED-Based Illumination Subsystem 14 and reflected from the illuminated object and transmitted through a narrow-band transmission-type optical filter realized within the hand-supportable housing (i.e. using a red-wavelength high-pass reflecting window filter element disposed at the light transmission aperture thereof and a low-pass filter before the image sensor) is detected by the image sensor and all other components of ambient light are substantially rejected; an Image Cropping Pattern Generator 203 for generating a visible illumination-based Image Cropping Pattern (ICP) 200 projected within the field of view (FOV) of the Multi-Mode Area-type Image Formation and Detection Subsystem 13; an IR-Based Object Presence And Range Detection Subsystem 12 for producing an IR-based object detection field within the FOV of the Image Formation and Detection Subsystem 13; an Automatic Light Exposure Measurement and Illumination Control Subsystem 14 for measuring illumination levels in the FOV and controlling the operation of the LED-Based Multi-Mode Illumination Subsystem 14 during the image capture mode; an Image Capturing and Buffering Subsystem 16 for capturing and buffering 2-D images detected by the Image Formation and Detection Subsystem 13; an Image Processing and Cropped Image Locating Module 201 for processing captured and buffered images to locate the image region corresponding to the region defined by the Image Cropping Pattern (ICP) 200; an Image Perspective Correction and Scaling Module 202 for correcting the perspective of the cropped image region and scaling the corrected image to a predetermined (i.e. fixed) pixel image size suitable for decode-processing; a Multimode Image-Processing Based Bar Code Symbol Reading Subsystem 17 for processing cropped and scaled images generated by the Image Perspective and Scaling Module 202 and reading 1D and 2D bar code symbols represented; and an Input/Output Subsystem 18 for outputting processed image data and the like to an external host system or other information receiving or responding device, in which each said subsystem component is integrated about a System Control Subsystem 19, as shown.

Notably, use of FOV folding mirror 236 can help to achieve a wider FOV beyond the light transmission window, while using a housing having narrower depth dimensions. Also, use of the linear optical waveguide 221 obviates the need for large aperture light collection optics which requires significant space within the housing.

Digital Image Capture and Processing Engine of the Present Invention Employing Curved Optical Waveguide Technology for Collecting and Conducting LED-Based Illumination in the Automatic Light Exposure Measurement and Illumination Control Subsystem During Object Illumination and Image Capture Modes of Operation In FIGS. 45 and 46, an alternative embodiment of the digital image capture and processing engine 220 of the present invention is shown reconfigured in such as way that the illumination/aiming subassembly 232 (depicted in FIG. 42) is detached from the camera housing 226 and mounted adjacent the light transmission window 233 of the engine housing 234. The remaining subassembly, including lens barrel assembly 225, the camera housing 226, the camera board 227 and the image processing board 230 is mounted relative to the bottom of the engine housing 234 so that the optical axis of the camera lens assembly 225 is parallel with the light transmission aperture 233. A curved optical waveguide 221 is used to collect light from a central portion of the field of view of the engine, and guide the collected light to photodiode 228 on the camera board 227. In addition, a field of view (FOV) folding mirror 236 is mounted beneath the illumination/aiming subassembly 232 for directing the FOV of the system out through the central aperture 237 formed in the illumination/aiming subassembly 232. Use of the FOV folding mirror 236 in this design can help to achieve a wider FOV beyond the light transmission window, while using housing having narrower depth dimensions. Also, use of the curved optical waveguide 221 obviates the need for large aperture light collection optics which requires significant space within the housing.

Automatic Imaging-Based Bar Code Symbol Reading System of the Present Invention Supporting Presentation-Type Modes of Operation Using Wide-Area Illumination and Video Image Capture and Processing Techniques In FIGS. 47A, 47B and 47C, a presentation-type imaging-based bar code symbol reading system 300 is shown constructed using the general components of the digital image capture and processing engine of FIGS. 45 and 46, with some modifications. As shown, the illumination/aiming subassembly 232' of FIG. 52 is mounted adjacent the light transmission window 233' of the system housing 301. The remaining subassembly, including lens barrel assembly 225', the camera housing 226', the camera board 227' and the image processing board 230, is mounted relative to the bottom of the engine housing 234' so that the optical axis of the camera lens is parallel with the light transmission aperture 233'. In addition, a field of view (FOV) folding mirror 236' is mounted beneath the illumination/aiming subassembly 232' for directing the FOV of the system out through the central aperture formed in the illumination/aiming subassembly 232.

Automatic Imaging-Based Bar Code Symbol Reading System of the Present Invention Supporting a Pass-Through Mode of Operation Using Narrow-Area Illumination and Video Image Capture and Processing Techniques and a Presentation-Type Mode of Operation Using Wide-Area Illumination and Video Image Capture and Processing Techniques In FIGS. 49A, 49B and 49C through 55C4, there is shown an automatic imaging-based bar code symbol reading system of the present invention 400 supporting a pass-through mode of operation illustrated in FIG. 49C using narrow-area illumination and video image capture and processing techniques, and a presentation-type mode of operation illustrated in FIG. 49C using wide-area illumination and video image capture and processing techniques. As shown in FIGS. 49A through 50, the POS-based imaging system 400 employs a digital image capture and processing engine similar in design to that shown in FIGS. 47A and 47B and that shown in FIG. 2A1, except for the following differences:

(1) the Automatic Light Exposure Measurement and Illumination Control Subsystem 15 is adapted to measure the light exposure on a central portion of the CMOS image sensing array and control the operation of the LED-Based Multi-Mode Illumination Subsystem 14 in cooperation with a the Multi-Mode Image Processing Based Bar Code Symbol Reading Subsystem 17 employing software for performing real-time "exposure quality analysis" of captured digital images in accordance with the adaptive system control method of the present invention, illustrated in FIGS. 27A through 27E;

(2) the substantially-coplanar narrow-area field of illumination and narrow-area FOV 401 are oriented in the vertical direction (i.e. oriented along Up and Down directions) with respect to the counter surface of the POS environment, so as to support the "pass-through" imaging mode of the system, as illustrated in FIG. 49A; and (3) the IR-based object presence and range detection system 12 employed in FIG. 47A is replaced with an automatic IR-based object presence and direction detection subsystem 12' comprising four independent IR-based object presence and direction detection channels (i.e. fields) 402A, 402B, 402C and 402D, generated by IR LED and photodiode pairs 12A1, 12A2, 12A3 and 12A4 respectively, which automatically produce activation control signals $A1(t)$, $A2(t)$, $A3(t)$ and $A4(t)$ upon detecting an object moving through the object presence and direction detection fields, and a signal analyzer and control logic block 12B' for receiving and processing these activation control signals $A1(t)$, $A2(t)$, $A3(t)$ and $A4(t)$, according to Processing Rules 1 through 5 set forth in FIG. 50, so as to generate a control activation signal indicative that the detected object is being moved either in a "pass-though" direction (e.g. L->R, R-->L, U→D, or D→U), or in a "presentation" direction (towards the imaging window of the system).

Preferably, this POS-based imaging system supports the adaptive control process illustrated in FIG. 19A through 19E, and in the illustrative embodiment of the present invention, operates generally according to System Mode No. 17, described hereinabove. In this POS-based imaging system, the "trigger signal" is generated from the automatic IR-based object presence and direction detection subsystem 12'. In the illustrative embodiment, the trigger signal can take on one or three possible values, namely: (1) that no object has been detected in the FOV of the system; (2) that an object has been detected in the FOV and is being moved therethrough in a "Pass-Through" manner; or that an object has been detected in the FOV and is being moved therethrough in a Presentation" manner (i.e. toward the imaging window). For purposes of explanation below, trigger signal (1) above is deemed a "negative" trigger signal, whereas trigger signals (2) and (3) are deemed "positive" trigger signals.

In the event that the "Pass-Through" Mode (illustrated in FIG. 49B) is enabled in response to detected movement of the object in the FOV from L-R or R-→L, then the SCPs would be initially configured as follows:

(1) the shutter mode parameter will be set to the "Video Mode" (illustrated in FIG. 2E);

(2) the electronic gain of the image sensor will be set to a default value determined during factory calibration;

(3) the exposure time for blocks of image sensor pixels will be set to a default determined during factory calibration;

(4) the illumination mode parameter will be set to "continuous";

(5) the automatic illumination control parameter will be set to "ON";

(6) the illumination field type will be set to "narrow-area field";

(7) the image capture mode parameter will be set to "narrow-area image capture";

(8) the image capture control parameter will be set to "video frame";

(9) the image processing mode will be set, for example, to a default value; and

(10) the automatic object detection mode will be set to "ON".

Also, the SCPR flag will be set to its FALSE value.

On the other hand, if the event that the "Presentation" Mode (illustrated in FIG. 49C) is enabled in response to detected movement of the object in the FOV towards the imaging window of the system, then the SCPs would be initially configured as follows:

(1) the shutter mode parameter will be set to the "Video Mode" (illustrated in FIG. 2E);

(2) the electronic gain of the image sensor will be set to a default value determined during factory calibration;

(3) the exposure time for blocks of image sensor pixels will be set to a default determined during factory calibration;

(4) the illumination mode parameter will be set to "continuous";

(5) the automatic illumination control parameter will be set to "ON";

(6) the illumination field type will be set to "wide-area field";

(7) the image capture mode parameter will be set to "wide-area image capture";

(8) the image capture control parameter will be set to "video frame";

(9) the image processing mode will be set, for example, to a default value; and

(10) the automatic object detection mode will be set to "ON".

Also, the SCPR flag will be set to its FALSE value.

Adaptive (Camera) System Control During Pass-Through Mode of Operation

Upon the generation of a "positive" trigger signal from subsystem 12' (i.e. that an object has been detected in the FOV and is being moved therethrough in a "Pass-Through" manner, or that an object has been detected in the FOV and is being moved therethrough in a Presentation" manner), the system will reconfigure itself only if the SCPR flag is TRUE; otherwise, the system will maintain its current SCPs. During the first pass through STEP 1, the SCPR flag will be FALSE, and therefore the system will maintain its SCPs at their default settings. For purpose of illustration, assume that trigger signal (2) was generated, indicative of Pass-Through object detection and movement.

Then at STEP 2 in FIG. 19A, the object will be continuously illuminated within a narrow-field of LED-based illumination produced by the illumination subsystem, and a sequence of narrow-area digital images will be captured by the image formation and detection subsystem and buffered to reconstruct 2D images, while the CMOS image sensing array is operated in its Video Mode of operation.

At STEP 3 in FIG. 19B, the reconstructed digital image will be analyzed for exposure quality (e.g. brightness level, saturation etc.).

At STEP 4, if the measured/calculated exposure quality values do not satisfy the exposure quality threshold (EQT) parameters, then the system recalculates new SCPs and sets the SCPR flag to TRUE, indicating that the system must be reconfigured prior to acquiring a digital image during the next wide-area image acquisition cycle while the CMOS sensing array is operated in its Video Mode. Otherwise, the SCPs are maintained by the system.

At STEP 5, the system attempts to read a 1D bar code symbol in the captured reconstructed 2D digital image.

At STEP 6, if the system is incapable of reading the bar code symbol (i.e. decoding fails), then the system returns to STEP 1 and reconfigures its SCPs if the SCPR flag is set to TRUE (i.e. indicative of unsatisfactory exposure quality in the captured image). In the case of reconfiguration, the system might reset the SCPs as follows:

(1) the shutter mode parameter—set to "Video Mode" illustrated in FIG. 19E;

(2) the electronic gain of the image sensor—set to the value calculated during STEP 4;

(3) the exposure time for blocks of image sensor pixels—set to a values determined during STEP 4;

(4) the illumination mode parameter—set to "continuous";

(5) the automatic illumination control parameter will be set to "ON";

(6) the illumination field type will be set to "narrow-area field";

(7) the image capture mode parameter will be set to "narrow-area image capture";

(8) the image capture control parameter will be set to "video frame";

(9) the image processing mode will be set to the default value; and

(10) the automatic object detection mode will be set to ON.

Then at STEPS 2-4, the system captures a second 2D image using continuous LED illumination and the image sensing array configured in its Video Mode (illustrated in FIG. 19E), and recalculates Exposure Quality Threshold Parameters and if the exposure quality does not satisfy the current Exposure Quality Threshold Parameters, then the system calculates new SCPs and sets the SCPR flag to TRUE. Otherwise, the system maintains the SCPs, and proceeds to attempt to decode a bar code symbol in the 2D reconstructed digital image captured using continuous LED illumination.

If at STEPS 5 and 6, bar code decoding is successful, then at STEP 7 the system transmits the results (i.e. symbol character data) to the host the system, and/or at STEP 8, transmits the captured digital image to the host system for storage or processing, or to internal memory for storage, and then exits the control process at STEP 9.

If at STEPS 5 and 6 in Block B2 in FIG. 19B, bar code decoding fails, then the system returns to STEP 1, and reconfigures for narrow-area illumination and image capture. If while operating in its narrow-area illumination and image capture modes of operation, the image captured by the system had an "exposure quality" which did not satisfy the Exposure Quality Threshold Parameters and indicated that the light exposure was still too bright and saturated, and the recalculated SCPs required switching to a new level of electronic gain (or illumination control), to reduce exposure brightness, then at STEP 1 the SCPs are reconfigured using the SCPs previously computed at STEP 4. Thereafter, the object is illuminated using, for example, ambient illumination and captured at STEP 2, and at STEP 3, the captured/reconstructed 2D image is analyzed for exposure quality, as described above. At STEP 4, the exposure quality measured in STEP 3 is compared with the Exposure Quality Threshold parameters, and if it does not satisfy these parameters, then new SCPs are calculated and the SCPR flag is set to TRUE. Otherwise the system maintains the SCPs using current SCPs. At STEPs 5 and 6, bar code decoding is attempted, and if it is successful, then at STEPS 7 and 8, symbol character data and image data are transmitted to the host system, and then the system exits the control process at STEP 9. If bar code decoding fails, then the system returns to STEP 1 to repeat STEPS within Blocks B1 and B2 of FIGS. 19A and 19B, provided that the automatic trigger signal (2) is still persistent (indicative that the object is still within the field of view of the digital imager). During this second pass through the control loop of Blocks B1 and B2, the system will reconfigure the system as determined by the exposure quality analysis performed at STEP B1, and calculations performed at STEP 4. Notably, such calculations could involve calculating new SCPs that require adjusting illumination and/or image sensing array parameters during the narrow-area image capture mode, that is, as the analysis of the facts may require, according to the adaptive control process of the present invention. Recycling this control loop will reoccur as long as a bar code symbol has not been successfully read, and the automatic trigger signal (2) is persistently generated by the IR-based automatic object detecting subsystem 12'.

Adaptive System Control During Presentation (Camera) Mode of Operation

In the event that trigger signal (3) was generated, indicative of Presentation object detection and movement, then at STEP 2 in FIG. 19A, the object will be continuously illuminated within a wide-field of LED-based illumination produced by the illumination subsystem, and a sequence of wide-area (2D) digital images will be captured by the image formation and detection subsystem and buffered, while the CMOS image sensing array is operated in its Video Mode of operation.

At STEP 3 in FIG. 19B, the reconstructed digital image will be analyzed for exposure quality (e.g. brightness level, saturation etc.).

At STEP 4, if the measured/calculated exposure quality values do not satisfy the exposure quality threshold (EQT) parameters, then the system recalculates new SCPs and sets the SCPR flag to TRUE, indicating that the system must be reconfigured prior to acquiring a digital image during the next wide-area image acquisition cycle while the CMOS sensing array is operated in its Video Mode. Otherwise, the SCPs are maintained by the system.

At STEP 5, the system attempts to read a 1D bar code symbol in the captured wide-area digital image.

At STEP 6, if the system is incapable of reading the bar code symbol (i.e. decoding fails), then the system returns to STEP 1 and reconfigures its SCPs if the SCPR flag is set to TRUE (i.e. indicative of unsatisfactory exposure quality in the captured image). In the case of reconfiguration, the system might reset the SCPs as follows:

(1) the shutter mode parameter—set to "Video Mode" illustrated in FIG. 19E;

(2) the electronic gain of the image sensor—set to the value calculated during STEP 4;

(3) the exposure time for blocks of image sensor pixels—set to a values determined during STEP 4;

(4) the illumination mode parameter—set to "continuous";

(5) the automatic illumination control parameter will be set to "ON";

(6) the illumination field type will be set to "wide-area field";

(7) the image capture mode parameter will be set to "wide-area image capture";

(8) the image capture control parameter will be set to "video frame";

(9) the image processing mode will be set to the default value; and

(10) the automatic object detection mode will be set to ON.

Then at STEPS 2-4, the system captures a second 2D image using continuous LED illumination and the image sensing array configured in its Video Mode (illustrated in FIG. 19E), and recalculates Exposure Quality Threshold Parameters and if the exposure quality does not satisfy the current Exposure Quality Threshold Parameters, then the system calculates new SCPs and sets the SCPR flag to TRUE. Otherwise, the system maintains the SCPs, and proceeds to attempt to decode a bar code symbol in the 2D reconstructed digital image captured using continuous LED illumination.

If at STEPS 5 and 6, bar code decoding is successful, then at STEP 7 the system transmits the results (i.e. symbol character data) to the host the system, and/or at STEP 8, transmits the captured digital image to the host system for storage or processing, or to internal memory for storage, and then exits the control process at STEP 9.

If at STEPS 5 and 6 in Block B2 in FIG. 19B, bar code decoding fails, then the system returns to STEP 1, and reconfigures for wide-area illumination and image capture. If while operating in its wide-area illumination and image capture modes of operation, the image captured by the system had an "exposure quality" which did not satisfy the Exposure Quality Threshold Parameters and indicated that the light exposure was still too bright and saturated, and the recalculated SCPs required switching to a new level of electronic gain (or illumination control), to reduce exposure brightness, then at STEP 1 the SCPs are reconfigured using the SCPs previously computed at STEP 4. Thereafter, the object is illuminated with ambient illumination and captured at STEP 2, and at STEP 3, the captured wide-area image is analyzed for exposure quality, as described above. At STEP 4, the exposure quality measured in STEP 3 is compared with the Exposure Quality Threshold parameters, and if it does not satisfy these parameters, then new SCPs are calculated and the SCPR flag is set to TRUE. Otherwise the system maintains the SCPs using current SCPs. At STEPs 5 and 6, bar code decoding is attempted, and if it is successful, then at STEPS 7 and 8, symbol character data and image data are transmitted to the host system, and then the system exits the control process at STEP 9. If bar code decoding fails, then the system returns to STEP 1 to repeat STEPS within Blocks B1 and B2 of FIGS. 19A and 19B, provided that the automatic trigger signal (3) is still persistent (indicative that the object is still within the field of view of the digital imager). During this second pass through the control loop of Blocks B1 and B2, the system will reconfigure the system as determined by the exposure quality analysis performed at STEP B1, and calculations performed at STEP 4. Notably, such calculations could involve calculating new SCPs that require adjusting illumination and/or image sensing array parameters during the wide-area image capture mode, that is, as the analysis of the facts may require, according to the adaptive control process of the present invention. Recycling this control loop will reoccur as long as a bar code symbol has not been successfully read, and the automatic trigger signal (3) is persistently generated by the IR-based automatic object detecting subsystem 12'.

By virtue of the intelligent automatic pass-through/presentation digital image capture and processing system of the present invention, it is now possible for operators to move objects past the imager in either a pass-through or presentation type manner, and the system will automatically adapt and reconfigure itself to optimally support the method of image-based scanning chosen by the operator.

Alternative Embodiments of Imaging-Based Bar Code Symbol Reading System of the Present Invention In FIG. 52A, a first alternative embodiment of a projection-type POS image-processing based bar code symbol reading system 250 is shown employing the digital image capture and processing engine 220 or 220'. As shown, system 250 includes a housing 241 which may contain the engine housing shown in FIG. 45, or alternatively, it may support the subassemblies and components shown in FIG. 45.

In FIG. 52B, a second illustrative embodiment of a projection-type POS image-processing based bar code symbol reading system 260 is shown employing the digital image capture and processing engine 220 or 220'. As shown, system 260 includes a housing 261 which may contain the engine housing shown in FIG. 45, or alternatively, it may support the subassemblies and components shown in FIG. 55A1.

In FIG. 52C, a third illustrative embodiment of a projection-type POS image-processing based bar code symbol reading system 270 is shown employing the digital image capture and processing engine 220 or 220'. As shown, system 270 includes a housing portion 271 (containing engine 220 or 220'), and a base portion 272 for rotatably supporting housing portion 271. Housing portion 271 may contain the engine housing shown in FIG. 45, or alternatively, it may support the subassemblies and components shown in FIG. 45.

In each of the POS-based systems disclosed in FIGS. 52A, 52B and 52C, the number of VLDs mounted on the illumination board 224 can be substantially greater than four (4), as shown in the illustrative embodiment in FIG. 45. The exact number of LEDs used in the illumination will depend on the end-user application requirements at hand. Also, the IR-Based Object Presence And Range Detection Subsystem 12 employed therein may be used to detect the range of an object within the FOV, and the LED-Based Illumination Subsystem 14 may include both long and short range wide-area LED illumination arrays, as disclosed hereinabove, for optimized illumination of long and short range regions of the FOV during image capture operations.

In FIG. 53, a price lookup unit (PLU) system 280 is shown comprising: a housing 281 with mounting bracket; a LCD panel 282; a computing platform 283 with network interfaces etc, and a digital image capture and processing subsystem 220 or 220' of the present invention, for identifying bar coded consumer products in retail store environments, and displaying the price thereof on the LCD panel 282.

Some Modifications Which Readily Come to Mind

In general, any image capture and processing system or device that supports an application software layer and at least an image capture mechanism and an image processing mechanism would be suitable for the practice of the imaging-based code symbol reading system of the present invention. Thus, image-capturing cell phones, digital cameras, video cameras, and portable or mobile computing terminals and portable data terminals (PDTs) are all suitable systems in which the present invention can be practiced.

Also, it is understood that the application layer of the image-processing bar code symbol reading system of the present invention can be ported over to execute on conventional mobile computing devices, PDAs, pocket personal computers (PCs), and other portable devices supporting image capture and processing functions, and being provided with suitable user and communication interfaces. Possible hardware computing platforms would include such as Palm®, PocketPC®, MobilePC®, JVM®, etc. equipped with CMOS sensors, trigger switches etc. In such illustrative embodiments, the 3-tier system software architecture of the present invention can be readily modified by replacing the low-tier Linux OS (described herein) with any operating system (OS), such as Palm, PocketPC, Apple OSX, etc. Furthermore, provided that the mid-tier SCORE subsystem described hereinabove supports a specific hardware platform equipped with an image sensor, trigger switch of one form or another etc., and that the same (or similar) top-tier "Bar Code Symbol Reading System" Application is compiled for that platform, any universal (mobile) computing device can be transformed into an Image Acquisition and Processing System having the bar code symbol reading functionalities of the system described hereinabove.

In alternative embodiments of the present invention, illumination arrays 27, 28 and 29 employed within the Multi-Mode Illumination Subsystem 14 may be realized using solid-state light sources other than LEDs, such as, for example, visible laser diode (VLDs) taught in great detail in WIPO Publication No. WO 02/43195 A2, published on May 30, 2002, assigned to Metrologic Instruments, Inc., and incorporated herein by reference in its entirety as if set forth fully herein. However, when using VLD-based illumination techniques in the imaging-based bar code symbol reader of the present invention, great care must be taken to eliminate or otherwise substantially reduce speckle-noise generated at the image detection array 22 when using coherent illumination source during object illumination and imaging operations. WIPO Publication No. WO 02/43195 A2, supra, provides diverse methods of and apparatus for eliminating or substantially reducing speckle-noise during image formation and detection when using VLD-based illumination arrays. Also, when using LEDs, the wavelengths of illumination produced therefrom may be outside the visible band and therefore include infrared (IR) wavelengths, or combinations of visible and invisible electromagnetic radiation.

While CMOS image sensing array technology was described as being used in the preferred embodiments of the present invention, it is understood that in alternative embodiments, CCD-type image sensing array technology, as well as other kinds of image detection technology, can be used.

The bar code reader design described in great detail hereinabove can be readily adapted for use as an industrial or commercial fixed-position bar code reader/imager, having the interfaces commonly used in the industrial world, such as Ethernet TCP/IP for instance. By providing the system with an Ethernet TCP/IP port, a number of useful features will be enabled, such as, for example: multi-user access to such bar code reading systems over the Internet; control of multiple bar code reading system on the network from a single user application; efficient use of such bar code reading systems in live video operations; web-servicing of such bar code reading systems, i.e. controlling the system or a network of systems from an Internet Browser; and the like.

While the illustrative embodiments of the present invention have been described in connection with various types of bar code symbol reading applications involving 1-D and 2-D bar code structures, it is understood that the present invention can be use to read (i.e. recognize) any machine-readable indicia, dataform, or graphically-encoded form of intelligence, including, but not limited to bar code symbol structures, alphanumeric character recognition strings, handwriting, and diverse dataforms currently known in the art or to be developed in the future. Hereinafter, the term "code symbol" shall be deemed to include all such information carrying structures and other forms of graphically-encoded intelligence.

Also, imaging-based bar code symbol readers of the present invention can also be used to capture and process various kinds of graphical images including photos and marks printed on driver licenses, permits, credit cards, debit cards, or the like, in diverse user applications.

It is understood that the image capture and processing technology employed in bar code symbol reading systems of the illustrative embodiments may be modified in a variety of ways which will become readily apparent to those skilled in the art of having the benefit of the novel teachings disclosed herein. All such modifications and variations of the illustrative embodiments thereof shall be deemed to be within the scope and spirit of the present invention as defined by the Claims to Invention appended hereto.

The invention claimed is:

1. An automatic digital video image capture and processing system supporting an image-processing based code symbol reading process during a pass-through mode of system operation at a retail point of sale (POS) station, comprising:
   a housing supportable on a countertop surface at a point-of-sale (POS) station or other work environment, and including an imaging window;
   a digital image formation and detection subsystem, disposed within said housing, and having (i) image formation optics for projecting a field of view (FOV) from an area-type image detection array, through said imaging window, and upon an object to be imaged during object illumination and imaging operations, and (ii) said area-type image detection array detecting frames of digital video data of the object during said object illumination and imaging operations carried out while said automatic digital video image capture and processing system is configured in said pass-through mode of system operation;
   an automatic object direction detection subsystem, disposed in said housing, for automatically detecting the presence and direction of movement of the object in said FOV, and in response thereto, generating a first signal indicating a triggering event and a second signal indicating the direction of movement of said object with respect to said FOV;
   an illumination subsystem, disposed within said housing, and having an illumination array for producing and projecting a field of illumination within said FOV during said object illumination and imaging operations;
   an automatic illumination control subsystem, disposed within said housing, for controlling said illumination array during said object illumination and imaging operations;
   a digital image capturing and buffering subsystem, disposed within said housing, for capturing and buffering said frames of digital video data in memory, during said object illumination and imaging operations;
   a digital image processing subsystem, disposed in said housing, for processing said frames of digital video data and reading one or more code symbols graphically represented in said frames of digital video data, and producing symbol character data representative of said read one or more code symbols;
   an input/output subsystem, disposed in said housing, for transmitting said symbol character data to an external host system or other information receiving or responding device; and
   a system control subsystem, disposed in said housing, and responsive to said first and second signals, for controlling and/or coordinating the operation of said subsystems above.

2. The automatic digital video image capture and processing system of claim 1, wherein said automatic object direction detection subsystem comprises:
   a plurality of IR-based object presence and direction detection fields projected through said FOV, for (i) automatically detecting an object moving through the object presence and direction detection fields, (ii) generating one or more detection signals in response to detecting an object moving through the object presence and direction detection fields, and (iii) processing said one or more detection signals so as to generate said second signal indicating that the detected object is being moved in one or more of a plurality of directions referenced with respect to said imaging window.

3. The automatic digital video image capture and processing system of claim 2, wherein said plurality of directions includes directions selected from the group consisting of left-to-right direction, right-to-left direction, up-to-down direction, and down-to-up direction.

4. The automatic digital video image capture and processing system of claim 2, wherein said automatic object direction detection subsystem comprises a plurality of independent IR-based transmitters and receivers, and wherein each said independent IR-based transmitter and receiver comprises an IR-based light emitting diode (LED) and an IR-based photo-receiving diode, for supporting one of said plurality of IR-based object presence and direction detection fields and generating one said detection signal in response to the detection of the object in said object presence and direction detection fields.

5. The automatic digital video image capture and processing system of claim 4, wherein said automatic object direction detection subsystem further comprises a signal processor for processing said detection signals generated by said plurality of independent IR-based transmitters and receivers.

6. The automatic digital video image capture and processing system of claim 1, wherein said area-type image detection array detects narrow-area frames of digital video data of the object during said object illumination and imaging operations.

7. The automatic digital video image capture and processing system of claim 6, wherein said field of view and said area-type image detection array are arranged so that said narrow-area frames are taken substantially perpendicular to the countertop surface on which said housing is supported, as said object is moved through said FOV during said pass-through mode of system operation.

8. The automatic digital video image capture and processing system of claim 1, wherein each said code symbol is a bar code symbol selected from the group consisting of a 1D bar code symbol, a 2D bar code symbol, and a data matrix type code symbol structure.

9. The automatic digital video image capture and processing system of claim 1, wherein said image formation optics comprises a lens barrel assembly for supporting a plurality of lenses.

10. The automatic digital video image capture and processing system of claim 1, which further comprises an automatic illumination exposure measurement subsystem, disposed within said housing, for measuring the intensity of illumination reflected and/or scattered off the illuminated object, and producing an electrical signal representative of said measured intensity; and wherein said automatic illumination control subsystem further comprises digital circuitry for controlling drive signals provided to said illumination array, in response to said electrical signal produced by said automatic illumination exposure measurement subsystem.

11. The automatic digital video image capture and processing system of claim 1, wherein said illumination subsystem comprises:
   (i) an illumination board supported within said housing and having a central aperture through which said FOV passes during object illumination and imaging operations, and on which said illumination array is mounted, and
   (ii) an assembly of lenses for focusing and/or shaping illumination emanating from said illumination array so as to produce said field of illumination within said FOV.

12. The automatic digital video image capture and processing system of claim 10, wherein said automatic illumination exposure measurement subsystem includes an optical component for collecting illumination scattered off an illuminated object present in said FOV, and directing the collected illumination onto a photo-detector, operating independently from said area-type image detection array, for measuring the intensity of said collected illumination and producing an electrical signal representative of said measured intensity.

13. The automatic digital video image capture and processing system of claim 1, wherein said field of illumination comprises narrow-band illumination produced from said illumination array.

14. The automatic digital video image capture and processing system of claim 13, wherein said narrow-band illumination is visible to the human vision system.

15. The automatic digital video image capture and processing system of claim 1, wherein said illumination array comprises a plurality of light emitting diodes (LEDs).

16. The automatic digital video image capture and processing system of claim 1, which further comprises a mechanism for automatically configuring said automatic digital video image capture and processing system in said pass-through mode of system operation, upon said housing being placed on said countertop surface.

17. The automatic digital video image capture and processing system of claim 1, which further comprises a computing platform, disposed in said housing, for implementing said digital image processing subsystem, said input/output subsystem and said system control subsystem.

18. The automatic digital video image capture and processing system of claim 17, wherein said computing platform comprises:
   (i) a multi-tier modular software architecture characterized by an Operating System (OS) layer, and an application layer; and
   (ii) a microprocessor for running one or more applications stored in one or more software libraries maintained in said Application layer, and
   wherein said one or more software libraries contains a code associated with a digital-imaging based code symbol reading application which is responsive to the generation of said triggering event while said automatic digital video image capture and processing system is operating in said pass-through mode of system operation, and wherein said digital image formation and detection subsystem is configured in a video image capture mode of operation.

19. The automatic digital video image capture and processing system of claim 18, wherein said multi-tier modular software architecture further comprises a System CORE (SCORE) layer positioned between said OS layer and said application layer.

20. The automatic digital video image capture and processing system of claim 19, wherein said OS layer comprises one or more software modules selected from the group consisting of an OS kernal module, an OS file system module, and device driver modules.

21. The automatic digital video image capture and processing system of claim 19, wherein said SCORE layer includes one or more of the software modules selected from the group consisting of a tasks manager module, an events dispatcher module, an input/output manager module, a user commands manager module, a timer subsystem module, an input/output subsystem module and a memory control subsystem module.

22. The automatic digital video image capture and processing system of claim 19, wherein said application layer includes one or more software modules selected from the group consisting of a code symbol decoding module, a function programming module, an application events manager module, a user commands table module, and a command handler module.

23. The automatic digital video image capture and processing system of claim 1, wherein said housing is also hand-supportable.

* * * * *